US012811177B2

(12) United States Patent
Varni et al.

(10) Patent No.: US 12,811,177 B2
(45) Date of Patent: Nov. 24, 2026

(54) CELL FORMATION SYSTEM INCLUDING COMPRESSION FIXTURE FOR LITHIUM CONTAINING SECONDARY BATTERIES

(71) Applicant: Enovix Corporation, Fremont, CA (US)

(72) Inventors: John F. Varni, Campbell, CA (US); Robert F. Kinchen, Fremont, CA (US); Robbie Singh Sidhu, Mountain House, CA (US); Ilya Dvoiris, Piedmont, CA (US)

(73) Assignee: Enovix Corporation, Fremont, CA (US)

( * ) Notice: Subject to any disclaimer, the term of this patent is extended or adjusted under 35 U.S.C. 154(b) by 757 days.

(21) Appl. No.: 18/189,389

(22) Filed: Mar. 24, 2023

(65) Prior Publication Data

US 2023/0318017 A1 Oct. 5, 2023

Related U.S. Application Data

(60) Provisional application No. 63/325,928, filed on Mar. 31, 2022.

(51) Int. Cl.

| | |
|---|---|
| ***H01M 10/04*** | (2006.01) |
| ***H01M 10/0525*** | (2010.01) |
| ***H01M 50/507*** | (2021.01) |

(52) U.S. Cl.
CPC ... *H01M 10/0481* (2013.01); *H01M 10/0525* (2013.01); *H01M 50/507* (2021.01)

(58) Field of Classification Search
CPC ......... H01M 10/0481; H01M 10/0525; H01M 50/507; H01M 10/052; H01M 50/547
See application file for complete search history.

(56) References Cited

U.S. PATENT DOCUMENTS

| | | | | |
|---|---|---|---|---|
| 2004/0154160 | A1 | 8/2004 | Hong | |
| 2012/0312719 | A1 | 12/2012 | Fan et al. | |
| 2018/0191023 | A1 | 7/2018 | Cao et al. | |
| 2019/0157708 | A1 | 5/2019 | Mao et al. | |
| 2019/0260064 | A1* | 8/2019 | An | H01M 4/38 |
| 2020/0212493 | A1* | 7/2020 | Busacca | H01M 10/0525 |
| 2020/0313146 | A1* | 10/2020 | Busacca | H01M 50/54 |

FOREIGN PATENT DOCUMENTS

| | | |
|---|---|---|
| CN | 111261922 A | 6/2020 |

* cited by examiner

*Primary Examiner* — Stewart A Fraser
(74) *Attorney, Agent, or Firm* — Richard Shin; Dalton Chasser; Ronit Buller

(57) ABSTRACT

Disclosed herein are methods, devices, and control systems associated with battery cell formation.

21 Claims, 62 Drawing Sheets

CELL FORMATION SYSTEM INCLUDING COMPRESSION FIXTURE FOR LITHIUM CONTAINING SECONDARY BATTERIES

CROSS-REFERENCE TO RELATED APPLICATION

This application claims priority to U.S. Provisional Patent Application No. 63/325,928, filed Mar. 31, 2022, the disclosure of which is hereby incorporated by reference in its entirety.

FIELD

The field of the disclosure relates generally to the formation of secondary batteries, and more specifically, to a cell formation system for lithium containing secondary batteries.

BACKGROUND

In rocking-chair battery cells, both the positive electrode and the negative electrode of a secondary battery comprise materials into which a carrier ion, such as lithium, inserts and extracts. As the battery is discharged, carrier ions are extracted from the negative electrode and inserted into the positive electrode. As the battery is charged, the carrier ion is extracted from the positive electrode and inserted into the negative electrode.

Silicon has become a promising candidate to replace carbonaceous materials as the anode because of its high specific capacity. For instance, graphite anodes formed from $LiC_6$ may have a specific capacity of about 370 milli-amp hours per gram (mAh/g), while crystalline silicon anodes formed from $Li_{15}Si_4$ may have a specific capacity of about 3600 mAh/g, a nearly 10 fold increase over graphite anodes. However, the use of silicon anodes has been limited, due to the large volumetric changes (e.g., 300%) in silicon when Li carrier ions are inserted into silicon anodes. This volumetric increase along with the cracking and pulverization associated with the charge and discharge cycles has limited the use of silicon anodes in practice. In addition, the use of silicon anodes has been limited due to its poor initial columbic efficiency (ICE), which leads to a capacity loss during the initial formation of secondary batteries that utilize silicon anodes.

After a lithium containing secondary battery is assembled, the assembled battery is typically subjected to a formation process. During the formation process, the battery is slowly charged and discharged one or more times. At least some known formation processes include a pre-lithiation process to add lithium to the battery. These formation processes are typically performed by large centralized systems. Such systems include a central control center that is connected to all of the batteries that are to undergo the formation process. The central control center directly controls the charging, discharging, and (where applicable) pre-lithiation of all of the batteries to which it is connected. In order to be capable of controlling the formation processes and distributing electrical power to a large number of batteries, the central control centers are relatively large and expensive systems using a significant amount of power, occupying a significant amount of space, and utilizing a large amount of wire to connect to all of the batteries undergoing formation.

BRIEF DESCRIPTION

One embodiment comprises a cell formation system for lithium containing secondary batteries. Each lithium containing secondary battery includes a population of unit cells, an electrode busbar, a counter-electrode busbar, a first terminal electrically connected to the electrode busbar, and a second terminal electrically connected to the counter-electrode busbar. Each unit cell of the population of unit cells includes an electrode structure, a separator structure, and a counter-electrode structure. The cell formation system includes a compression fixture and a loading mechanism. The compression fixture includes a base and a plurality of compression plate sets coupled to the base. Each compression plate set includes a fixed compression plate, a moveable compression plate moveable relative to the fixed compression plate between a first position and a second position, and at least one spring operatively coupled to the moveable compression. The moveable compression plate is positioned farther from the fixed compression plate in the second position than in the first position. The fixed compression plate and the moveable compression plate define a battery receptacle therebetween for receiving a lithium containing secondary battery. The at least one spring biases the moveable compression plate towards the fixed compression plate such that a compressive force is applied to the lithium containing secondary battery when positioned within the battery receptacle. The loading mechanism includes at least one plate spreader operable to move the moveable compression plate away from the fixed compression plate to load and unload the lithium containing secondary battery within the battery receptacle.

Another embodiment comprises a compression fixture for lithium containing secondary batteries. Each lithium containing secondary battery includes a population of unit cells, an electrode busbar, a counter-electrode busbar, a first terminal electrically connected to the electrode busbar, and a second terminal electrically connected to the counter-electrode busbar. Each unit cell of the population of unit cells includes an electrode structure, a separator structure, and a counter-electrode structure. The compression fixture includes a base and a plurality of compression plate sets coupled to the base. Each compression plate set includes a fixed compression plate, a moveable compression plate, and at least one spring coupled to the moveable compression plate. The moveable compression plate is moveable relative to the fixed compression plate between a first position and a second position in which the moveable compression plate is positioned farther from the fixed compression plate than in the first position. The fixed compression plate and the moveable compression plate define a battery receptacle therebetween for receiving a lithium containing secondary battery. The at least one spring biases the moveable compression plate towards the fixed compression plate such that a compressive force is applied to the lithium containing secondary battery when positioned within the battery receptacle.

Another embodiment comprises a method for manufacturing lithium containing secondary batteries. Each lithium containing secondary battery includes a population of unit cells, an electrode busbar, a counter-electrode busbar, a first terminal electrically connected to the electrode busbar, and a second terminal electrically connected to the counter-electrode busbar. Each unit cell of the population of unit cells includes an electrode structure, a separator structure, and a counter-electrode structure. The method includes moving a moveable compression plate of a compression plate set from a first position to a second position. The compression plate set includes a fixed compression plate, the moveable compression plate, and at least one spring that biases the moveable compression plate towards the fixed compression plate. The fixed compression plate and the moveable compression plate define a battery receptacle therebetween. The moveable compression plate is positioned farther from the fixed compression plate in the second position than in the first position. The method further includes positioning a lithium containing secondary battery within the battery receptacle, and moving the moveable compression plate towards and into engagement with the lithium containing secondary battery such that the lithium containing secondary battery is compressed between the fixed compression plate and the moveable compression plate.

Various refinements exist of the features noted in relation to the above-mentioned aspects. Further features may also be incorporated in the above-mentioned aspects. These refinements and additional features may exist individually or in any combination. For instance, various features discussed below in relation to any of the illustrated embodiments may be incorporated into any of the above-described aspects, alone or in any combination.

DEFINITIONS

Figure 1:
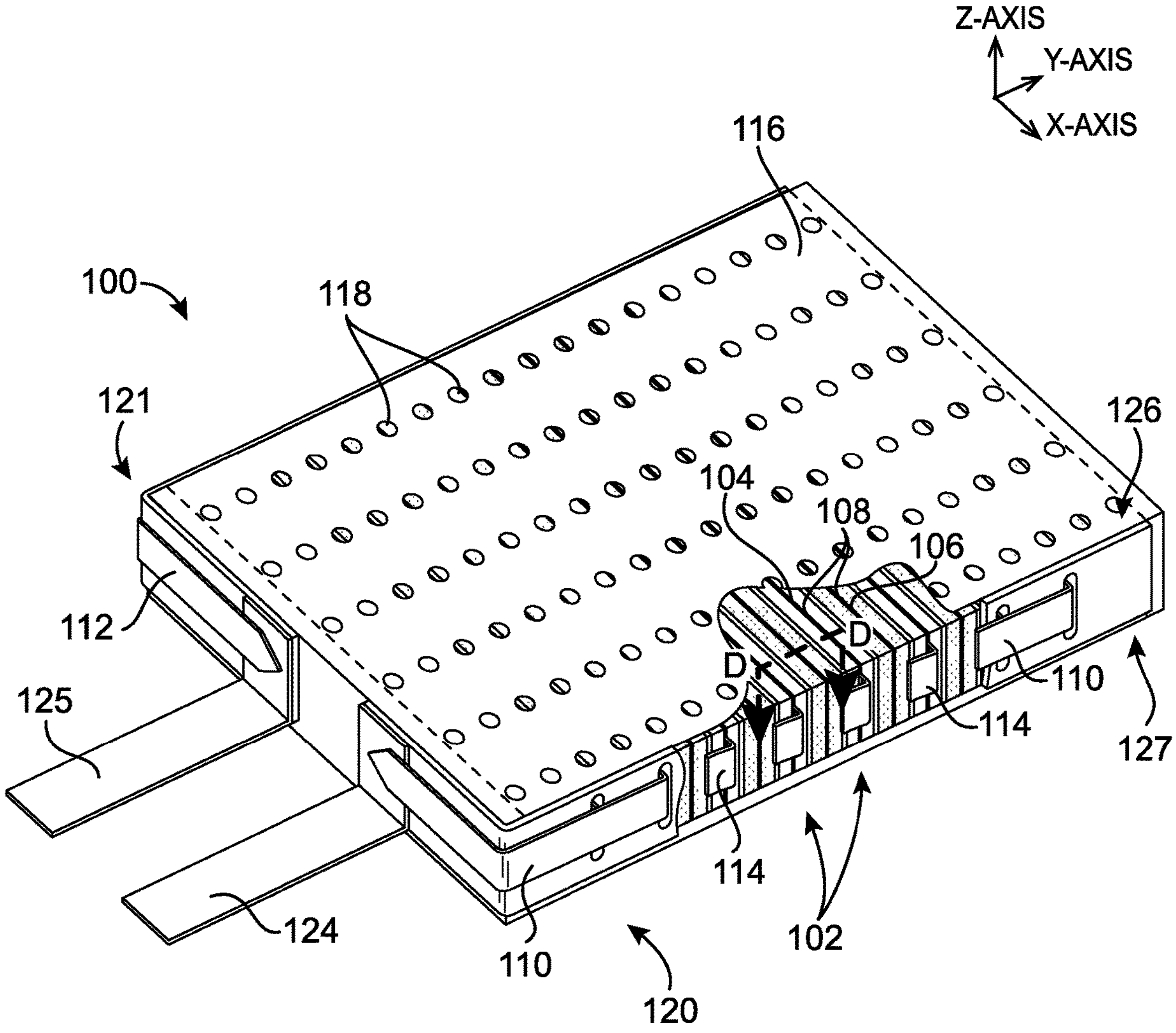
FIG. 1 is a perspective view of a secondary battery of an exemplary embodiment.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 micrometers (μm) would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anode material" or "Anodically active" as used herein means material suitable for use as the negative electrode of a secondary battery "Cathode" as used herein in the context of a secondary battery refers to the positive electrode in the secondary battery "Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter-electrode" as used herein may refer to the negative or positive electrode (anode or cathode), opposite of the Electrode, of a secondary battery unless the context clearly indicates otherwise.

"Counter-electrode current collector" as used herein may refer to the negative or positive (anode or cathode) current collector, opposite of the Electrode current connector, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector" as used herein may refer to the negative or positive (anode or cathode) current collector of a secondary battery unless the context clearly indicates otherwise.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Capacity" or "C" as used herein refers to an amount of electric charge that a battery (or a sub-portion of a battery comprising one or more pairs of electrode structures and counter-electrode structures that form a bilayer) can deliver at a pre-defined voltage unless the context clearly indicates otherwise.

"Electrolyte" as used herein refers to a non-metallic liquid, gel, or solid material in which current is carried by the movement of ions adapted for use in a battery unless the context clearly indicates otherwise.

"Charged state" as used herein in the context of the state of a secondary battery refers to a state where the secondary battery is charged to at least 75% of its rated capacity unless the context clearly indicates otherwise. For example, the battery may be charged to at least 80% of its rated capacity, at least 90% of its rated capacity, and even at least 95% of its rated capacity, such as 100% of its rated capacity.

"Discharge capacity" as used herein in connection with a negative electrode means the quantity of carrier ions available for extraction from the negative electrode and insertion into the positive electrode during a discharge operation of the battery between a predetermined set of cell end of charge and end of discharge voltage limits unless the context clearly indicates otherwise.

"Discharged state" as used herein in the context of the state of a secondary battery refers to a state where the secondary battery is discharged to less than 25% of its rated capacity unless the context clearly indicates otherwise. For example, the battery may be discharged to less than 20% of its rated capacity, such as less than 10% of its rated capacity, and even less than 5% of its rated capacity, such as 0% of its rated capacity.

"Reversible coulombic capacity" as used herein in connection with an electrode (i.e., a positive electrode, a negative electrode or an auxiliary electrode) means the total capacity of the electrode for carrier ions available for reversible exchange with a counter electrode.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

"Composite material" or "Composite" as used herein refers to a material which comprises two or more constituent materials unless the context clearly indicates otherwise.

"Void fraction" or "Porosity" or "Void volume fraction" as used herein refers to a measurement of the voids (i.e., empty) spaces in a material, and is a fraction of the volume of voids over the total volume of the material, between 0 and 1, or as a percentage between 0% and 100%.

"Polymer" as used herein may refer to a substance or material consisting of repeating subunits of macromolecules unless the context clearly indicates otherwise.

"Microstructure" as used herein may refer to the structure of a surface of a material revealed by an optical microscope above about 25× magnification unless the context clearly indicates otherwise.

"Microporous" as used herein may refer to a material containing pores with diameters less than about 2 nanometers unless the context clearly indicates otherwise.

"Macroporous" as used herein may refer to a material containing pores with diameters greater than about 50 nanometers unless the context clearly indicates otherwise.

"Nanoscale" or "Nanoscopic scale" as used herein may refer to structures with a length scale in the range of about 1 nanometer to about 100 nanometers.

"Pre-lithiation" or "Pre-lithiate" as used herein may refer to the addition of lithium to the active lithium content of a lithium containing secondary battery as part of the formation process prior to battery operation to compensate for the loss of active lithium. "Pre-lithiation" or "Pre-lithiate" may also be referred to herein as a "buffer process."

DETAILED DESCRIPTION

Embodiments of the present disclosure provide a distributed formation process where modern electronics and distributed embedded network strategies are employed. Thus, instead of a centralized system that requires dedicated connections to every battery undergoing the formation process and that controls the formation process for hundreds or thousands of batteries, the formation process in example embodiments of this disclosure is distributed among smaller clusters, each of which directly handles the formation process for a battery to which it is connected. These embodiments may simplify the construction of formation systems by requiring less powerful central controllers and less interconnection wiring, while allowing the formation processing system to be more easily scaled up or down, and physically distributed where desired.

Some embodiments of the present disclosure may provide benefits such as mitigation or improvement of the poor ICE associated with silicon-based anodes in secondary batteries utilizing an auxiliary anode electrochemically coupled with the secondary battery that provides additional carrier ion during and/or subsequent to initial battery formation. The use of an auxiliary anode mitigates the initial loss of carrier ions in the secondary battery during initial formation, thereby providing a technical benefit of, for example, increasing the capacity of the secondary battery after formation. Further, the introduction of additional carrier ions after battery formation mitigates the cycle-based decrease in carrier ions that are typically lost through secondary reactions, thereby providing a technical benefit of decreasing the cycle-by-cycle capacity loss in a secondary battery. Further still, the introduction of additional carrier ions after battery formation improves the cycling performance of the secondary battery by maintaining the anode of the secondary battery at a lower potential voltage at discharge, as the anode includes additional carrier ions. In some embodiments, the auxiliary anode is removed from the secondary battery after formation, thereby providing a technical benefit of increasing the energy density of the battery.

Figure 2:
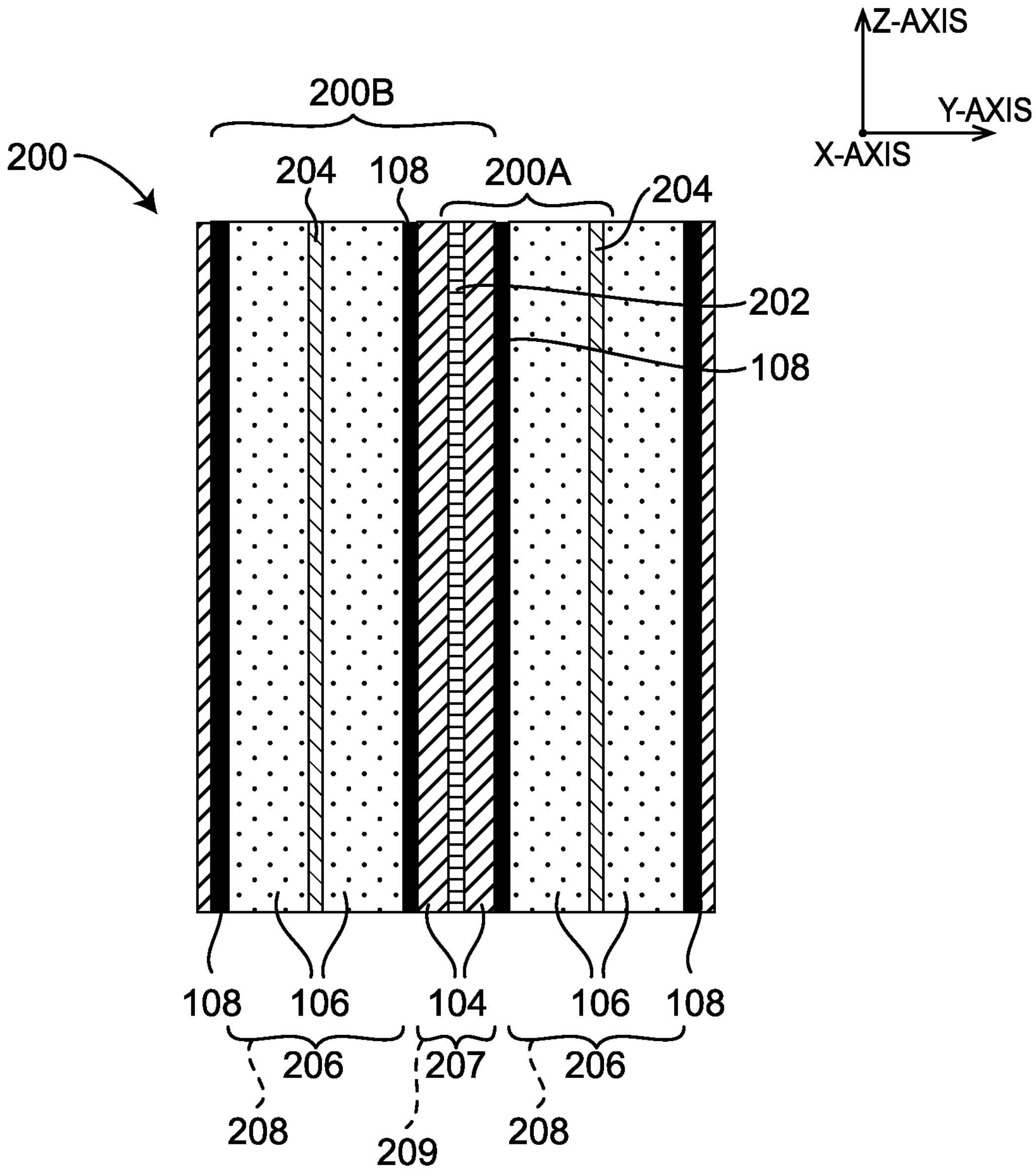
FIG. 2 depicts a unit cell for the secondary battery of FIG. 1.

FIG. 1 is a perspective view of a secondary battery 100 of an exemplary embodiment, and FIG. 2 depicts a unit cell 200 for the secondary battery 100. The secondary battery 100 in FIG. 1 has a portion exposed showing some of the internal structures of the secondary battery, as further described below.

As illustrated in FIG. 1, the secondary battery 100 includes a plurality of adjacent electrode sub-units 102. Each of the electrode sub-units 102 has a dimension in the X-axis, Y-axis and Z-axis, respectively. The X-axis, Y-axis and Z-axis are each mutually perpendicular, akin to a Cartesian coordinate system. As used herein, dimensions of each electrode sub-unit 102 in the Z-axis may be referred to as a "height", dimensions in the X-axis may be referred to as a "length" and dimensions in the Y-axis may be referred to as a "width." The electrode sub-units 102 may be combined into one or more unit cells 200 (see FIG. 2). Each of the unit cells 200 comprises at least one anodically active material layer 104 and at least one cathodically active material layer 106. The anodically active material layer 104 and the cathodically active material layer 106 are electrically isolated from each other by a separator layer 108. It should be appreciated that in suitable embodiments of the present disclosure, any number of the electrode sub-units 102 may be used, such as from 1 to 200 or more of the electrode sub-units 102 in the secondary battery 100.

Referring to FIG. 1, the secondary battery 100 includes a first busbar 110 and a second busbar 112 that are in electrical contact with the anodically active material layer 104 and the cathodically active material layer 106 of each of the electrode sub-units 102, respectively, via electrode tabs 114. The electrode tabs 114 are only visible on a first side 120 of the secondary battery 100 in FIG. 1, although a different set of the electrode tabs 114 are present on a second side 121 of the secondary battery. The electrode tabs 114 on the first side 120 of the secondary battery 100 are electrically coupled with the first busbar 110, which may be referred to as an anode busbar. The electrode tabs 114 on the second side 121 of the secondary battery 100 (not visible in FIG. 1) are electrically coupled to the second busbar 112, which may be referred to as a cathode busbar. In this embodiment, the first busbar 110 is electrically coupled with a first electrical terminal 124 of the secondary battery 100, which is electrically conductive. When the first busbar 110 comprises an anode busbar for the secondary battery 100, the first electrical terminal 124 comprises a negative terminal for the secondary battery 100. Further in this embodiment, the second busbar 112 is electrically coupled with a second electrical terminal 125 of the secondary battery 100, which is electrically conductive. When the second busbar 112 comprises a cathode busbar for the secondary battery 100, the second electrical terminal 125 comprises a positive terminal for the secondary battery 100.

In one embodiment, a casing 116, which may be referred to as a constraint, may be applied over one or both of the X-Y surfaces of the secondary battery 100. In the embodiment shown in FIG. 1, the casing 116 includes a plurality of perforations 118 to facilitate distribution or flow of an electrolyte solution once the secondary battery 100 has been fully assembled. In one embodiment, the casing 116 comprises stainless steel, such as SS301, SS316, 440C or 440C hard. In other embodiments, the casing 116 comprises aluminum (e.g., aluminum 7075-T6, hard H18, etc.), titanium (e.g., 6A1-4V), beryllium, beryllium copper (hard), copper ($O_2$ free, hard), nickel, other metals or metal alloys, composite, polymer, ceramic (e.g., alumina (e.g., sintered or Coorstek AD96), zirconia (e.g., Coorstek YZTP), yttriastabilizedzirconia (e.g., ENrG E-Strate®)), glass, tempered glass, polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass (e.g., Victrex 90HMF40 or Xycomp 1000-04), polyimide (e.g., Kapton®), E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy, Kevlar 49 Aramid Fiber, S Glass Fibers, Carbon Fibers, Vectran UM LCP Fibers, Dyneema, Zylon, or other suitable material.

In some embodiments, the casing 116 comprises a sheet having a thickness in the range of about 10 to about 100 micrometers (μm). In one embodiment, the casing 116 comprises a stainless-steel sheet (e.g., SS316) having a thickness of about 30 μm. In another embodiment, the casing 116 comprises an aluminum sheet (e.g., 7075-T6) having a thickness of about 40 μm. In another embodiment, the casing 116 comprises a zirconia sheet (e.g., Coorstek YZTP) having a thickness of about 30 μm. In another embodiment, the casing 116 comprises an E Glass UD/Epoxy 0 deg sheet having a thickness of about 75 μm. In another embodiment, the casing 116 comprises 12 μm carbon fibers at >50% packing density.

In this embodiment, the secondary battery 100 includes a first major surface 126 and a second major surface 127 that opposes the first major surface 126. The major surfaces 126, 127 of the secondary battery 100 may be substantially planar is some embodiments.

With reference to FIG. 2, which depicts the secondary battery 100 along cut lines D-D in FIG. 1, the individual layers of the unit cell 200, which may be the same as or similar to the electrode sub-units 102, is shown. For each of the unit cells 200, in some embodiments, the separator layer 108 is an ionically permeable microporous polymeric material suitable for use as a separator in a secondary battery. In an embodiment, the separator layer 108 is coated with ceramic particles on one or both sides. In this embodiment, unit cell 200 includes an anode current collector 202 in the center, which may comprise or be electrically coupled with, one of the electrode tabs 114 on one of the sides 120, 121 of the secondary battery 100 (see FIG. 1). The unit cell 200 further includes the anodically active material layer 104, the separator layer 108, the cathodically active material layer 106, and a cathode current collector 204 in a stacked formation. The cathode current collector 204 may comprise or be electrically coupled with, one of the electrode tabs 114 on one of the sides 120, 121 of the secondary battery 100 that is different than the anode current collector 202.

In an alternative embodiment, the placement of the cathodically active material layer 106 and the anodically active material layer 104 may be swapped, such that the cathodically active material layers are toward the center and the anodically active material layers are distal to the cathodically active material layers. In one embodiment, a unit cell 200A includes, from left to right in stacked succession, the anode current collector 202, the anodically active material layer 104, the separator layer 108, the cathodically active material layer 106, and the cathode current collector 204. In an alternative embodiment, a unit cell 200B includes, from left to right in stacked succession, the separator layer 108, a first layer of the cathodically active material layer 106, the cathode current collector 204, a second layer of the cathodically active material layer 106, the separator layer 108, a first layer of the anodically active material layer 104, the anode current collector 202, a second layer of the anodically active material layer 104, and the separator layer 108.

In FIG. 2, the layered structure comprising the cathodically active material layer 106 and the cathode current collector 204 may be referred to as a cathode structure 206, while the layered structure comprising the anodically active material layer 104 and the anode current collector 202 may be referred to as an anode structure 207. Collectively, the population of the cathode structures 206 for the secondary battery 100 may be referred to as a positive electrode 208 of the secondary battery 100, and the population of the anode structures 207 for the secondary battery 100 (only one of the anode structures 207 are shown in FIG. 2) may be referred to as the negative electrode 209 of the secondary battery 100.

A voltage difference V exists between adjacent cathode structures 206 and anode structures 207, with the adjacent structures considered a bilayer in some embodiments. Each bilayer has a capacity C determined by the makeup and configuration of the cathode structures 206 and the anode structures 207. In this embodiment, each bilayer produces a voltage difference of about 4.35 volts. In other embodiments, each bilayer has a voltage difference of about 0.5 volts, about 1.0 volts, about 1.5 volts, about 2.0 volts, about 2.5 volts, about 3.0 volts, about 3.5 volts, about 4.0 volts, 4.5 volts, about 5.0 volts, between 4 and 5 volts, or any other suitable voltage. During cycling between a charged state and a discharged state, the voltage may vary, for example, between about 2.5 volts and about 4.35 volts. The capacity C of a bilayer in this embodiment is about 3.5 milliampere-hour (mAh). In other embodiments, the capacity C of a bilayer is about 2 mAh, less than 5 mAh, or any other suitable capacity. In some embodiments, the capacity C of a bilayer may be up to about 10 mAh.

The cathode current collector 204 may comprise aluminum, nickel, cobalt, titanium, and tungsten, or alloys thereof, or any other material suitable for use as a cathode current collector layer. In general, the cathode current collector 204 will have an electrical conductivity of at least about 103 Siemens/cm. For example, in one such embodiment, the cathode current collector 204 will have a conductivity of at least about 104 Siemens/cm. By way of further example, in one such embodiment, the cathode current collector 204 will have a conductivity of at least about 105 Siemens/cm. In general, the cathode current collector 204, may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, the cathode current collector 204 comprises gold or an alloy thereof such as gold silicide. By way of further example, in one embodiment, the cathode current collector 204 comprises nickel or an alloy thereof such as nickel silicide.

The cathodically active material layer 106 may be an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3.2d}$, $FeF_3$, $CoF_3$, $CoF_2$, $CuF_2$, $NiF_2$, where $0 \leq d \leq 0.5$, and the like.

Exemplary cathodically active material layers 106 also include any of a wide range of intercalation-type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathodically active materials include $LiCoO_2$, $LiNio_5Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathodically active material layers 106 will have a thickness of at least about 20 μm. For example, in one embodiment, the cathodically active material layers 106 will have a thickness of at least about 40 μm. By way of further example, in one such embodiment, the cathodically active material layers 106 will have a thickness of at least about 60 μm. By way of further example, in one such embodiment, the cathodically active material layers 106 will have a thickness of at least about 100 μm. Typically, the cathodically active material layers 106 will have a thickness of less than about 90 μm or less than about 70 μm.

Figure 3:
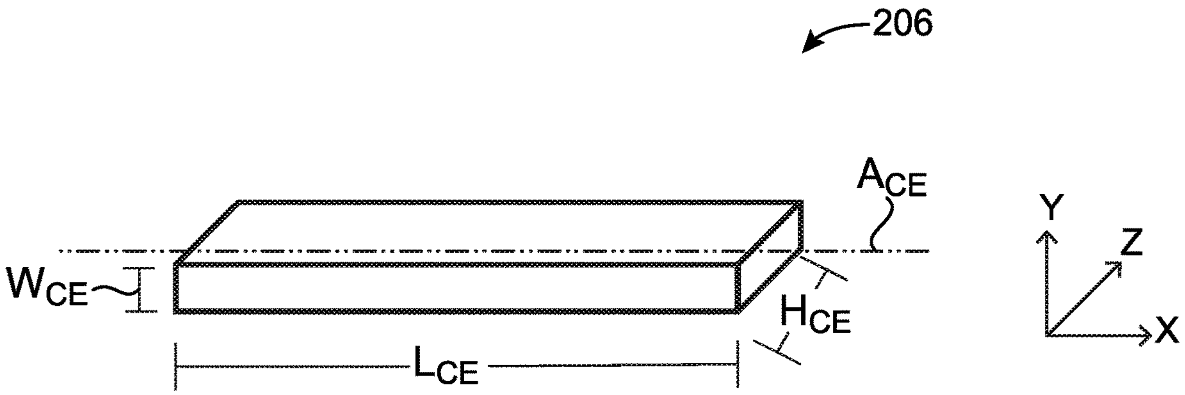
FIG. 3 depicts an example cathode structure for the unit cell of FIG. 2.

FIG. 3 depicts one of the cathode structures 206 of FIG. 2. Each cathode structure 206 has a length ($L_{CE}$) measured along the longitudinal axis ($A_{CE}$), a width ($W_{CE}$), and a height ($H_{CE}$) measured in a direction that is perpendicular to each of the directions of measurement of the length $L_{CE}$ and the width $W_{CE}$.

The length $L_{CE}$ of the cathode structures 206 will vary depending upon the secondary battery 100 and its intended use. In general, however, each cathode structure 206 will typically have a length $L_{CE}$ in the range of about 5 millimeters (mm) to about 500 mm. For example, in one such embodiment, each cathode structure 206 has a length $L_{CE}$ of about 10 mm to about 250 mm. By way of further example, in one such embodiment each cathode structure 206 has a length $L_{CE}$ of about 25 mm to about 100 mm. According to one embodiment, the cathode structures 206 include one or more first electrode members having a first length, and one or more second electrode members having a second length that is different than the first length. In yet another embodiment, the different lengths for the one or more first electrode members and one or more second electrode members may be selected to accommodate a predetermined shape for an electrode assembly, such as an electrode assembly shape having a different lengths along one or more of the longitudinal and/or transverse axis, and/or to provide predetermined performance characteristics for the secondary battery 100.

The width $W_{CE}$ of the cathode structures 206 will also vary depending upon the secondary battery 100 and its intended use. In general, however, the cathode structures 206 will typically have a width $W_{CE}$ within the range of about 0.01 mm to 2.5 mm. For example, in one embodiment, the width $W_{CE}$ of each cathode structure 206 will be in the range of about 0.025 mm to about 2 mm. By way of further example, in one embodiment, the width $W_{CE}$ of each cathode structure 206 will be in the range of about 0.05 mm to about 1 mm. According to one embodiment, the cathode structures 206 include one or more first electrode members having a first width, and one or more second electrode members having a second width that is different than the first width. In yet another embodiment, the different widths for the one or more first electrode members and one or more second electrode members may be selected to accommodate a predetermined shape for the secondary battery 100, such as an assembly having a different widths along one or more of the longitudinal and/or transverse axis, and/or to provide predetermined performance characteristics for the secondary battery 100.

The height $H_{CE}$ of the cathode structures 206 will also vary depending upon the secondary battery 100 and its intended use. In general, however, the cathode structures 206 will typically have a height $H_{CE}$ within the range of about 0.05 mm to about 25 mm. For example, in one embodiment, the height $H_{CE}$ of each cathode structure 206 will be in the range of about 0.05 mm to about 5 mm. By way of further example, in one embodiment, the height $H_{CE}$ of each cathode structure 206 will be in the range of about 0.1 mm to about 1 mm. According to one embodiment, the cathode structures 206 include one or more first cathode members having a first height, and one or more second cathode members having a second height that is different than the first height. In yet another embodiment, the different heights for the one or more first cathode members and one or more second cathode members may be selected to accommodate a predetermined shape for the secondary battery 100, such as a shape having a different heights along one or more of the longitudinal and/or transverse axis, and/or to provide predetermined performance characteristics for the secondary battery 100.

In general, each cathode structure 206 has a length $L_{CE}$ that is substantially greater than its width $W_{CE}$ and substantially greater than its height $H_{CE}$. For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each cathode structure 206. By way of further example, in one embodiment, the ratio of $L_{CE}$ to each of $W_{CE}$ and $H_{CE}$ is at least 10:1 for each cathode structure 206. By way of further example, in one embodiment, the ratio of $L_{CE}$ to each of $W_{CE}$ and $H_{CE}$ is at least 15:1 for each cathode structure 206. By way of further example, in one embodiment, the ratio of $L_{CE}$ to each of $W_{CE}$ and $H_{CE}$ is at least 20:1 for each cathode structure 206.

In one embodiment, the ratio of the height $H_{CE}$ to the width $W_{CE}$ of the cathode structures 206 is at least 0.4:1, respectively. For example, in one embodiment, the ratio of $H_{CE}$ to $W_{CE}$ will be at least 2:1, respectively, for each cathode structure 206. By way of further example, in one embodiment, the ratio of $H_{CE}$ to $W_{CE}$ will be at least 10:1, respectively, for each cathode structure 206. By way of further example, in one embodiment, the ratio of $H_{CE}$ to $W_{CE}$ will be at least 20:1, respectively, for each cathode structure 206. Typically, however, the ratio of $H_{CE}$ to $W_{CE}$ will generally be less than 1,000:1, respectively, for each cathode structure 206. For example, in one embodiment, the ratio of $H_{CE}$ to $W_{CE}$ will be less than 500:1, respectively, for each cathode structure 206. By way of further example, in one embodiment, the ratio of $H_{CE}$ to $W_{CE}$ will be less than 100:1, respectively. By way of further example, in one embodiment, the ratio of $H_{CE}$ to $W_{CE}$ will be less than 10:1, respectively. By way of further example, in one embodiment, the ratio of $H_{CE}$ to $W_{CE}$ will be in the range of about 2:1 to about 100:1, respectively, for each cathode structure 206.

Anodic Type Structures and Materials

Referring again to FIG. 2, the anode current collector 202 in the unit cell 200 may comprise a conductive material such as copper, carbon, nickel, stainless-steel, cobalt, titanium, and tungsten, and alloys thereof, or any other material suitable as an anode current collector layer. In general, the anode current collector 202 will have an electrical conductivity of at least about 103 Siemens/cm. For example, in one such embodiment, the anode current collector 202 will have a conductivity of at least about 104 Siemens/cm. By way of further example, in one such embodiment, the anode current collector 202 will have a conductivity of at least about 105 Siemens/cm.

In general, the anodically active material layers 104 in the unit cell 200 may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Exemplary anodically active material layers 104 include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material layers 104 comprise silicon or an alloy or oxide thereof.

In one embodiment, the anodically active material layers 104 are microstructured to provide a significant void volume fraction to accommodate volume expansion and contraction as lithium ions (or other carrier ions) are incorporated into or leave the anodically active material layers 104 during charging and discharging processes for the secondary battery 100. In general, the void volume fraction of (each of) the anodically active material layer 104 is at least 0.1. Typically, however, the void volume fraction of (each of) the anodically active material layer 104 is not greater than 0.8. For example, in one embodiment, the void volume fraction of (each of) the anodically active material layer 104 is about 0.15 to about 0.75. By way of the further example, in one embodiment, the void volume fraction of (each of) the anodically active material layer 104 is about 0.2 to about 0.7. By way of the further example, in one embodiment, the void volume fraction of (each of) the anodically active material layer 104 is about 0.25 to about 0.6.

Depending upon the composition of the microstructured anodically active material layers 104 and the method of their formation, the microstructured anodically active material layers 104 may comprise macroporous, microporous, or mesoporous material layers or a combination thereof, such as a combination of microporous and mesoporous, or a combination of mesoporous and macroporous. Microporous material is typically characterized by a pore dimension of less than 10 nanometer (nm), a wall dimension of less than 10 nm, a pore depth of 1 μm to 50 μm, and a pore morphology that is generally characterized by a "spongy" and irregular appearance, walls that are not smooth, and branched pores. Mesoporous material is typically characterized by a pore dimension of 10 nm to 50 nm, a wall dimension of 10 nm to 50 nm, a pore depth of 1 μm to 100 μm, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1 μm to 500 μm, and a pore morphology that may be varied, straight, branched, or dendritic, and smooth or rough-walled. Additionally, the void volume may comprise open or closed voids, or a combination thereof. In one embodiment, the void volume comprises open voids, that is, the anodically active material layers 104 contain voids having openings at the lateral surface of the anodically active material layers through which lithium ions (or other carrier ions) can enter or leave. For example, lithium ions may enter the anodically active material layers 104 through the void openings after leaving the cathodically active material layers 106. In another embodiment, the void volume comprises closed voids, that is, the anodically active material layers 104 contain voids that are enclosed. In general, open voids can provide greater interfacial surface area for the carrier ions whereas closed voids tend to be less susceptible to SEI formation, while each provides room for the expansion of anodically active material layers 104 upon the entry of carrier ions. In certain embodiments, therefore, it is preferred that the anodically active material layers 104 comprise a combination of open and closed voids.

In one embodiment, the anodically active material layers 104 comprise porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material layers 104 will generally have a porosity fraction of at least about 0.1, but less than 0.8 and have a thickness of about 1 μm to about 100 μm. For example, in one embodiment, the anodically active material layers 104 comprise porous silicon, have a thickness of about 5 μm to about 100 μm, and have a porosity fraction of about 0.15 to about 0.75. By way of further example, in one embodiment, the anodically active material layers 104 comprise porous silicon, have a thickness of about 10 μm to about 80 μm, and have a porosity fraction of about 0.15 to about 0.7. By way of further example, in one such embodiment, the anodically active material layers 104 comprise porous silicon, have a thickness of about 20 μm to about 50 μm, and have a porosity fraction of about 0.25 to about 0.6. By way of further example, in one embodiment, the anodically active material layers 104 comprise a porous silicon alloy (such as nickel silicide), have a thickness of about 5 μm to about 100 μm, and have a porosity fraction of about 0.15 to about 0.75.

In another embodiment, the anodically active material layers 104 comprise fibers of aluminum, tin, or silicon, or an alloy thereof. Individual fibers may have a diameter (thickness dimension) of about 5 nm to about 10,000 nm and a length generally corresponding to the thickness of the anodically active material layers 104. Fibers (nanowires) of silicon may be formed, for example, by chemical vapor deposition or other techniques known in the art such as vapor liquid solid (VLS) growth and solid liquid solid (SLS) growth. Additionally, the anodically active material layers 104 will generally have a porosity fraction of at least about 0.1, but less than 0.8 and have a thickness of about 1 μm to about 200 μm. For example, in one embodiment, the anodically active material layers 104 comprise silicon nanowires, have a thickness of about 5 μm to about 100 μm, and a porosity fraction of about 0.15 to about 0.75. By way of further example, in one embodiment, the anodically active material layers 104 comprise silicon nanowires, have a thickness of about 10 μm to about 80 μm, and a porosity fraction of about 0.15 to about 0.7. By way of further example, in one such embodiment, the anodically active material layers 104 comprise silicon nanowires, have a thickness of about 20 μm to about 50 μm, and a porosity fraction of about 0.25 to about 0.6. By way of further example, in one embodiment, the anodically active material layers 104 comprise nanowires of a silicon alloy (such as nickel silicide), have a thickness of about 5 μm to about 100 μm, and a porosity fraction of about 0.15 to about 0.75.

In yet other embodiments, the anodically active material layers 104 are coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the anodically active material layers 104 by spraying, loading, or otherwise disposing the lithium particulate material onto the anodically active material layers 104 at a loading amount of about 0.05 $mg/cm^2$ to 5 $mg/cm^2$, e.g., about 0.1 $mg/cm^2$ to 4 $mg/cm^2$, or even about 0.5 $mg/cm^2$ to 3 $mg/cm^2$. The average particle size ($D_{50}$) of the lithium particulate material may be 5 μm to 200 μm, e.g., about 10 μm to 100 μm, 20 μm to 80 μm, or even about 30 μm to 50 μm. The average particle size ($D_{50}$) may be defined as a particle size corresponding to 50% in a cumulative volume-based particle size distribution curve. The average particle size ($D_{50}$) may be measured, for example, using a laser diffraction method.

In one embodiment, the anode current collector 202 has an electrical conductance that is substantially greater than the electrical conductance of its associated anodically active material layers 104. For example, in one embodiment, the ratio of the electrical conductance of the anode current collector 202 to the electrical conductance of the anodically active material layers 104 is at least 100:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 500:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 1000:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 5000:1 when there is an applied current to store energy in the secondary battery 100 or an applied load to discharge the secondary battery 100. By way of further example, in some embodiments, the ratio of the electrical conductance of the anode current collector 202 to the electrical conductance of the anodically active material layers 104 is at least 10,000:1 when there is an applied current to store energy in the secondary battery 100 or an applied load to discharge the secondary battery 100.

Figure 4:
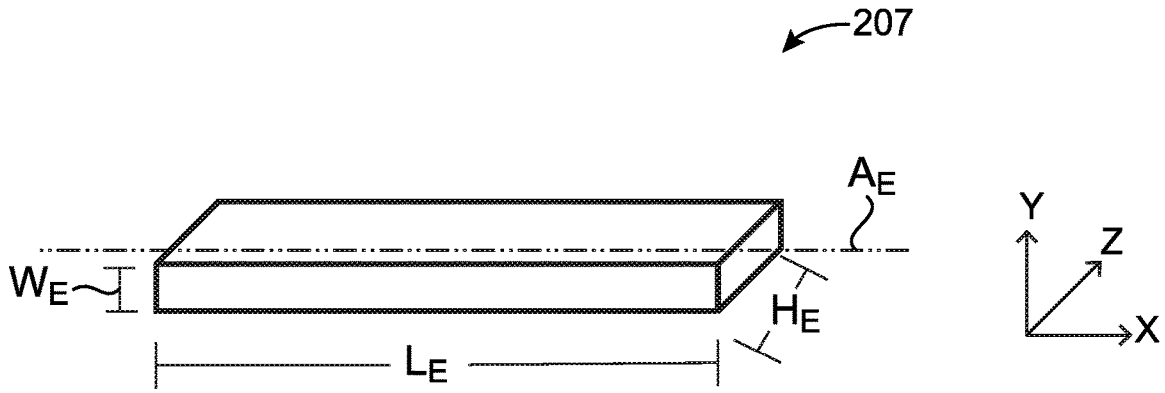
FIG. 4 depicts an anode structure for the unit cell of FIG. 2.

FIG. 4 depicts one of the anode structures 207 of FIG. 2 of an exemplary embodiment. Each anode structure 207 has a length ($L_E$) measured along a longitudinal axis ($A_E$) of the electrode, a width ($W_E$), and a height ($H_E$) measured in a direction that is orthogonal to each of the directions of measurement of the length $L_E$ and the width $W_E$.

The length $L_E$ of the anode structures 207 will vary depending upon the secondary battery 100 and its intended use. In general, however, the anode structures 207 will typically have a length $L_E$ in the range of about 5 millimeter (mm) to about 500 mm. For example, in one such embodiment, the anode structures 207 have a length $L_E$ of about 10 mm to about 250 mm. By way of further example, in one such embodiment, the anode structures 207 have a length $L_E$ of about 25 mm to about 100 mm. According to one embodiment, the anode structure 207 include one or more first electrode members having a first length, and one or more second electrode members having a second length that is different than the first length. In yet another embodiment, the different lengths for the one or more first electrode members and the one or more second electrode members may be selected to accommodate a predetermined shape for the secondary battery 100, such as a shape having a different lengths along one or more of the longitudinal and/or transverse axis, and/or to provide predetermined performance characteristics for the secondary battery 100.

The width $W_E$ of the anode structures 207 will also vary depending upon the secondary battery 100 and its intended use. In general, however, each anode structure 207 will typically have a width $W_E$ within the range of about 0.01 mm to 2.5 mm. For example, in one embodiment, the width $W_E$ of each anode structure 207 will be in the range of about 0.025 mm to about 2 mm. By way of further example, in one embodiment, the width $W_E$ of each anode structure 207 will be in the range of about 0.05 mm to about 1 mm. According to one embodiment, the anode structures 207 include one or more first electrode members having a first width, and one or more second electrode members having a second width that is different than the first width. In yet another embodiment, the different widths for the one or more first electrode members and one or more second electrode members may be selected to accommodate a predetermined shape for the secondary battery 100, such as a shape having a different widths along one or more of the longitudinal and/or transverse axis, and/or to provide predetermined performance characteristics for the secondary battery 100.

The height $H_E$ of the anode structures 207 will also vary depending upon the secondary battery 100 and its intended use. In general, however, the anode structures 207 will typically have a height $H_E$ within the range of about 0.05 mm to about 25 mm. For example, in one embodiment, the height $H_E$ of each anode structure 207 will be in the range of about 0.05 mm to about 5 mm. By way of further example, in one embodiment, the height $H_E$ of each anode structure 207 will be in the range of about 0.1 mm to about 1 mm. According to one embodiment, the anode structures 207 include one or more first electrode members having a first height, and one or more second electrode members having a second height that is different than the first height. In yet another embodiment, the different heights for the one or more first electrode members and one or more second electrode members may be selected to accommodate a predetermined shape for the secondary battery 100, such as a shape having a different heights along one or more of the longitudinal and/or transverse axis, and/or to provide predetermined performance characteristics for the secondary battery 100.

In general, the anode structures 207 each have a length $L_E$ that is substantially greater than each of its width $W_E$ and its height $H_E$. For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each anode structure 207. By way of further example, in one embodiment, the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each anode structure 207.

In one embodiment, the ratio of the height $H_E$ to the width $W_E$ of the anode structures 207 is at least 0.4:1, respectively. For example, in one embodiment, the ratio of $H_E$ to $W_E$ will be at least 2:1, respectively, for each anode structure 207. By way of further example, in one embodiment, the ratio of $H_E$ to $W_E$ will be at least 10:1, respectively. By way of further example, in one embodiment, the ratio of $H_E$ to $W_E$ will be at least 20:1, respectively. Typically, however, the ratio of $H_E$ to $W_E$ will generally be less than 1,000:1, respectively. For example, in one embodiment, the ratio of $H_E$ to $W_E$ will be less than 500:1, respectively. By way of further example, in one embodiment, the ratio of $H_E$ to $W_E$ will be less than 100:1, respectively. By way of further example, in one embodiment, the ratio of $H_E$ to $W_E$ will be less than 10:1, respectively. By way of further example, in one embodiment, the ratio of $H_E$ to $W_E$ will be in the range of about 2:1 to about 100:1, respectively, for each anode structure 207.

Separator Structures, Separator Materials, and Electrolytes

Referring again to FIG. 2, the separator layer(s) 108 separate the cathode structures 206 from the anode structures 207. The separator layers 108 are made of electrically insulating but ionically permeable separator material. The separator layers 108 are adapted to electrically isolate each member of the plurality of the cathode structures 206 from each member of the plurality of the anode structures 207. Each separator layer 108 will typically include a microporous separator material that can be permeated with a non-aqueous electrolyte; for example, in one embodiment, the microporous separator material includes pores having a diameter of at least 50 Angstroms (Å), more typically in the range of about 2,500 Å, and a porosity in the range of about 25% to about 75%, more typically in the range of about 35% to 55%

In general, the separator layers 108 will each have a thickness of at least about 4 μm. For example, in one embodiment, the separator layers 108 will have a thickness of at least about 8 μm. By way of further example, in one such embodiment, the separator layers 108 will have a thickness of at least about 12 μm. By way of further example, in one such embodiment, the separator layers 108 will have a thickness of at least about 15 μm. In some embodiments, the separator layers 108 will have a thickness of up to 25 μm, up to 50 or any other suitable thickness. Typically, however, the separator layers 108 will have a thickness of less than about 12 μm or less than about 10 μm.

In general, the material of the separator layers 108 may be selected from a wide range of material having the capacity to conduct carrier ions between the anodically active material layers 104 and the cathodically active material layers 106 of the unit cell 200. For example, the separator layers 108 may comprise a microporous separator material that may be permeated with a liquid, non-aqueous electrolyte. Alternatively, the separator layers 108 may comprise a gel or solid electrolyte capable of conducting carrier ions between the anodically active material layers 104 and the cathodically active material layers 106 of the unit cell 200.

In one embodiment, the separator layers 108 may comprise a polymer-based electrolyte. Exemplary polymer electrolytes include PEO-based polymer electrolytes and polymer-ceramic composite electrolytes.

In another embodiment, the separator layers 108 may comprise an oxide-based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$), and lithium aluminum titanium phosphate ($Li_{1.4}Al_{0.4}Ti_{1.6}(PO_4)_3$).

In another embodiment, the separator layers 108 may comprise a solid electrolyte. Exemplary solid electrolytes include sulfide-based electrolytes such as lithium tin phosphorus sulfide ($Li_{10}SnP_2Si_2$), lithium phosphorus sulfide ($\beta$-$Li_3PS_4$), and lithium phosphorus sulfur chloride iodide ($Li_6PS_5Cl_{0.9}I_{0.1}$).

In some embodiments, the separator layers 108 may comprise a solid-state lithium ion conducting ceramic, such as a lithium-stuffed garnet.

In one embodiment, the separator layers 108 comprise a microporous separator material comprising a particulate material and a binder, with the microporous separator material having a porosity (void fraction) of at least about 20 vol. %. The pores of the microporous separator material will have a diameter of at least 50 Å and will typically fall within the range of about 250 Å to about 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10^{-4}$ Siemens/cm (S/cm). By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, and $Ge_3N_4$. See, for example, P. Arora and J. Zhang, "Battery Separators" Chemical Reviews 2004, 104, 4419-4462). In one embodiment, the particulate material will have an average particle size of about 20 nm to 2 µm, more typically 200 nm to 1.5 µm. In one embodiment, the particulate material will have an average particle size of about 500 nm to 1 µm.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In the secondary battery 100 (see FIG. 1), the microporous separator material of the separator layers 108 are permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Additional Embodiments of the Present Disclosure

When a secondary battery is assembled, the amount of carrier ions available for cycling between the anode and the cathode is often initially provided in the cathode, because cathodically active materials, such as lithium cobalt oxide, are relatively stable in ambient air (e.g., they resist oxidation) compared to lithiated anode materials, such as lithiated graphite. When a secondary battery is charged for the first time, the carrier ions are extracted from the cathode and introduced into the anode. As a result, the anode potential is lowered significantly (toward the potential of the carrier ions), and the cathode potential is increased (to become even more positive). These changes in potential may give rise to parasitic reactions on both the cathode and the anode, but sometimes more severely on the anode. For example, a decomposition product comprising lithium (or other carrier ions) and electrolyte components, known as solid electrolyte interphase (SEI), may readily form on the surfaces of carbon anodes. These surfaces or covering layers are carrier ion conductors, which establish an ionic connection between the anode and the electrolyte and prevent the reactions from proceeding any further.

Although formation of the SEI layer is desired for the stability of a half-cell system comprising the anode and the electrolyte, a portion of the carrier ions introduced into the cells via the cathode is irreversibly bound and thus removed from cyclic operation, i.e., from the capacity available to the user. As a result, during the initial discharge, fewer carrier ions are returned to the cathode from the anode than was initially provided by the cathode during the initial charging operation, leading to irreversible capacity loss. During each subsequent charge and discharge cycle, the capacity losses resulting from mechanical and/or electrical degradation to the anode and/or the cathode tend to be much less per cycle, but even the relatively small carrier ion losses per cycle contribute significantly to reductions in energy density and cycle life as the battery ages. In addition, chemical and electrochemical degradation may also occur on the electrodes and cause capacity losses. To compensate for the formation of SEI (or another carrier ion-consuming mechanism such as mechanical and/or electrical degradation of the negative electrode), additional or supplementary carrier ions may be provided from an auxiliary electrode after formation of the battery.

In general, the positive electrode 208 of the secondary battery 100 (e.g., the collective population of the cathode structures 206 in the secondary battery 100) preferably has a reversible coulombic capacity that is matched to the discharge capacity of the negative electrode 209 (e.g., the collective population of the anode structures 207 in the secondary battery 100). Stated differently, the positive electrode 208 of the secondary battery 100 is sized to have a reversible coulombic capacity that corresponds to the discharge capacity of the negative electrode 209 which, in turn, is a function of the negative electrode 209 end of discharge voltage.

In some embodiments, the negative electrode 209 of the secondary battery 100 (e.g., the collective population of the anode structures 207 in the secondary battery 100) is designed to have a reversible coulombic capacity that exceeds the reversible coulombic capacity of the positive electrode 208. For example, in one embodiment, a ratio of the reversible coulombic capacity of the negative electrode 209 to the reversible coulombic capacity of the positive electrode 208 is at least 1.2:1, respectively. By way of further example, in one embodiment, a ratio of the reversible coulombic capacity of the negative electrode 209 to the reversible coulombic capacity of the positive electrode 208 is at least 1.3:1, respectively. By way of further example, in one embodiment, a ratio of the reversible coulombic capacity of the negative electrode 209 to the reversible coulombic capacity of the positive electrode 208 is at least 2:1, respectively. By way of further example, in one embodiment, a ratio of the reversible coulombic capacity of the negative electrode 209 to the reversible coulombic capacity of the positive electrode 208 is at least 3:1, respectively. By way of further example, a ratio of the reversible coulombic capacity of the negative electrode 209 to the reversible coulombic capacity of the positive electrode 208 is at least 4:1, respectively. By way of further example, a ratio of the reversible coulombic capacity of the negative electrode 209 to the reversible coulombic capacity of the positive electrode 208 is at least 5:1, respectively. Advantageously, the excess coulombic capacity of the negative electrode 209 provides a source of anodically active material to allow the secondary battery 100 to reversibly operate within a specified voltage that inhibits formation of crystalline phases (incorporating carrier ions) on the negative electrode 209 that reduce cycle-life of the negative electrode 209 as result of cycling.

As previously noted, the formation of SEI during the initial charge/discharge cycle reduces the amount of carrier ions available for reversible cycling. Mechanical and/or electrical degradation of the negative electrode 209 during cycling of the secondary battery 100 may further reduce the amount of carrier ions available for reversible cycling. To compensate for the formation of SEI (or another carrier ion-consuming mechanism such as mechanical and/or electrical degradation of the negative electrode), therefore, additional or supplementary carrier ions may be provided from an auxiliary electrode after formation of the secondary battery 100. In the embodiments of the present disclosure, the auxiliary electrode is used to electrochemically transfer additional carrier ions to the positive electrode 208 and/or the negative electrode 209 of the secondary battery 100 during and/or after formation. In one embodiment, the auxiliary electrode is removed after transferring the additional carrier ions to the secondary battery 100 in order to improve the energy density of the secondary battery in its final form.

Figure 5:
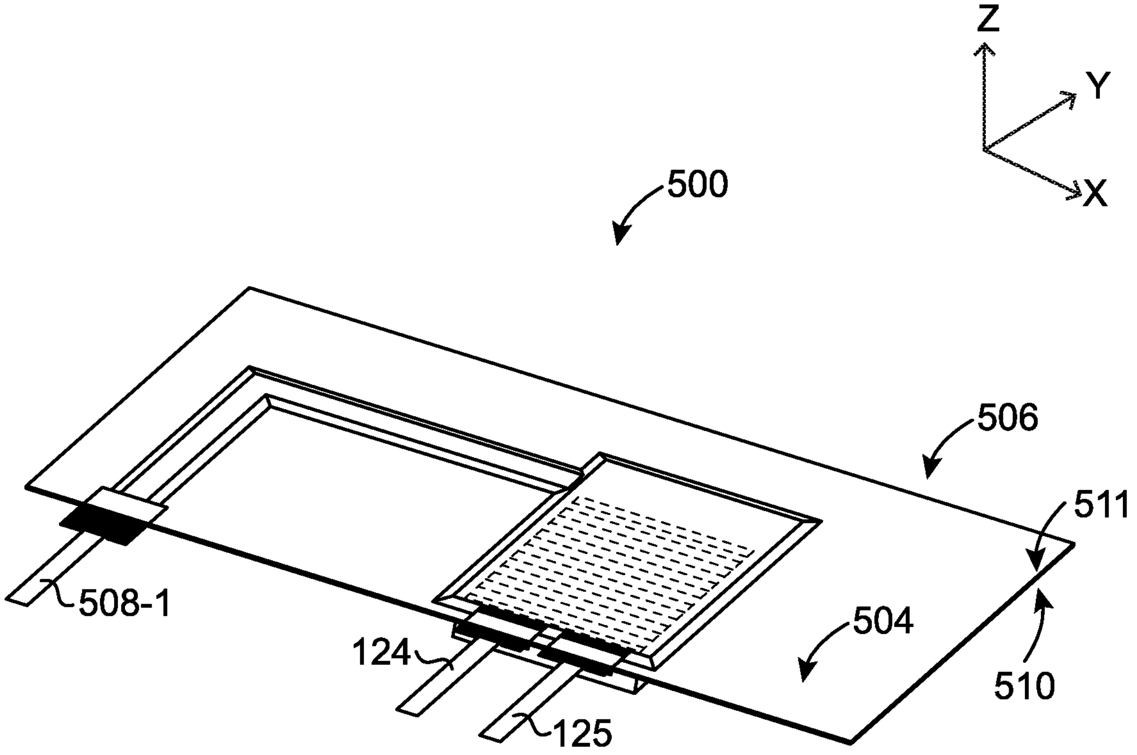
FIG. 5 depicts a perspective view of a buffer system of an exemplary embodiment.
Figure 6:
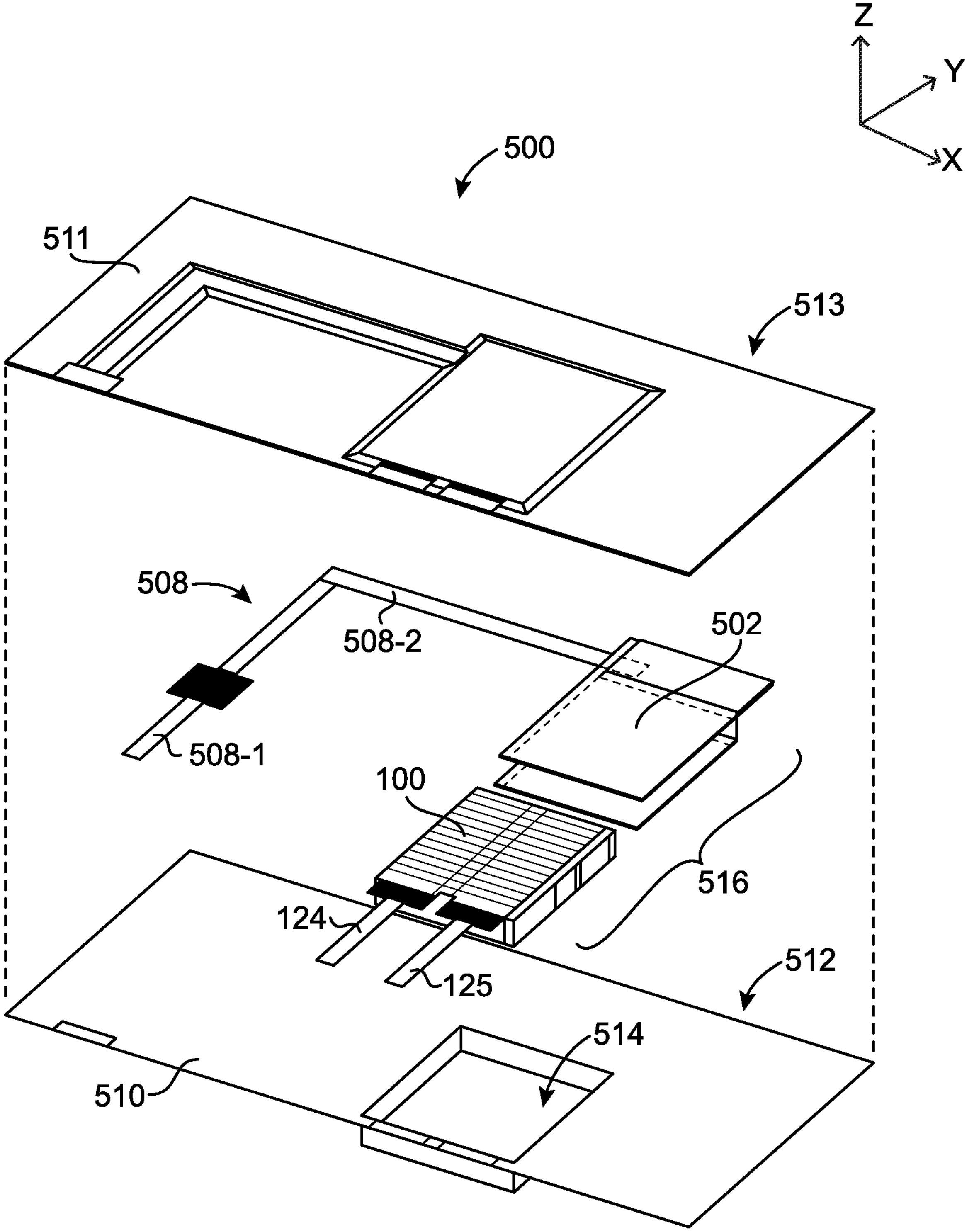
FIG. 6 depicts an exploded view of the buffer system of FIG. 5.

FIG. 5 is a perspective view of a buffer system 500 of an exemplary embodiment, and FIG. 6 is an exploded view of the buffer system 500. Generally, the buffer system 500 may be temporarily assembled during or after initial formation of the secondary battery 100 and the buffer system 500 is used to introduce additional carrier ions into the positive electrode 208 and/or the negative electrode 209 of the secondary battery 100 using an auxiliary electrode 502 (see FIG. 6). In this embodiment, the buffer system 500 includes an enclosure 504 that encapsulates the auxiliary electrode 502 (see FIG. 6) and the secondary battery 100 within a perimeter 506 of the enclosure 504. In FIG. 5, the electrical terminals 124, 125 of the secondary battery 100 and a segment of a conductive tab 508-1 extend from the perimeter 506 of the enclosure 504, providing electrical connections to the auxiliary electrode 502 and the secondary battery 100. In this embodiment, the enclosure 504 comprises a first enclosure layer 510 and a second enclosure layer 511 that are joined together to form the enclosure 504.

Referring to FIG. 6, the first enclosure layer 510 has a perimeter 512 and the second enclosure layer 511 has a perimeter 513. Each of the enclosure layers 510, 511 may comprise a flexible or semi-flexible material, such as aluminum, polymer, a thin film flexible metal, or the like. In one embodiment, one or more of the enclosure layers 510, 511 comprises a multi-layer aluminum polymer material, plastic, or the like. In another embodiment, one or more of the enclosure layers 510, 511 comprises a polymer material laminated on a metal substrate, such as aluminum. In one embodiment, the first enclosure layer 510 includes a pouch 514 (e.g., an indentation) that is sized and shaped to match the outer surface size and shape of the secondary battery 100.

The auxiliary electrode 502 partially surrounds the secondary battery 100 in the buffer system 500, and contains a source of carrier ions to replenish the lost energy capacity of the secondary battery 100 after formation (i.e., to compensate for the loss of carrier ions upon the formation of SEI and other carrier ion losses in the first charge and/or discharge cycle of the secondary battery 100). In embodiments, the auxiliary electrode 502 may comprise a foil of the carrier ions in metallic form (e.g., a foil of lithium, magnesium, or aluminum), or any of the previously mentioned materials used for the cathodically active material layers 106 and/or the anodically active material layers 104 (see FIG. 2) in their carrier-ion containing form. For example, the auxiliary electrode 502 may comprise lithiated silicon or a lithiated silicon alloy. When the buffer system 500 is assembled, the combination of the auxiliary electrode 502 and the secondary battery 100, which may be referred to as an auxiliary subassembly 516 (see FIG. 6), are inserted into the pouch 514, and the enclosure layers 510, 511 are sealed together to form the buffer system 500 as depicted in FIG. 5. The specific details of the assembly process for the buffer system 500 and how the buffer system 500 is used during a carrier ion transfer process to the secondary battery 100 will be discussed in more detail below. The auxiliary electrode 502 in this embodiment includes an electrically conductive tab 508, which may be segmented into a conductive tab 508-2 that is covered by the enclosure 504 and a conductive tab 508-1 that is partially exposed by the enclosure as depicted in FIG. 5, for example, for ease of manufacturing.

Figure 7:
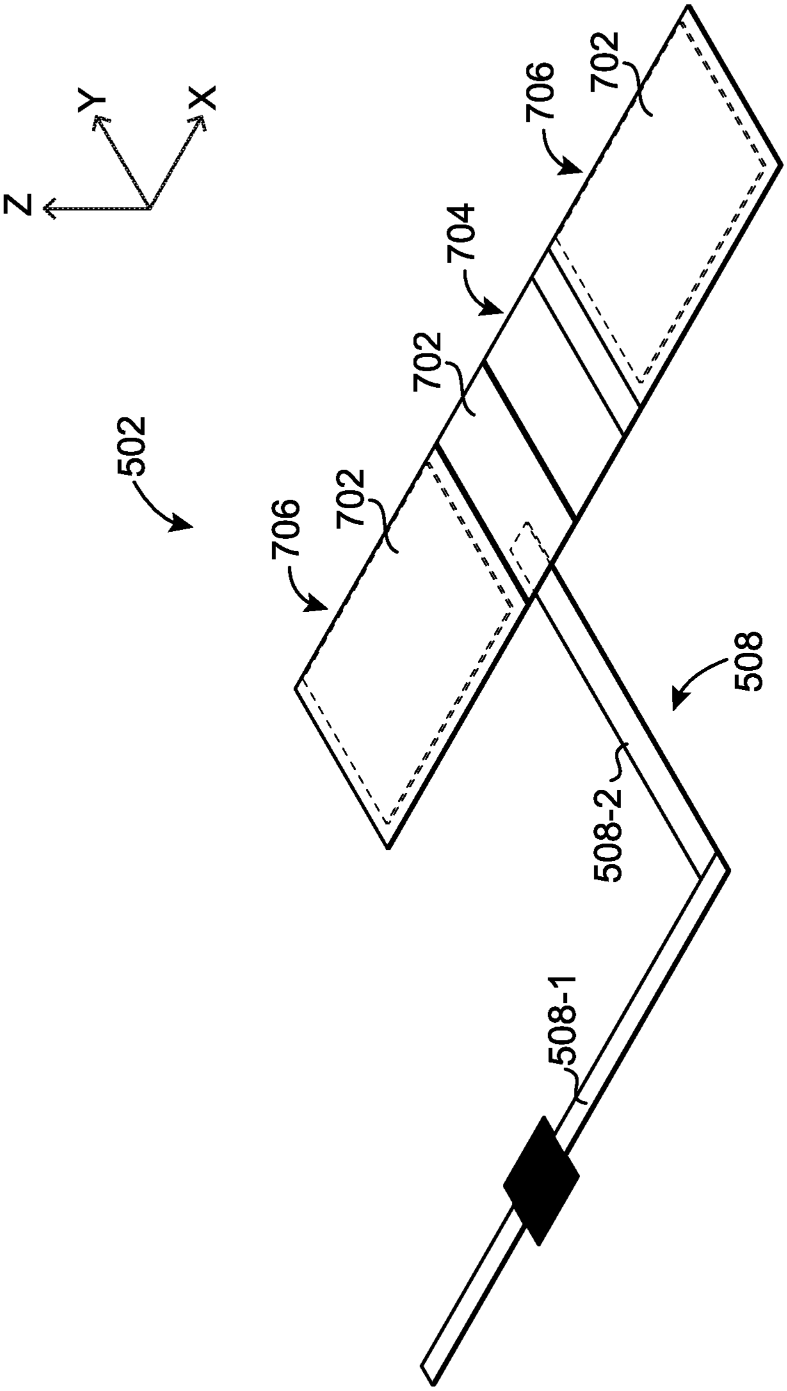
FIG. 7 depicts a perspective view of an auxiliary electrode of an exemplary embodiment.
Figure 8:
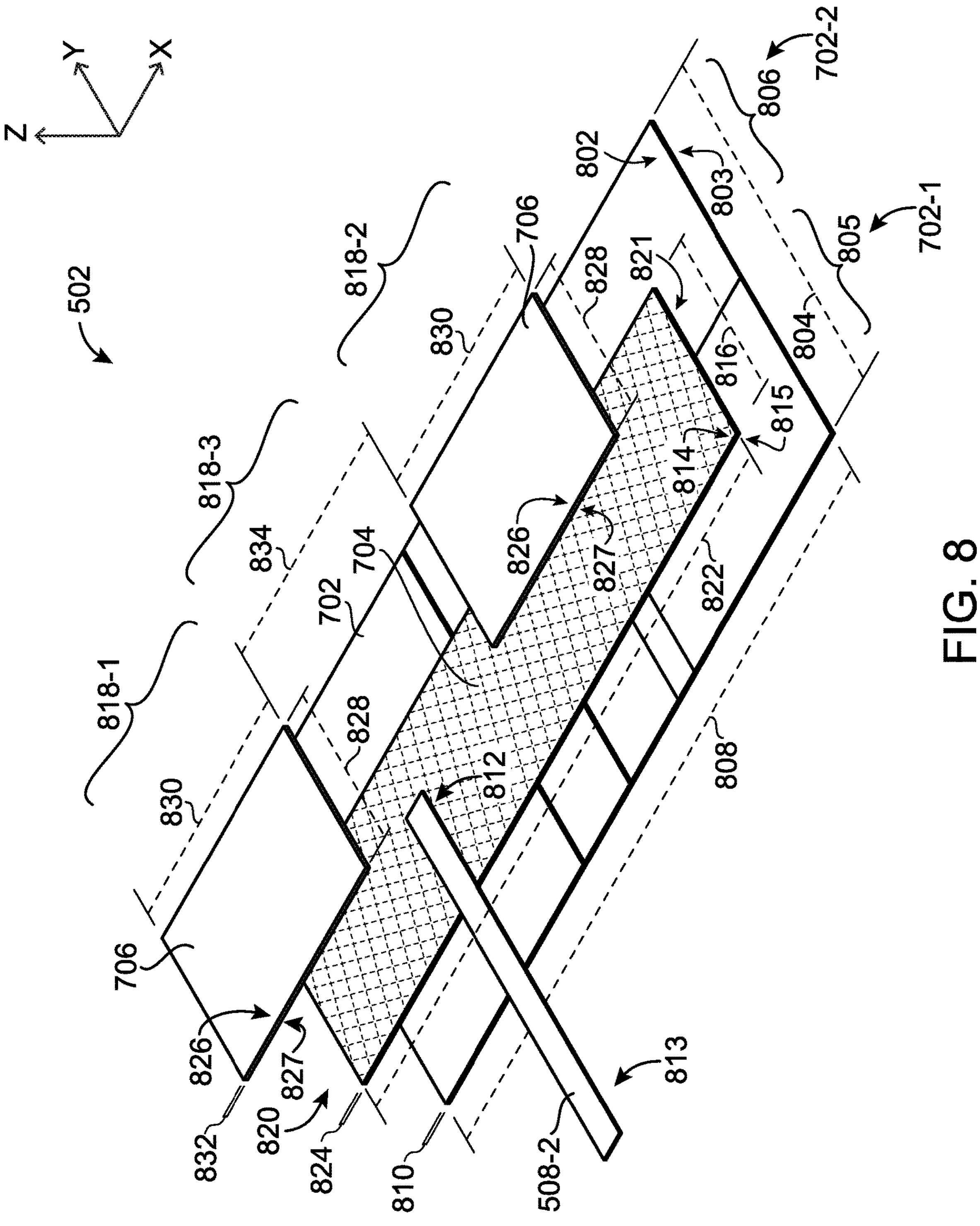
FIG. 8 depicts an exploded view of the auxiliary electrode of FIG. 7.

FIG. 7 is a perspective view of the auxiliary electrode 502 of an exemplary embodiment, and FIG. 8 is an exploded view of the auxiliary electrode. Referring to FIG. 7, the auxiliary electrode 502 generally includes a separator 702, which covers a conductive layer 704 and carrier ion supply layers 706. When the auxiliary electrode 502 is formed into the shape depicted in FIG. 6, the carrier ion supply layers 706 are located proximate to major surfaces 126, 127 of the secondary battery 100 (see FIG. 1), with the separator 702 insulating the casing 116 of the secondary battery 100 from the conductive layer 704 and the carrier ion supply layers 706. The separator 702 includes an electrolyte, which facilitates the transfer of carrier ions from the carrier ion supply layers 706 to the secondary battery 100 during a buffer process.

Referring to FIG. 8, the auxiliary electrode 502 includes, from bottom to top in FIG. 8, the separator 702, the conductive layer 704, and the population of carrier ion supply layers 706. The auxiliary electrode 502 in this embodiment further includes the conductive tab 508-2, which is electrically conductive and electrically coupled with the conductive layer 704. The conductive tab 508-2 provides an electrical connection with the auxiliary electrode 502. Generally, the auxiliary electrode 502 is used during the buffer process to transfer carrier ions from the carrier ion supply layers 706 to the positive electrode 208 and/or the negative electrode 209 of the secondary battery 100 during or after formation of the secondary battery 100.

The separator 702 may comprise any of the materials previously described with respect to the separator layer 108 of the secondary battery 100. The separator 702 may be permeated with an electrolyte that serves as a medium to conduct carrier ions from the carrier ion supply layers 706 to the positive electrode 208 of the secondary battery 100 and/or the negative electrode 209 of the secondary battery. The electrolyte may comprise any of the materials previously described with respect to the secondary battery 100.

The separator 702 in this embodiment includes a first surface 802 and a second surface 803 that opposes the first surface 802. The surfaces 802, 803 of the separator 702 form major surfaces for the separator 702 and are disposed in the X-Y plane in FIG. 8. The separator 702 in this embodiment has a width 804 that extends in a direction of the Y-axis. The separator 702 in this embodiment is segmented in the width 804 into a first portion 805 and a second portion 806. In some embodiments, the separator 702 may comprise a first separator layer 702-1 corresponding to the first portion 805 and a second separator layer 702-2 corresponding to the second portion 806.

In one embodiment, the width 804 of the separator 702 is about 34 mm. In other embodiments, the width 804 of the separator is about 30 mm, about 35 mm, or another suitable value. In some embodiments, the width 804 of the separator 702 lies in a range of values of about 10 mm to about 200 mm, or some other suitable range that allows the separator 702 to function as described herein.

The separator 702, in one embodiment, has a length 808 that extends in a direction of the X-axis. In an embodiment, the length 808 of the separator 702 is about 72 mm. In other embodiments, the length 808 of the separator 702 is about 65 mm, about 70 mm, about 75 mm, or some other suitable value that allows the separator 702 to function as described herein. In some embodiments, the length 808 of the separator 702 lies in a range of values of about 30 mm to about 200 mm, or some other suitable range of values that allows the separator 702 to function as described herein.

In one embodiment, the separator 702 has a thickness 810 that extends in the direction of the Z-axis. Generally, the thickness 810 is a distance from the first surface 802 of the separator 702 to (and including) the second surface 803 of the separator. In one embodiment, the thickness 810 of the separator 702 is about 0.025 mm. In other embodiments, the thickness 810 of the separator 702 is about 0.015 mm, about 0.02 mm, about 0.03 mm, about 0.035 mm, or some other suitable value. In some embodiments, the thickness 810 of the separator 702 lies in a range of values of about 0.01 mm to about 1.0 mm, or some other suitable range of values that allows the separator 702 to function as described herein.

The conductive layer 704 is electrically conductive, and may comprise a metal, a metalized film, an insulating base material with a conductive material applied thereto, or some other type of electrically conductive material. In some embodiments, the conductive layer 704 comprises copper. In other embodiments, the conductive layer 704 comprises aluminum or another metal. In this embodiment, the conductive layer 704 is electrically coupled with the conductive tab 508-2, which is also electrically conductive. The conductive tab 508-2 has a first end 812 disposed proximate to the conductive layer 704 and a second end 813 disposed distal to the conductive layer 704 that opposes the first end 812. The first end 812 of the conductive tab 508-2 is electrically coupled to the conductive layer 704. In some embodiments, the first end 812 of the conductive tab 508-2 is spot-welded to the conductive layer 704. In other embodiments, the first end 812 of the conductive tab 508-2 is soldered to the conductive layer 704. Generally, the conductive tab 508-2 may be affixed at the first end 812 to the conductive layer 704 using any suitable means that ensure a mechanical connection and an electrical connection to the conductive layer. The conductive tab 508-2 may comprise any type of electrically conductive material as desired. In one embodiment, the conductive tab 508-2 comprises a metal. In these embodiments, the conductive tab 508-2 may comprise nickel, copper, aluminum, or other suitable metals or metal alloys that allows the conductive tab 508-2 to function as described herein.

The conductive layer 704 in this embodiment includes a first surface 814 and a second surface 815 that opposes the first surface 814. The surfaces 814, 815 of the conductive layer 704 form major surfaces for the conductive layer 704 and are disposed in the X-Y plane in FIG. 8. The conductive layer 704 in this embodiment has a width 816 that extends in a direction of the Y-axis. In an embodiment, the width 816 of the conductive layer 704 is about 15 mm. In other embodiments, the width 816 of the conductive layer 704 is about 10 mm, about 20 mm, or some other suitable value that allows the conductive layer 704 to function as described herein.

In some embodiments, the width 816 of the conductive layer 704 lies in a range of values of about 5 mm to about 100 mm, or some other suitable range of values that allows the conductive layer 704 to function as described herein. The first surface 814 of the conductive layer 704 in this embodiment is segmented into a first region 818-1, disposed proximate to a first end 820 of the conductive layer 704, a second region 818-2, disposed proximate to a second end 821 of the conductive layer 704, and a third region 818-3 disposed between the first region 818-1 and the second region 818-2.

The conductive layer 704 has a length 822 that extends in a direction of the X-axis. In one embodiment, the length 822 of the conductive layer 704 is about 70 mm. In other embodiments, the length 822 of the conductive layer 704 is about 60 mm, about 65 mm, about 75 mm, or some other suitable value that allows the conductive layer 704 to function as described herein. In some embodiments, the length 822 of the conductive layer 704 lies in a range of values of about 30 mm to about 200 mm, or some other suitable range of values that allows the conductive layer 704 to function as described herein.

The conductive layer 704 has a thickness 824 that extends in a direction of the Z-axis. Generally, the thickness 824 is a distance from the first surface 814 of the conductive layer 704 to (and including) the second surface 815 of the conductive layer 704. In one embodiment, the thickness 824 of the conductive layer 704 is about 0.1 mm. In other embodiments, the thickness 824 of the conductive layer 704 is about 0.005 mm, about 0.15 mm, or about 0.2 mm. In some embodiments, the thickness 824 of the conductive layer 704 lies in a range of values of about 0.01 mm to about 1.0 mm, or any other suitable range for the thickness that allows the conductive layer 704 to function as described herein.

The carrier ion supply layers 706, which comprise a population of carrier ion supply layers 706 in an embodiment, comprise any carrier ion containing material previously described that may be utilized to supply carrier ions to the positive electrode 208 and/or the negative electrode 209 of the secondary battery 100. The carrier ion supply layers 706 may comprise one or more sources of lithium ions, sodium ions, potassium ions, calcium ions, magnesium ions, and aluminum ions. In this embodiment, the carrier ion supply layers 706 are disposed within the first region 818-1 and the second region 818-2 of the conductive layer 704. In some embodiments, the carrier ion supply layers 706 are also disposed in the third region 818-3 of the conductive layer 704.

The carrier ion supply layers 706 in this embodiment include a first surface 826 and a second surface 827 that opposes the first surface 826. The surfaces 826, 827 of the carrier ion supply layers 706 form major surfaces for the carrier ion supply layers 706 and are disposed in the X-Y plane in FIG. 8. The carrier ion supply layers 706 in this embodiment have a width 828 that extends in a direction of the Y-axis. In an embodiment, the width 828 of the carrier ion supply layers 706 are about 15 mm. In other embodiments, the width 828 of the carrier ion supply layers 706 are about 10 mm, about 20 mm, or some other suitable value that allow the carrier ion supply layers 706 to function as described herein. In some embodiments, the width 828 of the carrier ion supply layers 706 lies in a range of values of about 5 mm to about 100 mm, or some other suitable range of values that allows the carrier ion supply layers 706 to function as described herein.

The carrier ion supply layers 706, in one embodiment, have a length 830 that extends in a direction of the X-axis. In an embodiment, the length 830 of the carrier ion supply layers 706 are about 23 mm. In other embodiments, the length 830 of the carrier ion supply layers 706 are about 15 mm, about 20 mm, about 25 mm, or some other suitable length that allows the carrier ion supply layers 706 to function as described herein. In some embodiments, the length 830 of the carrier ion supply layers 706 lie in a range of values of about 10 mm to about 100 mm, or some other suitable range of values that allow the carrier ion supply layers 706 to function as described herein.

The carrier ion supply layers 706 each have a thickness 832 that extends in a direction of the Z-axis. Generally, the thickness 832 is a distance between the first surface 826 of the carrier ion supply layers 706 and the second surface 827 of the carrier ion supply layers 706. In one embodiment, the thickness 832 of the carrier ion supply layers 706 are about 0.13 mm. In other embodiments, the thickness 832 of the carrier ion supply layers 706 are about 0.005 mm, about 0.15 mm, or about 0.2 mm. In some embodiments, the thickness 832 of the carrier ion supply layers 706 lie in a range of values of about 0.01 mm to about 1.0 mm, or any other suitable range of values for the thickness 832 that allows the carrier ion supply layers 706 to function as described herein.

In this embodiment, the carrier ion supply layers 706 are separated from each other by a distance 834, corresponding to the third region 818-3. In one embodiment, the distance 834 is about 23 mm. In other embodiments, the distance 834 is about 15 mm, about 20 mm, about 25 mm, or about 30 mm. In some embodiments, the distance 834 lies in a range of values of about 10 mm to about 50 mm, or any other suitable range of values that allows the carrier ion supply layers 706 to function as described herein.

In one embodiment, the carrier ion supply layers 706 are sized to be capable of providing at least 15% of the reversible coulombic capacity of the positive electrode 208 of the secondary battery 100. For example, in one such embodiment, the carrier ion supply layers 706 are sized such that they contain sufficient carrier ions (e.g., lithium, magnesium, or aluminum ions) to provide at least 30% of the reversible coulombic capacity of the positive electrode 208 of the secondary battery 100. By way of further example, in one such embodiment, the carrier ion supply layers 706 are sized such that they contain sufficient carrier ions to provide at least 100% of the reversible coulombic capacity of the positive electrode 208 of the secondary battery 100. By way of further example, in one such embodiment, the carrier ion supply layers 706 are sized such that they contain sufficient carrier ions to provide at least 200% of the reversible coulombic capacity of the positive electrode 208 of the secondary battery 100. By way of further example, in one such embodiment, the carrier ion supply layers 706 are sized such that they contain sufficient carrier ions to provide at least 300% of the reversible coulombic capacity of the positive electrode 208 of the secondary battery 100. By way of further example, in one such embodiment, the carrier ion supply layers 706 are sized such that they contain sufficient carrier ions to provide about 100% to about 200% of the reversible coulombic capacity of the positive electrode 208 of the secondary battery 100.

During an assembly process for the auxiliary electrode 502, the separator 702 may be cut from stock material or prefabricated to achieve the width 804 and the length 808 as shown in FIG. 8. The conductive layer 704 may be cut from stock material or prefabricated to achieve the width 816 and the length 822 shown in FIG. 8. In some embodiments, the conductive layer 704 is prefabricated to include the conductive tab 508-2 with the first end 812 mechanically and electrically affixed to the conductive layer 704 as depicted in FIG. 8. In other embodiments, the conductive tab 508-2 is cut from a stock material and mechanically and electrically coupled with the conductive layer 704 (e.g., by spot welding or soldering first end 812 to the conductive layer 704). In some embodiments, the carrier ion supply layers 706 are cut to size from stock materials, and bonded or otherwise laminated to the conductive layer 704 (e.g., by cold welding the carrier ion supply layers 706 onto the conductive layer 704) to achieve the orientation depicted in FIG. 8, with the second surface 827 of the carrier ion supply layers 706 in contact with the first surface 814 of the conductive layer 704. For example, the material used to form the carrier ion supply layers 706 (e.g., lithium) may exist in stock form as rolls of lithium sheets that are cut to size.

In other embodiments, the conductive layer 704 is prefabricated to include the carrier ion supply layers 706 arranged in the orientation depicted in FIG. 8. In this embodiment, the conductive layer 704 is disposed within the first portion 805 of the separator 702 in a direction of the X-axis, with the second surface 815 of the conductive layer 704 contacting the first surface 802 of the separator 702.

Figure 9:
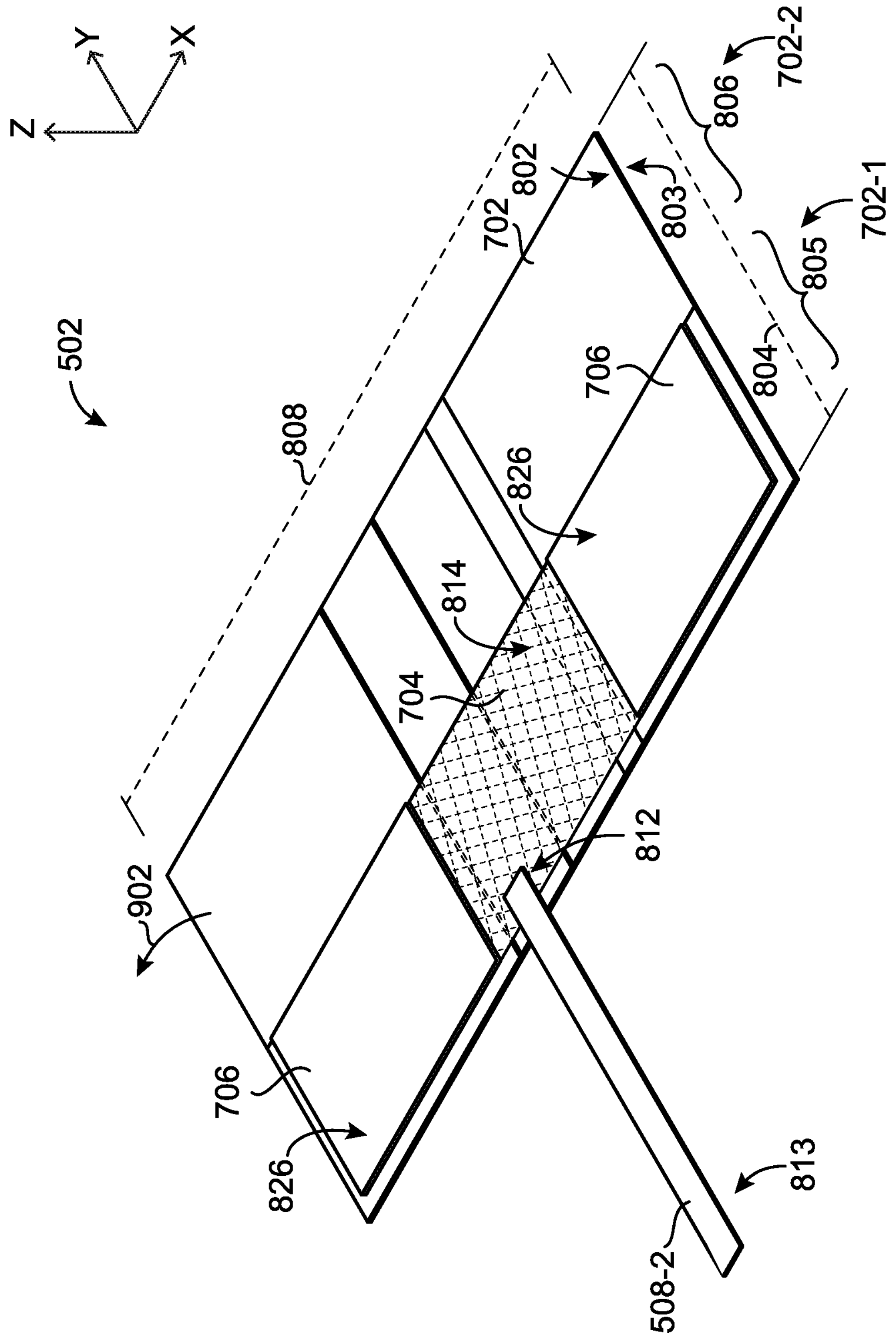
FIG. 9 is a perspective view of the auxiliary electrode of FIG. 7 at a stage in an assembly process for the auxiliary electrode of FIG. 7.

FIG. 9 is a perspective view of the auxiliary electrode 502 at an intermediate stage of the fabrication process for the auxiliary electrode. At this stage, the conductive layer 704 is disposed on the first portion 805 of the separator 702, and the conductive tab 508-2 extends to the left (in the Y-axis direction) in FIG. 9 from the first end 812, which is affixed to the conductive layer 704, away from the separator 702 and the conductive layer 704 towards the second end 813. The first surface 802 of the separator 702 is covered by the conductive layer 704 within the first portion 805 of the separator 702, while the first surface 802 of separator remains uncovered within the second portion 806 of the separator 702.

To continue the fabrication process of the auxiliary electrode 502, in one embodiment, the second portion 806 of the separator 702 is folded in the direction of an arrow 902 towards the left (about an axis parallel to the X-axis) in FIG. 9, such that the first surface 802 within the second portion 806 of the separator 702 contacts the first surfaces 826 of the carrier ion supply layers 706 and the first surface 814 of the conductive layer 704 that is exposed between the carrier ion supply layers 706. When the separator 702 comprises the first separator layer 702-1 and the second separator layer 702-2, the second separator layer may be placed such that the first surface 802 of the second separator layer contacts the first surfaces 826 of the carrier ion supply layers 706 and the first surface 814 of the conductive layer 704 that is exposed between the carrier ion supply layers 706.

Figure 10:
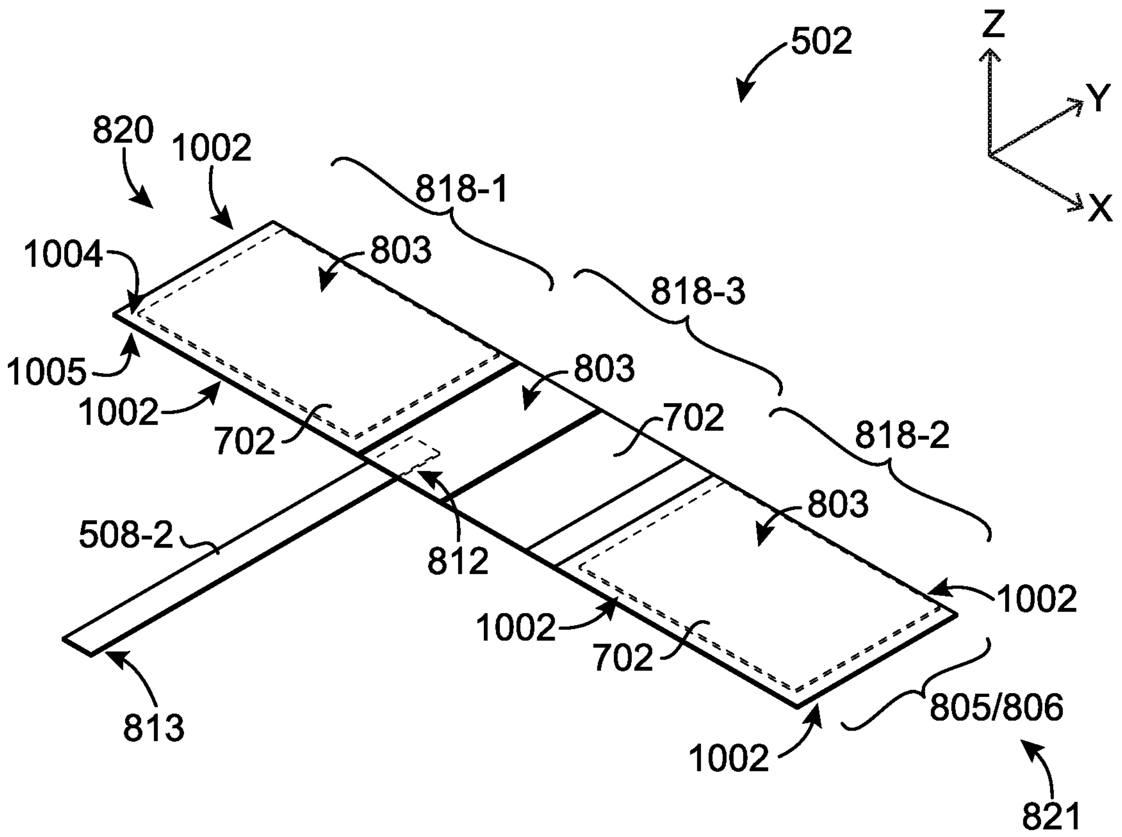
FIG. 10 is a perspective view of the auxiliary electrode of FIG. 7 at another stage in an assembly process for the auxiliary electrode of FIG. 7.

FIG. 10 is a perspective view of the auxiliary electrode 502 at another intermediate stage in the fabrication process, after folding the second portion 806 of the separator 702 as described above. At this stage, the separator 702 encapsulates the conductive layer 704 and the carrier ion supply layers 706, leaving a portion between the first end 812 of the conductive tab 508-2 and the second end 813 of the conductive tab 508-2 uncovered by the separator 702. The separator 702 may then be bonded to itself along at least a portion of an outer perimeter 1002 of the separator to encapsulate the conductive layer 704 within the first portion 805 of the separator and the second portion 806 of the separator along the first surface 802 of the separator (not visible in FIG. 10).

Figure 11:
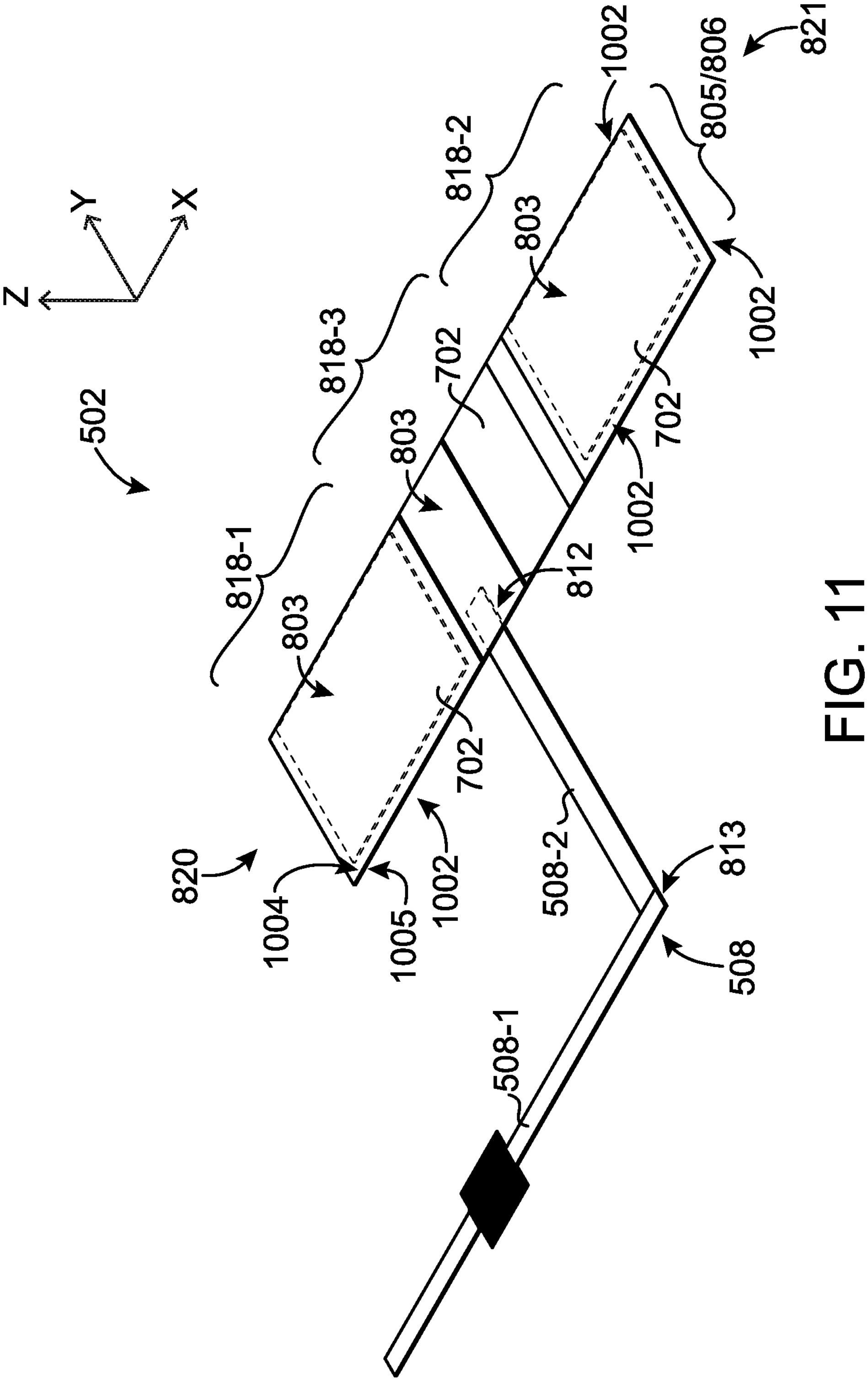
FIG. 11 is a perspective view of the auxiliary electrode of FIG. 7 at yet another stage in an assembly process that adds an extension tab to the auxiliary electrode of FIG. 7.

In one embodiment, the separator 702 is bonded to itself along at least a portion of an outer perimeter 1002 of the separator using a hot melt process, a welding process, a bonding process, etc. In FIG. 10, the auxiliary electrode 502 at this stage includes a first side 1004 and a second side 1005 that opposes the first side 1004. The first side 1004 includes the second surface 803 of the separator 702, which covers the carrier ion supply layers 706 in first region 818-1 proximate to first end 820 of the conductive layer 704 (not visible in FIG. 10) and the second region 818-2 proximate to the second end 821 of the conductive layer 704 (not visible in this view). In FIG. 10, the first region 818-1 is proximate to the first end 812 of the conductive tab 508-2 and the second region 818-2 is disposed away from the first end 812 of the conductive tab 508-2. The first end 812 of the conductive tab 508-2 is electrically coupled to the conductive layer 704 within the third region 818-3 of the conductive layer 704. In some embodiments, the conductive tab 508 may be extended (e.g., with the conductive tab 508-1, as shown in FIG. 11, which depicts the auxiliary electrode 502 after assembly).

Figure 12:
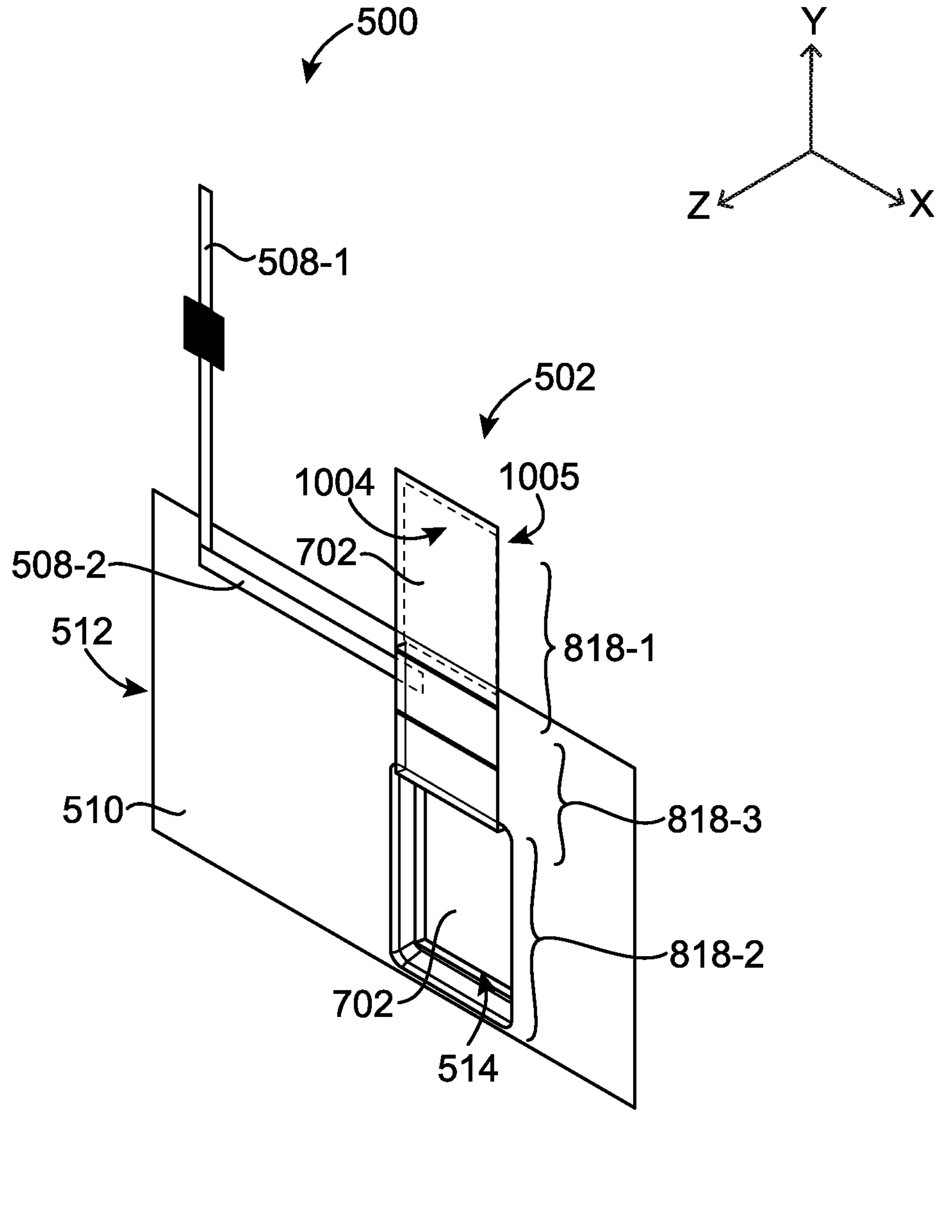
FIG. 12 is a perspective view of the buffer system of FIG. 5 at a stage in an assembly process for the buffer system.

In response to fabricating the auxiliary electrode 502, performing a fabrication process for the buffer system 500 (see FIGS. 6 and 7) continues as follows. FIGS. 12-16 are perspective views of the buffer system 500 during various stages in a fabrication process. Referring to FIG. 12, the second region 818-2 of the auxiliary electrode 502 is inserted into the pouch 514 of the first enclosure layer 510, with the second side 1005 of the auxiliary electrode disposed towards the first enclosure layer 510 within the pouch 514 and the first side 1004 of the auxiliary electrode disposed away from the first enclosure layer 510 within the pouch 514. The third region 818-3 and the first region 818-1 of the auxiliary electrode 502 extend away from the pouch 514 in the direction of the Y-axis.

Figure 13:
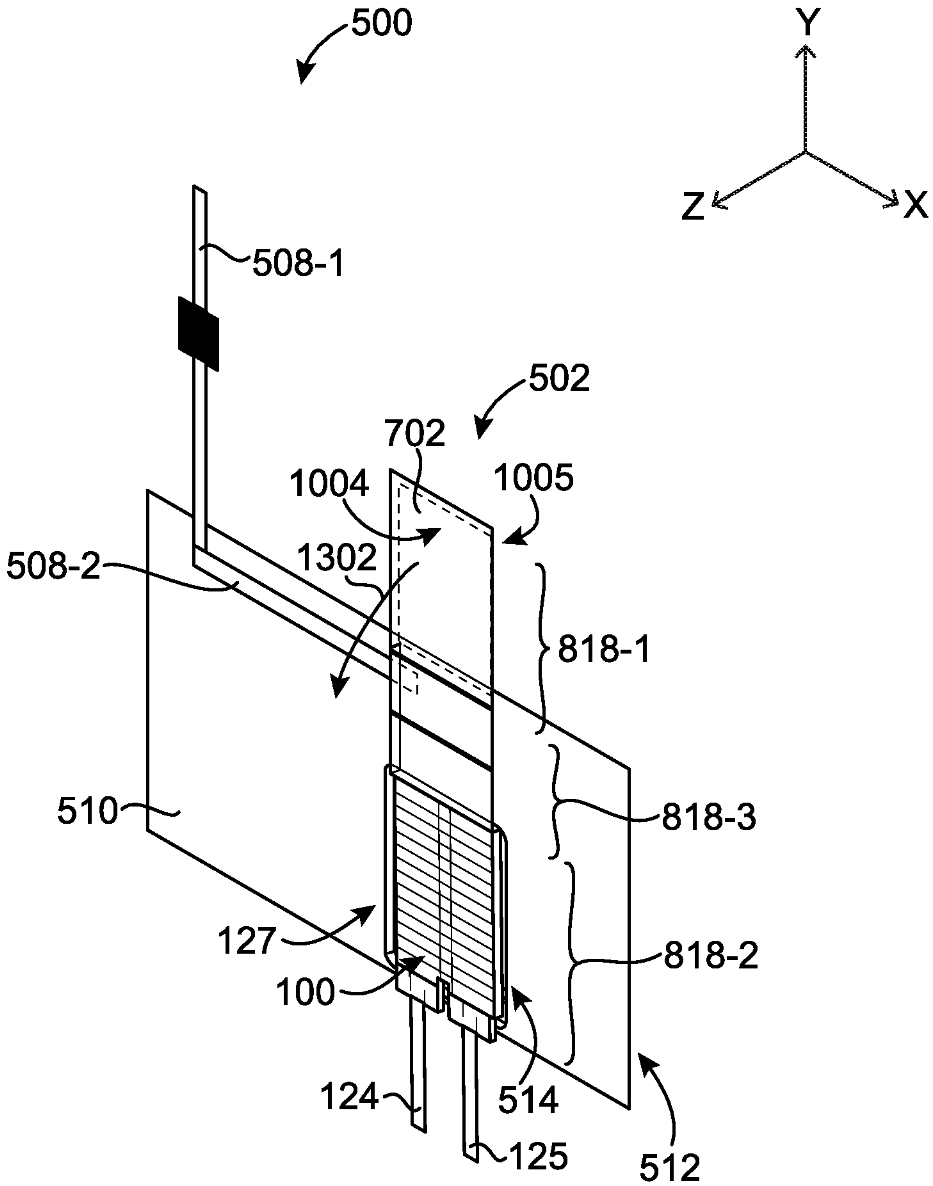
FIG. 13 is a perspective view of the buffer system of FIG. 5 at another stage in an assembly process for the buffer system.

With the auxiliary electrode 502 oriented within the pouch 514 as depicted in FIG. 12, the secondary battery 100 is placed on the auxiliary electrode 502 within the pouch 514, which corresponds to the second region 818-2 of the auxiliary electrode 502 (see FIG. 13). In this embodiment, the first major surface 126 of the secondary battery 100 (see FIG. 1, not visible in FIG. 13) contacts the auxiliary electrode 502 within the pouch 514 and the second major surface 127 of the secondary battery is disposed away from the auxiliary electrode 502. The electrical terminals 124, 125 of the secondary battery 100 extend away from the pouch 514 in the direction of the Y-axis in FIG. 13, placing the electrical terminals outside of the perimeter 512 of the first enclosure layer 510. At this stage of the fabrication process for the buffer system 500, in one embodiment, an electrolyte is added to the pouch 514. In another embodiment, the separator 702 of the auxiliary electrode 502 is pre-impregnated with the electrolyte.

Figure 14:
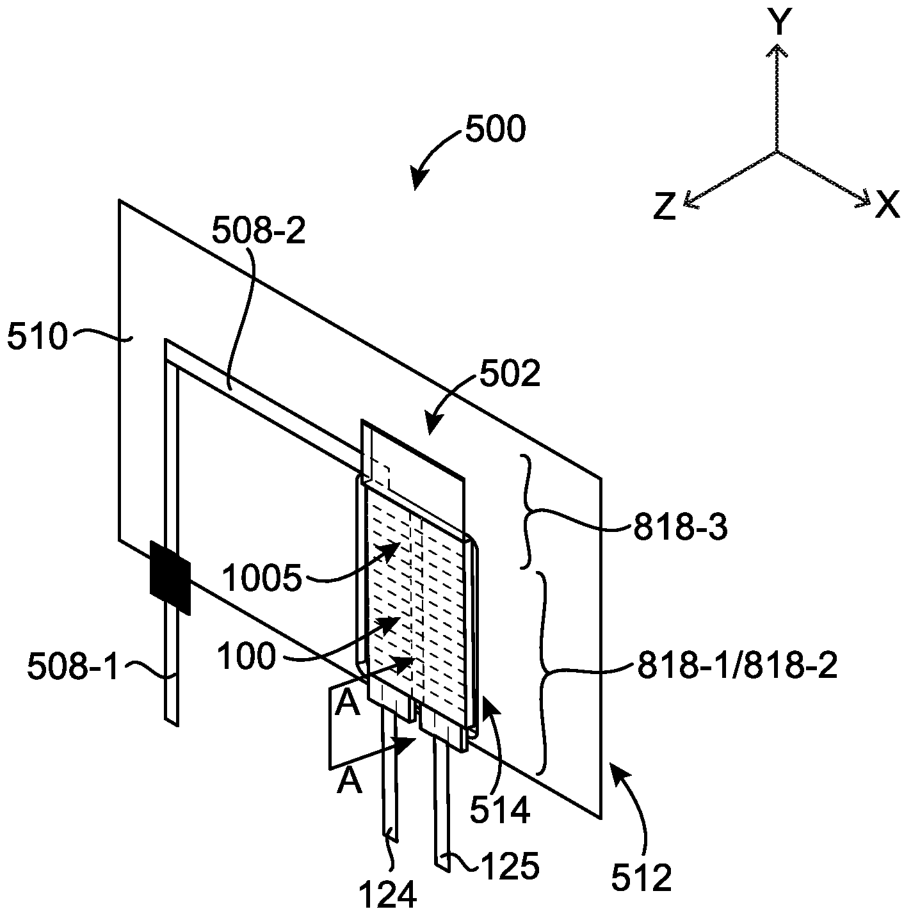
FIG. 14 is a perspective view of the buffer system of FIG. 5 at yet another stage in an assembly process for the buffer system.

With the secondary battery 100 loaded onto the second region 818-2 of the auxiliary electrode 502 within the pouch 514, the auxiliary electrode 502 is folded in the direction of an arrow 1302 in order to position the first side 1004 of the first region 818-1 of the auxiliary electrode 502 in contact with the second major surface 127 of the secondary battery 100, the result of which is depicted in FIG. 14. In this configuration, both major surfaces 126, 127 of the secondary battery 100 (see FIG. 1) are electrochemically coupled with the carrier ion supply layers 706 of the auxiliary electrode 502, using the separator 702 (see FIGS. 7-11) and an electrolyte disposed between each of the major surfaces 126, 127 of the secondary battery 100 and the carrier ion supply layers 706.

Figure 15:
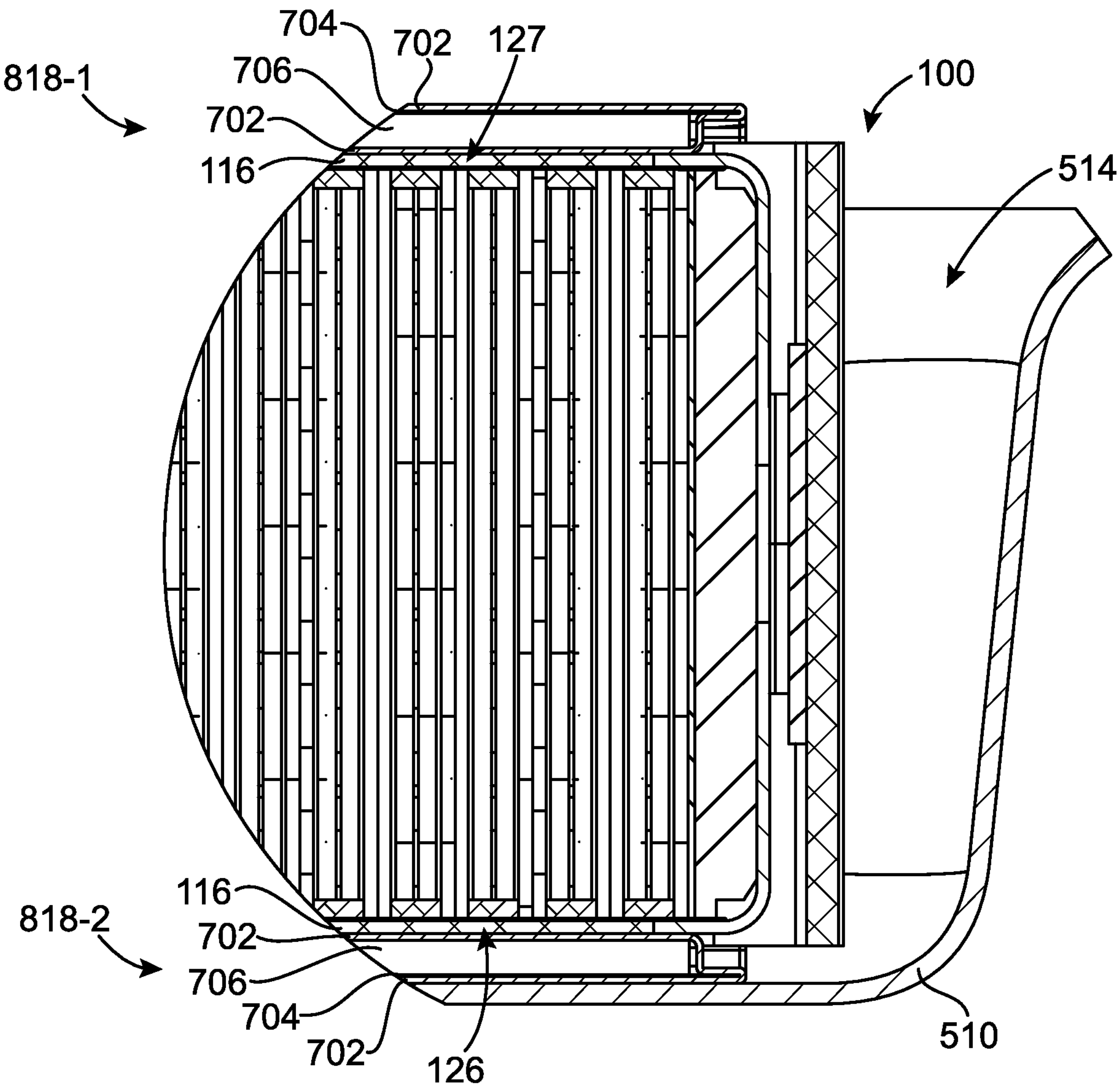
FIG. 15 is a cross-sectional view of a portion of the buffer system of FIG. 14.

FIG. 15 is a cross-sectional view of the buffer system 500 along cut lines A-A of FIG. 14. In this view, the layers of the buffer system 500 at the pouch 514 of the first enclosure layer 510 are visible. In particular, FIG. 15 illustrates the placement of the secondary battery 100 and the auxiliary electrode 502 in the pouch 514, and specifically, from top to bottom in stacked succession, the separator 702, the conductive layer 704, one of the carrier ion supply layers 706, the separator 702, and the second major surface 127 of the secondary battery 100 at the casing 116. FIG. 15 further illustrates, from bottom to top in stacked succession, the first enclosure layer 510, the separator 702, the conductive layer 704, one of the carrier ion supply layers 706, the separator 702, and the first major surface 126 of the secondary battery 100 at the casing 116.

Figure 16:
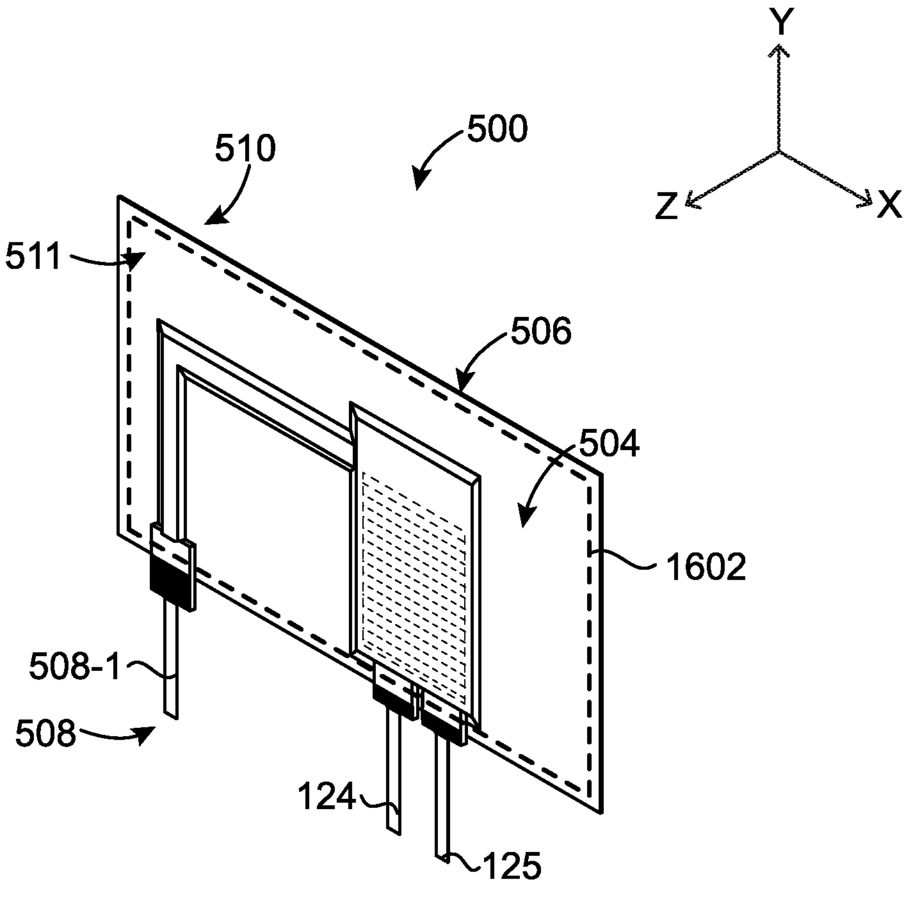
FIG. 16 is a perspective view of the buffer system of FIG. 5 at yet another stage in an assembly process for the buffer system.

With the secondary battery 100 sandwiched by the auxiliary electrode 502 within the pouch 514 as illustrated in FIG. 15, the second enclosure layer 511 is aligned to the first enclosure layer 510, as depicted in FIG. 16. After proper placement of the second enclosure layer 511 relative to the first enclosure layer 510, the enclosure layers 510, 511 are sealed along a sealing line 1602 (denoted by the dashed line in FIG. 16) to form the enclosure 504. The enclosure layers 510, 511 may be sealed along the sealing line 1602 by welding, heat sealing, adhesive, combinations thereof, or the like. In another embodiment, the enclosure layers 510, 511 may be sealed along three sides of the sealing line 1602 creating a pocket therein. In this embodiment, the secondary battery 100 may be placed within the pocket, and the final edge of the sealing line 1602 is subsequently sealed. In one embodiment, the sealing line 1602 is sealed using a hot press, that applies a controlled temperature and pressure to the sealing line 1602 causing the enclosure layers 510, 511 to adhere or fuse together along the sealing line 1602. In another embodiment, a vacuum is applied to the secondary battery 100 during the sealing process to evacuate any excess volume occupied by air or other gas. The time for which the sealing line 1602 is subject to the hot press may be controlled and is dependent upon the materials selected for the enclosure layers 510, 511. Once sealed over the secondary battery 100, the sealed enclosure layers 510, 511 form the buffer system 500. Upon sealing, the buffer system 500 is liquid tight and/or air-tight, depending on the desired application. The electrical terminals 124 and 125 of the secondary battery 100 and the conductive tab 508-1 remain exposed and are not covered by the enclosure layers 510, 511 to allow for a subsequent buffer process to be applied to the secondary battery 100.

With the secondary battery 100 and the carrier ion supply layers 706 of the auxiliary electrode 502 (not visible in FIG. 16) electrochemically coupled together within the enclosure 504 of the buffer system 500, a carrier ion buffer process is performed on the secondary battery 100 during or after initial formation of the secondary battery 100. Generally, this carrier ion buffer process transfers carrier ions from the carrier ion supply layers 706 of the auxiliary electrode 502 into each of the first major surface 126 of the secondary battery 100 and the second major surface 127 of the secondary battery 100 (see FIG. 15). Generally, transferring the carrier ions to the secondary battery 100 from both major surfaces 126, 127 of the secondary battery 100, as depicted in FIG. 15, provides a technical benefit of distributing the forces generated by anode and/or cathode swelling more equally across the casing 116 of the secondary battery 100 as more carrier ions are loaded into the anode and/or the cathode of the secondary battery 100.

Either prior to inserting the secondary battery 100 into the buffer system 500, or after, the secondary battery 100 is charged (e.g., via the electrical terminals 124, 125) by transferring carrier ions from the cathode structures 206 of the secondary battery to the anode structures 207 of the secondary battery. Charging may be discontinued when the positive electrode 208 of the secondary battery 100 reaches its the end-of-charge design voltage. During the initial charging cycle, SEI may form on the surfaces of the anode structures 207 of the secondary battery 100. To compensate for the loss of carrier ions to SEI, and to further provide additional carrier ions to mitigate the long term secondary reactions during cycling where carrier ions are lost due to side reactions, the positive electrode 208 and/or the negative electrode 209 of the secondary battery 100 may be replenished by applying a voltage across the auxiliary electrode 502 and the cathode structures 206 and/or the anode structures 207 (e.g., via the conductive tab 508-1 of the auxiliary electrode 502 and one of the electrical terminals 124, 125) to drive carrier ions from the carrier ion supply layers 706 of the auxiliary electrode 502 to the cathode structures 206 and/or the anode structures 207 of the secondary battery 100. Once the transfer of carrier ions from the auxiliary electrode 502 to the secondary battery 100 is complete, the negative electrode 209 of the secondary battery 100 is again charged, this time with carrier ions transferred from the cathode structures 206 of the secondary battery 100 to the anode structures 207 of the secondary battery.

In one embodiment, the amount of carrier ions transferred from the auxiliary electrode 502 to the secondary battery 100 during the buffer process is about 50% of the reversable columbic capacity of the positive electrode 208 of the secondary battery 100. In other embodiments, the amount of carrier ions transferred from the auxiliary electrode 502 to the secondary battery 100 during the buffer process is about 55%, about 60%, about 65%, about 70%, about 75%, about 80%, about 85%, about 90%, about 95%, or about 100% of the reversable columbic capacity of the positive electrode 208 of the secondary battery 100. In some embodiments, the amount of carrier ions transferred from the auxiliary electrode 502 to the secondary battery 100 lies in a range of values of about 1% to about 100% of the reversable columbic capacity of the positive electrode 208 of the secondary battery 100. In one particular embodiment, the negative electrode 209 of the secondary battery 100 has about 170% of the reversable columbic capacity of the positive electrode 208 of the secondary battery 100 stored as carrier ions when the secondary battery 100 is charged, and about 70% of the reversable columbic capacity of the positive electrode 208 of the secondary battery 100 stored as carrier ions when the secondary battery 100 is discharged. An excess of carrier ions at the negative electrode 209 of the secondary battery 100 provided during the buffer process provides a technical benefit of mitigating the loss of carrier ions at the secondary battery 100 due to SEI at initial formation. Further, an excess of carrier ions at the negative electrode 209 of the secondary battery 100 provided during the buffer process provides a technical benefit of mitigating the loss of carrier ions at the secondary battery 100 due to side reactions that deplete carrier ions in the secondary battery 100 as the secondary battery 100 is cycled during use, which reduces the capacity loss of the secondary battery 100 over time.

In some embodiments, transferring carrier ions from the auxiliary electrode 502 to the secondary battery 100 may occur concurrently with an initial formation of the secondary battery 100 (e.g., during the first charge of the secondary battery 100), and/or during a subsequent charge of the secondary battery 100 after initial formation. In these embodiments, carrier ions are transferred from the positive electrode 208 of the secondary battery 100 to the negative electrode 209 of the secondary battery 100. Concurrently with or based on a temporal delay or a temporal pattern, carrier ions are transferred from the auxiliary electrode 502 to the positive electrode 208 and/or the negative electrode 209 of the secondary battery 100.

In yet another embodiment, the positive electrode 208 may be replenished with carrier ions by simultaneously transferring carrier ions from the auxiliary electrode 502 to the positive electrode 208 of the secondary battery 100, while also transferring carrier ions from the positive electrode 208 of the secondary battery 100 to the negative electrode 209 of the secondary battery 100. Referring to FIG. 6, a voltage is applied across the electrical terminals 124, 125 of the secondary battery 100, to drive carrier ions from the positive electrode 208 to the negative electrode 209 of the secondary battery 100. While the carrier ions are being transferred from the positive electrode 208 to the negative electrode 209, a voltage is applied across the conductive tab 508-1 of the auxiliary electrode 502 and the positive electrode 208 of secondary battery 100 to drive carrier ions from the auxiliary electrode 502 to the positive electrode 208 of the secondary battery 100. Thus, carrier ions are transferred from the auxiliary electrode 502 to the positive electrode 208 of the secondary battery 100 at the same time that carrier ions are being transferred from the positive electrode 208 to the negative electrode 209 of the secondary battery 100. That is, a voltage is maintained across the positive electrode 208 and the negative electrode 209 of the secondary battery 100 that is sufficient to drive carrier ions from the positive electrode 208 to the negative electrode 209 of the secondary battery 100, at the same time that a voltage is maintained across the conductive tab 508-1 of the auxiliary electrode 502 and the positive electrode 208 of the secondary battery 100 that is sufficient to drive carrier ions from the auxiliary electrode 502 to the positive electrode 208. In another embodiment, the onset of transfer of carrier ions from the auxiliary electrode 502 to the positive electrode 208 of the secondary battery 100 may commence simultaneously with onset of the transfer of carrier ions from the positive electrode 208 to the negative electrode 209 of the secondary battery 100. In one embodiment, the rate of transfer of carrier ions from the positive electrode 208 to the negative electrode 209 of the secondary battery 100 is greater than or equal to the rate of transfer of carrier ions from the auxiliary electrode 502 to the positive electrode 208 of the secondary battery 100, such that a good overall rate of transfer of carrier ions from the auxiliary electrode 502 to the negative electrode 209 of the secondary battery 100 via the positive electrode 208 can be maintained. That is, the relative rates of transfer between the positive electrode 208 and the negative electrode 209 of the secondary battery 100, and the auxiliary electrode 502 and the positive electrode 208, may be maintained such that the overall capacity of the positive electrode 208 for additional carrier ions is not exceeded. The positive electrode 208 may thus be maintained in a state where it has the ability to accept new carrier ions from the auxiliary electrode 502, which may allow for subsequent transfer of carrier ions to the negative electrode 209 of the secondary battery 100.

In one embodiment, without being limited by any particular theory, the carrier ions are transferred from the auxiliary electrode 502 to the positive electrode 208 of the secondary battery 100 as a part of the replenishment of the negative electrode 209 of the secondary battery 100 (as opposed to transferring from the auxiliary electrode 502 directly to the negative electrode 209 of the secondary battery), because the positive electrode 208 may be capable of more uniformly accepting carrier ions across the surface thereof, thus allowing the carrier ions to more uniformly participate in the transfer thereof between the positive electrode 208 and the negative electrode 209 of the secondary battery 100.

Figure 17:
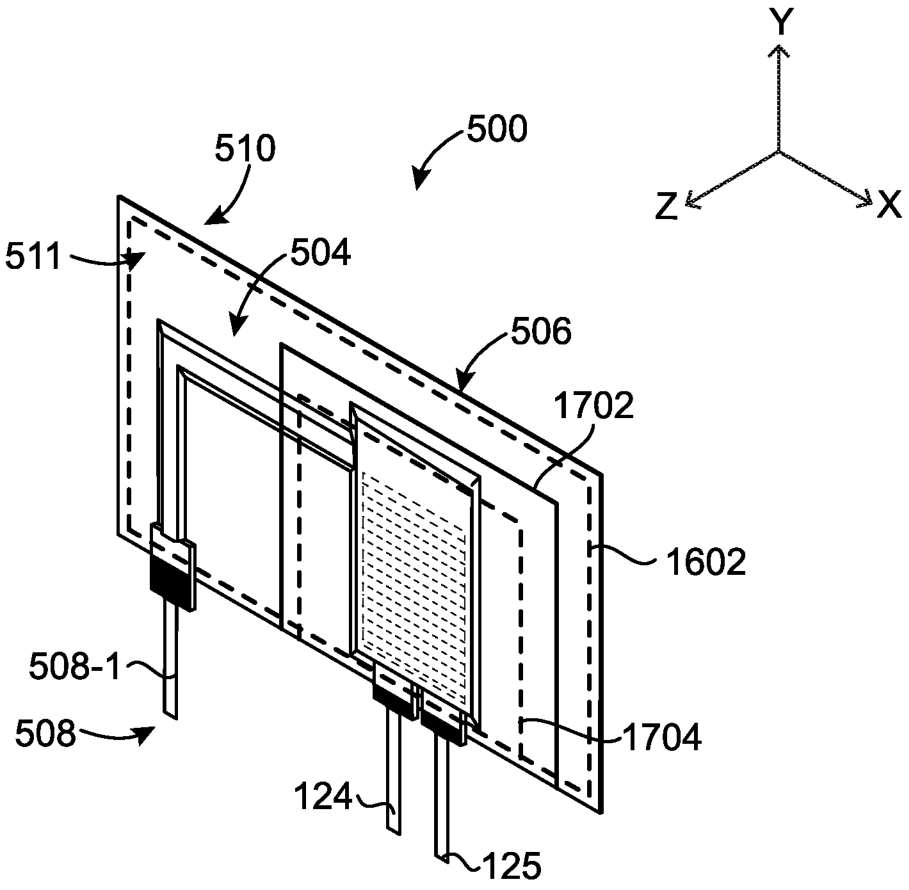
FIG. 17 is a perspective view of the buffer system of FIG. 5 subsequent to performing a buffer process on a secondary battery.

After the buffer process is performed on the secondary battery 100 utilizing the buffer system 500, the auxiliary electrode 502 may be removed from the buffer system 500 in order to improve the energy density of the secondary battery 100 in its final form. For example, after the buffer process, the carrier ion supply layers 706 (see FIG. 7) may have been removed from the conductive layer 704, having been electrochemically transferred to the secondary battery 100. Thus, the auxiliary electrode 502 may be superfluous at this point. To remove the auxiliary electrode 502 from the enclosure 504 after the buffer process is performed, the enclosure layers 510, 511 of the enclosure may be cut along cut lines 1702, illustrated in FIG. 17 as solid lines, allowing the enclosure layers 510, 511 to be peeled back proximate to the auxiliary electrode 502. The auxiliary electrode 502 is removed from the enclosure 504 of the buffer system 500, while the secondary battery 100 remains within the pouch 514 (see FIG. 12). The enclosure layers 510, 511 may then be re-sealed along a final sealing line 1704 illustrated as dashed lines to form the enclosure 504 in its final form prior to placing the secondary battery 100 in service. This re-seal may be performed using any of the previously described processes for sealing the first enclosure layer 510 and the second enclosure layer 511 together.

Figure 18:
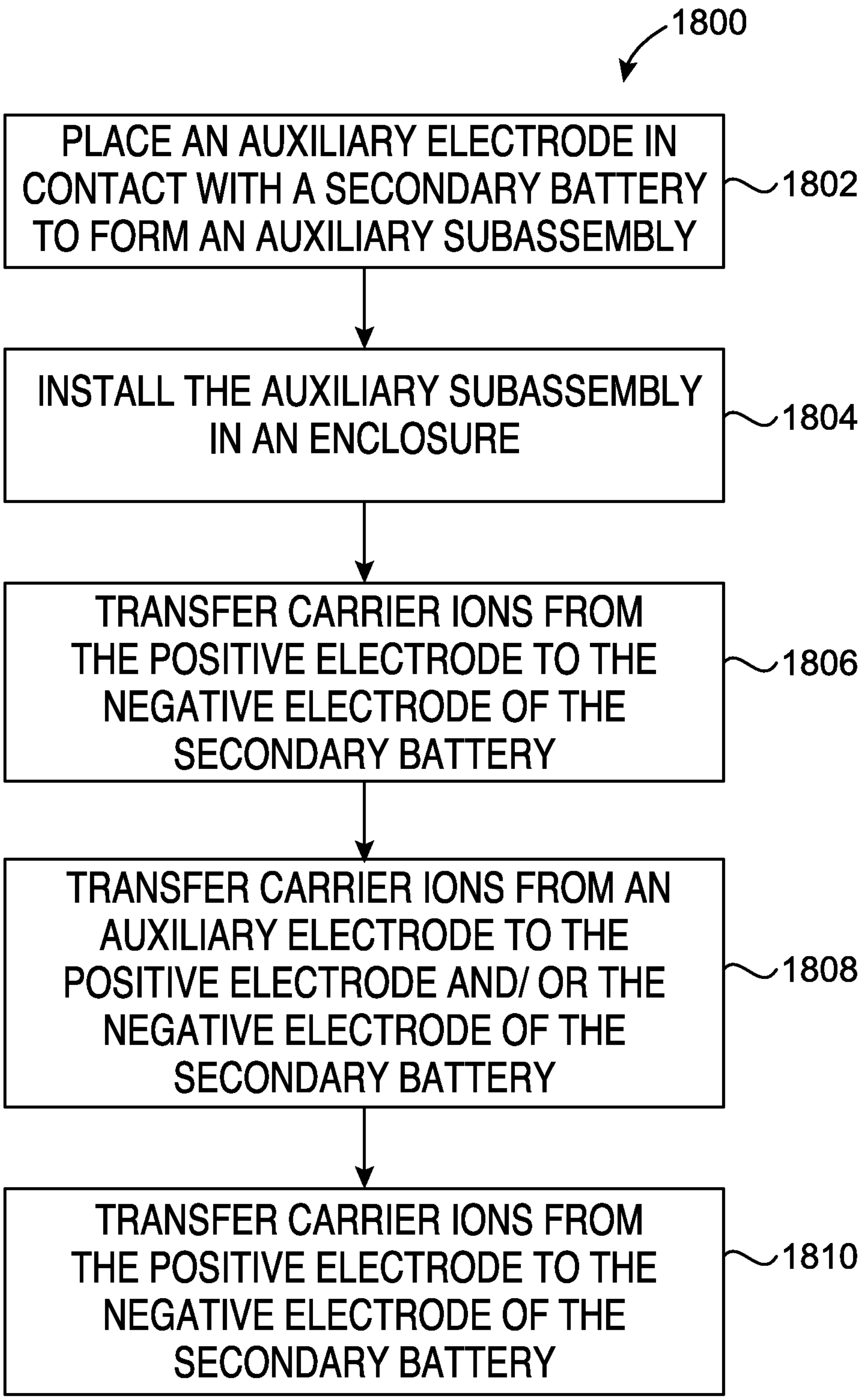
FIG. 18 is a flow chart of a method of pre-lithiating a secondary battery with carrier ions using an auxiliary electrode of an exemplary embodiment.
Figure 19:
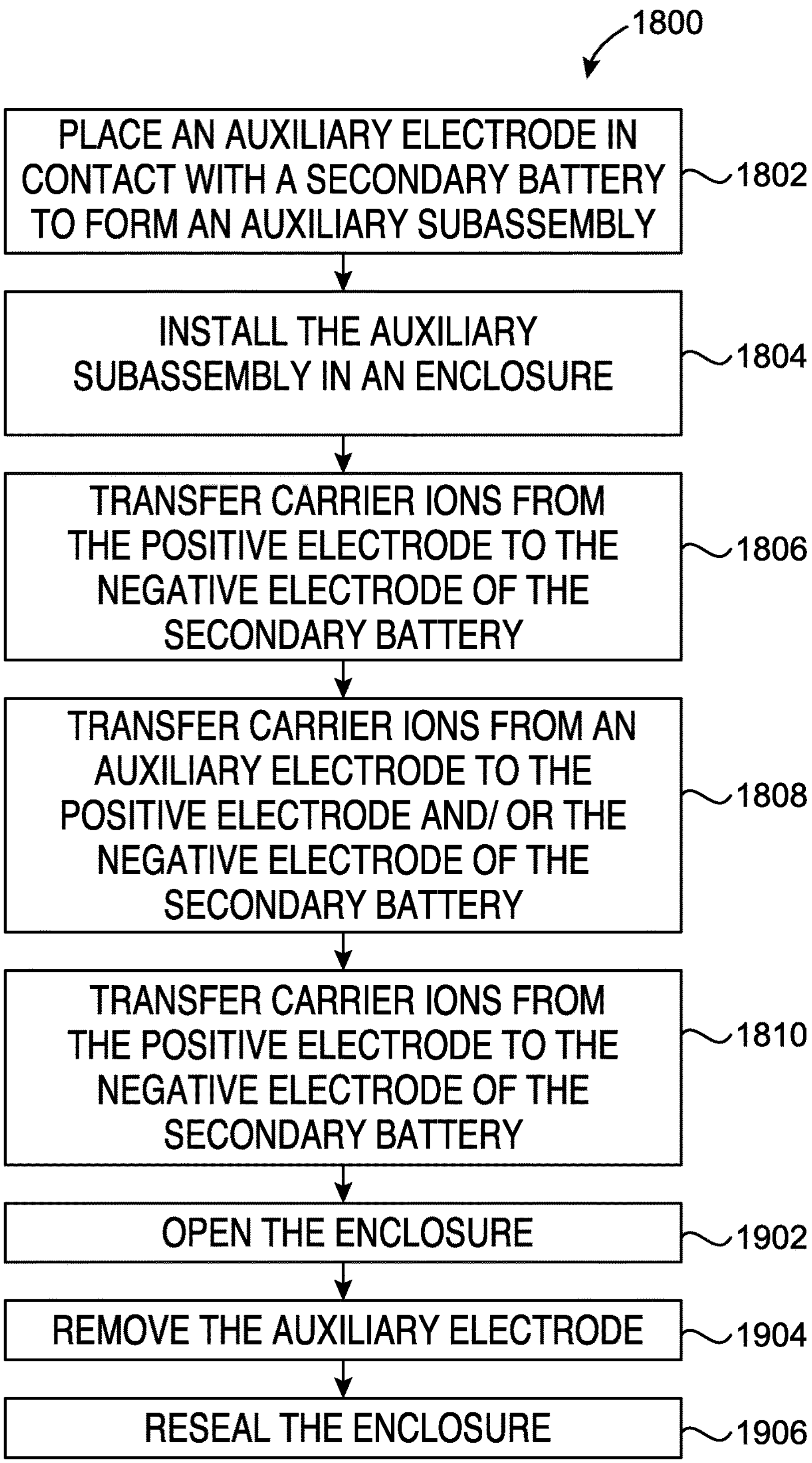
FIG. 19 is a flow chart depicting additional details of the method of FIG. 18.
Figure 20:
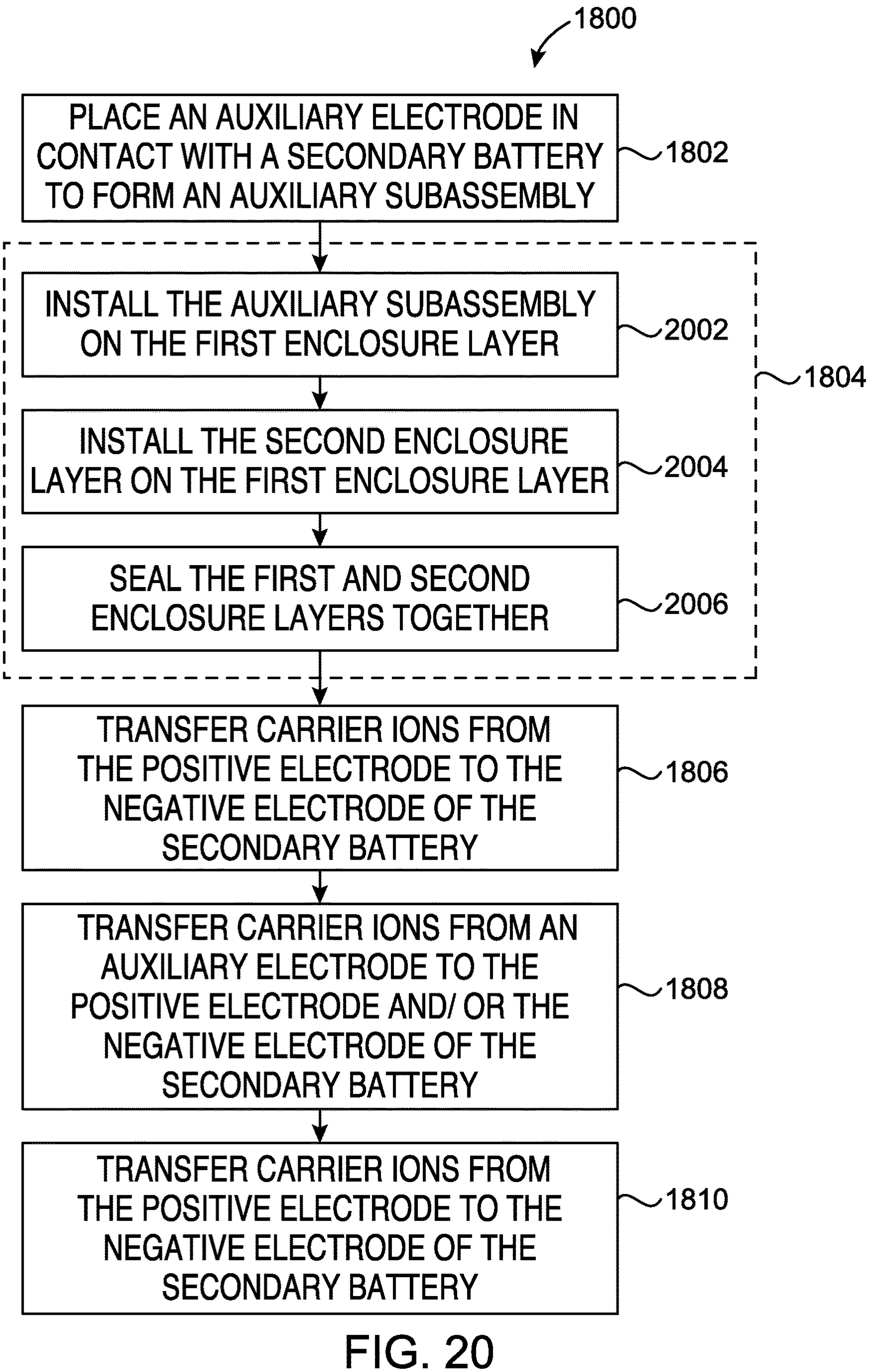
FIG. 20 is a flow chart depicting additional details of the method of FIG. 18.
Figure 21:
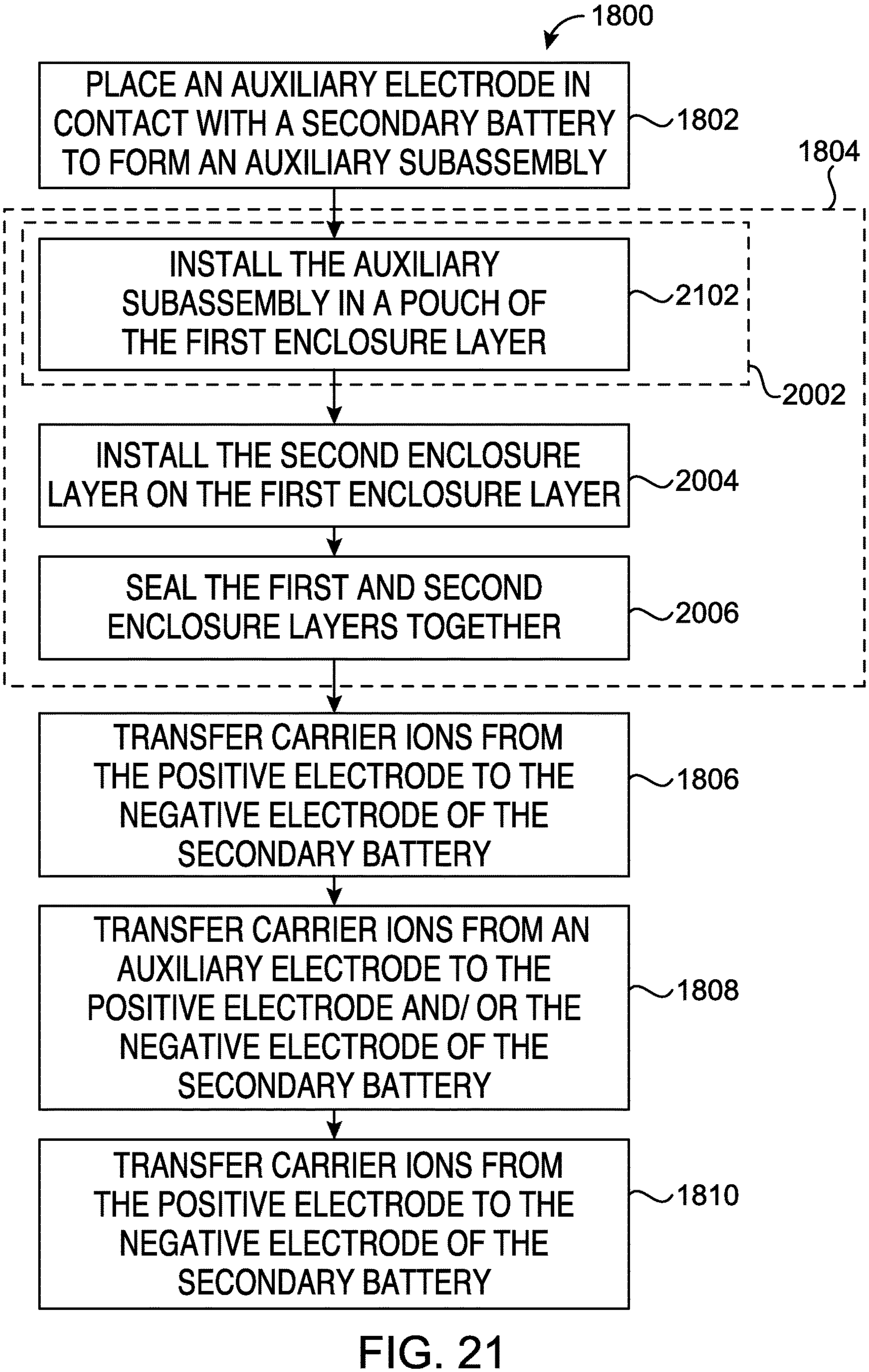
FIG. 21 is a flow chart depicting additional details of the method of FIG. 18.

FIG. 18 is a flow chart of a method 1800 of pre-lithiating a secondary battery with carrier ions using an auxiliary electrode of an exemplary embodiment, and FIGS. 19-21 are flow charts depicting additional details of the method 1800. The method 1800 will be described with respect to the secondary battery 100, the buffer system 500, and the auxiliary electrode 502 of FIGS. 1-17, although the method 1800 may apply to other systems, not shown. The steps of the method 1800 are not all inclusive, and the method 1800 may include other steps, not shown. Further, the steps of the method 1800 may be performed in an alternate order.

In this embodiment, the secondary battery 100 (see FIG. 1) has major surfaces 126, 127 that oppose each other, and the electrical terminals 124, 125. The electrical terminals 124, 125 are coupled to one of the positive electrode 208 of the secondary battery 100 (e.g., the population of the cathode structures 206 in the secondary battery 100, as depicted in FIG. 2) and the negative electrode 209 of the secondary battery 100 (e.g., the population of the anode structures 207 in the secondary battery 100, as depicted in FIG. 2). The secondary battery 100 comprises the microporous separator layer 108 (see FIG. 2) between the negative electrode 209 and the positive electrode 208 that is permeated with an electrolyte in ionic contact with the negative electrode 209 and the positive electrode 208. The negative electrode 209 comprises the anodically active material layer 104, such as silicon or an alloy thereof, having a coulombic capacity for the carrier ions. The positive electrode 208 comprises the cathodically active material layer 106, having a coulombic capacity for the carrier ions, with a negative electrode 209 coulombic capacity exceeding a positive electrode 208 coulombic capacity.

The auxiliary electrode 502 (see FIG. 6) is placed in contact with the major surfaces 126, 127 of the secondary battery 100 to form the auxiliary subassembly 516, where the auxiliary electrode 502 includes the electrically conductive layer 704, the carrier ion supply layers 706 disposed on the conductive layer 704 that are proximate to the major surfaces 126, 127 of the secondary battery 100, the separator 702 disposed between the carrier ion supply layers 706 and the major surfaces 126, 127 of the secondary battery, and the electrically conductive tab 508 coupled to the conductive layer 704 (see step 1802 of FIG. 18, and FIGS. 12-15).

The auxiliary subassembly 516 is installed in the enclosure 504, where the electrical terminals 124, 125 of the secondary battery 100 and the electrically conductive tab 508 of the auxiliary electrode 502 electrically extend from the perimeter 506 of enclosure 504 (see step 1804, and FIG. 16).

Carrier ions are transferred from the positive electrode 208 of the secondary battery 100 to the negative electrode 209 of the secondary battery 100 to at least partially charge the secondary battery 100 by applying a potential voltage across the electrical terminals 124, 125 (see step 1806). Charging may be discontinued when the positive electrode 208 of the secondary battery 100 reaches its the end-of-charge design voltage. During the initial charging cycle, SEI may form on the internal structural surfaces of the negative electrode 209 of the secondary battery 100.

To compensate for the loss of carrier ions to SEI, and to further provide additional carrier ions to mitigate the long term secondary reactions during cycling where carrier ions are lost due to side reactions, carrier ions are transferred from the carrier ion supply layers 706 of the auxiliary electrode 502 to the positive electrode 208 and/or the negative electrode 209 of the secondary battery 100 by applying a potential voltage across the electrically conductive tab 508 of the auxiliary electrode 502 and one or more of the electrical terminals 124, 125 of the secondary battery 100 (see step 1808, FIG. 16). Generally, this carrier ion buffer process transfers carrier ions from the carrier ion supply layers 706 of the auxiliary electrode 502 into each of the first major surface 126 of the secondary battery 100 and the second major surface 127 of the secondary battery 100 (see FIG. 15). Generally, transferring carrier ions to the secondary battery 100 from both of the major surfaces 126, 127 of the secondary battery 100, as depicted in FIG. 15, provides a technical benefit of distributing the forces generated by anode and/or cathode swelling more equally across the casing 116 of the secondary battery 100 as more carrier ions are loaded into the cathode and/or the anode of the secondary battery 100.

In one embodiment, the amount of carrier ions transferred from the auxiliary electrode 502 to the secondary battery 100 is about 50% of the reversable columbic capacity of the positive electrode 208 of the secondary battery 100. In other embodiments, the amount of carrier ions transferred from the auxiliary electrode 502 to the secondary battery 100 is about 55%, about 60%, about 65%, about 70%, about 75%, about 80%, about 85%, about 90%, about 95%, or about 100% of the reversable columbic capacity of the positive electrode 208 of the secondary battery 100. In some embodiments, the amount of carrier ions transferred from the auxiliary electrode 502 to the secondary battery 100 lies in a range of values of about 1% to about 100% of the reversable columbic capacity of the positive electrode 208 of the secondary battery 100. In one particular embodiment, the negative electrode 209 of the secondary battery 100 has about 170% of the reversable columbic capacity of the positive electrode 208 of the secondary battery 100 stored as carrier ions when the secondary battery 100 is charged, and about 70% of the reversable columbic capacity of the positive electrode 208 of the secondary battery 100 stored as carrier ions when the secondary battery 100 is discharged. An excess of carrier ions at the negative electrode 209 of the secondary battery 100 provided during the buffer process provides a technical benefit of mitigating the loss of carrier ions at the secondary battery 100 due to SEI at initial formation. Further, an excess of carrier ions at the negative electrode 209 of the secondary battery 100 provided during the buffer process provides a technical benefit of mitigating the loss of carrier ions at the secondary battery 100 due to side reactions that deplete carrier ions in the secondary battery 100 as the secondary battery 100 is cycled during use, which reduces the capacity loss of the secondary battery 100 over time.

In some embodiments, transferring carrier ions from the auxiliary electrode 502 to the secondary battery 100 may occur concurrently with an initial formation of the secondary battery 100 (e.g., during the first charge of the secondary battery 100), and/or during a subsequent charge of the secondary battery 100 after initial formation. In these embodiments, carrier ions are transferred from the positive electrode 208 of the secondary battery 100 to the negative electrode 209 of the secondary battery 100. Concurrently with or based on a temporal delay or a temporal pattern, carrier ions are transferred from the auxiliary electrode 502 to the positive electrode 208 and/or the negative electrode 209 of the secondary battery 100.

Carrier ions are again transferred from the positive electrode 208 of the secondary battery 100 to the negative electrode 209 of the secondary battery 100 to charge the secondary battery 100 by applying a potential voltage across the electrical terminals 124, 125 of the secondary battery 100 until the negative electrode 209 has greater than 100% of the positive electrode 208 coulombic capacity stored as the carrier ions (see step 1810).

In yet another embodiment, the positive electrode 208 may be replenished with carrier ions by simultaneously transferring carrier ions from the auxiliary electrode 502 to the positive electrode 208 of the secondary battery 100, while also transferring carrier ions from the positive electrode 208 of the secondary battery 100 to the negative electrode 209 of the secondary battery 100. Referring to FIG. 6, a voltage is applied across the electrical terminals 124, 125 of the secondary battery 100, to drive carrier ions from the positive electrode 208 to the negative electrode 209 of the secondary battery 100. While the carrier ions are being transferred from the positive electrode 208 to the negative electrode 209, a voltage is applied across the conductive tab 508-1 of the auxiliary electrode 502 and the positive electrode 208 of secondary battery 100 to drive carrier ions from the auxiliary electrode 502 to the positive electrode 208 of the secondary battery 100. Thus, carrier ions are transferred from the auxiliary electrode 502 to the positive electrode 208 of the secondary battery 100 at the same time that carrier ions are being transferred from the positive electrode 208 to the negative electrode 209 of the secondary battery 100. That is, a voltage is maintained across the positive electrode 208 and the negative electrode 209 of the secondary battery 100 that is sufficient to drive carrier ions from the positive electrode 208 to the negative electrode 209 of the secondary battery 100, at the same time that a voltage is maintained across the conductive tab 508-1 of the auxiliary electrode 502 and the positive electrode 208 of the secondary battery 100 that is sufficient to drive carrier ions from the auxiliary electrode 502 to the positive electrode 208. In another embodiment, the onset of transfer of carrier ions from the auxiliary electrode 502 to the positive electrode 208 of the secondary battery 100 may commence simultaneously with onset of the transfer of carrier ions from the positive electrode 208 to the negative electrode 209 of the secondary battery 100. In one embodiment, the rate of transfer of carrier ions from the positive electrode 208 to the negative electrode 209 of the secondary battery 100 is greater than or equal to the rate of transfer of carrier ions from the auxiliary electrode 502 to the positive electrode 208 of the secondary battery 100, such that a good overall rate of transfer of carrier ions from the auxiliary electrode 502 to the negative electrode 209 of the secondary battery 100 via the positive electrode 208 can be maintained. That is, the relative rates of transfer between the positive electrode 208 and the negative electrode 209 of the secondary battery 100, and the auxiliary electrode 502 and the positive electrode 208, may be maintained such that the overall capacity of the positive electrode 208 for additional carrier ions is not exceeded. The positive electrode 208 may thus be maintained in a state where it has the ability to accept new carrier ions from the auxiliary electrode 502, which may allow for subsequent transfer of carrier ions to the negative electrode 209 of the secondary battery 100.

In one embodiment, without being limited by any particular theory, the carrier ions are transferred from the auxiliary electrode 502 to the positive electrode 208 of secondary battery 100 as a part of the replenishment of the negative electrode 209 of the secondary battery 100 (as opposed to transferring from the auxiliary electrode 502 directly to the negative electrode 209 of the secondary battery 100), because the positive electrode 208 may be capable of more uniformly accepting carrier ions across the surface thereof, thus allowing the carrier ions to more uniformly participate in the transfer thereof between the positive electrode 208 and the negative electrode 209 of the secondary battery 100.

In some embodiments of the method 1800, the enclosure 504 is opened (see step 1902 of FIG. 19), and the auxiliary electrode 502 is removed from the enclosure 504 (see step 1904). In response to removing the auxiliary electrode 502 from the enclosure 504, the enclosure is resealed into its final form to encapsulate the secondary battery 100 for use (see step 1906).

Although installing the auxiliary subassembly 516 in the enclosure 504 as previously described with respect to step 1804 detailed above, one particular embodiment comprises installing the auxiliary subassembly 516 on the first enclosure layer 510 (see step 2002 of FIG. 20). The second enclosure layer 511 is installed on the first enclosure layer 510 (see step 2004), and the first enclosure layer 510 and the second enclosure layer 511 are sealed together along the sealing line 1602 to form the enclosure 504 (see step 2006).

The enclosure layers 510, 511 may be sealed along the sealing line 1602 (see FIG. 16) by welding, heat sealing, adhesive, combinations thereof, or the like. In another embodiment, the enclosure layers 510, 511 may be sealed along three sides of the sealing line 1602 creating a pocket therein. In this embodiment, the secondary battery 100 may be placed within the pocket, and the final edge of the sealing line 1602 is subsequently sealed. In one embodiment, the sealing line 1602 is sealed using a hot press, that applies a controlled temperature and pressure to the sealing line 1602 causing the enclosure layers 510, 511 to adhere or fuse together along the sealing line 1602. In another embodiment, a vacuum is applied to the secondary battery 100 during the sealing process to evacuate any excess volume occupied by air or other gas. The time for which the sealing line 1602 is subject to the hot press may be controlled and is dependent upon the materials selected for the enclosure layers 510, 511. Once sealed over the secondary battery 100, the sealed enclosure layers 510, 511 form the buffer system 500. Upon sealing, the buffer system 500 is liquid tight and/or air-tight, depending on the desired application. The electrical terminals 124, 125 of the secondary battery 100 and the conductive tab 508 remain exposed and are not covered by the enclosure layers 510, 511.

In embodiments where the first enclosure layer 510 includes the pouch 514, installing the auxiliary subassembly 516 within the enclosure 504 initially comprises placing the auxiliary subassembly 516 within the pouch 514 (see step 2102 of FIG. 21). In some embodiments, an electrolyte is added to the pouch 514 (e.g., either before or after installing the auxiliary subassembly 516 in the pouch 514), with the enclosure 504 formed subsequent thereto by sealing the first enclosure layer 510 and the second enclosure layer 511 together along the sealing line 1602.

In some embodiments, one or more steps of the formation process performed on the secondary battery 100 discussed above may be performed using a battery tray and a formation base removably attachable to the battery tray.

Figure 22:
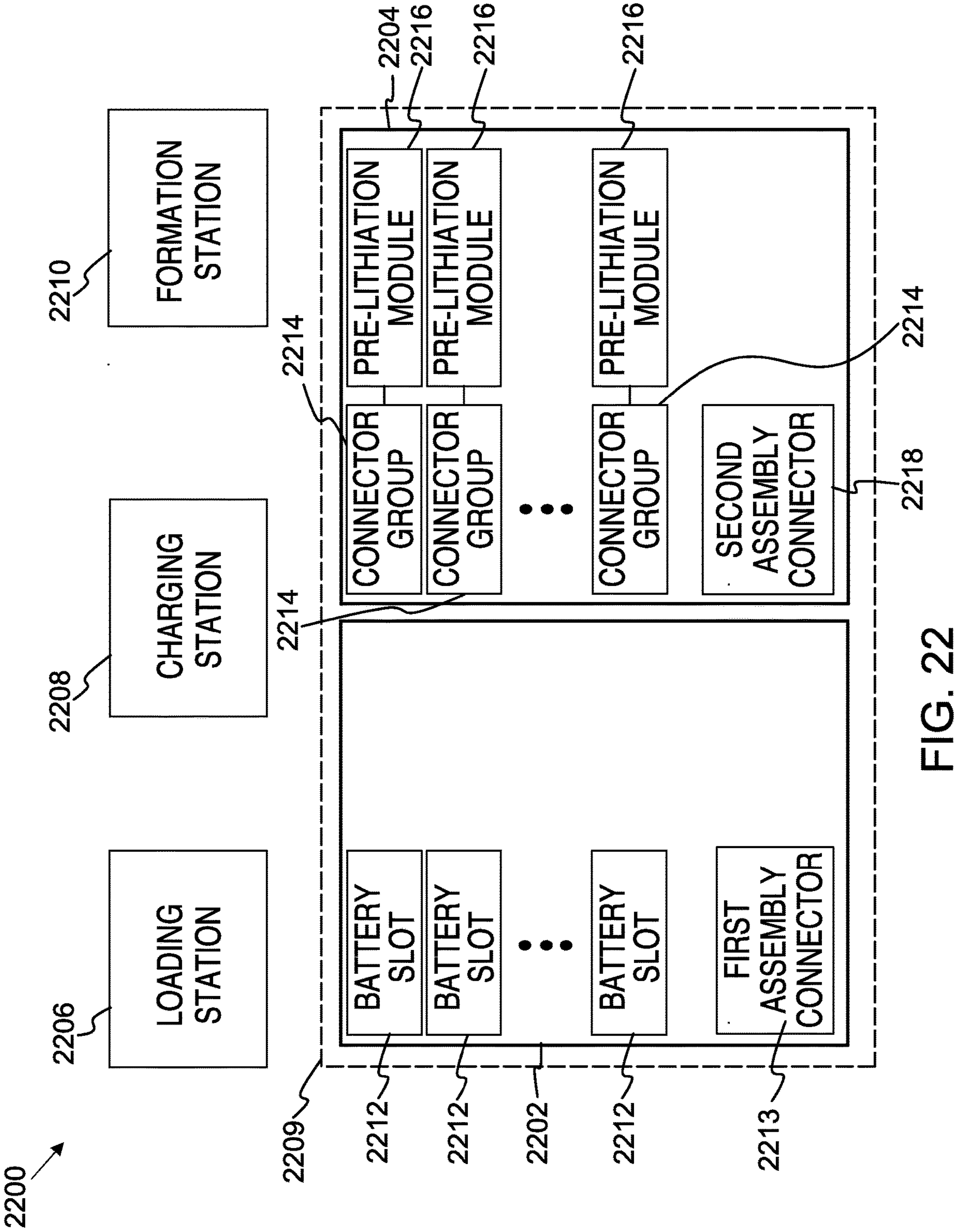
FIG. 22 is a block diagram of an example cell formation system.

FIG. 22 is a block diagram of an example cell formation system 2200 for lithium containing secondary batteries, such as the secondary battery 100. The system 2200 includes a battery tray 2202, a formation base 2204, a loading station 2206, a charging station 2208, and a formation station 2210. The battery tray 2202 and the formation base 2204 form a formation assembly 2209 when attached. Other embodiments do not include the charging station 2208, and the batteries to be processed by the cell formation system 2200 may be charged using any suitable charging system.

The battery tray 2202 includes battery slots 2212 and a first assembly connector 2213. Each battery slot 2212 is configured (e.g., sized and shaped) to receive and retain a secondary battery 100. In the example embodiment, each battery slot 2212 is configured to receive only one secondary battery 100, but in other embodiments, each battery slot may be configured to receive more than one battery. In one example embodiment, the battery tray 2202 includes one hundred and twenty battery slots 2212 arranged in three rows of forty battery slots. Other embodiments include more or fewer battery slots 2212 arranged in more or fewer rows. Openings are defined in a bottom of the battery tray 2202 at locations corresponding to the battery slots 2212 to allow the first terminal 124, the second terminal 125, and the conductive tab 508-1 to extend through the bottom of the battery tray when a secondary battery 100 is positioned in a battery slot 2212.

The formation base 2204 is sized and shaped similar to the battery tray 2202, and is configured for removable attachment to the battery tray. The formation base 2204 includes connector groups 2214, pre-lithiation modules 2216, and a second assembly connector 2218. Each connector group 2214 is configured for making electrical connection to the conductive tab 508-1, and one of the first terminal 124 and the second terminal 125 of a different secondary battery 100 when the battery tray 2202 with the secondary battery loaded therein is attached to the formation base. The one of the first terminal 124 and the second terminal 125 of a different secondary battery 100 to which the connector group 2214 connects is the cathodic terminal. In other embodiments, each connector group 2214 is configured for making electrical connection to the conductive tab 508-1, the first terminal 124, and the second terminal 125 of a different secondary battery 100 when the battery tray 2202 with the secondary battery loaded therein is attached to the formation base 2204.

Each pre-lithiation module 2216 is electrically connected to a different one of the connector groups 2214, and is configured to diffuse lithium to the electrode active materials of the secondary battery 100 connected to the connector group 2214 to which the pre-lithiation module 2216 is electrically connected. In other embodiments, each pre-lithiation module 2216 is electrically connected to more than one of the connector groups 2214, and is configured to diffuse lithium to the electrode active materials of the secondary batteries 100 connected to the more than one connector group 2214 to which the pre-lithiation module 2216 is electrically connected. In one example, the pre-lithiation modules 2216 are switched capacitor circuits. In another example, the pre-lithiation modules 2216 include a resistor to be electrically connected between the conductive tab 508-1, and one of the first terminal 124 and the second terminal 125, and a circuit which interrupts the connection when the voltage drops to 1.5V (indicating the completion of the buffer process). Other embodiments include any other suitable pre-lithiation module 2216.

The second assembly connector 2218 is configured to matingly engage with the first assembly connector 2213 to mechanically connect the battery tray 2202 to the formation base 2204. In one example embodiment, the first assembly connector 2213 is a rectangular opening through the bottom of the battery tray 2202, and the second assembly connector 2218 is a rotatable t-shaped connector extending from the formation base 2204. In a first orientation, the second assembly connector 2218 may pass through the rectangular opening of the first assembly connector 2213 to allow the battery tray 2202 to be placed into position on the formation base 2204. When the second assembly connector 2218 is rotated to a second position (e.g., ninety degrees from the first position), the second assembly connector 2218 cannot pass through the rectangular opening of the first assembly connector 2213. Thus, after the battery tray 2202 is placed into position on the formation base 2204, the second assembly connector 2218 is rotated to the second position to lock the battery tray 2202 and the formation base 2204 together into the formation assembly 2209. Other embodiments may use other connection systems as the first and second assembly connectors 2213, 2218.

The loading station 2206, the charging station 2208, and the formation station 2210 are stations for loading batteries 100 into the battery tray 2202, charging batteries in the battery tray, and buffering batteries in the formation assembly 2209, respectively. At the loading station 2206, secondary batteries 100 are typically loaded into the battery tray 2202 by a loading mechanism (e.g., loading mechanism 3860, shown in FIG. 38). In other embodiments, secondary batteries 100 are loaded into the battery tray 2202 by a human operator. The charging station 2208 is configured to receive the battery tray 2202 loaded with secondary batteries 100, and to store the loaded battery tray and charge the batteries 100 in the battery tray. The formation station 2210 is configured to receive the formation assembly 2209 including the battery tray 2202 loaded with charged secondary batteries 100, and to store the formation assembly while lithium is diffused to the electrode active materials of the secondary batteries in the battery tray by the pre-lithiation modules 2216. Some embodiments also include a mounting station (not shown) at which the battery tray 2202 is mounted to the formation base 2204. The battery tray 2202 and the formation assembly 2209 may travel between the loading station 2206, the charging station 2208, the formation station 2210, and the mounting station on a conveyer belt or any other suitable conveyance system.

The charging station 2208 includes a rack or shelving system to store the battery tray 2202, as well as electrical connections for providing power to the battery tray to charge the secondary batteries 100 in the battery tray. In some embodiments, the charging station includes charging circuitry to control the charging of the secondary batteries 100, while in other embodiments, the charging circuitry is included in the battery tray 2202 or the formation base 2204. In some embodiments, the charging station 2208 also includes communications connections to allow one or more remote computing devices to control and/or monitor charging of secondary batteries 100 at the charging station 2208.

The formation station 2210 includes a rack or shelving system to store the formation assembly 2209, as well as electrical connections for providing power for the formation process. In some embodiments, the formation station 2210 also includes communications connections to allow one or more remote computing devices to control and/or monitor the formation process at the formation station 2210.

Figure 23:
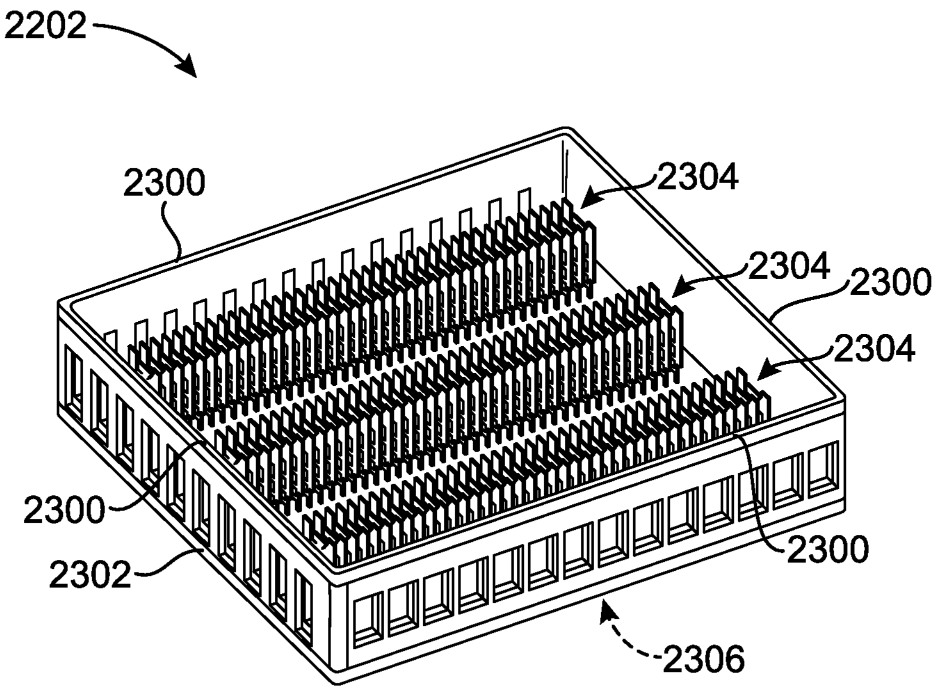
FIG. 23 is a perspective view of an example battery tray for the cell formation system of FIG. 22.

FIG. 23 is a perspective view of an example battery tray that may be used as the battery tray 2202 in the cell formation system 2200 (shown in FIG. 22). The battery tray 2202 includes sides 2300 connected to and extending above a base 2302. In the example embodiment, the battery tray 2202 includes four sides 2300 of approximately equal length, height and thickness. In other embodiments, the battery tray may include more or fewer sides 2300 and/or the sides may vary in one or more of their dimensions. The example battery tray 2202 includes one hundred and twenty battery slots 2212 arranged in three rows 2304 of forty slots each. Other embodiments may include more or fewer total slots 2212 arranged in more or fewer rows 2304. At least one opening (not shown in FIG. 23) is defined through the base 2302 at a location of each slot 2212 to permit the conductive tab 508-1, the first terminal 124, and the second terminal 125 to extend from the slot 2212 through the base of the battery tray 2202 to a position accessible from a bottom side 2306 of the base of the battery tray. The battery tray 2202 includes six first assembly connectors 2213 (not shown in FIG. 23) for matingly engaging a corresponding six second assembly connectors 2218 of the formation base 2204 to mechanically connect the battery tray 2202 to the formation base 2204. Other embodiments may include more or fewer first assembly connectors 2213 and second assembly connectors 2218.

Figure 24:
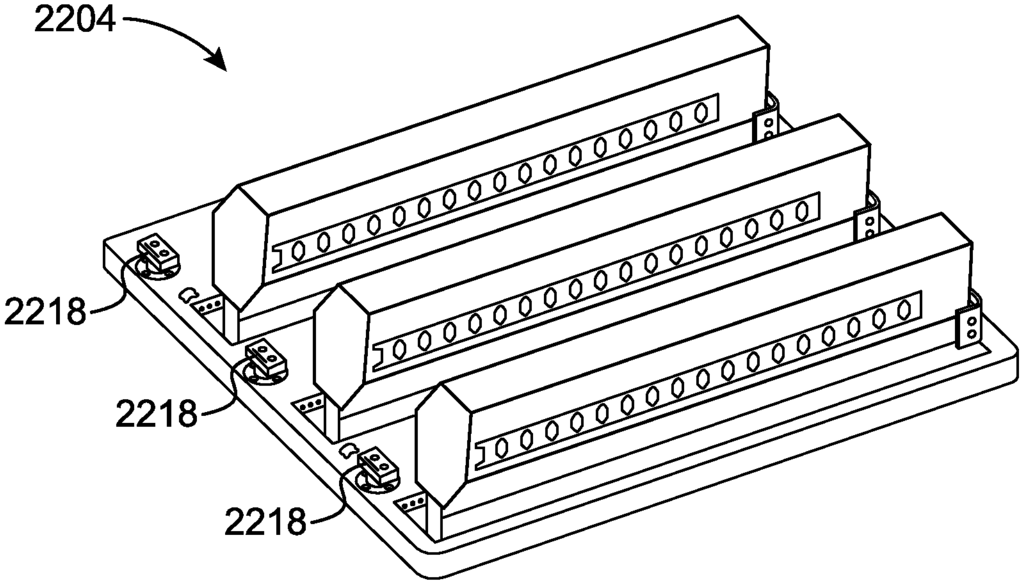
FIG. 24 is a perspective view of an example formation base for the cell formation system of FIG. 22.
Figure 25:
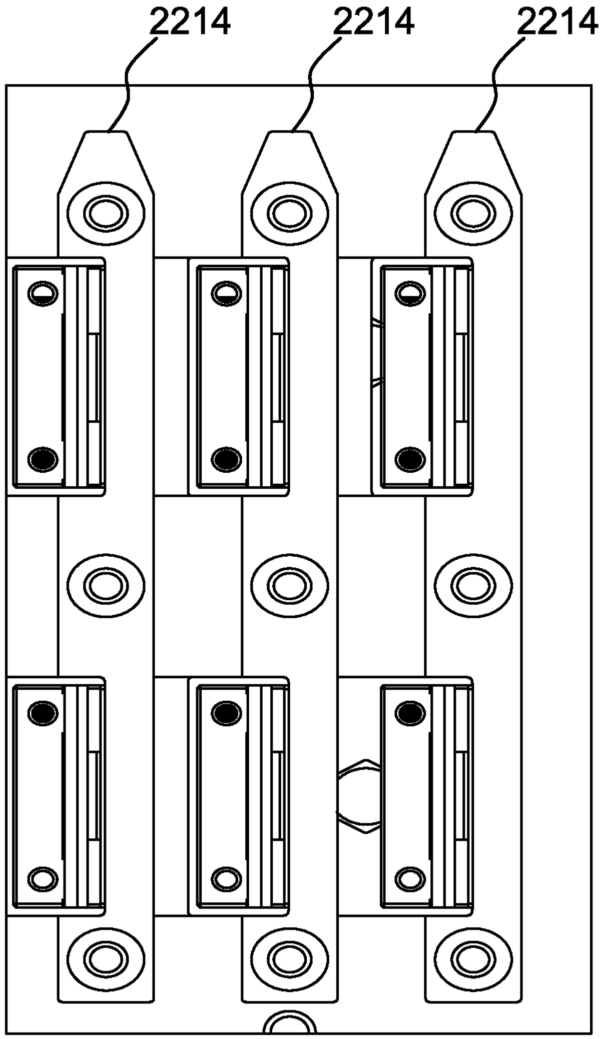
FIG. 25 is an enlarged view of connector groups of the formation base of FIG. 24.

FIG. 24 is a perspective view of an example formation base that may be used as the formation base 2204 in the cell formation system 2200 (shown in FIG. 22). The formation base 2204 includes a same number of connector groups 2214 as the battery tray 2202 has battery slots 2212. Three connector groups 2214 are shown in FIG. 25. The example formation base 2204 includes six second assembly connectors 2218 (three on each side—only one side is visible in FIG. 24) for matingly engaging the first assembly connectors 2213 of the battery tray 2202 to mechanically connect the battery tray 2202 to the formation base 2204.

Figure 26:
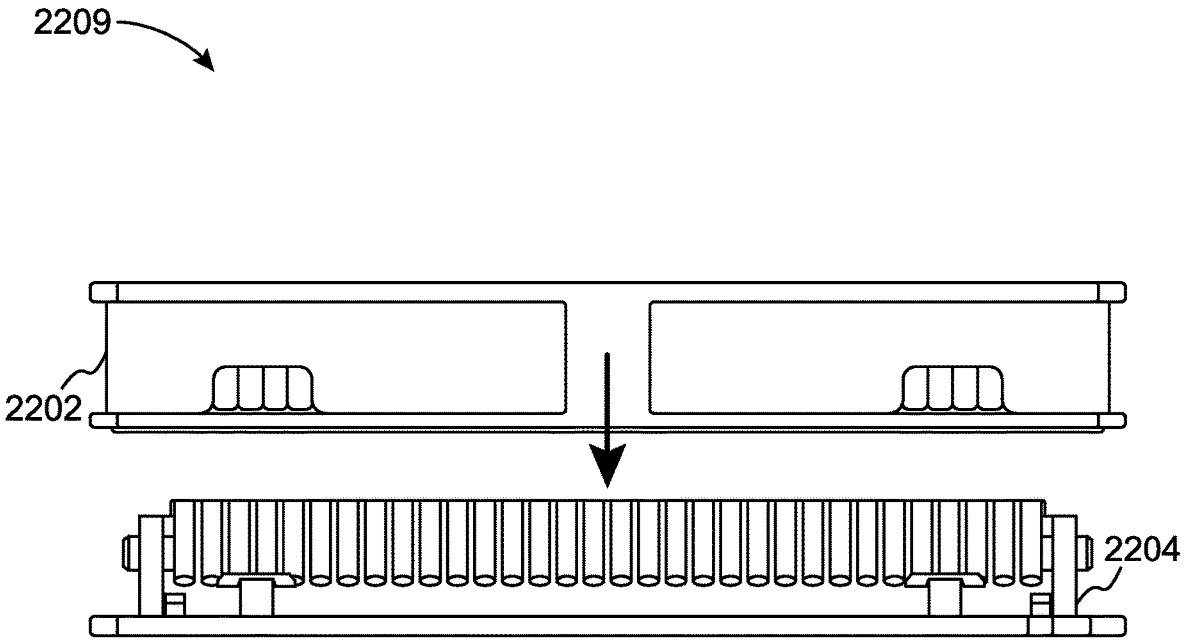
FIG. 26 is a side view of the battery tray of FIG. 23 being positioned to attach to the formation base of FIG. 24 to form a formation assembly.
Figure 27:
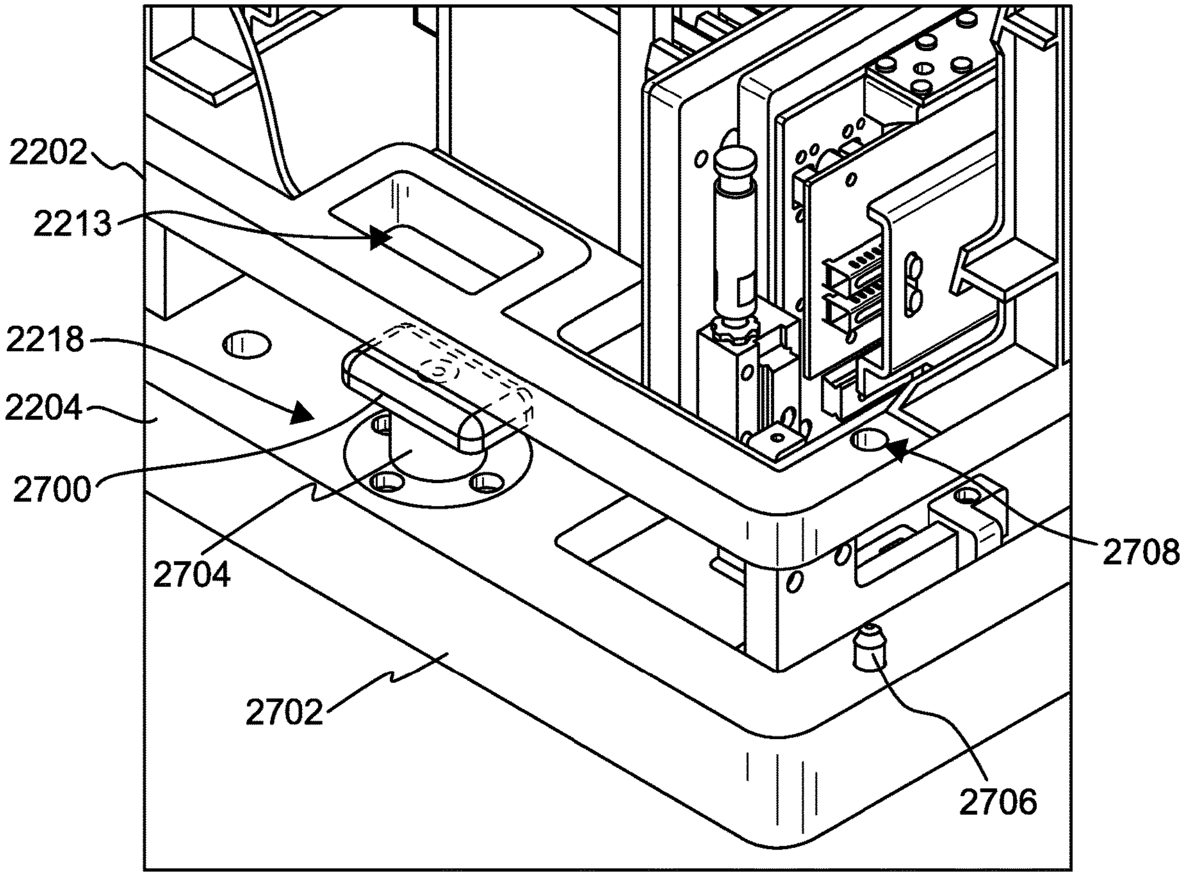
FIG. 27 is a partial view of the battery tray of FIG. 23 positioned over the formation base of FIG. 24 with assembly connectors aligned.
Figure 28:
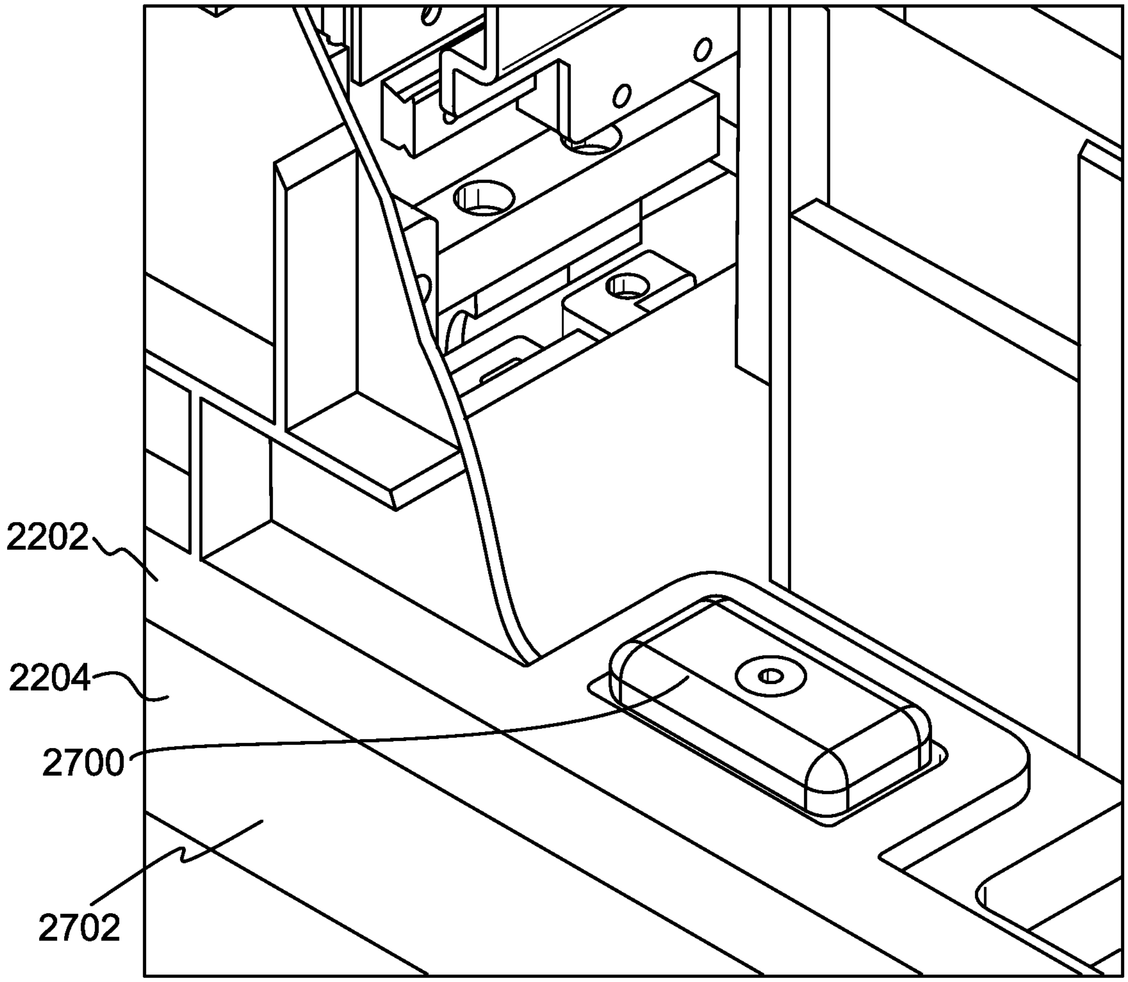
FIG. 28 is a partial view of the battery tray of FIG. 23 lowered onto the formation base of FIG. 24.
Figure 29:
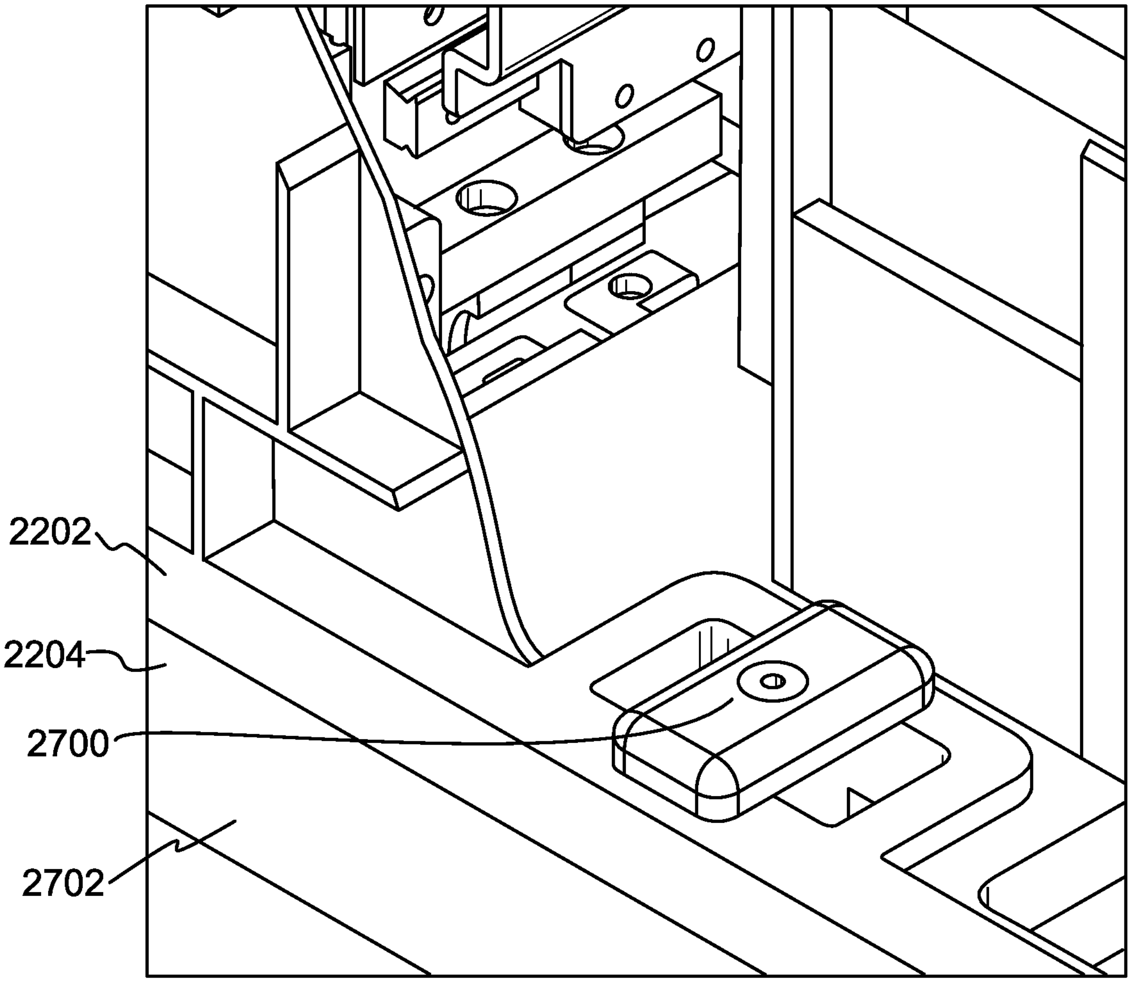
FIG. 29 is a partial view of the battery tray of FIG. 23 lowered onto the formation base of FIG. 24 with the assembly connectors engaged.

FIG. 26 is a side view of the battery tray 2202 being positioned to attach to the formation base 2204 to form the formation assembly 2209. FIGS. 27-29 show the process of engaging one of the second assembly connectors 2218 of the formation base 2204 and one of the first assembly connectors 2213 of the battery tray 2202. During connection of the battery tray 2202 to the formation base 2204, the same process would occur for each first assembly connector 2213 and second assembly connector 2218. As shown in FIG. 27, the battery tray 2202 is positioned over the formation base 2204 with the first assembly connectors 2213 aligned over the second assembly connectors 2218. In this embodiment, the first assembly connector 2213 is a rectangular opening, and the second assembly connector 2218 includes a rotatable rectangular bar 2700 supported above a base 2702 by a post 2704. The rectangular bar 2700 is sized to fit through the rectangular opening of the first assembly connector 2213, and the post 2704 is sized to be approximately the same height or a slightly greater height above the base 2702 as a thickness of the base 2302 of the battery tray. When beginning assembly of the formation assembly 2209, the second assembly connector 2218 is oriented with the rectangular bar 2700 in a first orientation that will allow it to pass through the rectangular opening of the first assembly connector 2213 when the battery tray 2202 is lowered (or the formation base 2204 is raised) to connect the battery tray 2202 and the formation base 2204. The formation base 2204 also has a population of alignment posts 2706 (only one of which is shown in FIG. 27) that correspond to alignment holes 2708 in the battery tray 2202. When the battery tray 2202 is positioned on the formation base 2204, the alignment posts 2706 pass into the alignment holes 2708 to facilitate aligning the formation base 2204 and the battery tray 2202, and to facilitate limiting movement of the battery tray 2202 relative to the formation base 2204 in a plane parallel to the base 2702.

In FIG. 28, the battery tray 2202 has been lowered onto the formation base 2204 and the rectangular bar 2700 of the second assembly connector 2218 has passed through the rectangular opening of the first assembly connector 2213. The rectangular bar 2700 is still in the first orientation at this stage, and the battery tray 2202 may be lifted and removed from the formation base 2204. In FIG. 29, the rectangular bar 2700 has been rotated to a second orientation. In the second orientation, the rectangular bar 2700 of the second assembly connector 2218 cannot pass through the opening of the first assembly connector 2213, thereby securing the battery tray 2202 to the formation base 2204. Although the second orientation is about ninety degrees from the first orientation, the two orientations may differ by any angle sufficient to permit passage of the rectangular bar 2700 through the opening of the first assembly connector 2213 in the first orientation and prevent passage of the rectangular bar 2700 through the opening of the first assembly connector 2213. Other embodiments may use any other suitable types of connectors for the first assembly connector and the second assembly connector.

One example method of cell formation using the cell formation system 2200 will be described below. It should be understood that the cell formation system 2200 may be used for other methods of cell formation as well.

First, a population of lithium containing secondary batteries 100 are loaded into the battery tray 2202. Each battery 100 is loaded into a different battery slot 2212 with the conductive tab 508-1, the first terminal 124, and the second terminal 125 extending through the base 2302 of the battery tray to a position accessible from a bottom side of the base of the battery tray. The battery tray 2202 is then transported to the charging station 2208, where the lithium containing secondary batteries 100 in the battery tray are charged. The battery tray 2202 is removed from the charging station 2208 and the formation base 2204 is attached to the battery tray from the bottom side of the base 2302 of the battery tray to form the formation assembly 2209. The formation assembly 2209 is transported to the formation station 2210, and the lithium containing secondary batteries 100 in the formation assembly 2209 are prelithiated using the pre-lithiation modules 2216. The formation base 2204 is removed from the battery tray 2202 after pre-lithiation is complete. One or more additional processes may be performed on the lithium containing secondary batteries 100 in the battery tray 2202. The formation base 2204 is returned for re-use while the additional processes are performed. Thus, an additional population of lithium containing secondary batteries 100 may be loaded into an additional battery tray 2202, and the process above may be repeated with the additional battery tray 2202 and the formation base 2204.

In some embodiments, the formation process is performed by a distributed formation system (which may include the cell formation system 2200), in which each secondary battery 100 is connected to a separate formation cluster that performs the formation process for the secondary battery 100 to which it is connected. In embodiments using the cell formation system 2200, the separate formation cluster for each secondary battery 100 may be included in the formation base 2204. In such embodiments, charging and discharging may occur with the formation base 2204 attached to the battery tray, or may occur in the battery tray without the formation base 2204 attached (e.g., the charging module and discharging modules may be in the battery tray and the pre-lithiation module may be in the formation base).

Figure 30:
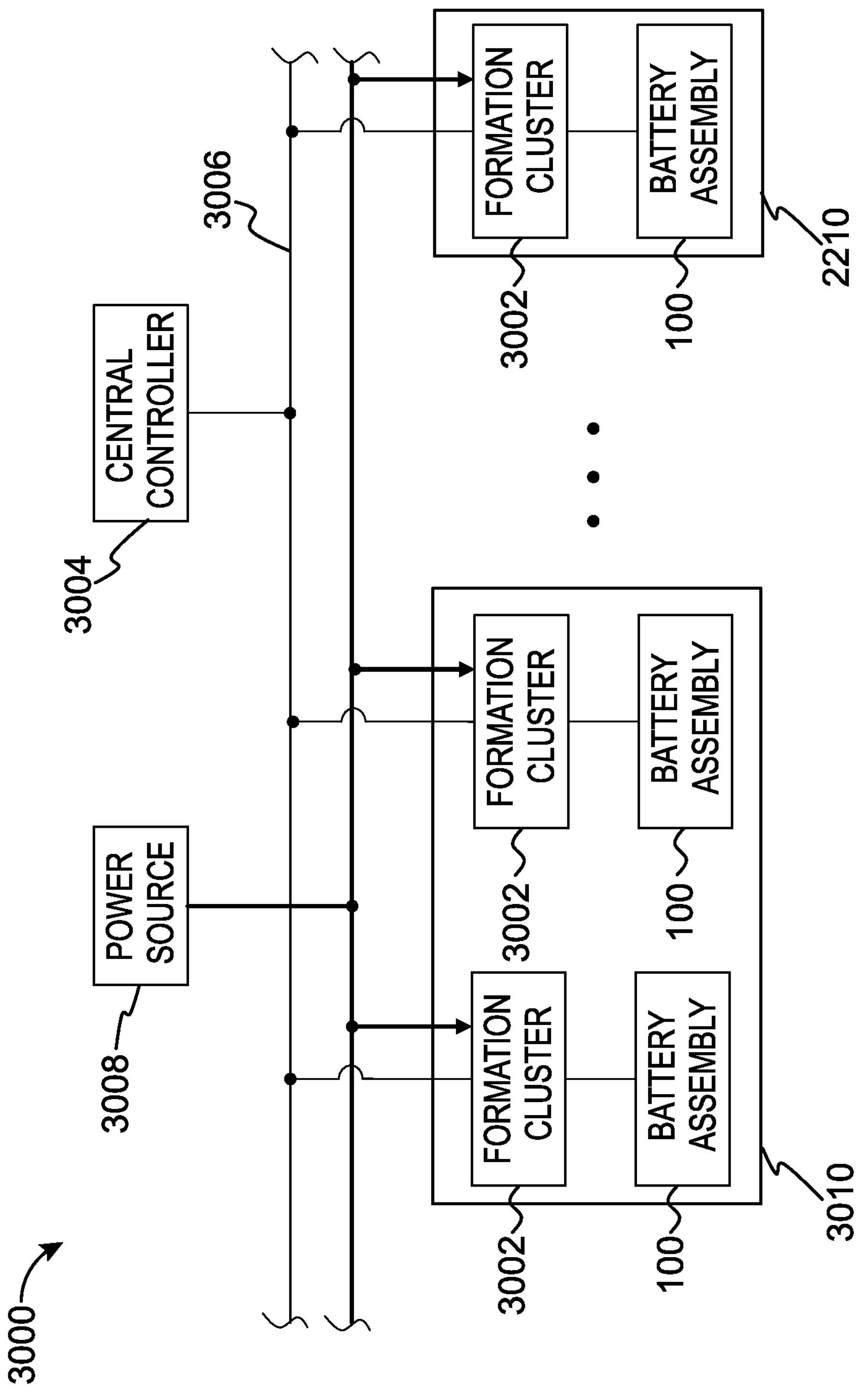
FIG. 30 is a block diagram of an example cell formation system for lithium containing secondary batteries.

FIG. 30 is a block diagram of an example cell formation system 3000 for lithium containing secondary batteries, such as the secondary battery 100. The cell formation system includes a population of formation clusters 3002 and a central controller 3004. Each formation cluster 3002 is connected to a secondary battery 100 and performs the formation process for the secondary battery 100 to which it is connected.

The formation clusters 3002 are communicatively coupled to the central controller 3004 by a network 3006. The network 3006 may be a wired or a wireless network of any type suitable for communication between the formation clusters 3002 and the central controller 3004. For example, the network 3006 may be an inter-integrated circuit (I2C) network, a controller area network (CAN), a local area network (LAN), a wide area network (WAN), or the like. Although shown connected to the same network 3006 in FIG. 30, the formation clusters 3002 and the central controller 3004 may be connected to different networks, or a combination of the same and different networks. For example, some of the formation clusters 3002 may be connected to a first LAN, some of the formation clusters may be connected to a second LAN, and the first and second LAN may be connected to the central controller 3004 through a WAN connected to both the first LAN and the second LAN.

Each formation cluster 3002 is connected to a power source 3008, such as an electrical grid, a generator, a photovoltaic system, a battery, or the like. The formation clusters 3002 use electrical power from the power source 3008 to power the formation cluster and to perform the formation process. Although illustrated connected to the same power source 3008 in FIG. 30, the formation clusters 3002 in the cell formation system 3000 may be connected to different power sources.

Groups of formation clusters 3002 are supported by a housing 3010. The housing 3010 may be an enclosure, such as a cabinet, or an open support, such as a rack. Although two formation clusters 3002 are shown in one housing 3010, and a single formation cluster 3002 is shown in another housing for simplicity, in practice each housing 3010 will typically support a larger number of formation clusters, such as 10, 25, 50, 100, 250, or a 1000 formation clusters. Notably, the central controller 3004 is separate from (and may be remotely located from) the housings 3010 and their formation clusters 3002. Moreover, the housings 3010 may be located in different locations from each other, so long as they are located somewhere with access to the power source 3008 and the network 3006. Further, each housing 3010 may support a different number of formation clusters 3002.

Figure 31:
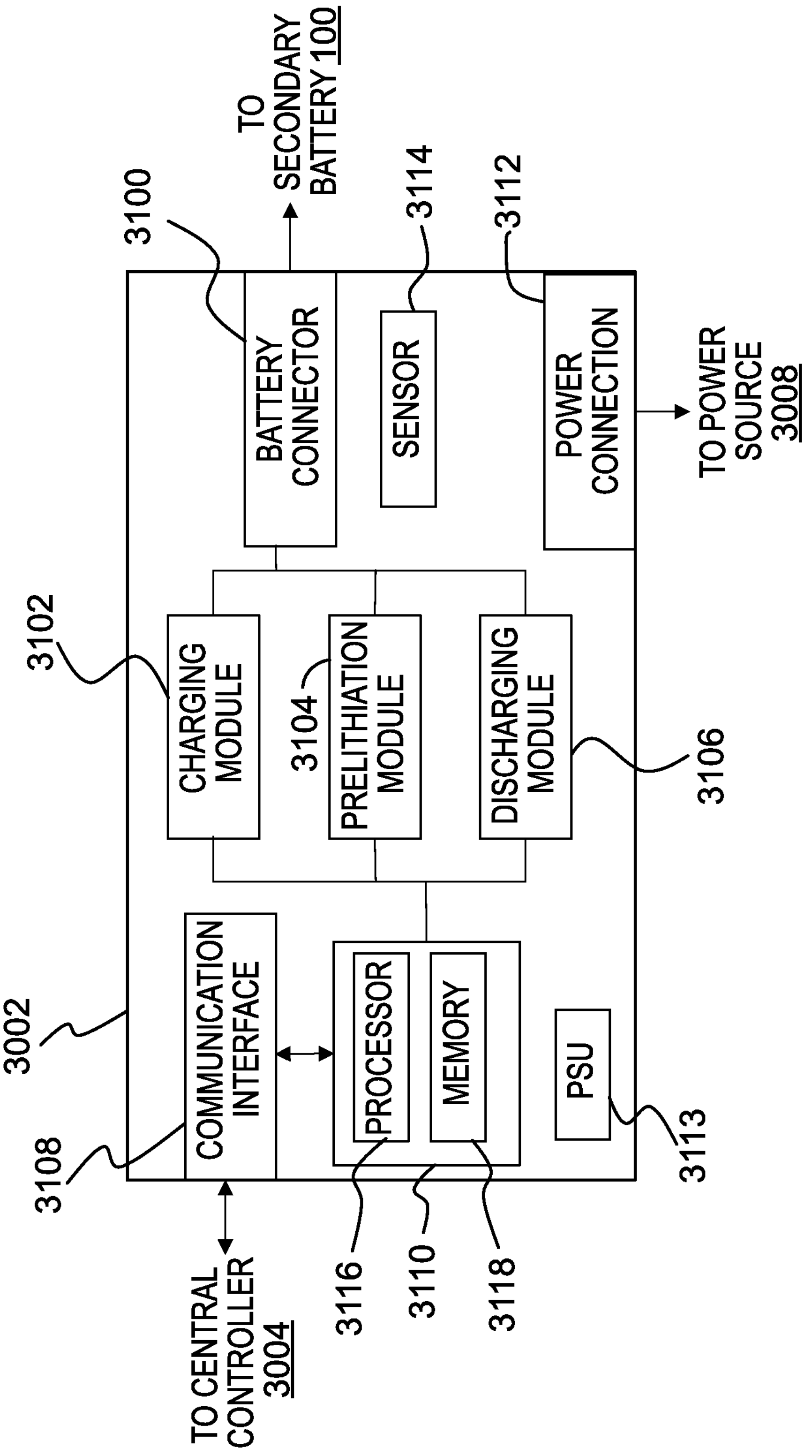
FIG. 31 is a block diagram of an example formation cluster for use in the cell formation system of FIG. 30.

FIG. 31 is a block diagram of an example formation cluster 3002. The formation cluster 3002 includes a battery connector 3100, a charging module 3102, a pre-lithiation module 3104 (sometimes also referred to as a buffer module), a discharging module 3106, a communication interface 3108, a formation cluster controller 3110, a power connection 3112, a power supply unit (PSU) 3113, and a sensor 3114.

The battery connector 3100 connects the formation cluster 3002 to the secondary battery 100. The battery connector 3100 may be any connector suitable for connection to the secondary battery 100, including a connector configured to mate with a similar connector on the battery, a clamping connector (such as an alligator clip), a wire soldered or welded to the battery and the formation cluster 3002, and the like. The battery connector 3100 is configured to connect to the anode and the cathode of the secondary battery 100. In some embodiments, the battery connector 3100 also electrically connects the formation cluster 3002 to the auxiliary electrode 502. In other embodiments, the formation cluster 3002 includes a separate connector, referred to as a pre-lithiation connector, that electrically connects the formation cluster 3002 to the auxiliary electrode 502. In some embodiments, the formation cluster 3002 includes more than one battery connector 3100, with each battery connector connected to a separate one of the modules of the formation cluster (e.g., the charging module 3102, the pre-lithiation module 3104, and the discharging module 3106).

The charging module 3102 is connected to the battery connector 3100 and is configured to charge the secondary battery 100 connected to the battery connector 3100. The pre-lithiation module 3104 is connected to the battery connector 3100 and configured to diffuse lithium carrier ions to the electrode active material layers (e.g., the cathodically active material layers 106 and/or the anodically active material layers 104) of the secondary battery 100. The discharging module 3106 is connected to the battery connector 3100 and is configured to discharge the secondary battery 100.

The communication interface 3108 connects the formation cluster 3002 to the central controller 3004. The communication interface 3108 may be any wired or wireless communications interface that permits the controller 3110 to communicate with the central controller 3004 directly or via a network. Wireless communication interfaces 3108 may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces 3108 may use any suitable wired communication protocol for direct communication including, without limitation, USB, RS232, I2C, SPI, analog, and proprietary I/O protocols. In some embodiments, the wired communication interface 3108 includes a wired network adapter allowing the controller 3110 to be coupled to a network, such as the Internet, a local area network (LAN), a wide area network (WAN), a mesh network, and/or any other network to communicate with remote devices and systems via the network.

The formation cluster controller 3110 controls the operation of the formation cluster 3002 to operate as described herein. The formation cluster controller 3110 includes a processor 3116 and a memory 3118. The processor 3116 is any programmable system including a microcontroller, microcomputer, microprocessor, reduced instruction set circuit (RISC), application specific integrated circuit (ASIC), programmable logic circuit (PLC), and any other circuit or processor capable of executing the functions described herein. The memory 3118 stores computer-readable instructions executable by the processor 3116 for control of the formation cluster 3002 as described herein. The memory 3118 may be any suitable type of memory including, but not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). In some embodiments, the processor 3116 and the memory 3118 are both embodied in a microcontroller, while in other embodiments the processor 3116 and the memory 3118 are separate components.

In the example embodiment, the formation cluster controller 3110 is programmed (by instruction stored in the memory 3118) to directly control each of the modules 3102, 3104, and 3106. That is, the formation cluster controller 3110 is programmed to control the charging module to charge the secondary battery 100, to control the pre-lithiation module 3104 to pre-lithiate (also referred to as buffering) the secondary battery 100, and to control the discharging module 3106 to discharge the secondary battery 100. The formation cluster controller 3110 is also programmed to control the overall formation process, such as when to use each of the modules 3102, 3104, and 3106.

In other embodiments one or more of the modules 3102, 3104, and 3106 includes its own module controller (having a processor and memory). In such embodiments, the formation cluster controller 3110 controls the overall formation process, but the module controllers control the specific tasks of their modules. For example, the formation cluster controller 3110 may instruct the charging module 3102 to charge the secondary battery 100, and the module controller in the charging module will then control the charging module to charge the secondary battery 100 according to instructions stored in the memory of the charging module's module controller.

In further embodiments, the formation cluster 3002 does not include the formation cluster controller 3110. Rather, each of the modules 3102, 3104, and 3106 includes its own module controller. In such embodiments, the central controller 3004 controls the overall formation process and sends instructions to the module controllers through the communication interface 3108. In such embodiments, the multiple module controllers in the formation cluster 3002 may be considered as a distributed formation cluster controller 3110.

Various levels of interaction and control may be performed by the central controller 3004 and the formation cluster controller 3110 in different embodiments. For example, in some embodiments, the central controller 3004 merely sends instructions to the formation cluster 3002 to begin the formation process. Then, in response to the instructions, the formation cluster controller 3110 controls the modules 3102, 3104, 3106 to perform the formation process. Alternatively, in response to the instructions, the formation cluster controller 3110, may instruct the modules 3102, 3104, 3106 to perform their respective functions at the appropriate times. In other embodiments, the central controller 3004 sends instructions to the formation clusters 3002 to perform an individual portion of the formation process (e.g., "charge the battery now"), and the formation cluster controller 3110 or the module controllers perform the task commanded by the central controller. In some embodiments, the central controller 3004 may send instructions to the formation clusters 3002 for how to perform one or more of the formation tasks, including sending control algorithms. In some embodiments, the formation cluster controller 3110 or the module controller may store instructions for multiple ways of performing the same task (e.g., a fast charge, a slow charge, a charge with a rest period, and the like), and the central controller's instructions may instruct the formation cluster 3002 which method to use.

In some embodiments, the central controller 3004 may program or update the programming of the formation cluster controller 3110 or the module controllers. For example, the central controller 3004 may send control algorithms to the formation cluster 3002, and the formation cluster controller 3110 and/or the module controllers may store the control algorithms in their respective memories. In other embodiments, the central controller may send a modification of a control algorithm already stored in the formation cluster, such as a change to a variable, a change in timing, or the like. The formation cluster controller 3110 or the controller modules then store the modification in memory for use in the formation process.

The formation cluster controller 3110 also transmits information back to the central controller 3004 in some embodiments. The information sent to the central controller 3004 may include confirmation that instructions were received, confirmation that a commanded process has begun, status of the operations being performed, data collected from the sensor 3114, or any other suitable information.

The power connection 3112 connects the formation cluster 3002 to the power source 3008. The power connection 3112 may be any connector suitable for connection to the power source 3008, including a plug configured for insertion into a mating socket of the power source, a wire soldered or welded to the power source, a clamping connector for clamping onto a terminal or wire of the power source, or the like. The PSU 3113 converts and/or distributes power from the power source to the rest of the formation cluster 3002 for use in the formation process. The PSU 3113 may be an AC/DC power converter, a DC/DC power converter, an inverter, or any other unit for suitable for converting and/or distributing power to the formation cluster. Some embodiments do not include a PSU, and utilize power from the power source 3008 directly.

The sensor 3114 is any sensor capable of monitoring a variable of interest to the formation process. For example, the sensor 3114 may be a voltage sensor for monitoring the voltage of the secondary battery 100, an ambient temperature sensor for monitoring the temperature around the formation cluster 3002, a temperature sensor for monitoring the temperature of the battery assembly or a component of the formation cluster, a current sensor for monitoring current flowing into, out of, or through the battery assembly, etc. Some embodiments include more than one sensor 3114, including combinations of the sensors described above. Moreover, some sensors 3114 may perform more than one of the above-described monitoring tasks.

The modular and distributed nature of the cell formation system 3000 allows for the system to be easily expanded or contracted as desired. Unlike traditional centralized systems that are configured for formation of a set number of batteries at one time, the system 3000 may be expanded to any number of batteries simply by adding more formation clusters 3002 (including increasing the number of batteries by as few as one additional battery). With a traditional centralized system, increases to the number of batteries to be formed would require acquisition of an additional system and an increase by some set number of batteries (determined by the size and configuration of the centralized system acquired). Further, centralized systems typically require running significant additional wiring for each additional battery in order to provide controlled power and communication to the additional batteries. In contrast, the cell formation system 3000 merely requires connecting additional formation clusters 3002 to a power source and an already existing communication network. The formation clusters 3002 in the system 3000 need not all be the same, so long as the central controller 3004 knows the configuration of each formation cluster 3002. Moreover, the formation clusters 3002 in the system 3000 may be used to form different batteries, either at different times or at the same time, so long as the central controller 3004 or the formation cluster controller 3110 knows what secondary battery 100 is connected to the formation cluster 3002.

Figure 32:
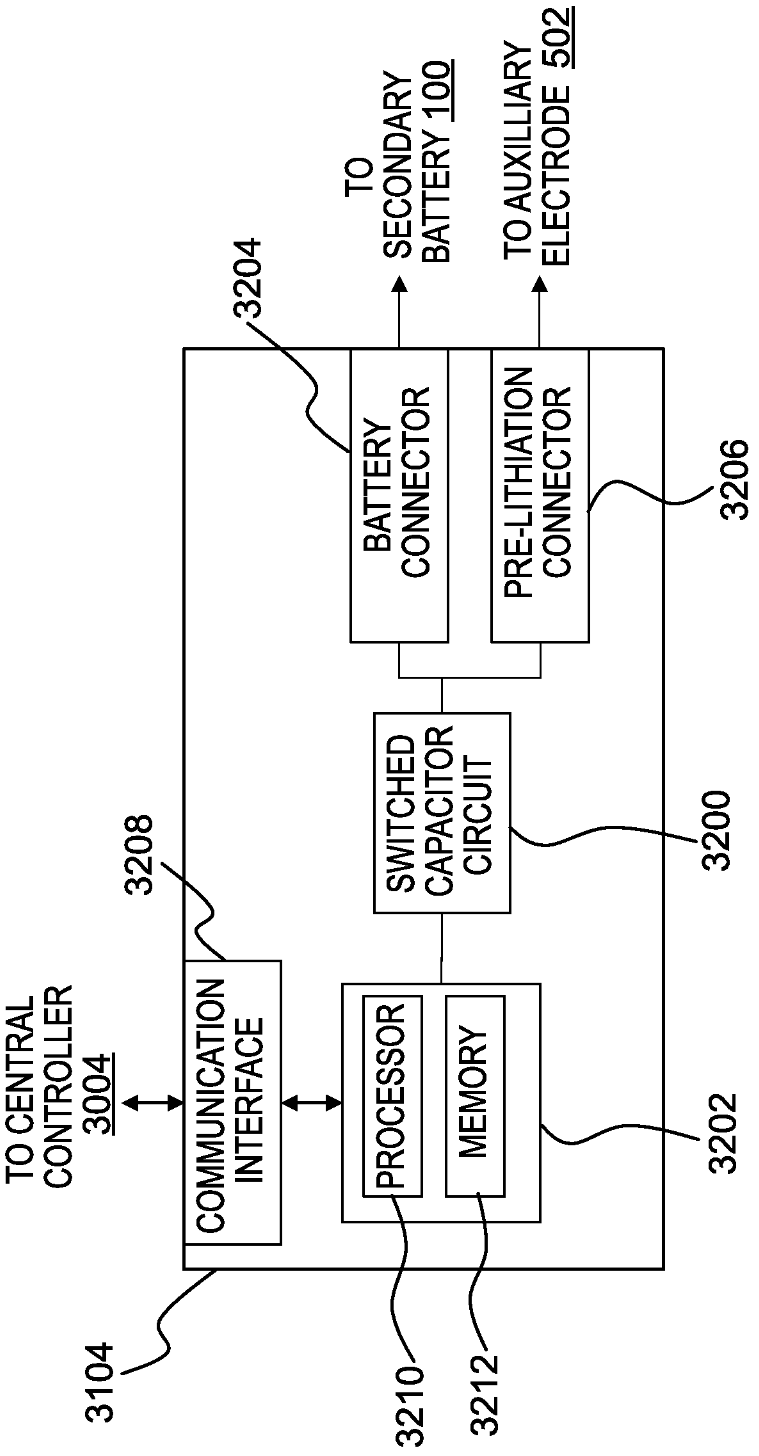
FIG. 32 is a block diagram of an example pre-lithiation module for use in the formation cluster of FIG. 31.

FIG. 32 is a block diagram of an example pre-lithiation module 3104 for use in the cell formation clusters 3002. As described above, the pre-lithiation module 3104 is configured to diffuse lithium to the electrode active material layers (e.g., the cathodically active material layers 106 and/or the anodically active material layers 104) of the secondary battery 100. The pre-lithiation module 3104 includes a switched capacitor circuit 3200, a pre-lithiation module controller 3202, a battery connector 3204, a pre-lithiation connector 3206, and a communication interface 3208.

The switched capacitor circuit 3200 is a switched resistor-capacitor network. The switched capacitor circuit 3200 will be described in more detail below with reference to FIG. 33. Generally, in a first stage, a current is allowed to flow through the circuit 3200 to charge a capacitor network, and the energy stored in the capacitor network is then discharged across a discharge resistor and released as heat in a second stage. In the pre-lithiation module 3104, the current allowed to flow to charge the capacitor network is a current between the auxiliary electrode 502 and one of the electrodes of the secondary battery 100 to diffuse lithium from the auxiliary electrode 502 to the electrode active material layers of the secondary battery 100.

The pre-lithiation module controller 3202 controls operation of the pre-lithiation module 3104 to pre-lithiate the secondary battery 100 by selectively conducting current through the auxiliary electrode 502 to diffuse lithium to the electrode active material layers of the secondary battery 100. The pre-lithiation module controller 3202 includes a processor 3210 and a memory 3212. The memory 3212 stores instructions that, when executed by the processor 3210 cause the processor to perform the pre-lithiation as described herein. The processor 3210 is any programmable system including a microcontroller, microcomputer, microprocessor, reduced instruction set circuit (RISC), application specific integrated circuit (ASIC), programmable logic circuit (PLC), and any other circuit or processor capable of executing the functions described herein. The memory 3212 may be any suitable type of memory, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). In some embodiments, the processor 3210 and the memory 3212 are both embodied in a microcontroller, while in other embodiments the processor and the memory are separate components.

The battery connector 3204 connects the pre-lithiation module 3104 to the secondary battery 100. The battery connector 3204 may be the battery connector 3100 or may be a separate battery connector connected only to the pre-lithiation module 3104. The battery connector 3204 may be any connector suitable for connection to the secondary battery 100, including a connector configured to mate with a similar connector on the battery, a clamping connector (such as an alligator clip), a wire soldered or welded to the battery and the pre-lithiation module 3104, and the like. The battery connector 3204 is configured to connect to the anode and the cathode of the secondary battery 100.

The pre-lithiation connector 3206 connects the pre-lithiation module 3104 to the auxiliary electrode 502 of the secondary battery 100. The pre-lithiation connector 3204 may be any connector suitable for connection to the secondary battery 100, including a connector configured to mate with a similar connector on the battery, a clamping connector (such as an alligator clip), a wire soldered or welded to the battery and the pre-lithiation module 3104, and the like. In some embodiments, the pre-lithiation connector 3206 is part of the battery connector 3100.

The communication interface 3208 connects the pre-lithiation module 3104 to the central controller 3004. The communication interface 3208 may be the communication interface 3108 or may be a separate communication interface. The communication interface 3208 may allow the pre-lithiation module 3104 to communicate directly with the central controller 3004, or it may allow the pre-lithiation module 3104 to communicate indirectly with the central controller, such as via the formation cluster controller 3110. The communication interface 3208 may be any wired or wireless communications interface that permits the controller 3202 to communicate with the central controller 3004 directly or via a network. Wireless communication interfaces 3208 may include a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces 3208 may use any suitable wired communication protocol for direct communication including, without limitation, USB, RS232, I2C, SPI, analog, and proprietary I/O protocols. In some embodiments, the wired communication interface 3108 includes a wired network adapter allowing the controller 3202 to be coupled to a network, such as the Internet, a local area network (LAN), a wide area network (WAN), a mesh network, and/or any other network to communicate with remote devices and systems via the network.

Figure 33:
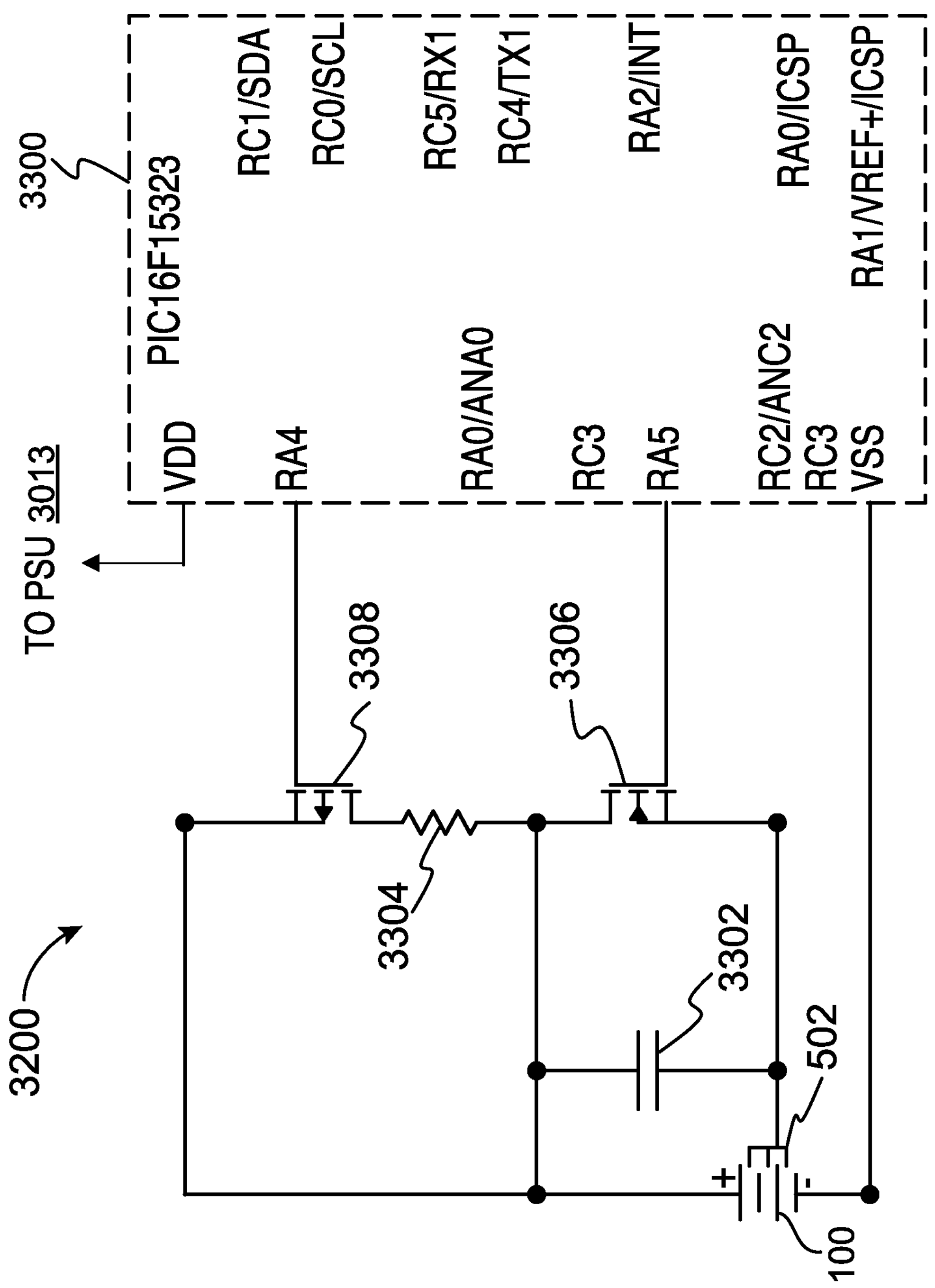
FIG. 33 is a simplified circuit diagram of an example embodiment of a switched capacitor circuit for use in the pre-lithiation module of FIG. 32.

FIG. 33 is a simplified circuit diagram of an example embodiment of the switched capacitor circuit 3200 connected to the secondary battery 100. The switched capacitor circuit 3200 includes a microcontroller 3300, a storage capacitor 3302, a discharge resistor 3304, a first switch 3306, and a second switch 3308.

The microcontroller 3300 controls the switched capacitor circuit 3200 according to a control algorithm stored in its memory. In the example embodiment, the microcontroller 3300 is also the pre-lithiation module controller 3202. In other embodiments, the pre-lithiation module controller 3202 is separate from the microcontroller 3300. In the example embodiment, the microcontroller is a PIC 16F15323 microcontroller from Microchip Technology Inc. of Chandler, Arizona, USA. In other embodiments, any other suitable microcontroller may be used. In this embodiment, the microcontroller 3300 is powered by the power source 3008 through the PSU 3113.

The microcontroller 3300 controls pre-lithiation of the secondary battery 100 by selectively conducting current through the auxiliary electrode 502 by controlling the first switch 3306 and the second switch 3308. The first switch 3306 is an N-channel enhancement mode metal-oxide-semiconductor field-effect transistor (MOSFET), and the second switch 3308 is a P-Channel enhancement mode MOSFET. Other embodiments may use any other suitable switches. By closing the first switch 3306 and opening the second switch 3308, the microcontroller 3300 creates a first current path from the cathode busbar 112 of the secondary battery 100 to the auxiliary electrode through the first switch 3306. The first current path includes the storage capacitor 3302. When current flows through the first current path, lithium is diffused from the auxiliary electrode 502 to the electrode active material layers of the secondary battery 100 and energy is stored in the storage capacitor 3302. Next, the microcontroller 3300 closes the second switch 3308 and opens the first switch 3306 to establish a second current path. The second current path includes the storage capacitor 3302, the discharge resistor 3304, and the second switch 3308. As current flows through the second current path, the energy stored in the capacitor 3302 is discharged across the discharge resistor 3304 and released as heat.

In the example embodiment, lithium is transferred from the auxiliary electrode 502 to the electrode active material layers of the positive electrodes of the secondary battery 100. In other embodiments, the diffusion is to the electrode active material layers of the negative electrodes of the secondary battery 100, by connecting the switched capacitor circuit 3200 such that the first current loop includes the anodic busbar 110 instead of the cathodic busbar 112. In still other embodiments, the switched capacitor circuit 3200 may be duplicated, such that there are two first current loops, one including the anodic busbar 110 and the other including the cathodic busbar 112. Such embodiments allow a single pre-lithiation module 3104 to transfer lithium from the auxiliary electrode 502 to the active material layers of the positive and negative electrodes of the secondary battery 100 without needing to stop the formation process to reconfigure the connections to the secondary battery 100 and the auxiliary electrode 502, and without needing to use two separate pre-lithiation modules 3104.

Pre-lithiation of the secondary battery 100 using the switched capacitor circuit 3200 generally pulls charge from the secondary battery 100 one small packet at a time at a high rate. Thus, the average current is equivalent to the frequency of the packet charge/discharge times the packet size in coulombs as shown by:

$$i = C\frac{dv}{dt} \rightarrow I = C \cdot \Delta V \cdot F \rightarrow I = QF \tag{1}$$

The total charge transferred is the sum of all charge packets, given by:

$$\sum_{n=0}^{N} Q_n = Q_{total} \quad (2)$$

To control the switched capacitor circuit 3200, the microcontroller 3300 uses pulse frequency modulation (PFM) control signals to the first switch 3306 and the second switch 3308. PFM is described by pulses having a fixed width (i.e., each pulse being on for a fixed length of time) with the time between pulses being variable. The time between the pulses is varied to yield a different frequency for charge movement. The faster that packets are moved (i.e., the higher the frequency of the fixed width pulses) the higher the current conducted through the auxiliary electrode 502. Conversely, the lower the frequency of the pulses (i.e., the longer the time between the pulses), the lower the current conducted through the auxiliary electrode 502. The upper limit of the current conducted through the auxiliary electrode 502 is determined by the settling time of the RC circuit elements of the switched capacitor circuit 3200. Thus, by varying the frequency of the control pulses to the switches 3306 and 3308, the microcontroller 3300 may control the current flowing through the auxiliary electrode 502. In other embodiments, the microcontroller 3300 uses pulse width modulation (PWM) control signals to the first switch 3306 and the second switch 3308. In PWM control, the pulses occur with a fixed frequency, but the length of each pulse may be varied to control the amount of charge moved to control the amount of current.

Figure 34A:
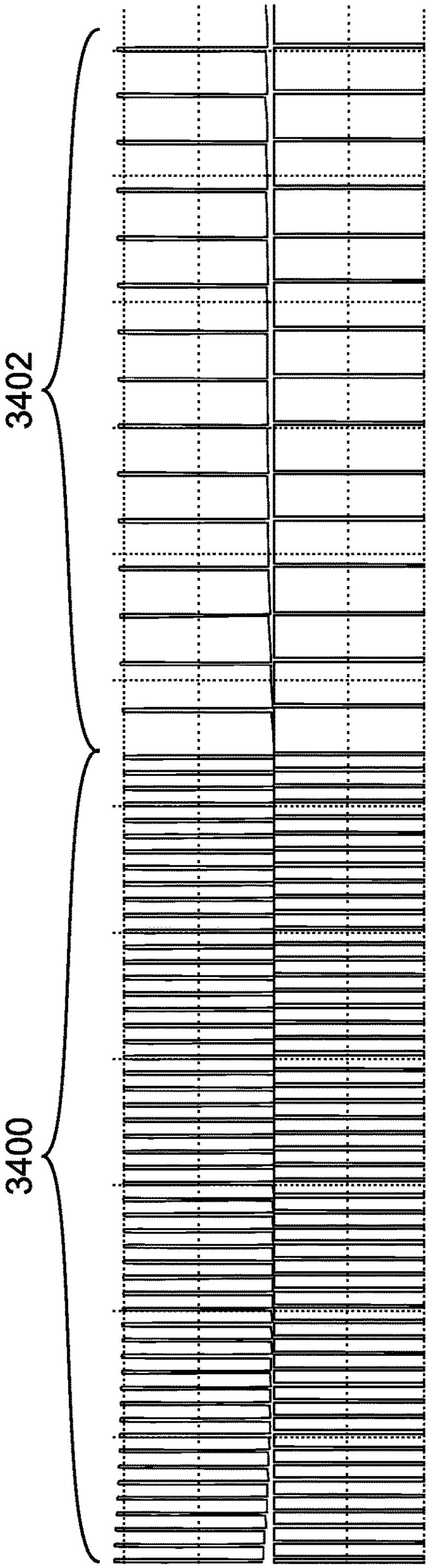
FIG. 34A is a graph of a series of PFM control pulses applied to the switches of the switched capacitor circuit of FIG. 33 as a function of time.
Figure 34B:
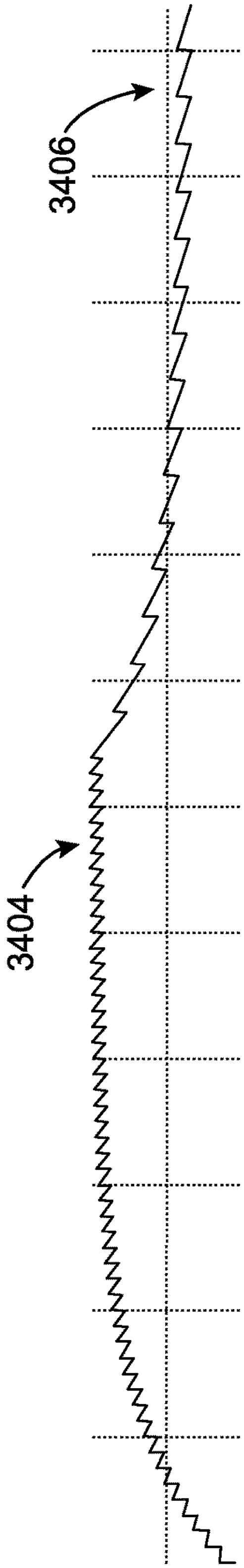
FIG. 34B is a graph of the resulting current through the auxiliary electrode in response to the control pulses of FIG. 34A as a function of time.

FIG. 34A is a graph of a series of PFM control pulses applied to the switches 3306 and 3308 as a function of time. As shown, in the first portion 3400 of the series, the fixed width pulses are applied at a higher frequency than in the second portion 3402 of the series of pulses. FIG. 34B is a graph of the resulting current through the auxiliary electrode 502 in response to the control pulses shown in FIG. 34A as a function of time. The current increases in a sawtooth pattern to a first maximum current 3404 during the first portion 3400. When the frequency of the pulses is reduced in the second portion 3402, the current through the auxiliary electrode 502 decreases to a second maximum current 3406 lower than the first maximum current 3404.

Figure 35:
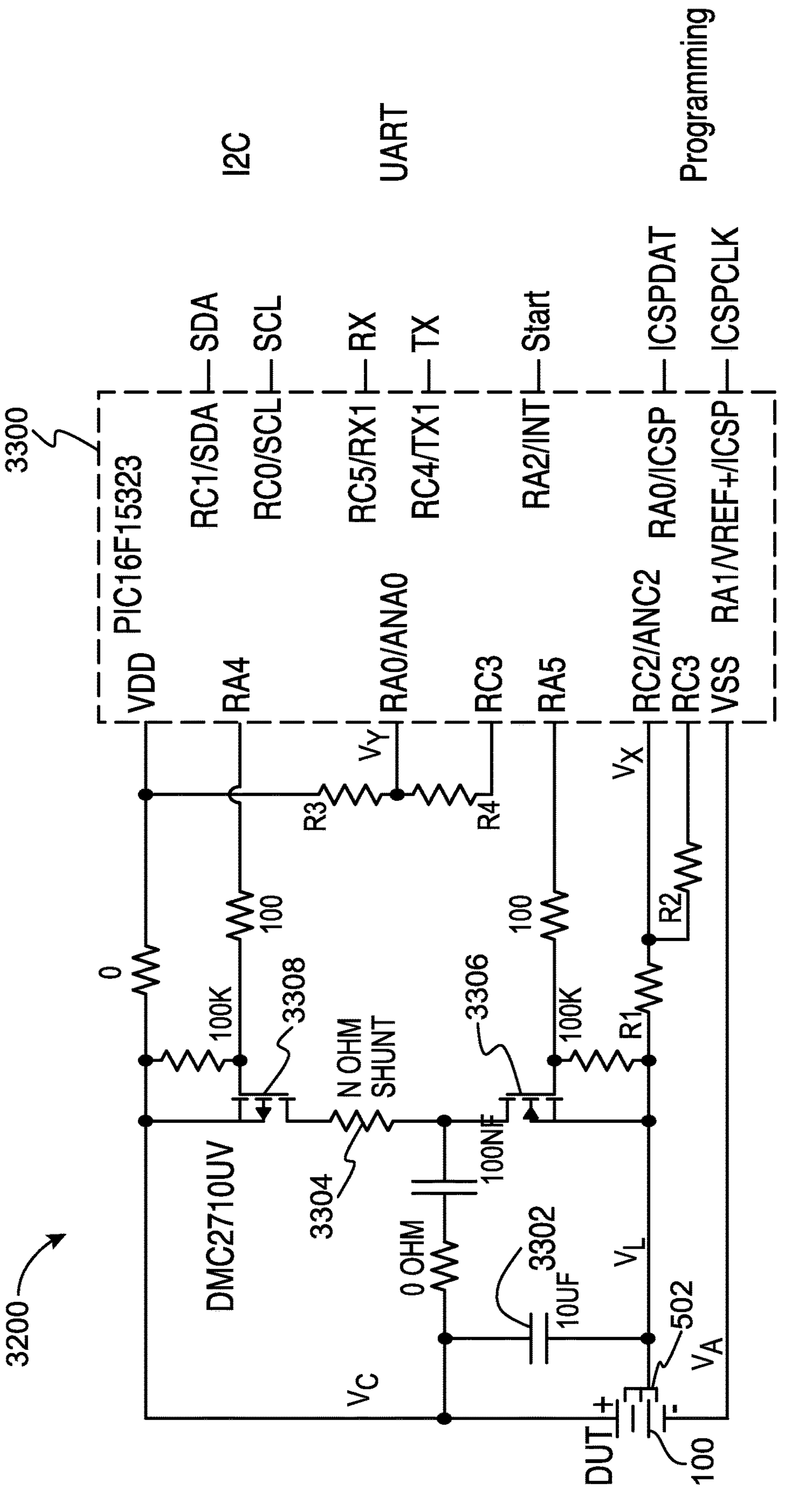
FIG. 35 is a circuit diagram of an example implementation of a switched capacitor circuit for use in the pre-lithiation module of FIG. 32.

FIG. 35 is a circuit diagram of an example implementation of the switched capacitor circuit 3200 connected to the secondary battery 100. Similar components share reference numbers with their corresponding components in FIG. 33. In this embodiment, the microcontroller 3300 is powered by the secondary battery 100, rather than the PSU 3113. The microcontroller 3300 presents a small leak on the secondary battery 100 generally in the range of 50 nA to 100 nA in most situations except when active.

During the pre-lithiation process, the microcontroller 3300 monitors the voltage of the cathode of the secondary battery 100 and the voltage $V_L$ at the auxiliary electrode 502. To measure the cathode voltage $V_c$, pin RC3 of the microcontroller 3300 is driven low to the anode of the secondary battery 100, which is considered the reference point in this circuit. This creates a voltage divider, and the voltage $V_y$ is read at pin RA0 of the microcontroller 3300. The cathode voltage $V_c$ is then calculated by the microcontroller 3300 as:

$$v_y \frac{R_3 + R_4}{R_4} = v_C \quad (3)$$

Measuring voltage $V_L$ at the auxiliary electrode node is a little more problematic because the node may be negative relative to the anode, which is the negative reference for the microcontroller 3300. Therefore, pin RC3 of the microcontroller 3300 is tied high to the cathode and the voltage divider in this situation pulls the voltage higher, ideally higher than the anode reference. The voltages $V_y$ and $V_x$ are read by the pins RA0 and RC2, respectively. The voltage $V_L$ at the auxiliary electrode node is then calculated as:

$$v_x \frac{R_1 + R_2}{R_1} - v_y \frac{R_2}{R_1} \frac{R_3 + R_4}{R_4} = v_L \quad (4)$$

If the resistors R1-R4 all have the same resistance, this leads to the significantly simplified relationships $$2v_y = v_C \quad (5)$$

and $$2v_x - 2v_y = v_L. \quad (6)$$

When not measuring, pin RC3 is kept HiZ (floating) and there is no current flow through the resistor divider.

When measuring the voltages, the microcontroller 3300 may use filtering to enhance measurement stability. For example, the microcontroller 3300 may use decimation, non-linear IIR filtering, or some combination of such signal processing to enhance measurement stability. The filtering may improve resolution and reduce noise before the data is consumed by management functionality of the microcontroller 3300. This provides relatively clean decision making regardless of any external factory noise that might otherwise affect the measurements. Because pre-lithiation is a relatively slow process (frequently requiring tens of hours), fairly significant signal processing may be employed without much concern for time.

Figure 36A:
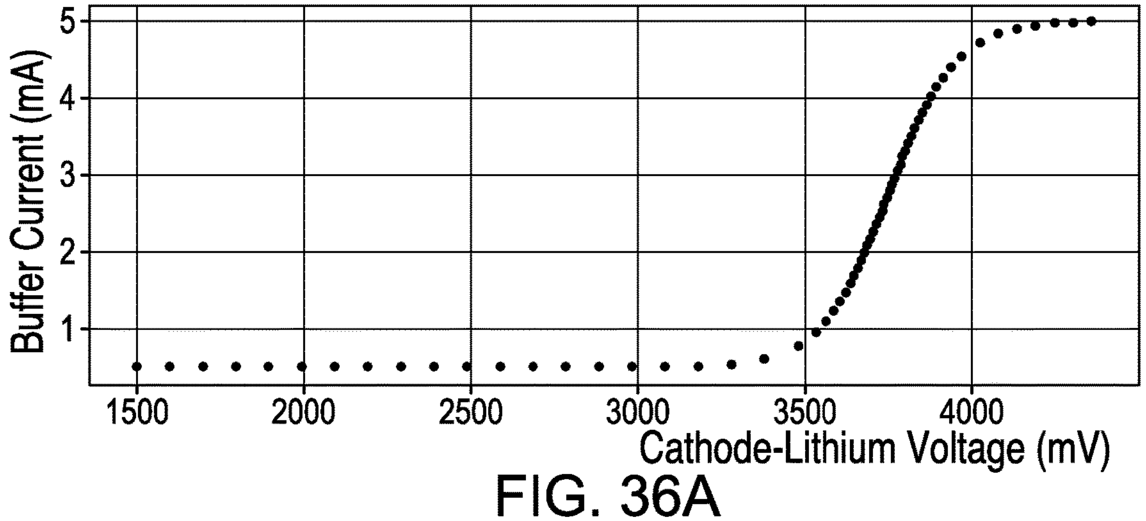
FIG. 36A is a graph of the buffer current for use as part of an example pre-lithiation profile.
Figure 36B:
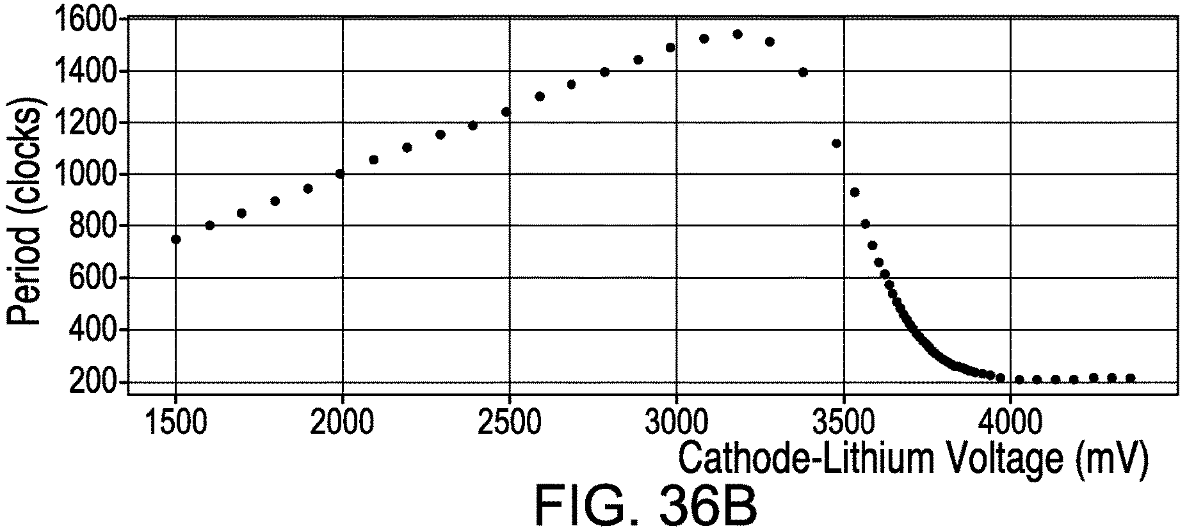
FIG. 36B is a graph of the period for pulses for the example pre-lithiation profile.
Figure 36C:
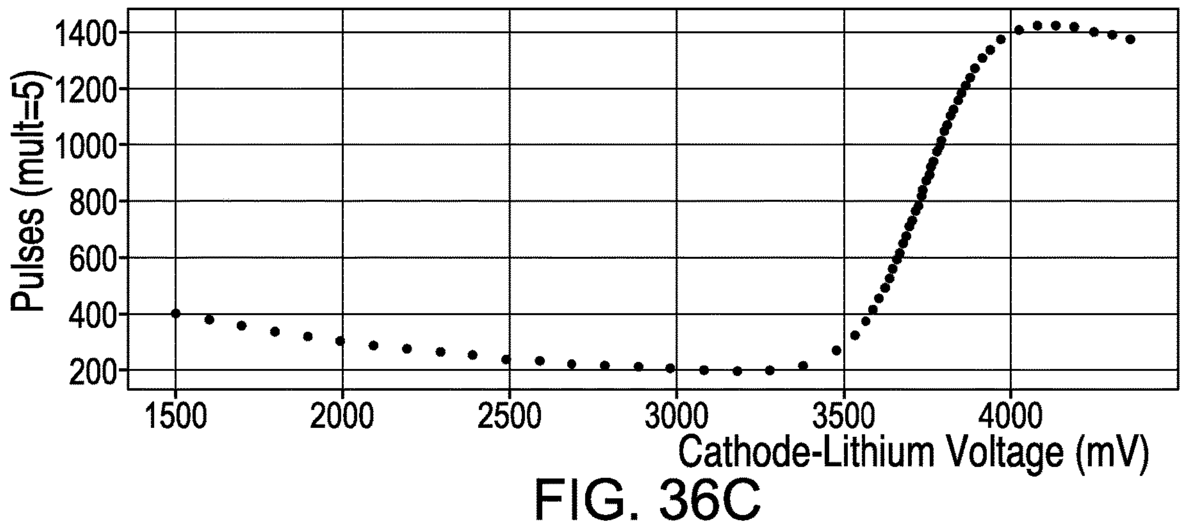
FIG. 36C is a graph of the number of pulses for the example pre-lithiation profile.

FIGS. 36A-36C are graphs of an example pre-lithiation profile for use by the microcontroller 3300 to perform pre-lithiation of the secondary battery 100. FIG. 36A graphs the buffer current (i.e., the current through the auxiliary electrode 502) as a function of the voltage difference between the cathode of the secondary battery 100 and the auxiliary electrode 502 in millivolts (mV). FIG. 36B graphs the period for the pulses as a function of the voltage difference between the cathode of the secondary battery 100 and the auxiliary electrode 502 in mV. FIG. 36C graphs the number of pulses as a function of the voltage difference between the cathode of the secondary battery 100 and the auxiliary electrode 502 in mV. Of course, different profiles may be used for secondary batteries 100 having different capacities and/or different top of charge voltages.

Figure 37A:
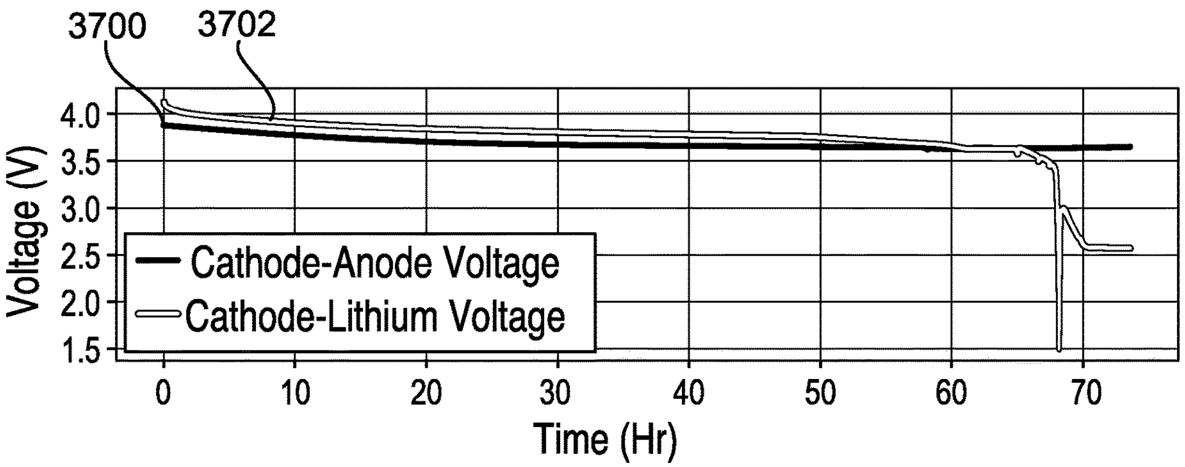
FIG. 37A is a graph of the cathode to anode voltage and the cathode to auxiliary electrode voltage as a function of time when pre-lithiating using the pre-lithiation profile of FIGS. 36A-36C.
Figure 37B:
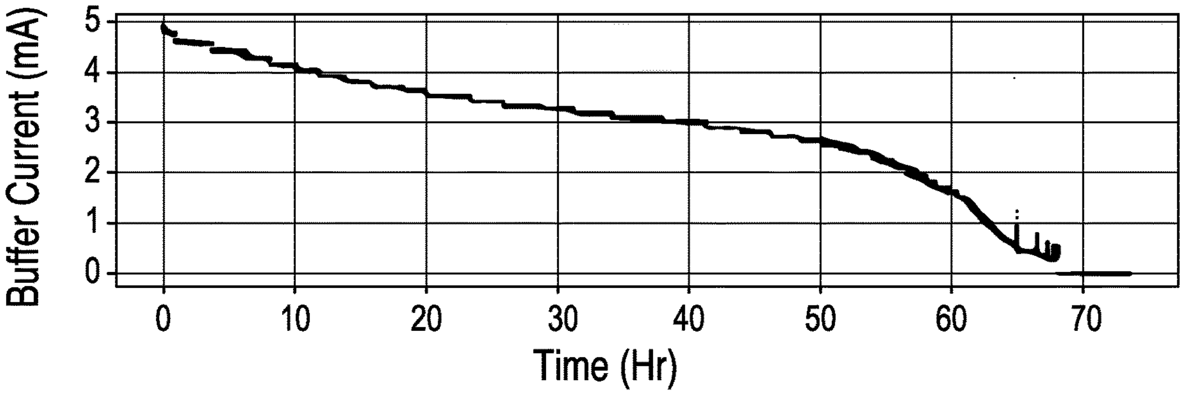
FIG. 37B is a graph of the buffer current as a function of time when pre-lithiating using the pre-lithiation profile of FIGS. 36A-36C.

The pre-lithiation profile shown in FIGS. 36A-36C was used with the implementation of the switched capacitor circuit 3200 shown in FIG. 33 to pre-lithiate a secondary battery 100. The results of the process are shown in FIGS. 37A and 37B. FIG. 37A is a graph of the cathode to anode voltage 3700 and the cathode to auxiliary electrode voltage 3702 as a function of time. FIG. 37B is a graph of the buffer current as a function of time.

Embodiments of the present disclosure utilize auxiliary electrodes to transfer or buffer carrier ions to a secondary battery during or subsequent to, initial formation of the secondary battery. Transferring carrier ions to the secondary battery (also referred to as pre-lithiating or buffering) mitigates carrier ion losses during formation due to, for example, SEI, thereby providing a technical benefit of improving the capacity of the secondary battery. Further, transferring carrier ions to the secondary battery provides the negative electrode of the secondary battery additional carrier ions beyond the coulombic capacity of the positive electrode of the secondary battery, thereby providing a reservoir of addition carrier ions over the cycle life of the secondary battery, further mitigating carrier ion loss during cycling due to side reactions which remove the carrier ions from availability during cycling. The result of the additional carrier ions at the negative electrode provides a further technical benefit of reducing the amount of capacity loss in the secondary battery from one discharge-charge cycle to the next, thereby improving the overall capacity of the secondary battery during its cycle life.

In some examples, during a formation and/or pre-lithiation process of a secondary battery such as described herein, gas or other vapors may be generated and/or otherwise form within an enclosure (e.g., enclosure 504 (FIG. 6) and/or the first enclosure layer 510 and the second enclosure layer 511 (FIG. 6)) of the secondary battery. For example, gas bubbles may form between an auxiliary electrode (e.g., auxiliary electrode 502 (FIG. 6)) and another portion (e.g., a unit cell 200 (FIG. 2)) of the secondary battery. Presence of the gas may prevent or otherwise inhibit uniform anode pre-lithiation in the secondary battery.

Accordingly, the cell formation system of the present disclosure may include a compression fixture that applies compressive forces to the secondary battery during the formation and/or pre-lithiation process of the secondary battery, as described further herein. The compressive forces may help prevent gas formation or transport of gas to between the auxiliary electrode and other portions of the secondary battery. The compressive forces may also facilitate even lithium distribution (e.g., during the formation and/or pre-lithiation processes). The compressive forces may also help form better mechanical and/or electrical connections of the secondary battery, as the compressive forces hold the secondary battery firmly in place within a battery tray.

Figure 38:
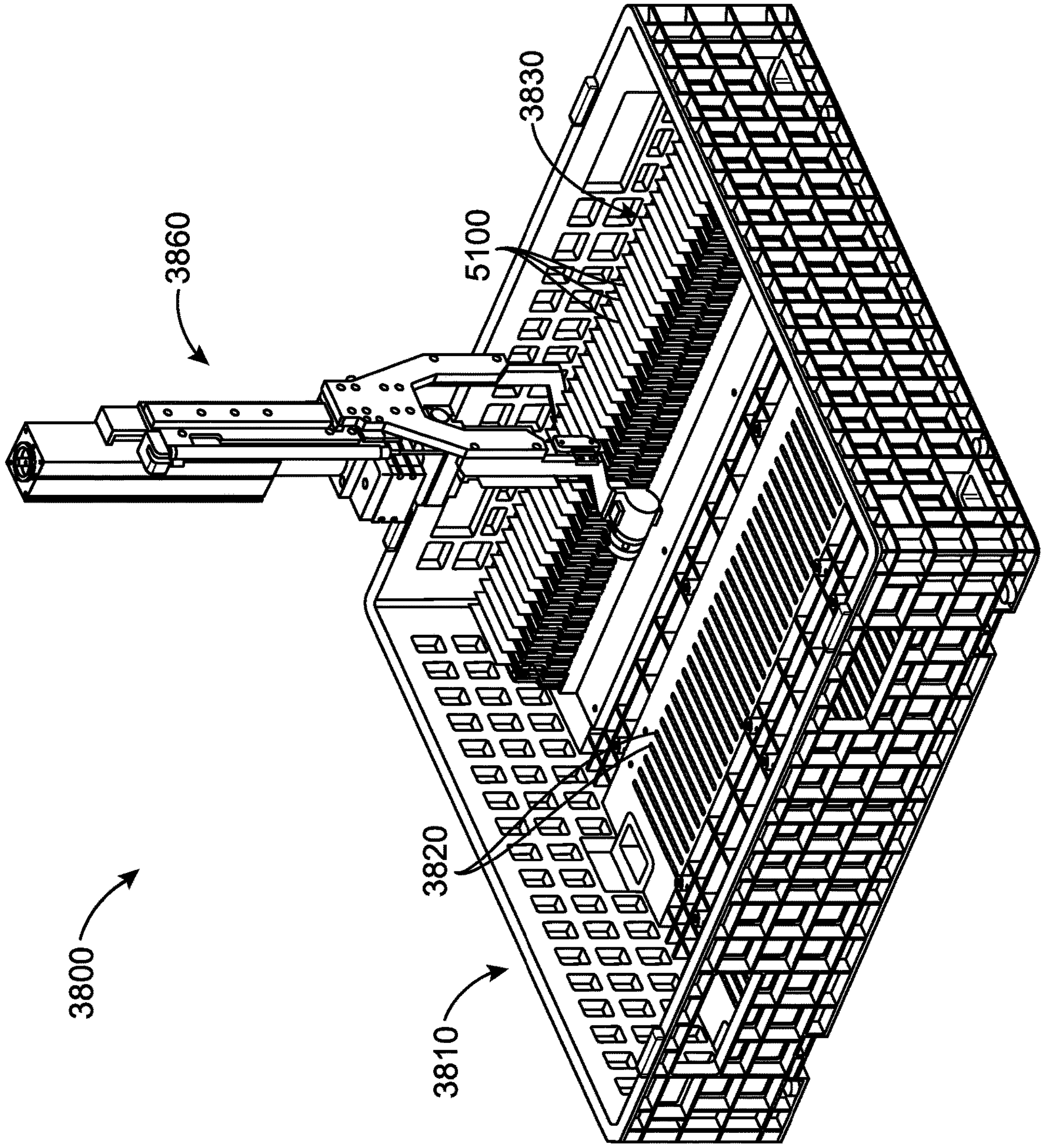
FIG. 38 is a perspective view of a cell formation system including a compression fixture according to one suitable embodiment of the present disclosure.

FIG. 38 is a perspective view of a portion of an example cell formation system 3800 according to one suitable embodiment of the present disclosure. The cell formation system 3800 includes various components and features that apply compressive forces to one or more secondary batteries during the formation and/or pre-lithiation process. The illustrated cell formation system 3800 includes a battery tray 3810, a compression fixture 3830 coupled to the battery tray 3810, and a loading mechanism 3860 operable to load and unload secondary batteries from the compression fixture 3830 and the battery tray 3810. In other embodiments, the cell formation system 3800 may include additional or fewer elements than those shown in FIG. 38. For example, the cell formation system 3800 may include elements of the cell formation systems 2200 and 3000 described above with reference to FIGS. 22 and 30, respectively. In some embodiments, for example, the cell formation system 3800 includes a formation base 2204, a loading station 2206, a charging station 2208, a formation station 2210, one or more formation clusters 3002, a central controller 3004, and/or a power source 3008.

The battery tray 3810 may have the same or substantially the same construction as the battery tray 2202 shown and described above with respect to FIGS. 22-29. For example, the battery tray 3810 may include a plurality of battery slots 3820, each configured (e.g., sized and shaped) to receive and retain a secondary battery (e.g., secondary battery 100) or a portion of a secondary battery therein. The battery slots 3820 may have the same or substantially the same construction as the battery slots 2212 shown and described with respect to FIGS. 22-29. The illustrated battery tray 3810 includes one hundred and twenty battery slots 3820 arranged in three rows of forty battery slots. Other embodiments may include more or fewer battery slots 3820 arranged in more or fewer rows.

In the example embodiment, each row of battery slots 3820 is configured to receive one of the compression fixtures 3830. In other words, the illustrated battery tray 3810 is configured to receive three compression fixtures 3830, one corresponding to each row of battery slots 3820 defined by the battery tray 3810. In other embodiments, a single compression fixture 3830 may extend across or span more than one row of battery slots 3820. In some embodiments, for example, a single compression fixture may span all three rows of battery slots of the battery tray 3810.

Figure 39:
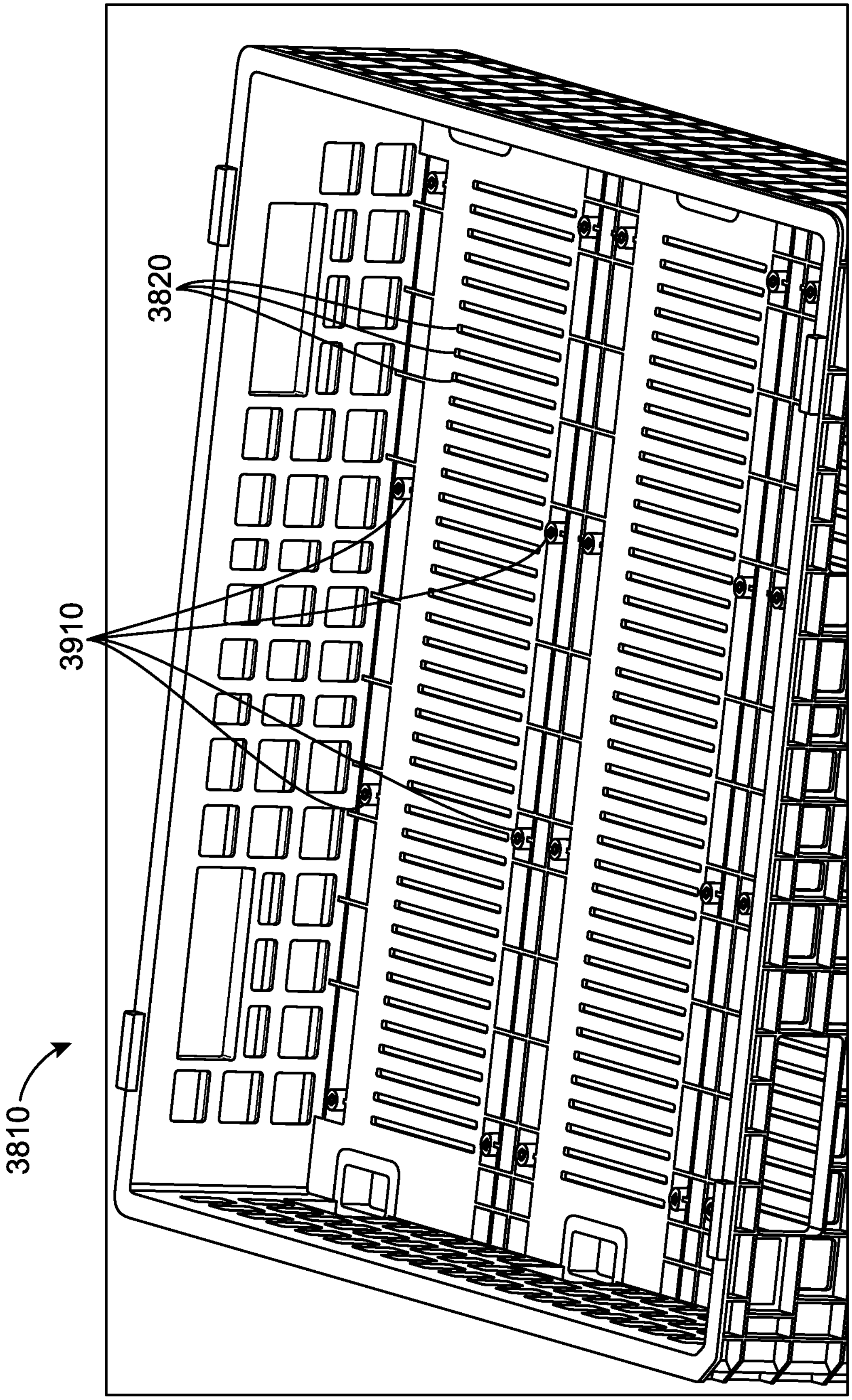
FIG. 39 is a perspective view of a battery tray of the cell formation system of FIG. 38.

With additional reference to FIG. 39, in this embodiment, the battery tray 3810 also includes one or more alignment features 3910 configured to cooperatively engage corresponding alignment features of the compression fixture 3830 (e.g., alignment features 4114, shown in FIG. 42) to facilitate aligning and coupling the compression fixture 3830 to the battery tray 3810. The alignment features 3910 are illustrated as raised posts or pins in the example embodiment, although the battery tray 3810 may include any other suitable alignment feature or features that enables the compression fixture 3830 to function as described herein. The example battery tray 3810 includes 24 alignment features, arranged in three sets of eight alignment features, where each set of alignment features corresponds to one of the rows of battery slots. Other embodiments may have any other suitable number of alignment features in any suitable arrangement.

Figure 40:
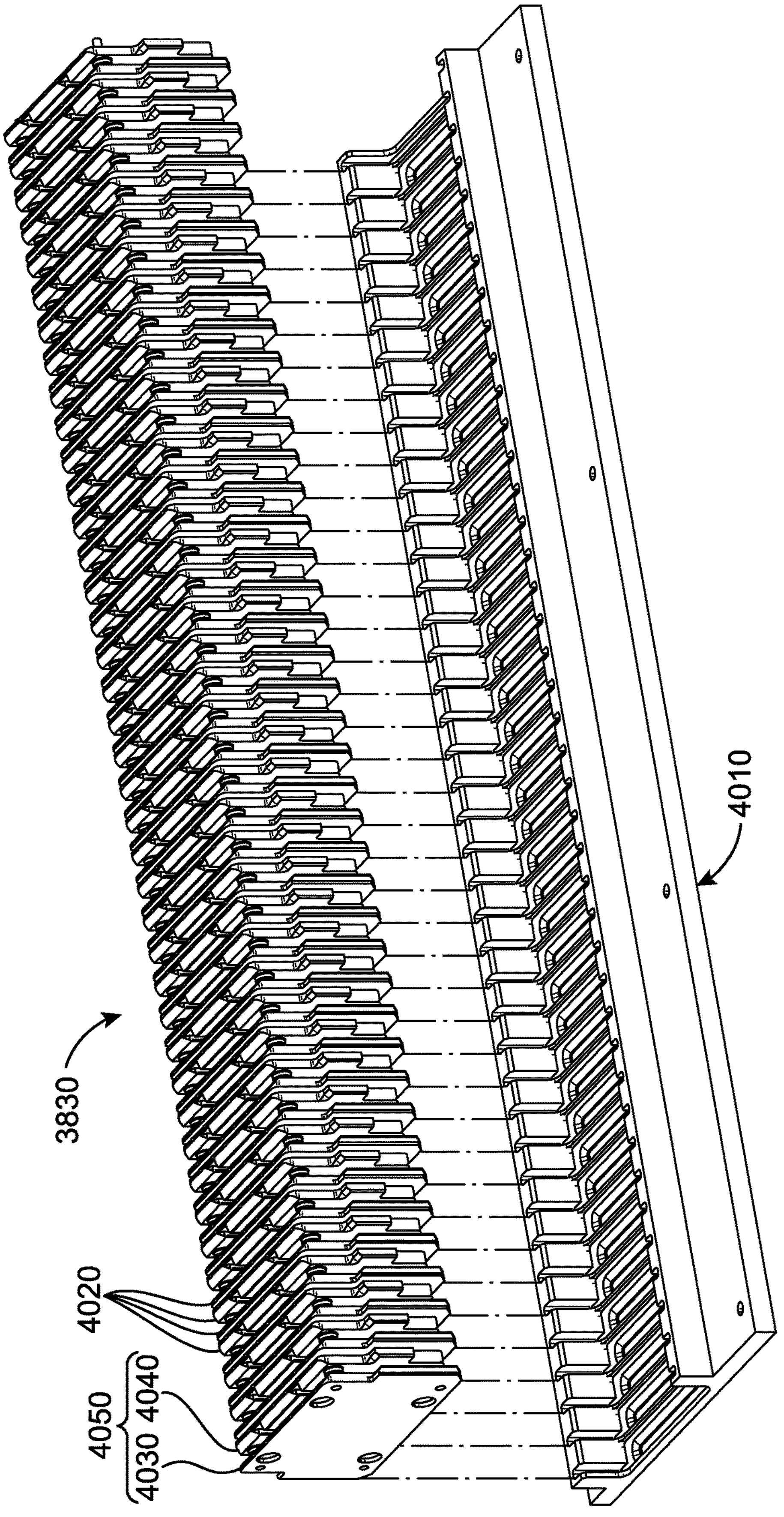
FIG. 40 is a partially exploded view of components of the compression fixture shown in FIG. 38.

With additional reference to FIG. 40, the compression fixture 3830 includes a base 4010 and a plurality of compression plates 4020 coupled to the base 4010. As described in greater detail herein, the plurality of compression plates 4020 includes a plurality of fixed compression plates 4030 and a plurality of moveable compression plates 4040, arranged in an alternating configuration (i.e., the compression plates 4020 alternate between fixed compression plates 4030 and moveable compression plates 4040). The compression plates 4020 are operable to apply compressive forces to secondary batteries (e.g., secondary batteries 100) loaded in the compression fixture 3830 during cell formation and/or the pre-lithiation process, as described further herein.

Figure 41:
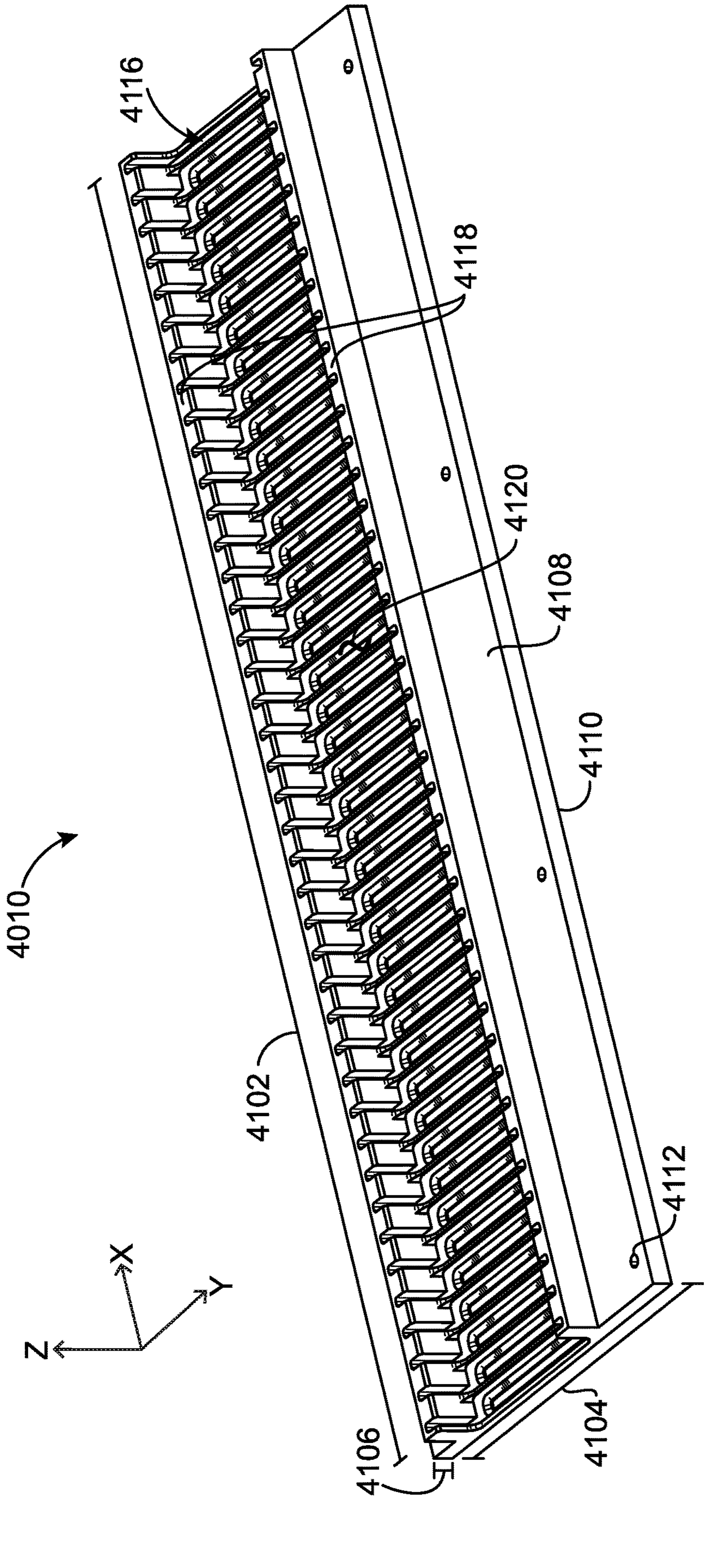
FIG. 41 is a top perspective view of a base of the compression fixture shown in FIG. 38.
Figure 42:
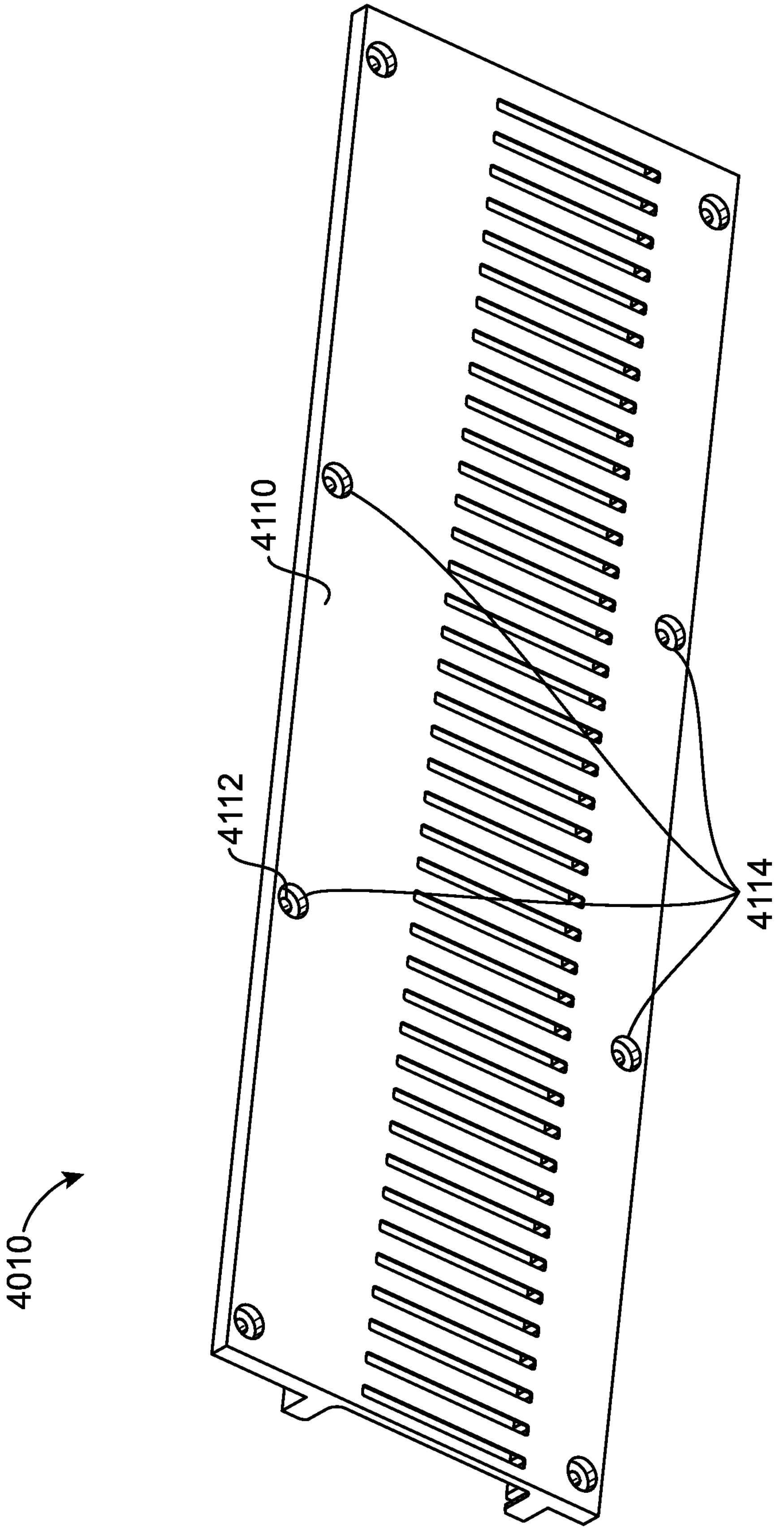
FIG. 42 is a bottom perspective view of the compression fixture base shown in FIG. 41.

FIG. 41 is a top perspective view of the compression fixture base 4010, and FIG. 42 is a bottom perspective view of the compression fixture base 4010. The base 4010 is sized and shaped to be received within the battery tray 3810, and to be coupled thereto. As shown in FIG. 41, the base 4010 extends a length 4102 in a longitudinal direction x, a width 4104 in a transverse direction y, and a height 4106 in a vertical direction z. The base 4010 may have any suitable length 4102, width 4104, and height 4106 that enables the compression fixture 3830 to function as described herein. The height 4106 extends between a first or top planar surface 4108 and an opposing second or bottom planar surface 4110.

The base 4010 may be permanently (i.e., non-removably) or removably coupled to the battery tray 3810. In the example embodiment, the base 4010 is removably coupleable to the battery tray 3810 via fasteners (e.g., screws, bolts, pins, etc., not shown) inserted through fastener openings 4112 defined in the base 4010. Other embodiments of the base 4010 may be removably coupled to the battery tray 3810 using any suitable coupling means that enables the compression fixture 3830 to function as described herein.

The base 4010 also includes a plurality of complementary alignment features 4114 configured to cooperatively engage corresponding alignment features of the battery tray 3810 (e.g., alignment features 3910, shown in FIG. 39) to facilitate aligning and coupling the compression fixture 3830 to the battery tray 3810. The alignment features 4114 are illustrated as counterbores in the example embodiment, although the base 4010 may include any other suitable alignment feature or features that enables the compression fixture 3830 to function as described herein. The example base 4010 includes eight alignment features 4114, or the same number of alignment features 4114 as the number of alignment features 3910 within one set of alignment features of the battery tray 3810.

The base 4010 also includes a compression plate retention section 4116 configured to receive and retain the compression plates 4020 therein. In the illustrated embodiment, the compression plate retention section 4116 includes a pair of rails 4118 extending vertically from the top surface 4108. Each rail 4118 extends longitudinally the entire length 4102 of the base 4010 in the illustrated embodiment, though in other embodiments the rails 4118 may extend longitudinally less than the entire length 4102 of the base 4010. The rails 4118 are spaced laterally apart from another to define a longitudinally-extending recess or channel 4120 therebetween.

Figure 43:
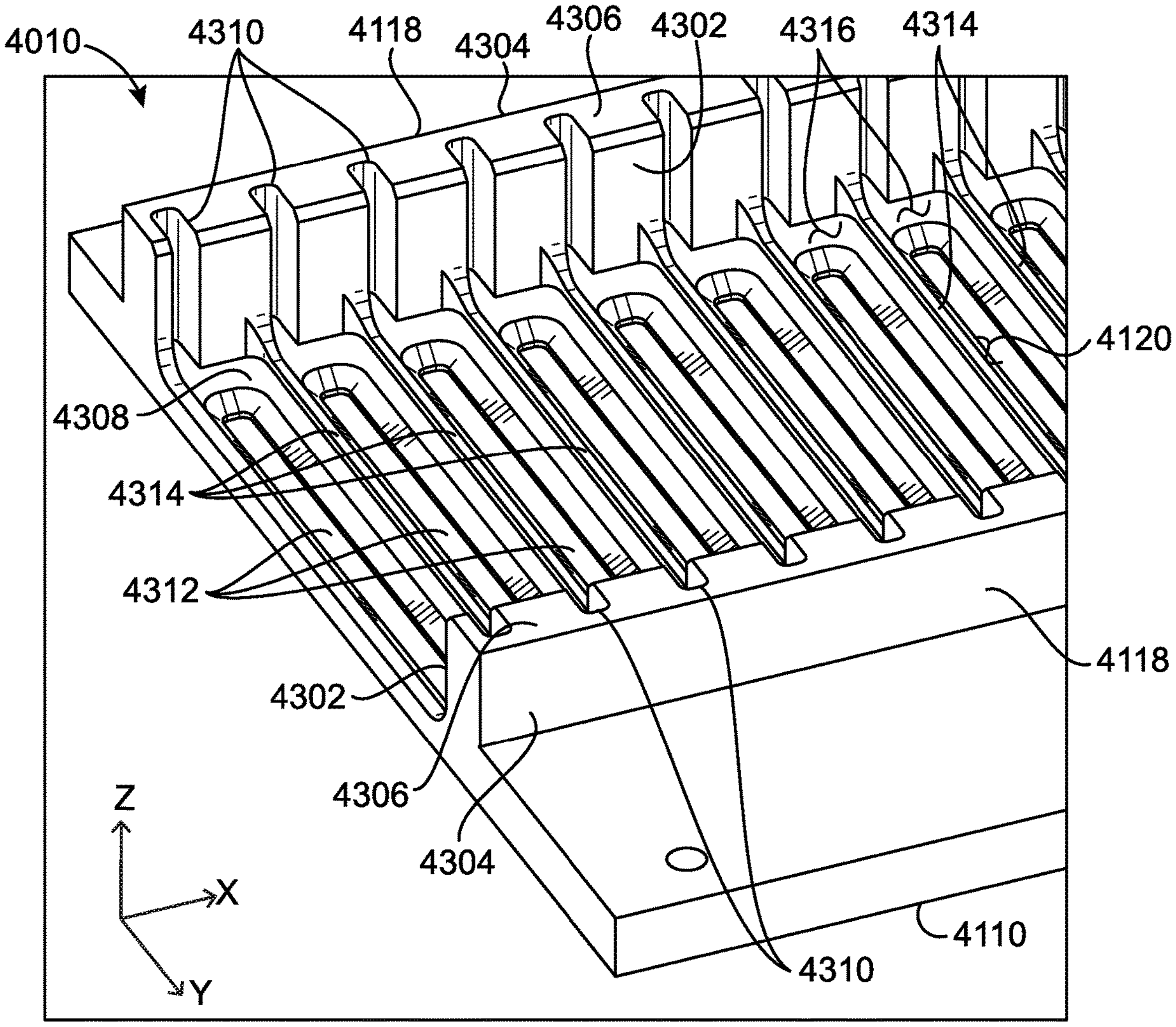
FIG. 43 is an enlarged perspective view of the compression fixture base shown in FIG. 41.

With additional reference to FIG. 43, each rail 4118 extends vertically from the top surface 4108 of the base 4010, and includes a lateral inner surface 4302, a lateral outer surface 4304, and a top surface 4306 extending between the lateral inner surface 4302 and the lateral outer surface 4304. The top surface 4306 of each rail 4118 is substantially flat and smooth to facilitate movement (e.g., sliding) of the moveable compression plates 4040 along the top surfaces 4306 of the rails 4118. The channel 4120 is defined by the lateral inner surface 4302 of each rail 4118 and a recessed surface 4308 that extends between the rails 4118. The recessed surface 4308 is positioned opposite the bottom surface 4110 of the base 4010. In the example embodiment, the recessed surface 4308 is spaced from the bottom surface 4110 by a distance less than the height 4106 of the base 4010. In other words, a height or thickness of the base 4010 within the compression plate retention section 4116 is less than the height 4106 of the base 4010 measured between the top surface 4108 and the bottom surface 4110.

Each rail 4118 defines a plurality of compression plate channels 4310, each configured (e.g., sized, shaped, and positioned) to receive a portion of one of the fixed compression plates 4030 therein. In the illustrated embodiment, each compression plate channel 4310 extends laterally outward from the lateral inner surface 4302 of the rail 4118, and vertically through the rail 4118 from the top surface 4306 to the recessed surface 4308. The compression plate channels 4310 are defined in each rail 4118 such that each of the compression plate channels 4310 defined in one of the rails 4118 is laterally aligned with a corresponding compression plate channel 4310 defined in the other of the rails 4118.

Each compression plate channel 4310 receives at least a portion of a fixed compression plate 4030 when the fixed compression plate 4030 is coupled to the base 4010. For example, to couple the fixed compression plate 4030 to the base 4010, side edges of the fixed compression plate 4030 are inserted into a top portion of laterally-opposite compression plate channels 4310, and the fixed compression plate 4030 is moved toward (e.g., downward) the base 4010 (i.e., towards the recessed surface 4308) until the bottom edge of the fixed compression plate 4030 is flush or substantially flush with the recessed surface 4308. The configuration of the compression plate channels 4310 helps maintain the fixed compression plate 4030 in a fixed position relative to the moveable compression plate 4040.

The base 4010 also has a plurality of battery openings 4312 defined therein. The battery openings 4312 of the compression fixture 3830 are arranged or otherwise positioned within the base 4010 so as to align with the battery slots 3820 (FIG. 38) of the battery tray 3810 when the base 4010 is coupled to the battery tray 3810. Accordingly, electrical terminals of a secondary battery positioned within compression fixture 3830 may extend through one of the battery openings 4312 of the compression fixture 3830 and through one of the battery slots 3820 of the battery tray 3810. In the illustrated embodiment, each battery opening 4312 is defined in the base 4010 within the compression plate retention section 4116 (specifically, between the rails 4118), and extends through the base 4010 from the recessed surface 4308 to the bottom surface 4110. Each battery opening 4312 is elongate in the lateral direction y, and has a width (measured in the lateral direction y in the orientation shown in FIG. 43) sufficient to receive one or more terminals or conductive tabs therein (e.g., the first terminal 124, the second terminal 125, and/or the conductive tab 508-1).

In the illustrated embodiment, the base 4010 also includes a plurality of stops 4314, illustrated in the form of raised lips or rims, that extend laterally across the channel 4120 from one rail 4118 to the other rail 4118. Each stop 4314 extends vertically upward from the recessed surface 4308, and is spaced from an adjacent stop 4314 by a distance sufficient to receive one of the fixed compression plates 4030 and one of the moveable compression plates 4040 therebetween. Each stop 4314 is configured (e.g., sized, shaped, and positioned) to inhibit or prevent longitudinal movement of a moveable compression plate 4040 beyond a certain position (e.g., the second position of the moveable compression plates 4040), as described further herein. The plurality of stops 4314 segment or divide the compression plate retention section 4116 into a plurality of pockets 4316, each sized and shaped to receive one of the fixed compression plates 4030 and one of the moveable compression plates 4040 therein. Each pocket 4316 also includes a pair of the laterally-opposed compression plate channels 4310 defined by the rails 4118, and one of the battery openings 4312. In one example embodiment, the base 4010 includes forty pockets 4316 arranged in a single row. Other embodiments include more or fewer pockets 4316 arranged in one or more rows.

Referring again to FIG. 40, the compression plates 4020 are arranged in an alternating pattern that alternates between a fixed compression plate 4030 and a movable compression plate 4040. The illustrated compression fixture 3830 includes forty fixed compression plates 4030 and forty moveable compression plates 4040. Other embodiments may include more or fewer fixed compression plates 4030 and/or moveable compression plates 4040. Each of the compression plates 4020 may be made of any suitable material that is conducive to providing a compressive force on a secondary battery when the secondary battery is positioned between one of the moveable compression plates 4040 and a corresponding one of the fixed compression plates 4030. For example, each fixed compression plate 4030 and each moveable compression plate 4040 may be made of plastic, aluminum, or combinations thereof. In other embodiments, the fixed compression plates 4030 and/or the moveable compression plates 4040 may be made of other materials. In some embodiments, a surface (e.g., a planar surface) of each compression plate may be anodized or otherwise coated with a non-conductive material.

Figure 44:
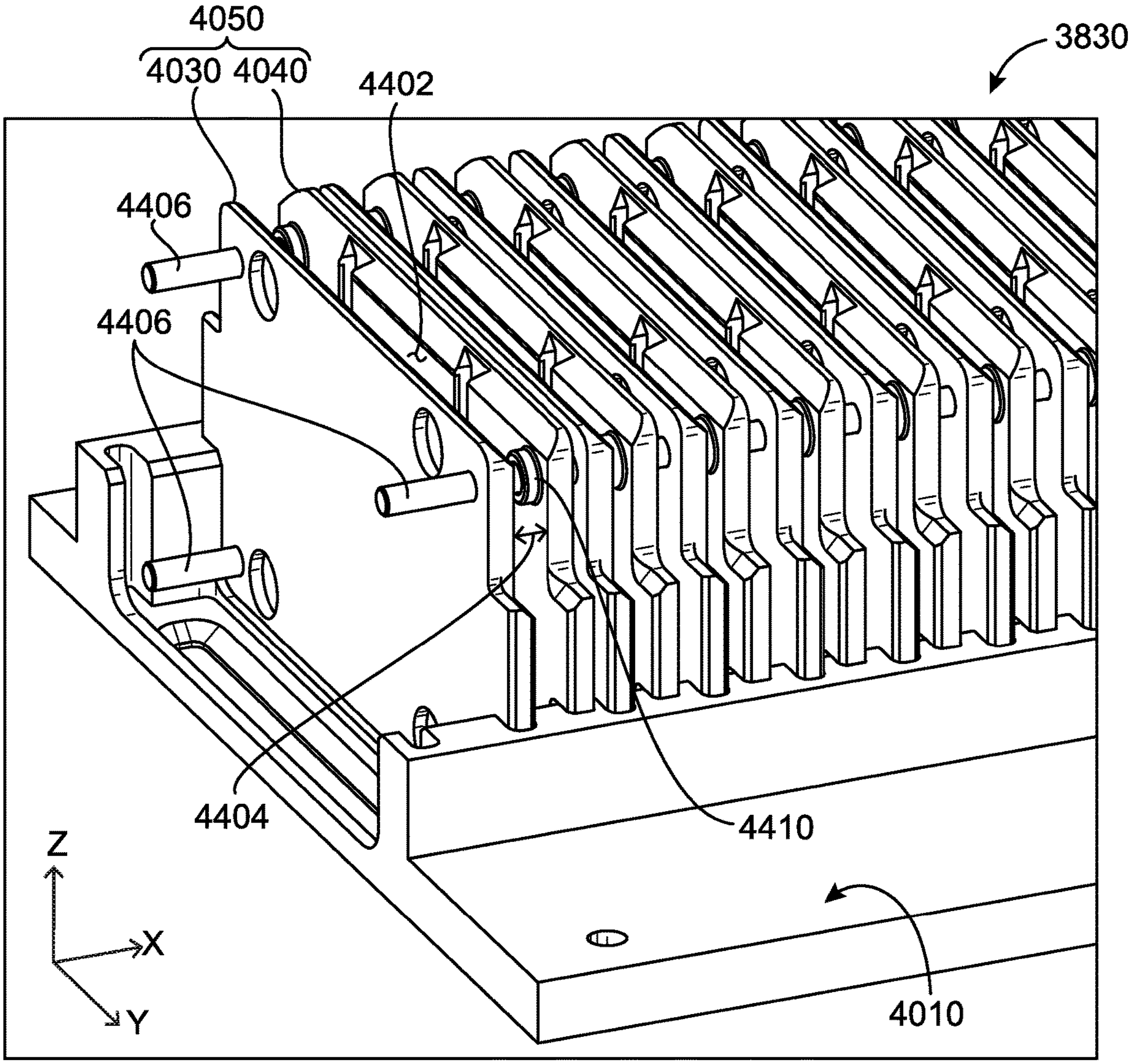
FIG. 44 is an enlarged perspective view of the compression fixture shown in FIG. 38.

The compression plates 4020 are coupled to the compression fixture base 4010 and are arranged in compression plate sets 4050, each including one of the fixed compression plates 4030 and a corresponding one of the moveable compression plates 4040. With additional reference to FIGS. 44-46, each fixed compression plate 4030 of a set 4050 is spaced apart from the corresponding moveable compression plate 4040 of the set 4050 to define a battery receptacle 4402 therebetween. Each moveable compression plate 4040 is moveable relative to the corresponding fixed compression plate 4030 such that a width 4404 of the battery receptacle 4402 may be increased (e.g., to insert a secondary battery into the battery receptacle 4402) or decreased (e.g., to apply compression to a secondary battery positioned within the battery receptacle 4402). More specifically, each moveable compression plate 4040 is moveable (e.g., linearly via a sliding motion) towards and away from a fixed compression plate 4030 between a first position (shown in FIG. 45) and a second position (shown in FIGS. 44 and 46). The moveable compression plate 4040 is positioned closer to the fixed compression plate 4030 in the first position as compared to the second position. When the moveable compression plate 4040 is in the second position, a secondary battery may be loaded into or removed from the battery receptacle 4402 (e.g., using the loading mechanism 3860).

The example compression fixture 3830 also includes one or more alignment rods 4406 to facilitate maintaining an orientation of the fixed compression plates 4030 and moveable compression plates 4040 (e.g., in a parallel orientation to one another). Each alignment rod 4406 extends at least partially along the length of the compression fixture 3830 (i.e., in the longitudinal direction x), and is oriented parallel to each of the other alignment rods 4406. Each fixed compression plate 4030 and moveable compression plate 4040 is coupled to the alignment rods 4406 to facilitate maintaining an orientation and alignment of each fixed compression plate 4030 and each moveable compression plate 4040. For example, each of the fixed compression plates 4030 and each of the moveable compression plates 4040 may include through-holes (described in greater detail herein) through which the alignment rods 4406 extend. In this way, the fixed compression plates 4030 and moveable compression plates 4040 are prevented or inhibited from rotating (e.g., about the x-, y-, or z-axes), and are maintained in a parallel orientation to one another. The moveable compression plates 4040 are operable to move or slide along the alignment rods 4406 (e.g., in the longitudinal direction x) to move between the first position and the second position. The alignment rods 4406 may be constructed of and/or coated with a low-friction material that is conducive to enabling the sliding motion or other movement of the moveable compression plates 4040 along the alignment rods 4406. Suitable low-friction materials include, for example and without limitation, plastics, thermoplastics, polyester, nylon, acetal, polytetrafluoroethylene (PTFE), polyimide, polyetheretherketone (PEEK), and polyphenylene sulfide (PPS).

The compression fixture 3830 may include any suitable number of alignment rods 4406 that enables the compression fixture 3830 to function as described herein. The compression fixture 3830 of the illustrated embodiment includes four alignment rods 4406 (three shown in FIG. 44), each positioned adjacent to respective corners of the fixed compression plates 4030 and moveable compression plates 4040. For example, in the illustrated embodiment, a first alignment rod 4406 extends through a first through-hole located at or near top-right corner of each compression plate 4020, a second alignment rod 4406 extends through a second through-hole located at or near a top-left corner of each compression plate 4020, a third alignment rod 4406 extends through a third through-hole located at or near a bottom-right corner of each compression plate 4020, and a fourth alignment rod 4406 extends through a fourth through-hole located at or near a bottom-left corner of each compression plate 4020. Other embodiments may include more than or less than four alignment rods 4406. Moreover, other embodiments may include other alignment features in addition to or alternatively to alignment rods 4406. For example, the compression fixture 3830 may include one or more alignment wires in place of or in addition to alignment rods.

Figure 45:
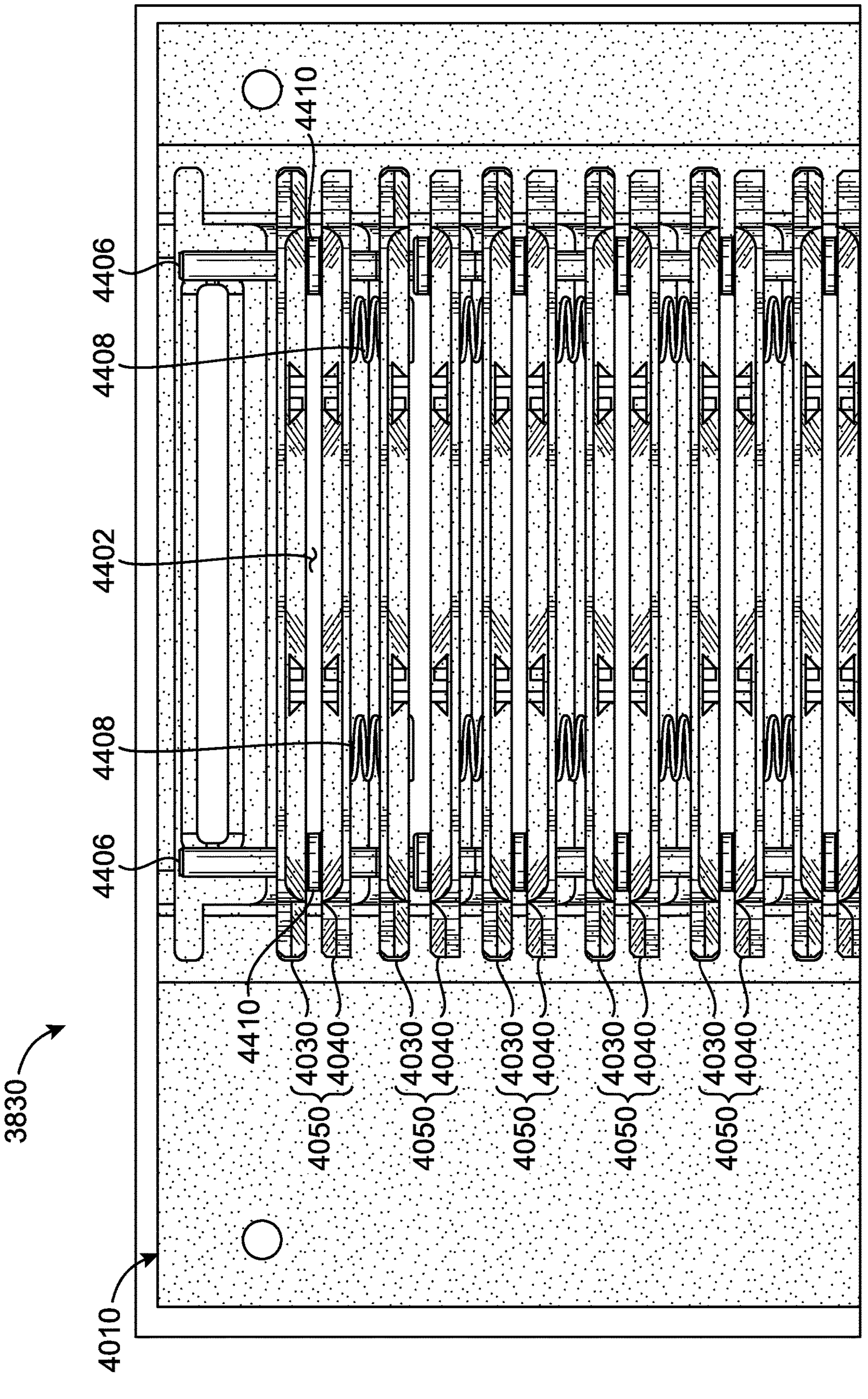
FIG. 45 is an enlarged top plan view of the compression fixture shown in FIG. 38, illustrating a moveable compression plate in a first position.
Figure 46:
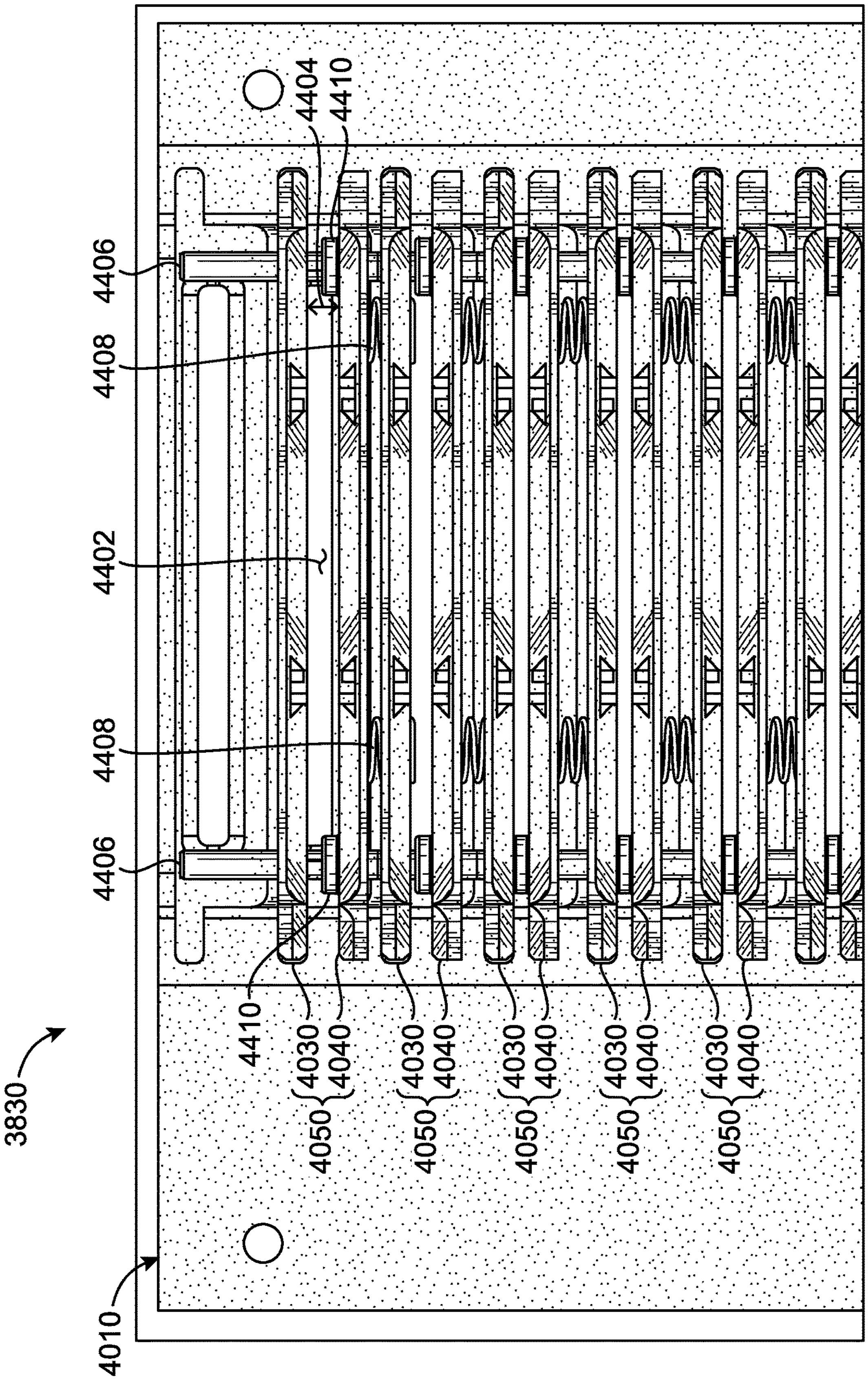
FIG. 46 is another enlarged top plan view of the compression fixture shown in FIG. 38, illustrating the moveable compression plate in a second position.
Figure 47:
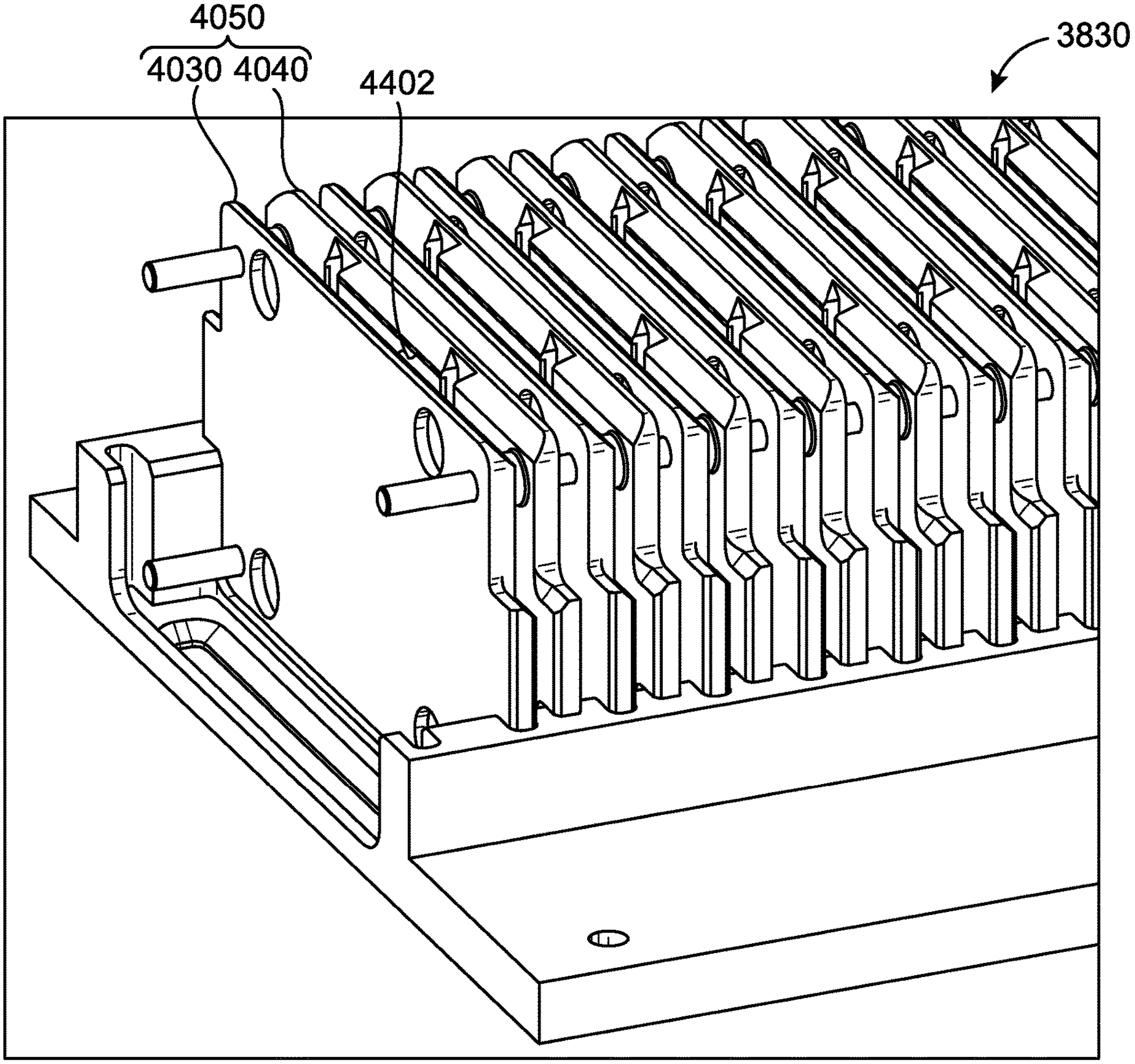
FIGS. 47-54 are perspective and top plan views of the compression fixture shown in FIG. 38, illustrating steps in a sequence of loading a secondary battery into a battery receptacle of the compression fixture.
Figure 48:
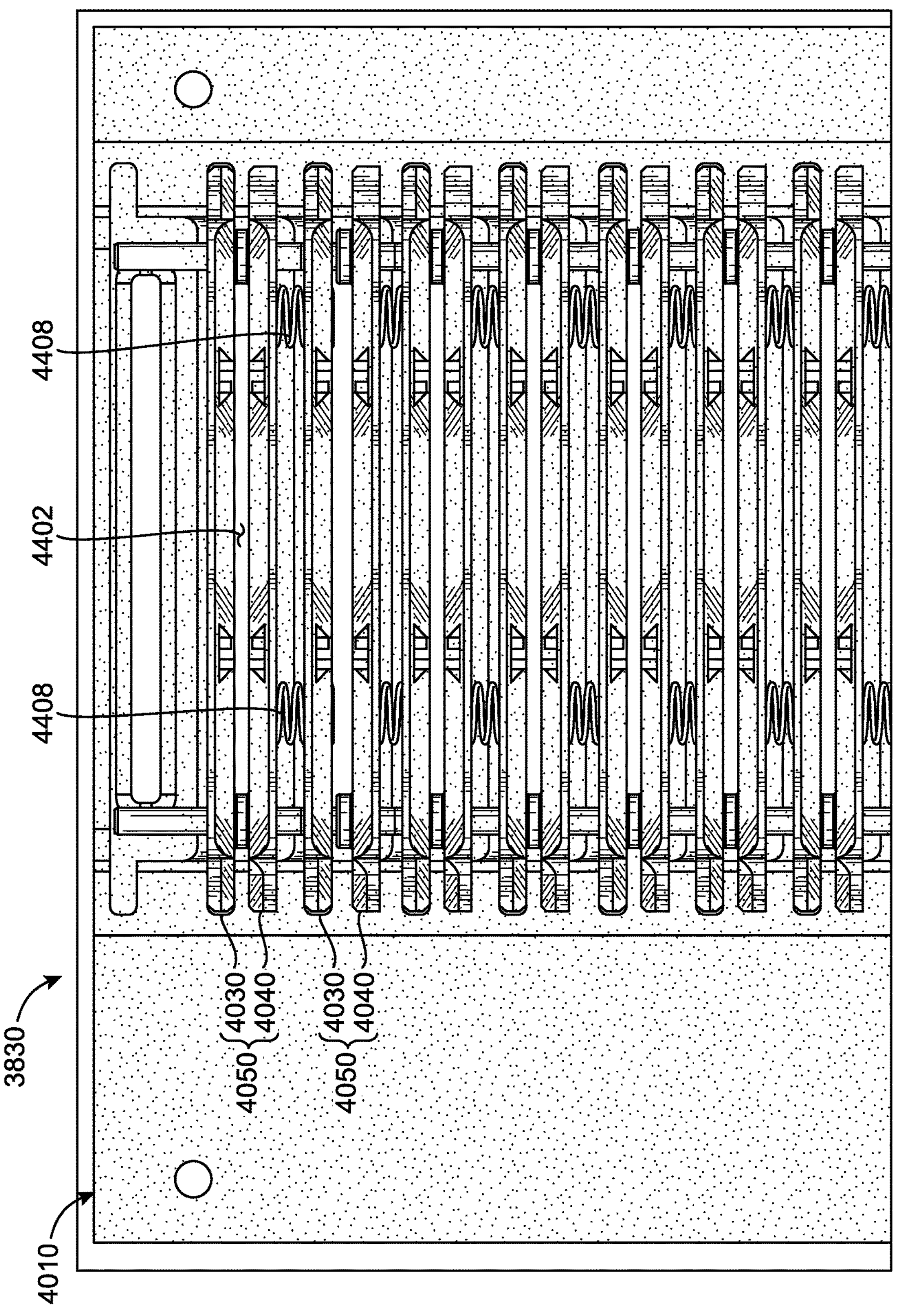
Figure 49:
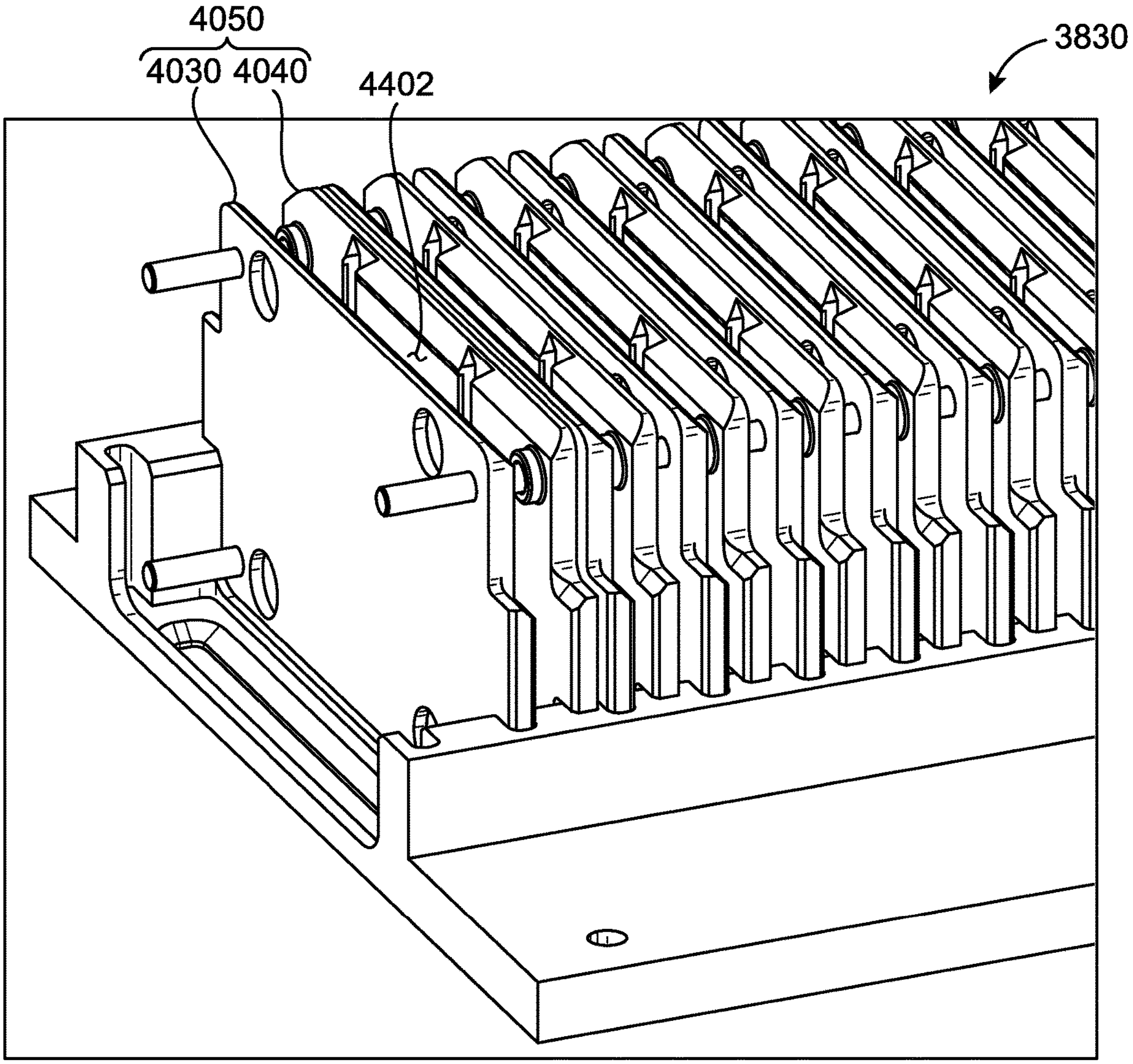
Figure 50:
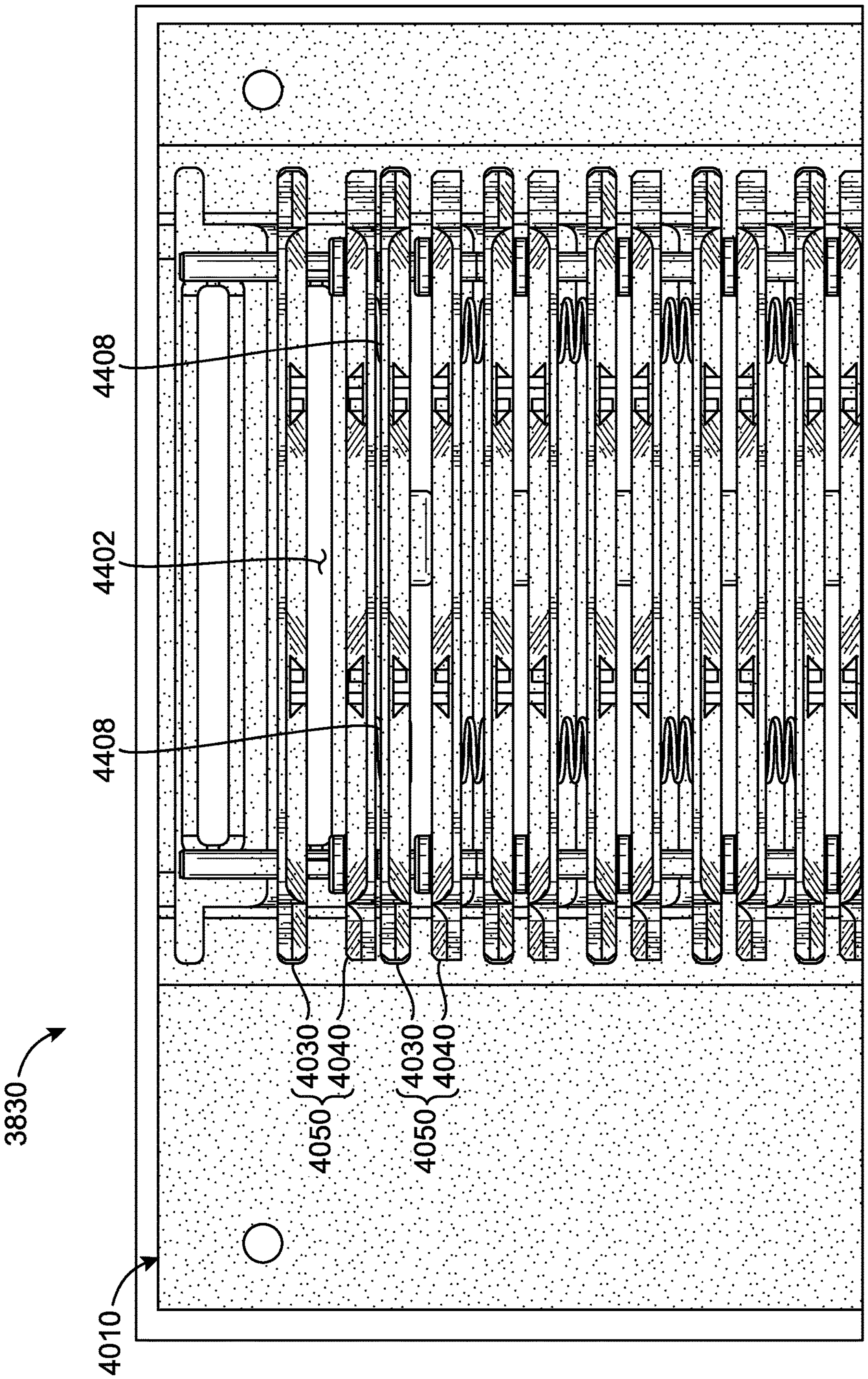
Figure 51:
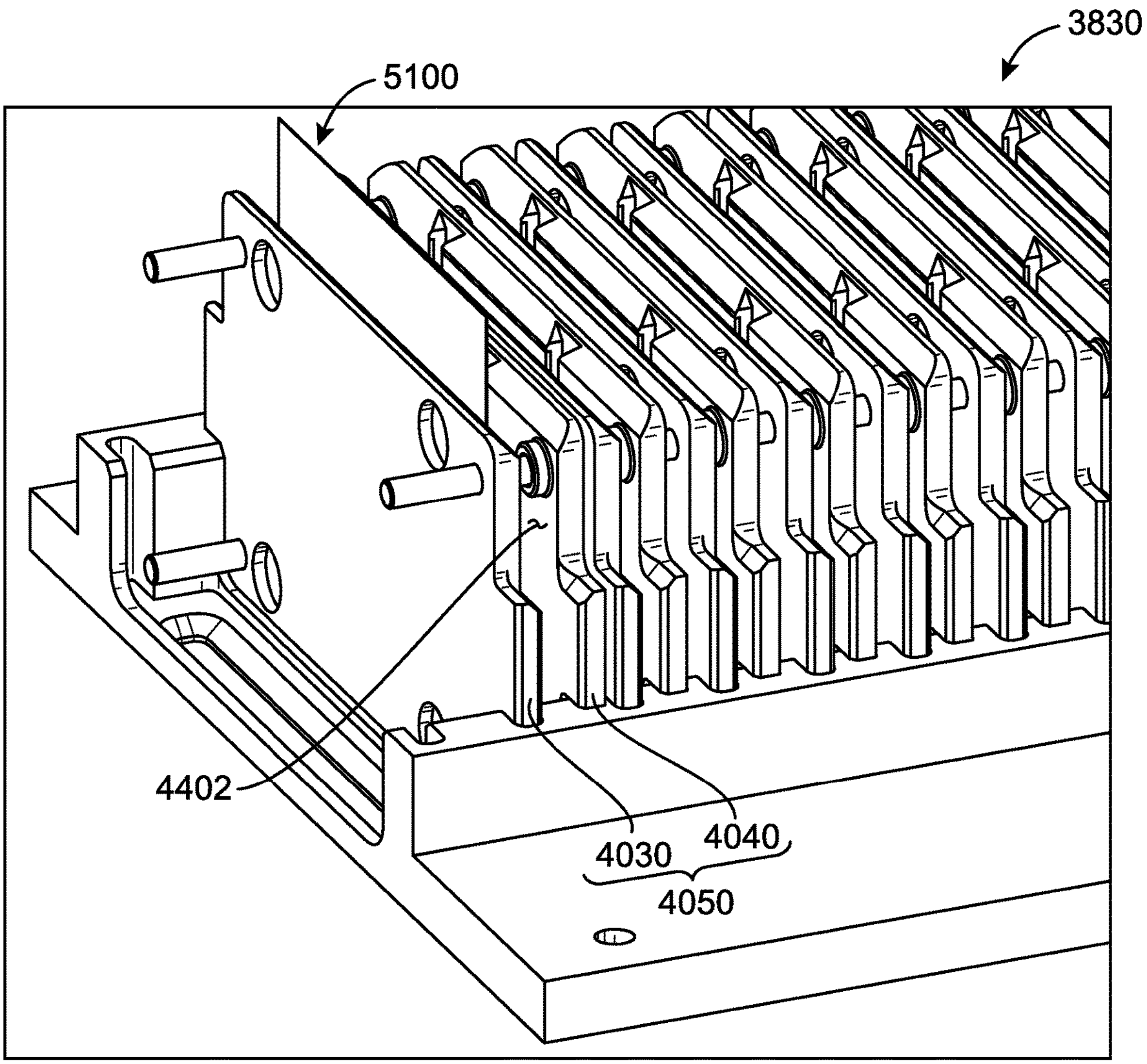
Figure 52:
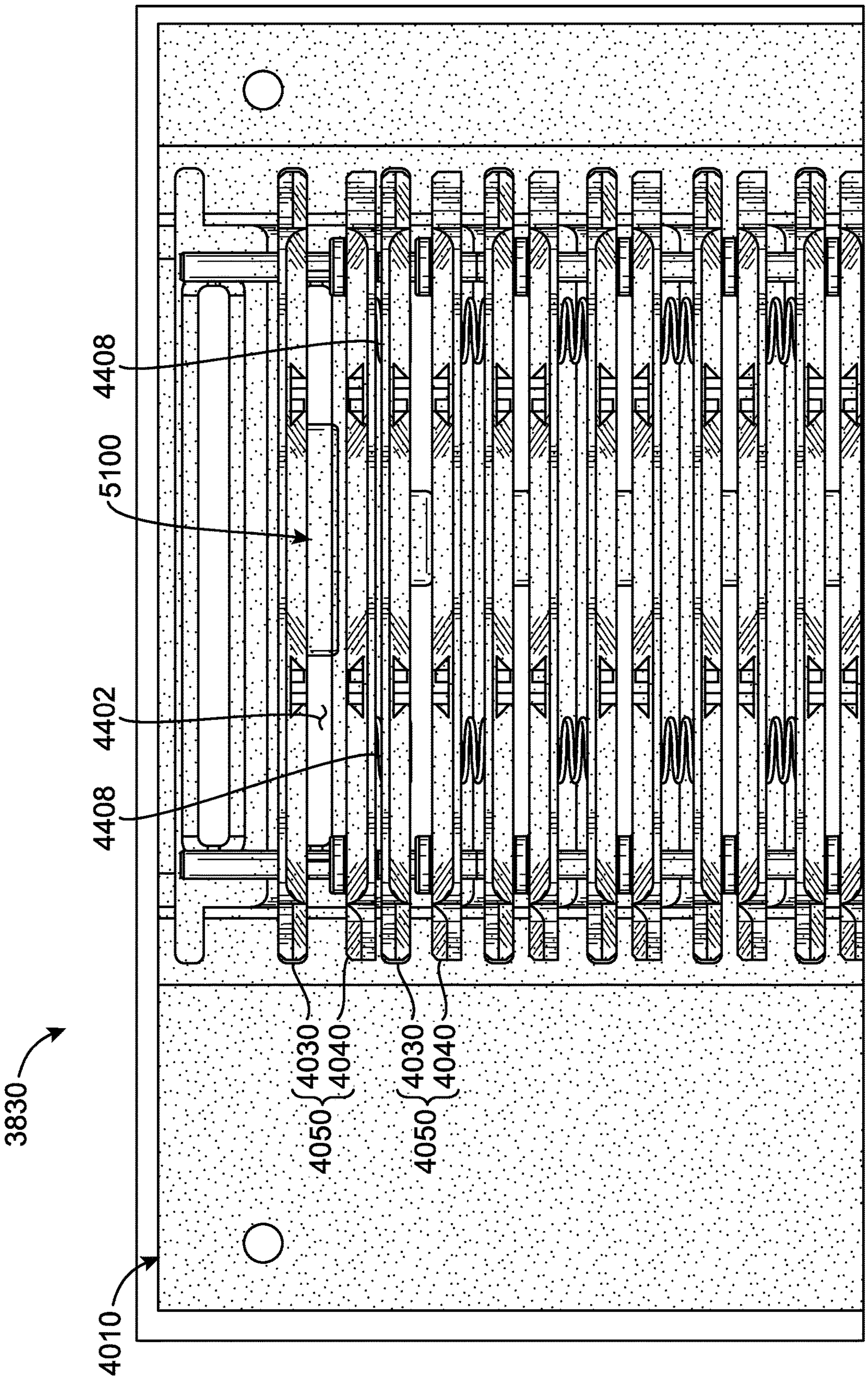

As shown in FIGS. 45 and 46, each compression plate set 4050 includes one or more biasing elements or springs 4408 operatively coupled to the moveable compression plate 4040 of the set 4050. The one or more springs 4408 bias the moveable compression plate 4040 towards the fixed compression plate 4030 of the set 4050 (i.e., towards the first position). The springs 4408 are positioned between the moveable compression plate 4040 and a fixed or non-movable surface located on an opposite side of the moveable compression plate 4040 from the fixed compression plate 4030. In this embodiment, the one or more springs 4408 are positioned between the moveable compression plate 4040 of one set 4050 of compression plates 4020 and the fixed compression plate 4030 of an adjacent set 4050 of compression plates 4020 such that the springs 4408 engage both the moveable compression plate 4040 and the fixed compression plate 4030. In other embodiments, the one or more springs 4408 may be positioned between the moveable compression plate 4040 and any other surface.

As shown in FIG. 45, the springs 4408 are in an expanded state when the moveable compression plate 4040 is in the first position. As the moveable compression plate 4040 moves from the first position to the second position, the springs 4408 are compressed between the moveable compression plate 4040 of one set 4050 and the fixed compression plate 4030 of an adjacent set 4050. The compressive force of the springs 4408 biases the moveable compression plate 4040 towards the first position and towards the fixed compression plate 4030 of the set 4050. In the absence of an applied force (e.g., from loading mechanism 3860), the springs 4408 cause the moveable compression plate 4040 to move from the second position towards the first position along the alignment rods 4406. The springs 4408 also exert a compressive force on the moveable compression plate 4040, which in turn provides a compressive force on a secondary battery positioned within the battery receptacle 4402.

Each compression plate set 4050 may include any suitable number and type of springs 4408 that enable the compression fixture 3830 to function as described herein. In the example embodiment, each compression plate set 4050 includes four springs 4408, each positioned adjacent a respective corner of the moveable compression plate 4040. For example, a first spring 4408 is located at or near a top-right area of the moveable compression plate 4040, a second spring 4408 is located at or near a top-left area of the moveable compression plate 4040, a third spring 4408 is located at or near a bottom-right area of the moveable compression plate 4040, and a fourth spring 4408 is located at or near a bottom-left area of the moveable compression plate 4040. The arrangement of the springs 4408 in this manner facilitates uniform application of pressure across a surface of the secondary battery. Other embodiments may include a greater or smaller number of springs 4408. The springs 4408 in the illustrated embodiment are helical coil springs, although other types of springs 4408 may be used.

Other embodiments may include biasing elements in addition to or alternatively to springs 4408. For example, some embodiments may include active biasing elements (as compared to passive biasing elements, such as springs 4408) that require some type of active control or activation. In some embodiments, for example, the compression plate sets 4050 may include inflatable bladders or air bags that are coupled in communication with a suitable fluid source (e.g., compressed air), and are inflated and deflated to apply a compressive force to a secondary battery. Moreover, in embodiments that include an inflatable bladder or air bag, the movable compression plate 4040 may be omitted, and the inflatable bladder or air bag may apply a compressive pressure directly to the secondary battery.

Each compression plate set 4050 of the example embodiment also includes one or more spacers 4410 positioned between the fixed compression plate 4030 and the moveable compression plate 4040 of the set 4050. The spacers 4410 limit a minimum distance or spacing between the fixed compression plate 4030 and the moveable compression plate 4040. That is, the spacer 4410 is provided or is otherwise used to maintain a minimum distance between the moveable compression plate 4040 and the fixed compression plate 4030 and/or maintain a minimum spacing or width 4404 of the battery receptacle 4402. The fixed minimum spacing may be equivalent or substantially equivalent to one or more dimensions of a secondary battery (e.g., a thickness of the secondary battery) that will be inserted into the battery receptacle 4402. The spacers 4410 may also facilitate maintaining a spacing between the fixed compression plate 4030 and the moveable compression plate 4040 when no secondary battery is positioned in the battery receptacle 4402 such that an actuator or other component of the loading mechanism 3860 may interact with the moveable compression plate 4040 (e.g., to load a secondary battery into the battery receptacle 4402). The spacers 4410 and the battery receptacle 4402 are located in non-spring spaces of the array. For example, the arrangement of the array of compression plates 4020, springs 4408, and spacers 4410 may be as follows: spring(s) 4408, moveable compression plate 4040, spacer(s) 4410, fixed compression plate 4030, spring(s) 4408, moveable compression plate 4040, spacer(s) 4410, fixed compression plate 4030, etc.

Each compression plate set 4050 may include any suitable number of spacers 4410 that enables the compression fixture 3830 to function as described herein. In the example embodiment, each compression plate set 4050 includes four spacers 4410, although other embodiments may include more than or less than four spacers. Additionally, in the example embodiment, each spacer 4410 is annular and positioned concentric with a respective through-hole of the moveable compression plate 4040 such that one of the alignment rods 4406 extends through each one of the spacers 4410, and each spacer 4410 is thereby coupled to one of the alignment rods 4406. In other embodiments, the spacers 4410 may be positioned at other locations relative to the alignment rods 4406 and the through-holes of the moveable compression plate 4040.

The spacers 4410 may be coupled to or formed integrally with one of the fixed compression plate 4030 or the moveable compression plate 4040. For example, in the illustrated embodiment, each spacer 4410 is integrally formed with a respective moveable compression plate 4040. In other embodiments, the spacers 4410 may be formed separately from the moveable compression plates 4040 and coupled to the moveable compression plates 4040. In yet other embodiments, the spacers 4410 may be coupled to or integrally formed with the fixed compression plates 4030.

Figure 53:
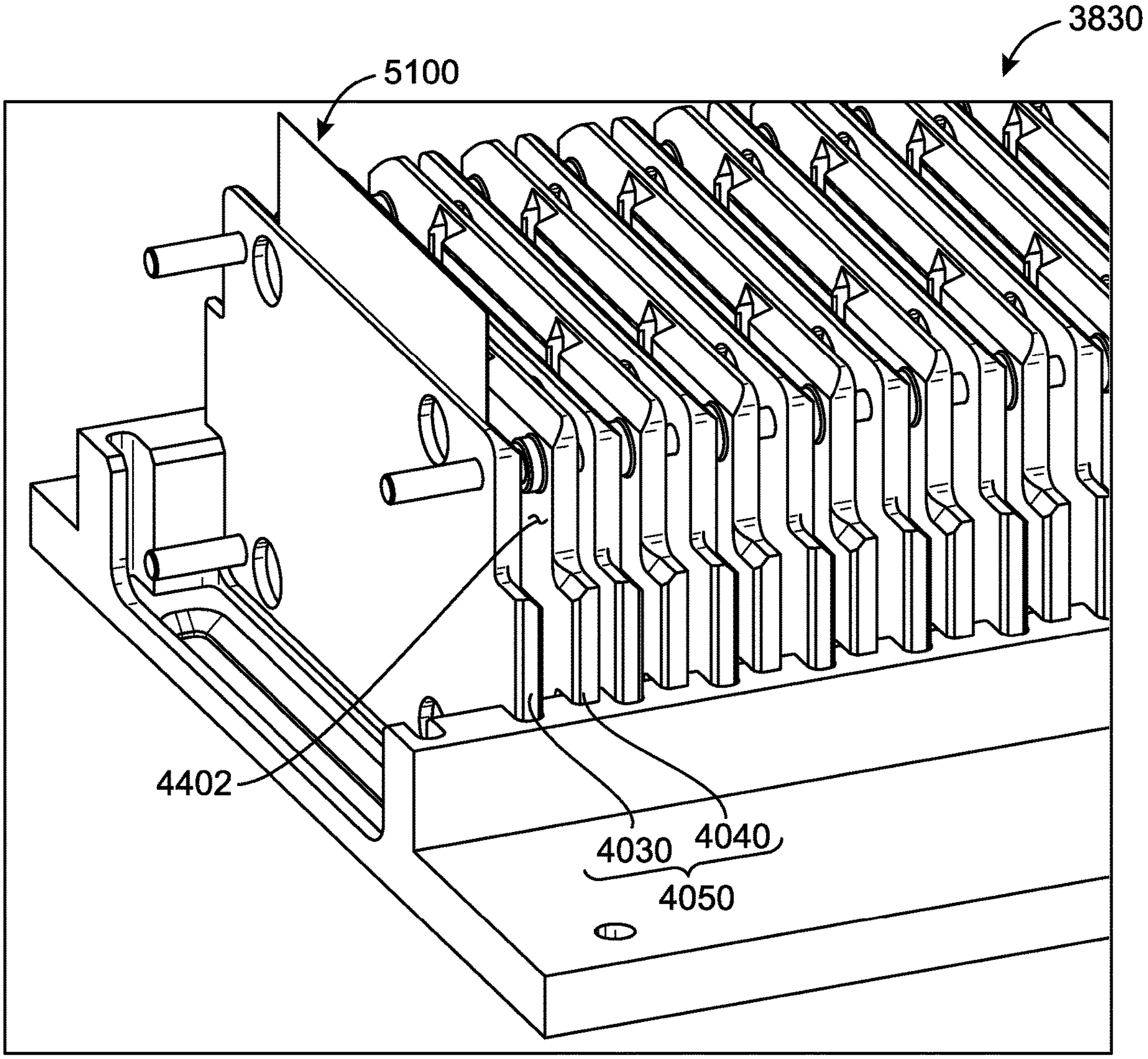
Figure 54:
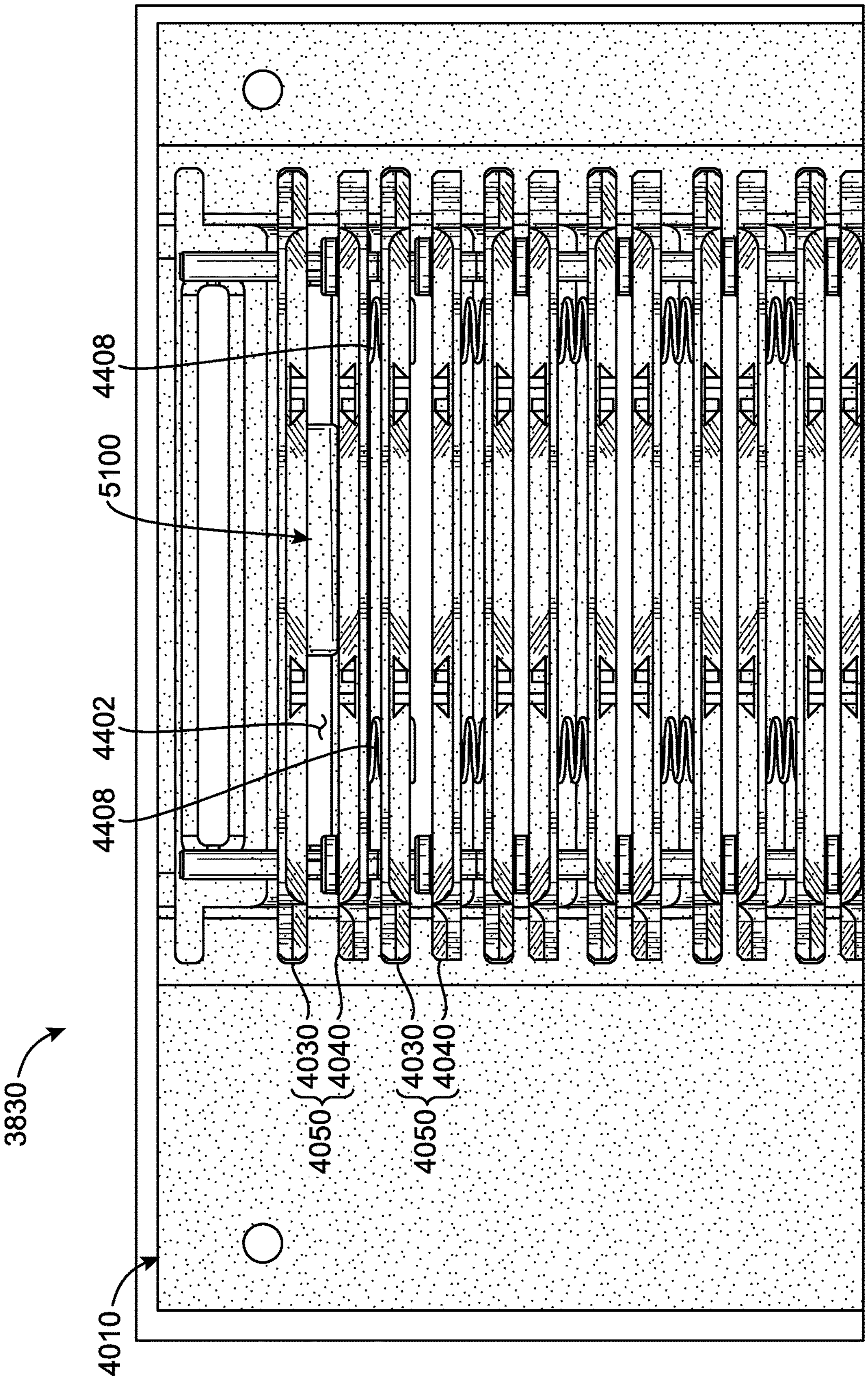

In operation, the springs 4408, in combination with the moveable compression plate 4040, the fixed compression plate 4030 and the spacer 4410, are used to apply a compressive force to a secondary battery positioned within the battery receptacle 4402. As illustrated in FIGS. 47-54, for example, to load a secondary battery 5100 (FIG. 51) into the battery receptacle 4402, the moveable compression plate 4040 is moved (e.g., using loading mechanism 3860) from the first position (shown in FIGS. 47 and 48) to the second position (shown in FIGS. 49-52), compressing the springs 4408 between the moveable compression plate 4040 of one set 4050 and the fixed compression plate 4030 of an adjacent set 4050. Once the secondary battery 5100 is placed into the battery receptacle 4402, shown in FIGS. 51 and 52, the moveable compression plate 4040 is allowed to move from the second position towards the first position (e.g., by releasing the moveable compression plate 4040 from the loading mechanism 3860) to engage the secondary battery 5100 positioned within the battery receptacle 4402, as shown in FIGS. 53 and 54. Depending on a thickness of the secondary battery 5100 positioned within the battery receptacle 4402, the moveable compression plate 4040 may engage the secondary battery 5100 before returning to the first position. That is, the moveable compression plate 4040 may not fully return to the first position when a secondary battery 5100 is positioned within the battery receptacle 4402 due to the thickness of the secondary battery 5100. The springs 4408 apply a compressive force on the secondary battery 5100 in the battery receptacle 4402 through the moveable compression plate 4040. The secondary batteries 5100 loaded into the compression fixture 3830 may be identical or substantially identical the secondary batteries described herein, such as secondary battery 100. Moreover, the secondary batteries 5100 may be loaded in the compression fixture 3830 as part of a larger assembly or system, such as a buffer system (e.g., buffer system 500 described above with reference to FIGS. 5 and 6).

Figure 55:
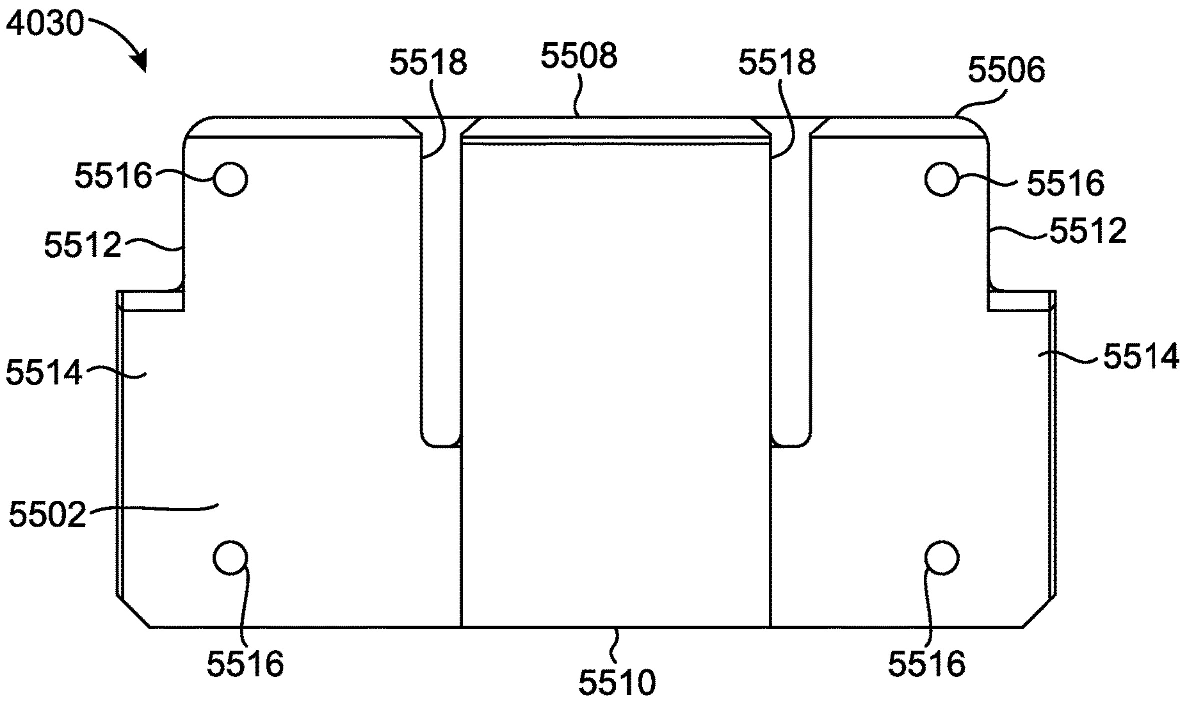
FIG. 55 is a front plan view of a fixed compression plate suitable for use with the compression fixture shown in FIG. 38.
Figure 56:
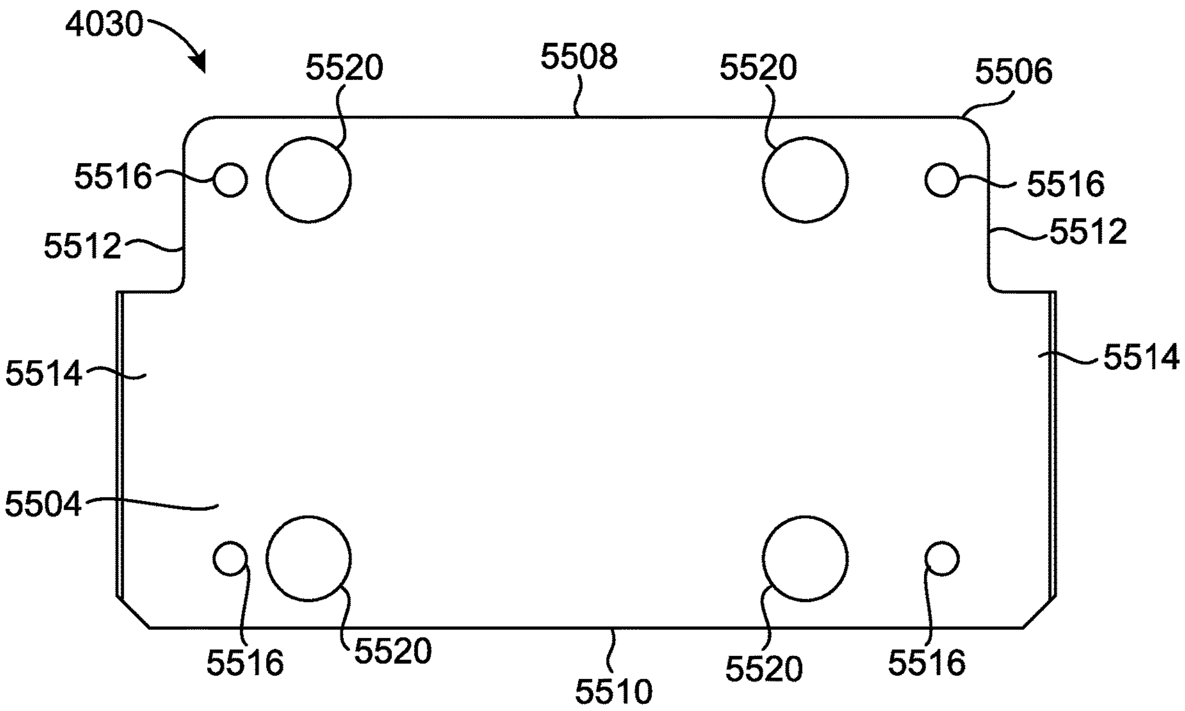
FIG. 56 is a rear plan view of the fixed compression plate shown in FIG. 55.

FIGS. 55 and 56 are front and rear views, respectively, of a fixed compression plate 4030 according to one suitable embodiment. The fixed compression plate 4030 includes a first or front side 5502 and a second or rear side 5504 opposite the first side 5502. The first side 5502 is joined to the second side 5504 by a peripheral edge 5506 extending between the first side 5502 and the second side 5504, and around the perimeter of the fixed compression plate 4030. The peripheral edge 5506 includes a top edge 5508, a bottom edge 5510, and laterally-opposed side edges 5512. The first side 5502 faces the battery receptacle 4402 when the fixed compression plate 4030 is assembled into a compression plate set 4050 with a moveable compression plate 4040. The first side 5502 is thereby positioned for engagement with a secondary battery positioned within the battery receptacle 4402. The first side 5502 is a substantially flat or planar surface to facilitate even distribution of pressure across a secondary battery positioned within the battery receptacle 4402. In the illustrated embodiment, the second side 5504 is also a substantially flat or planar surface.

The fixed compression plate 4030 of the example embodiment includes a pair of flanges 5514 extending from the laterally-opposed side edges 5512. Each flange 5514 extends from the bottom edge 5510 towards the top edge 5508 of the fixed compression plate 4030, and is sized and shaped to be received within one of the compression plate channels 4310 defined in the base 4010 to couple the fixed compression plate 4030 to the base 4010. The flanges 5514 of the fixed compression plate 4030 may be used by the loading mechanism 3860 to facilitate moving the moveable compression plate 4040 towards and/or away from the fixed compression plate 4030 to load or unload a secondary battery within the battery receptacle 4402. For example, a portion of the loading mechanism 3860 may engage the flanges 5514 of the fixed compression plate 4030 to brace the loading mechanism 3860 while simultaneously engaging a portion of the moveable compression plate 4040 to move the moveable compression plate 4040.

The fixed compression plate 4030 also has a plurality of through-holes 5516 defined therein and extending through the fixed compression plate 4030 from the first side 5502 to the second side 5504. Each through-hole 5516 is sized and positioned on the fixed compression plate 4030 to align with and receive one of the alignment rods 4406. The fixed compression plate 4030 includes the same number of through-holes 5516 as the number of alignment rods 4406 of the compression fixture 3830, which in the illustrated embodiment is four. The fixed compression plate 4030 may include more than or less than four through-holes in other embodiments.

As shown in FIG. 55, the first side 5502 of the fixed compression plate 4030 has one or more slots 5518 defined therein. The slots 5518 extend from the top edge 5508 of the fixed compression plate 4030 towards the bottom edge 5510 of the fixed compression plate 4030. Each slot 5518 is sized and shaped to receive a finger of the loading mechanism 3860 (described further herein) to facilitate loading and unloading a secondary battery within the battery receptacle 4402. The illustrated fixed compression plate 4030 includes two slots 5518 spaced laterally apart from one another, though other embodiments may include more than or less than two slots 5518.

In some examples, the fixed compression plate 4030 may include a compliant material (e.g., foam, neoprene) disposed on the first side 5502 (i.e., the side facing the battery receptacle 4402 and the fixed compression plate 4030), for example, to facilitate applying pressure equally across a surface of a secondary battery positioned within the battery receptacle 4402.

As shown in FIG. 56, the second side 5504 of the fixed compression plate 4030 has one or more spring depressions 5520 defined therein. Each spring depression 5520 is configured (e.g., sized and shaped) to receive at least a portion of a spring (e.g., spring 4408, shown in FIGS. 45 and 46) therein. For example, each spring depression 5520 may receive a first end of one of the springs 4408 and may hold the spring 4408 in place between the fixed compression plate 4030 of one set 4050 and the moveable compression plate 4040 of an adjacent set 4050. The fixed compression plate 4030 includes the same number of spring depressions 5520 as the number of springs 4408 of each compression plate set 4050, which in the illustrated embodiment is four. The fixed compression plate 4030 may include more than or less than four spring depressions 5520 in other embodiments.

Figure 57:
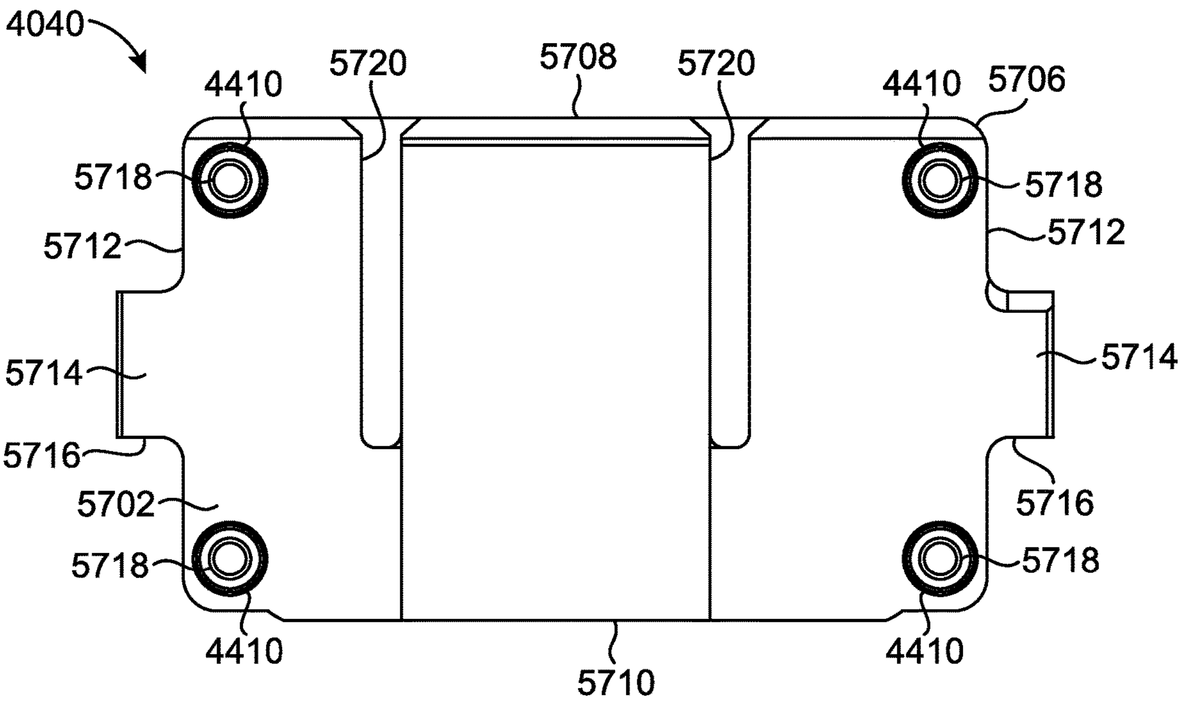
FIG. 57 is a front plan view of a moveable compression plate suitable for use with the compression fixture shown in FIG. 38.
Figure 58:
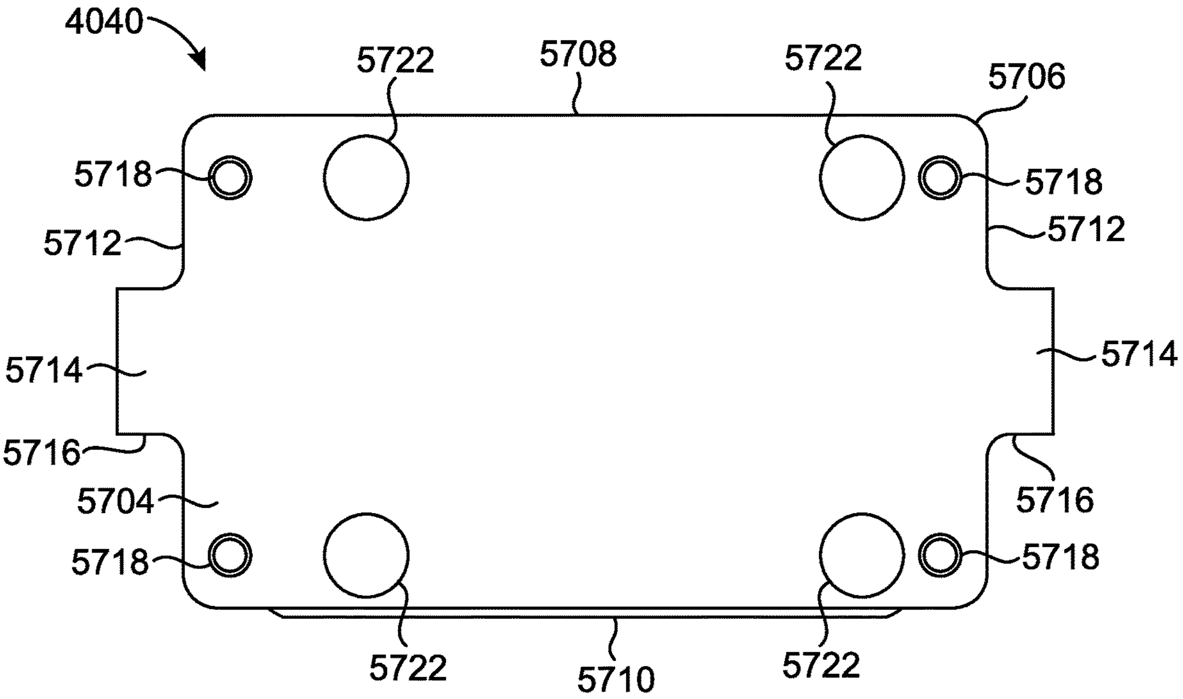
FIG. 58 is a rear plan view of the moveable compression plate show in FIG. 57.

FIGS. 57 and 58 are front and rear views, respectively, of a moveable compression plate 4040 according to one suitable embodiment. The moveable compression plate 4040 includes a first or front side 5702 and a second or rear side 5704 opposite the first side 5702. The first side 5702 is joined to the second side 5704 by a peripheral edge 5706 extending between the first side 5702 and the second side 5704, and around the perimeter of the moveable compression plate 4040. The peripheral edge 5706 includes a top edge 5708, a bottom edge 5710, and laterally-opposed side edges 5712. The first side 5702 faces the battery receptacle 4402 when the moveable compression plate 4040 is assembled into a compression plate set 4050 with a moveable compression plate 4040. The first side 5702 is thereby positioned for engagement with a secondary battery positioned within the battery receptacle 4402. The first side 5702 is a substantially flat or planar surface to facilitate even distribution of pressure across a secondary battery positioned within the battery receptacle 4402. In the illustrated embodiment, the second side 5704 is also a substantially flat or planar surface.

The moveable compression plate 4040 of the example embodiment includes a pair of flanges 5714 extending from the laterally-opposed side edges 5712. Each flange 5714 is spaced from the top edge 5708 and the bottom edge 5710 of the moveable compression plate 4040 such that the flanges 5714 are located approximately midway between the top edge 5708 and bottom edge 5710. Moreover, a bottom 5716 of each flange 5714 is spaced from the bottom edge 5710 of the moveable compression plate 4040 a sufficient distance such that each flange 5714 is positioned adjacent to and/or in engagement with the top surface 4036 of a respective one of the rails 4118 when the moveable compression plate 4040 is coupled to the base 4010. Additionally, each flange 5714 of the moveable compression plate 4040 is sized and shaped such that each flange 5714 of the moveable compression plate 4040 is coterminous with the portion of each flange 5514 of the fixed compression plate 4030 that extends above the compression plate channel 4310, as shown for example in FIGS. 44-54. The flanges 5714 of the moveable compression plate 4040 may be used by the loading mechanism 3860 to move the moveable compression plate 4040 towards and/or away from the fixed compression plate 4030 to load or unload a secondary battery within the battery receptacle 4402. For example, a portion of the loading mechanism 3860 may engage the flanges 5714 of the moveable compression plate 4040 to move the moveable compression plate 4040.

The moveable compression plate 4040 also has a plurality of through-holes 5718 defined therein and extending through the moveable compression plate 4040 from the first side 5702 to the second side 5704. Each through-hole 5718 is sized and positioned on the moveable compression plate 4040 to align with and receive one of the alignment rods 4406. The moveable compression plate 4040 includes the same number of through-holes 5718 as the number of alignment rods 4406 of compression fixture 3830, which in the illustrated embodiment is four. The moveable compression plate 4040 may include more than or less than four through-holes in other embodiments.

As shown in FIG. 57, the first side 5702 of the moveable compression plate 4040 has one or more slots 5720 defined therein. The slots 5720 extend from the top edge 5708 of the moveable compression plate 4040 towards the bottom edge 5710 of the moveable compression plate 4040. Each slot 5720 is sized and shaped to receive a finger of the loading mechanism 3860 (described further herein) to facilitate loading and unloading a secondary battery within the battery receptacle 4402. The illustrated moveable compression plate 4040 includes two slots 5720 spaced laterally apart from one another, though other embodiments may include more than or less than two slots 5720. In the example embodiment, the slots 5720 of the moveable compression plate 4040 have the same configuration (e.g., size, shape, and position) as the slots 5518 of the fixed compression plate 4030.

The first side 5702 of the moveable compression plate 4040 also includes the spacers 4410 in this embodiment. More specifically, each spacer 4410 is formed integrally with the moveable compression plate 4040, and is concentric with one of the through-holes 5718 of the moveable compression plate 4040. Each spacer 4410 is annular in this embodiment, each defining a through-hole aligned with a corresponding through-hole 5718 of the moveable compression plate 4040. As noted above, the spacers 4410 may be formed separately from the moveable compression plate 4040 and/or positioned at locations other than concentric with the through-holes 5718 in other embodiments.

In some examples, the moveable compression plate 4040 may include a compliant material (e.g., foam, neoprene) disposed on the first side 5702 (i.e., the side facing the battery receptacle 4402 and the fixed compression plate 4030), for example, to facilitate applying pressure equally across a surface of a secondary battery positioned within the battery receptacle 4402.

As shown in FIG. 58, the second side 5704 of the moveable compression plate 4040 has one or more spring depressions 5722 defined therein. Each spring depression 5722 is configured (e.g., sized and shaped) to receive at least a portion of a spring (e.g., spring 4408 shown in FIGS. 45 and 46) therein. For example, each spring depression 5722 may receive a second end of one of the springs 4408 and may hold the spring 4408 in place between the moveable compression plate 4040 of one set 4050 and the fixed compression plate 4030 of an adjacent set 4050. The moveable compression plate 4040 includes the same number of spring depressions 5722 as the number of springs 4408 of each compression plate set 4050, which in the illustrated embodiment is four. The moveable compression plate 4040 may include more than or less than four spring depressions 5722 in other embodiments. Each spring depression 5722 on the moveable compression plate 4040 is aligned with and faces one of the spring depressions 5520 on the fixed compression plate 4030 when the fixed compression plate 4030 and the moveable compression plate 4040 are coupled to the base 4010.

With additional reference to FIGS. 43-46, the compression fixture 3830 may be assembled by coupling the fixed compression plates 4030 and the moveable compression plates 4040 to the base 4010, positioning the springs 4408 between each moveable compression plate 4040 and the fixed compression plate 4030 of an adjacent set 4050, and inserting the alignment rods 4406 through the through-holes 5516 and 5718 of the fixed compression plate 4030 and the moveable compression plate 4040. The springs 4408 may be positioned between the moveable compression plates 4040 and the fixed compression plates 4030, for example, by inserting a first end of each spring 4408 in one of the spring depressions 5520 of a fixed compression plate 4030, and inserting a second, opposite end of the spring 4408 in one of the spring depressions 5722 of a moveable compression plate 4040. The fixed compression plates 4030 may be coupled to the base 4010, for example, by inserting the flanges 5514 of each fixed compression plate 4030 into corresponding compression plate channels 4310 (FIG. 43) of the base 4010. When the fixed compression plates 4030 are coupled to the base 4010, the second side 5504 (FIG. 56) of each fixed compression plate 4030 engages one of the stops 4314 of the base 4010. When the moveable compression plates 4040 are coupled to the base 4010, the flanges 5714 of each moveable compression plate 4040 are positioned on and/or adjacent the top surfaces 4306 of the rails 4118. Placement of the moveable compression plate 4040 within the base 4010 in this manner allows the moveable compression plate 4040 to move linearly in the longitudinal direction x (e.g., in response to actuation by the loading mechanism 3860). In this embodiment, linear or longitudinal movement of each moveable compression plate 4040 away from the fixed compression plate 4030 of the same set 4050 is limited by one of the stops 4314. For example, as the moveable compression plate 4040 is moved away from the fixed compression plate 4030 (e.g., during insertion or removal of a secondary battery within the battery receptacle 4402), the second side 5704 of the moveable compression plate 4040 will engage the stop 4314, which inhibits further longitudinal or linear movement of the moveable compression plate 4040 away from the fixed compression plate 4030.

Referring again to FIG. 38, the example embodiment includes the loading mechanism 3860 to facilitate loading and unloading secondary batteries within the compression fixture 3830. For example, the loading mechanism 3860 of the example embodiment is configured to load secondary batteries 5100 into the compression fixture 3830 and remove secondary batteries 5100 from the compression fixture 3830 (e.g., following formation and/or pre-lithiation processes). More specifically, the loading mechanism 3860 is configured to interact with each moveable compression plate 4040 and/or each fixed compression plate 4030 of the compression fixture 3830 to move each moveable compression plate 4040 from the first position to the second position to increase the size or width 4404 of the battery receptacle 4402 such that a secondary battery 5100 may be inserted into the battery receptacle 4402 or removed from the battery receptacle 4402. Moreover, the loading mechanism 3860 is further configured to interact with each moveable compression plate 4040 and/or each fixed compression plate 4030 of the compression fixture 3830 to allow each moveable compression plate 4040 to move from the second position towards the first position (e.g., under the force of springs 4408 by releasing or otherwise disengaging from the moveable compression plate 4040) to engage and compress a secondary battery 5100 positioned within the battery receptacle 4402. Additionally, the illustrated loading mechanism 3860 is further configured to insert secondary batteries 5100 into the battery receptacles 4402 of the compression fixture 3830, and to remove secondary batteries from the battery receptacles 4402 of the compression fixture 3830. The loading mechanism 3860 may include any suitable actuators, motors, mechanical linkages, controllers, and other components to enable the loading mechanism 3860 to function as described herein. In some embodiments, the loading mechanism 3860 includes or is coupled to a positioning system operable to move the loading mechanism 3860 longitudinally, laterally, and/or vertically relative to the compression fixture 3830. In some embodiments, the loading mechanism 3860 may be moved longitudinally along the length of the compression fixture 3830 such that the loading mechanism 3860 may interact with (e.g., move, grab, push, pull, etc.) the moveable compression plate 4040 of each compression plate set 4050. In one embodiment, for example, the loading mechanism 3860 is mounted to an X-Y positioning system operable to move the loading mechanism 3860 in a plane parallel to the base 4010 of the compression fixture 3830 (e.g., longitudinally and laterally with respect to the compression fixture 3830).

Figure 59:
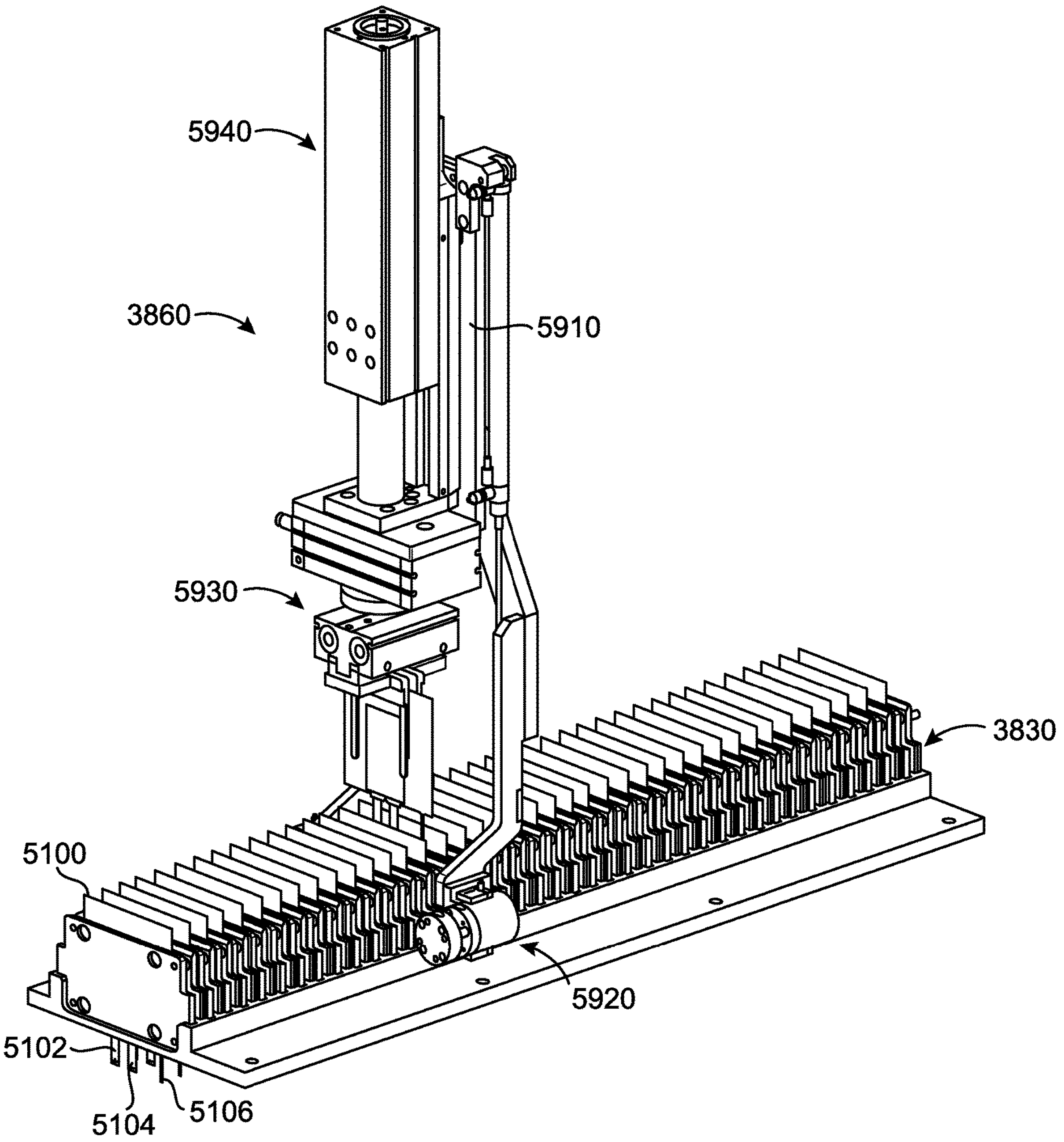
FIG. 59 is a perspective view of the compression fixture and a loading mechanism of the cell formation system shown in FIG. 38

With additional reference to FIG. 59, the example loading mechanism 3860 includes a bracket 5910, one or more plate spreaders 5920 coupled to the bracket 5910, and a battery clamp 5930 coupled to the bracket 5910. In this embodiment, the battery clamp 5930 is coupled to the bracket 5910 by a linear actuator 5940 operable to raise and lower the battery clamp 5930 (e.g., towards and away from the compression fixture 3830 and the battery receptacles 4402).

Figure 60:
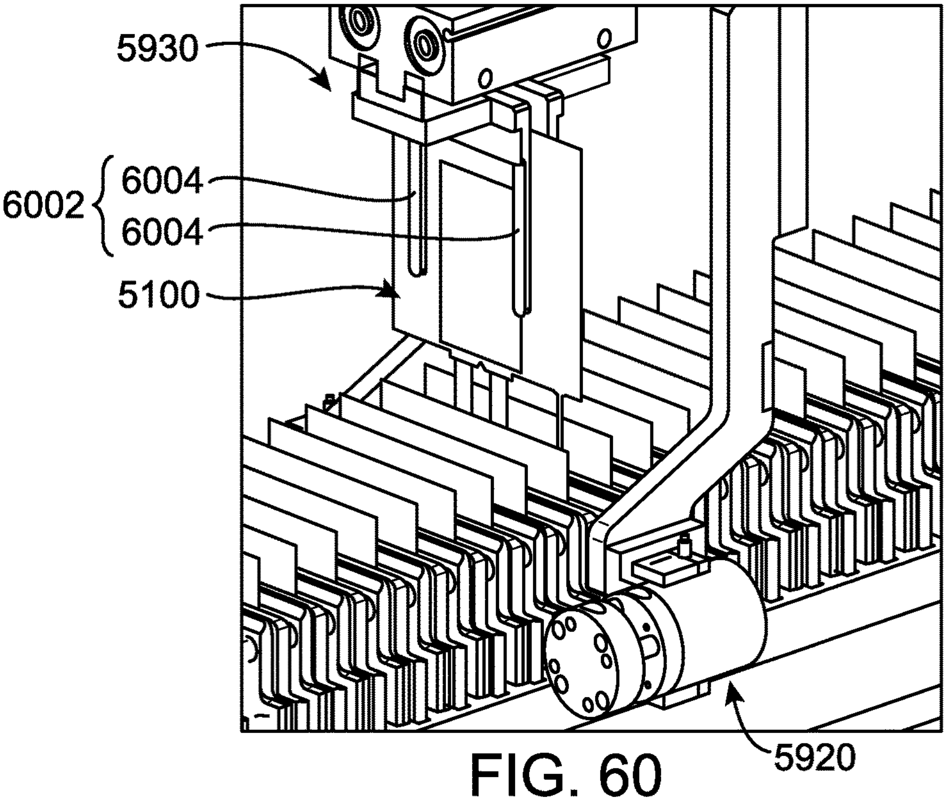
FIG. 60 is an enlarged perspective view of the loading mechanism and the compression fixture shown in FIG. 59.
Figure 61:
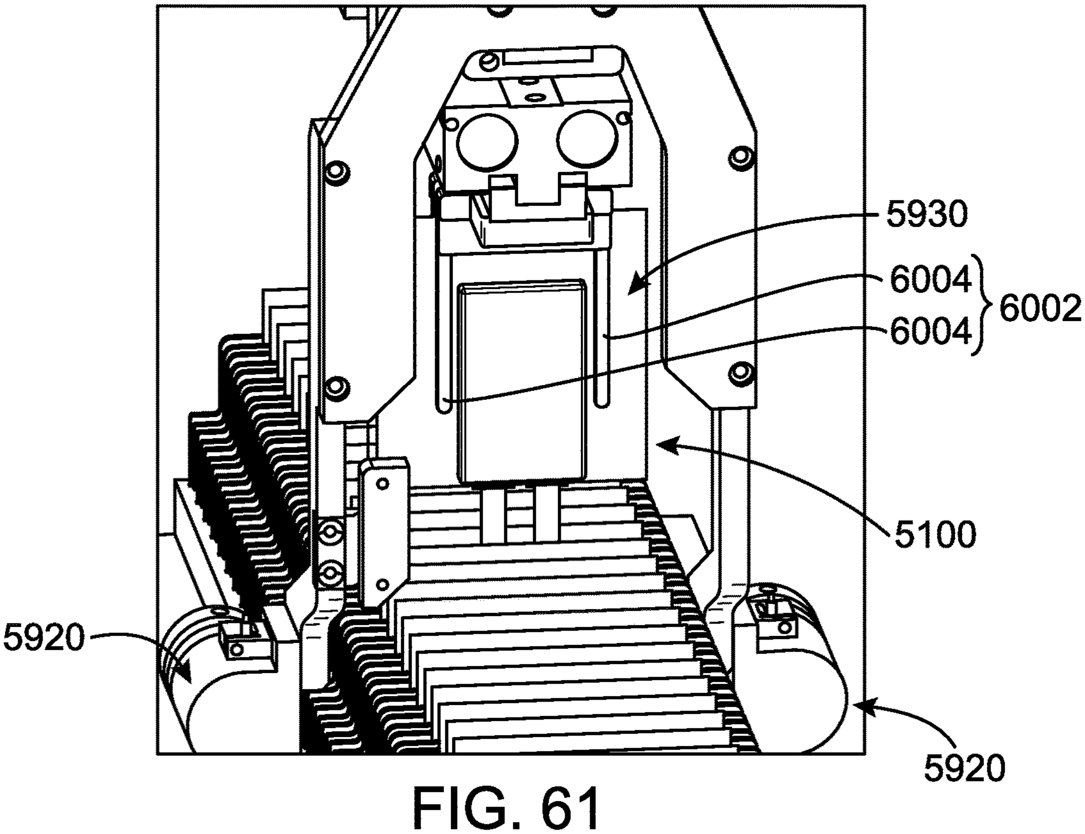
FIG. 61 is another enlarged perspective view of the loading mechanism and the compression fixture shown in FIG. 59.
Figure 62:
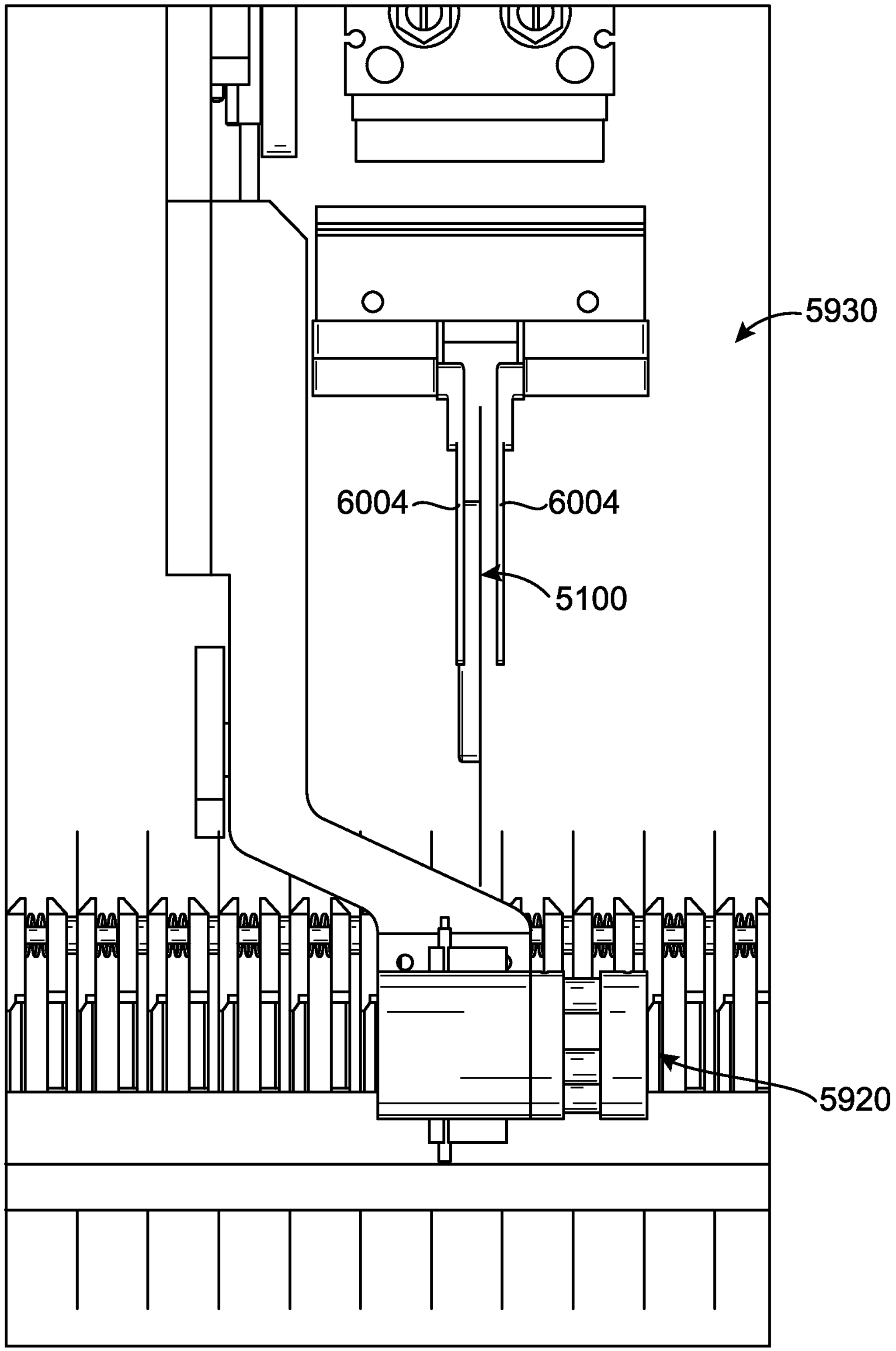
FIG. 62 is a side plan view of the loading mechanism and the compression fixture shown in FIG. 59.

FIGS. 60 and 61 are enlarged perspective views of the loading mechanism 3860, and FIG. 62 is an enlarged side view of the loading mechanism 3860. As shown in FIGS. 60-62, the battery clamp 5930 includes two pairs 6002 of elongate fingers 6004 operable to clamp a secondary battery 5100 between the fingers 6004 of one pair 6002 and the fingers 6004 of the other pair 6002. Each finger 6004 of one pair 6002 is positioned opposite and parallel to one of the fingers 6004 of the other pair 6002. One or both pairs 6002 of fingers 6004 may be coupled to an actuator operable to move the pairs 6002 of fingers 6004 towards and away from one another to clamp a secondary battery 5100 between the pairs 6002 of fingers 6004 and to release a secondary battery 5100. That is, one or both pairs 6002 of fingers 6004 may be moveable towards and away from the other pair 6002 of fingers 6004 to facilitate clamping and releasing a secondary battery 5100 from the battery clamp 5930. In this example, each pair 6002 of fingers 6004 is coupled to a respective linear actuator (not shown) operable to move the pair 6002 of fingers 6004 towards and away from the other pair 6002 of fingers 6004. In other embodiments, only one pair 6002 of fingers 6004 may be moveable (e.g., via a suitable actuator), and the other pair 6002 of fingers 6004 may be fixed or stationary. In other embodiments, any other suitable mechanism or mechanisms may be used to hold and release secondary batteries that enables the cell formation system 3800 to function as described herein.

Figure 63:
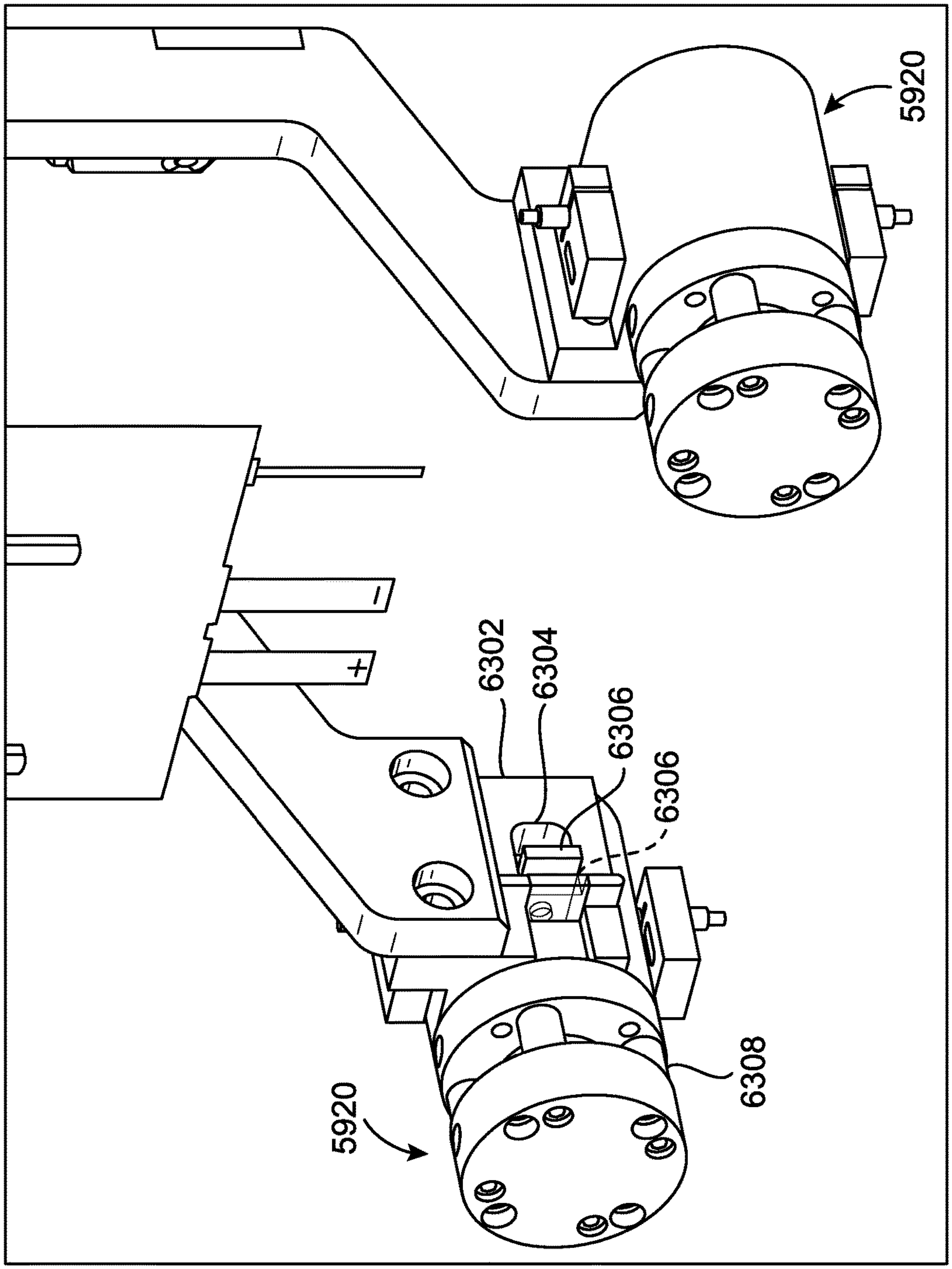
FIG. 63 is an enlarged perspective view of a portion of the loading mechanism shown in FIG. 59.

FIG. 63 is another enlarged perspective view of the loading mechanism 3860 in isolation from the compression fixture 3830, illustrating details of the plate spreaders 5920. The example loading mechanism 3860 includes two plate spreaders 5920 spaced laterally apart from one another and arranged in an opposing, facing relationship. When the loading mechanism 3860 interacts with the compression fixture 3830, one plate spreader 5920 is located on one side of the compression plates 4020, and the other plate spreader 5920 is located on the other side of the compression plates 4020 such that the compression plates 4020 are positioned in between the two plate spreaders 5920. Other embodiments may include more than or less than two plate spreaders 5920. Details of a single plate spreader 5920 are described below, though it should be understood that the other plate spreader 5920 may have the same or substantially the same construction and operate in the same or substantially the same manner.

As shown in FIG. 63, the plate spreader 5920 includes a guide 6302 defining an elongate slot 6304, a moveable tab 6306 positioned within the slot 6304 for linear movement therein, and an actuator 6308 coupled to the guide 6302 and the moveable tab 6306. In this embodiment, the actuator 6308 is a linear actuator operatively coupled to the moveable tab 6306 (e.g., via a shaft, not shown) to move the tab between a first position (shown in transparent in FIG. 63) and a second position (shown in solid lines in FIG. 63). The moveable tab 6306 protrudes from the elongate slot 6304, and is positioned to engage one of the moveable compression plates 4040 to move the moveable compression plate 4040 (e.g., from the first position to the second position, or towards the second position). More specifically, the moveable tab 6306 is positioned to engage one of the flanges 5714 of the moveable compression plate 4040 to move the moveable compression plate 4040 linearly or longitudinally along alignment rods 4406. For example, when the moveable tab 6306 is positioned adjacent and/or in engagement with the flange 5714 of a moveable compression plate 4040, actuation of the actuator 6308 causes the moveable tab 6306 to move from the first position to the second position, and thereby move the moveable compression plate 4040 towards the second position (i.e., away from the fixed compression plate 4030). In some embodiments, a thickness of the moveable tab 6306 is less than a thickness or height of the spacers 4410 (FIGS. 44-46) disposed between the fixed compression plate 4030 and the moveable compression plate 4040 of each compression plate set 4050, such that the moveable tab 6306 may be positioned or inserted between the fixed compression plate 4030 and the moveable compression plate 4040 when the moveable compression plate 4040 is in the first position (i.e., closest to the fixed compression plate 4030).

Figure 64:
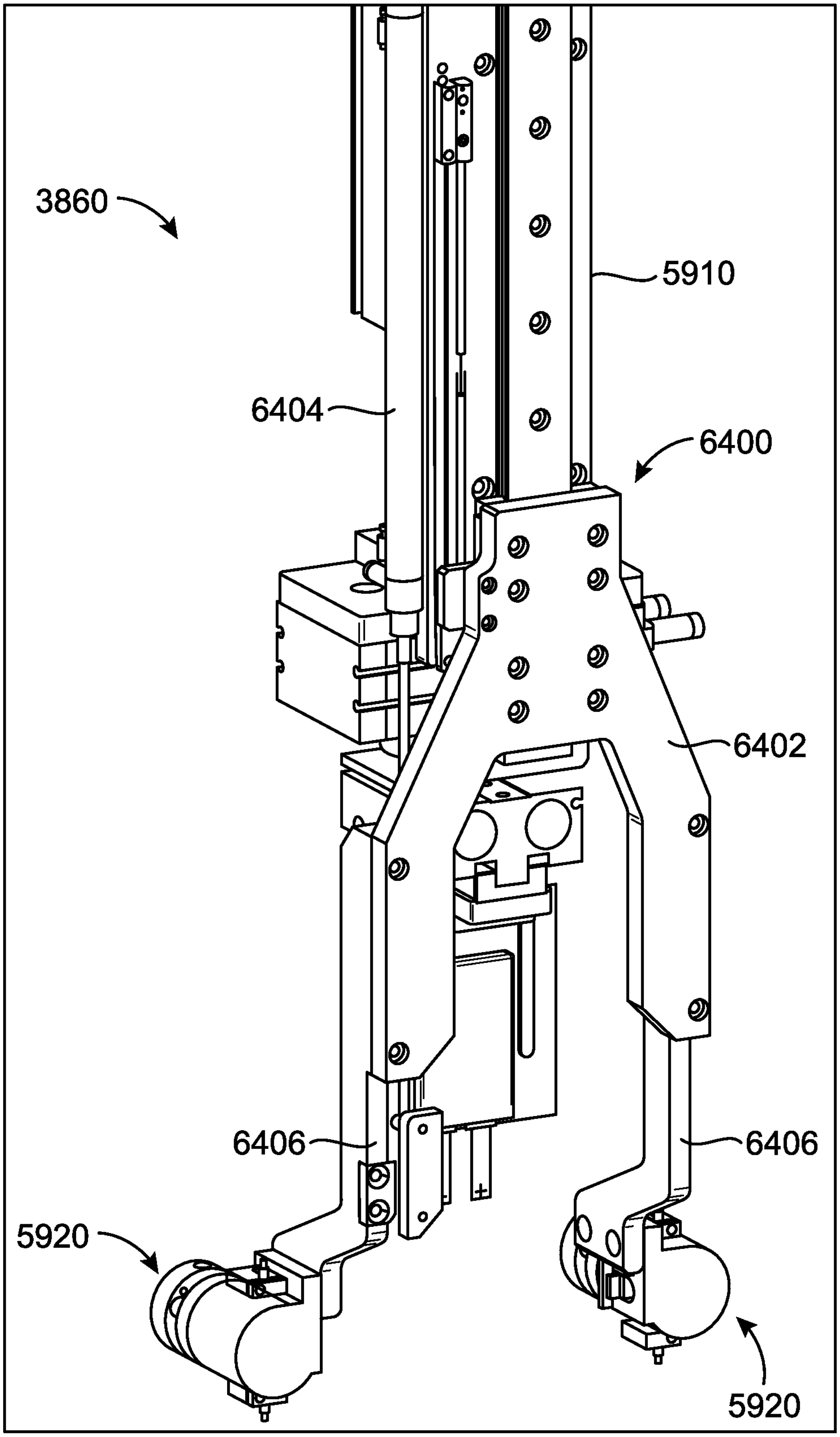
FIG. 64 is another enlarged perspective view of a portion of the loading mechanism shown in FIG. 59.
Figure 65:
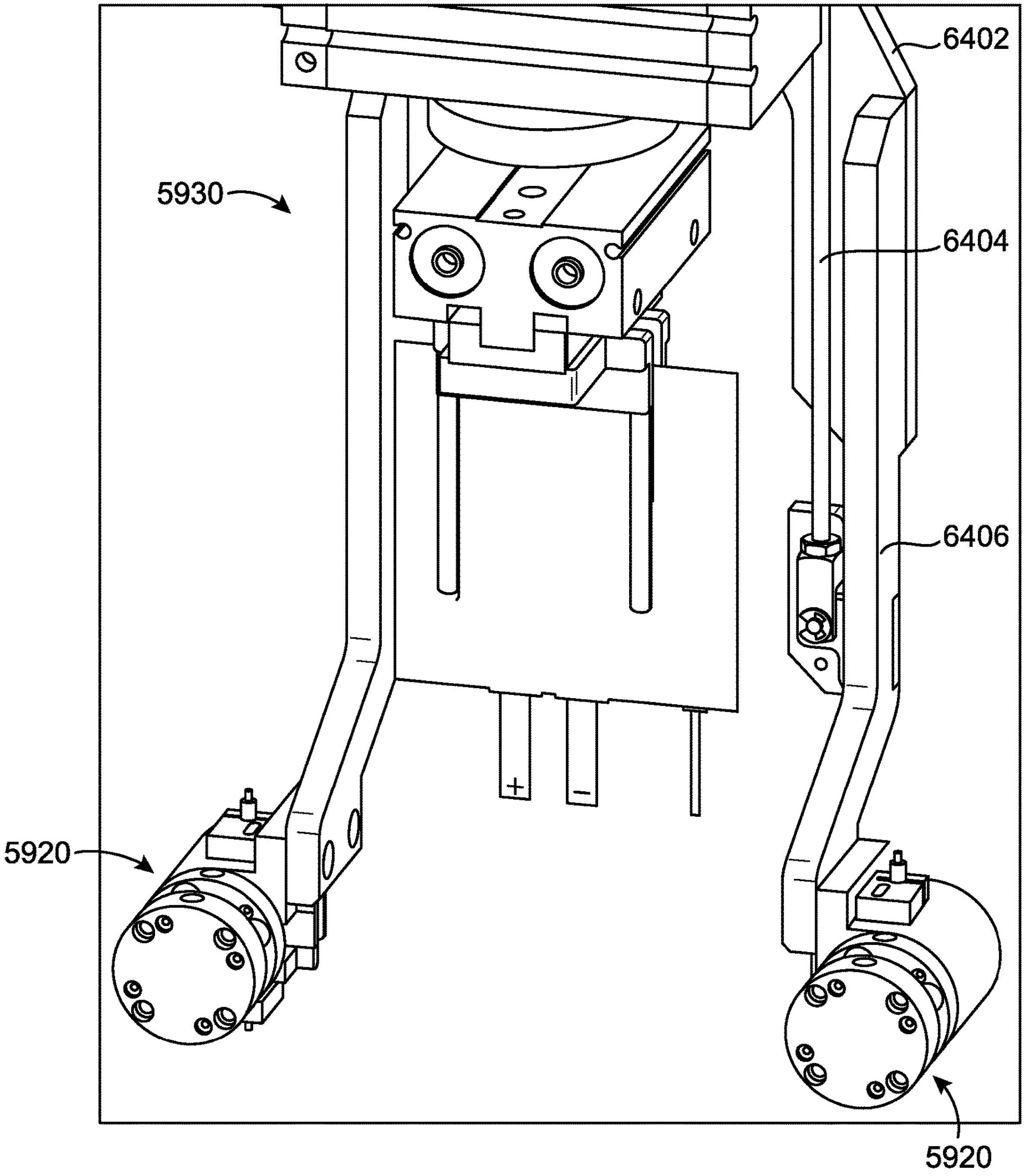
FIG. 65 is another enlarged perspective view of a portion of the loading mechanism shown in FIG. 59.

The plate spreaders 5920 may also be moveable with respect to the compression fixture 3830 and the compression plates 4020 such that each plate spreader 5920 may be moved (e.g., laterally and/or vertically) towards and away from the compression plates 4020 to facilitate positioning the moveable tabs 6306 of the plate spreaders 5920 between the moveable compression plate 4040 and the fixed compression plate 4030 of a compression plate set 4050. Referring to FIG. 64, for example, each plate spreader 5920 of the illustrated embodiment is coupled to the bracket 5910 by a lift mechanism 6400 operable to raise and lower the plate spreaders 5920 relative to the compression fixture 3830. The example lift mechanism 6400 includes a yoke 6402 slidably coupled to the bracket 5910, and an actuator 6404 coupled to the bracket 5910 and operatively coupled to the yoke 6402 to move or slide the yoke 6402 along the bracket 5910, towards and away from the compression fixture 3830. Each plate spreader 5920 is coupled to the yoke 6402 by a respective arm 6406. The actuator 6404 is coupled to the yoke 6402 through one of the arms 6406 in this embodiment, though in other embodiments the actuator 6404 may be coupled directly to the yoke 6402, or through any other suitable mechanical linkage. Actuation of the actuator 6404 causes the yoke 6402 and plate spreaders 5920 to be raised and lowered relative to the compression fixture 3830 such that the moveable tabs 6306 of the plate spreaders 5920 may positioned between the moveable compression plate 4040 and the fixed compression plate 4030 of a compression plate set 4050. For example, after the loading mechanism 3860 loads a secondary battery into the battery receptacle 4402 of one of the compression plate sets 4050, the plate spreaders 5920 may be raised by the lift mechanism 6400 above the moveable compression plate 4040 and the fixed compression plate 4030 of that set 4050 such that the plate spreaders 5920 may be moved longitudinally (e.g., via an X-Y positioning system) relative to the compression fixture 3830 and positioned above another compression plate set 4050. When the plate spreaders 5920 are positioned above another compression plate set 4050, the actuator 6404 may be actuated again to lower the yoke 6402 and the plate spreaders 5920 towards the compression fixture 3830 such that the moveable tabs 6306 of the plate spreaders 5920 are positioned between the moveable compression plate 4040 and the fixed compression plate 4030 of a compression plate set 4050.

The actuators of the loading mechanism 3860 may include, for example and without limitation, pneumatic actuators, electrically-controllable actuators including, but not limited to, electric motors, servo motors, stepper motors, and combinations thereof. Such electrically-controllable actuators may include and/or be communicatively coupled to a suitable controller or controllers (e.g., controller 3004, controller 3110, and/or a dedicated loading mechanism controller) to control operation of the loading mechanism 3860. In some embodiments, for example, one or more of the actuators of the loading mechanism 3860 may include and/or be communicatively coupled to one or more controllers for automatic or semi-automatic control of the loading mechanism 3860. For example, one or more controllers may be programmed to control the actuators of the loading mechanism 3860 to perform one or more operations described herein including, for example and without limitation, transporting a secondary battery to the compression fixture 3830, loading a secondary battery into a battery receptacle 4402 of the compression fixture 3830, removing a secondary battery 5100 from a battery receptacle 4402 of the compression fixture 3830, moving a moveable compression plate 4040 (e.g., from the first position to the second position), releasing or disengaging a moveable compression plate from the loading mechanism 3860, and any other process or operation described herein.

In operation, the compression fixture 3830 is used to apply compressive forces to secondary batteries, for example, during the formation and/or pre-lithiation process of the secondary batteries. For example, the loading mechanism 3860 may transport one or more secondary batteries 5100 to the compression fixture 3830 and insert the secondary batteries 5100 into respective battery receptacles 4402 of the compression fixture 3830. The secondary batteries 5100 may be stored at any suitable location prior to being transported to the compression fixture 3830. For example, the secondary batteries 5100 may be stored in a battery tray (e.g., battery tray 2202 or battery tray 3810), or in a separate row of battery slots 3820 of the tray 3810 to which compression fixture 3830 is coupled.

To transport secondary batteries 5100 to the compression fixture 3830, the loading mechanism 3860 may be positioned adjacent one of the secondary batteries 5100 (e.g., above the secondary battery 5100) via a suitable positioning system (e.g., an X-Y positioning system). The battery clamp 5930 may then be lowered or otherwise positioned relative to the secondary battery 5100 (e.g., via linear actuator 5940) such that the secondary battery 5100 is positioned between the pairs 6002 of fingers 6004 of the battery clamp 5930. The battery clamp 5930 may then be actuated to cause the pairs 6002 of fingers 6004 to clamp the secondary battery 5100 therebetween such that the secondary battery 5100 is secured by the battery clamp 5930. The battery clamp 5930 may then be raised with the secondary battery 5100 secured thereto, and the loading mechanism 3860 positioned adjacent the compression fixture 3830 to load the secondary battery 5100 therein.

In the illustrated embodiments, secondary batteries 5100 are loaded into the compression fixture 3830 as part of a buffer system (e.g., buffer system 500). Accordingly, the battery clamp 5930 may engage an enclosure or other portion of the buffer system instead of engaging the secondary battery 5100 directly. In the illustrated embodiment, for example, the fingers 6004 of the battery clamp 5930 engage an enclosure (e.g., a film) of the buffer system to the left and right of the secondary battery. In other embodiments, the battery clamp 5930 may engage the secondary batteries 5100 directly. In yet other embodiments, secondary batteries 5100 may be loaded into the compression fixture 3830 apart from or separate from a buffer system.

While the secondary batteries are being transported to or from the compression fixture 3830, the plate spreaders 5920 may be maintained in a raised positioned (e.g., via lift mechanism 6400), for example, to avoid interference with the compression fixture 3830 and/or other secondary batteries. To load a secondary battery 5100 into the compression fixture 3830, the loading mechanism 3860, having the secondary battery 5100 secured by the battery clamp 5930, may be positioned adjacent the compression fixture 3830. For example, the loading mechanism 3860 may be positioned above the compression fixture 3830 with the secondary battery 5100 vertically aligned with the battery receptacle 4402 of one of the compression plate sets 4050, and the moveable tab 6306 of each plate spreader 5920 vertically aligned with a space or gap between corresponding flanges (e.g., flanges 5514 and 5714) of the fixed compression plate 4030 and the moveable compression plate 4040 of the compression plate set 4050. The plate spreaders 5920 may then be lowered or otherwise moved (e.g., via lift mechanism 6400) such that the moveable tab 6306 of each plate spreader 5920 is positioned between corresponding flanges (e.g., flanges 5514 and 5714) of the fixed compression plate 4030 and the moveable compression plate 4040 of the compression plate set 4050. The actuator 6308 of each plate spreader 5920 may be actuated to cause the moveable tab 6306 to engage a respective flange 5714 of the moveable compression plate 4040, and move the moveable compression plate 4040 away from the fixed compression plate 4030 (e.g., from the first position to the second position) to increase a size or width of the battery receptacle 4402.

The secondary battery 5100 may then be lowered or otherwise moved into the battery receptacle 4402 by the battery clamp 5930 (e.g., via actuation of the linear actuator 5940) while the moveable compression plate 4040 is held in place (e.g., in the second position) by the plate spreaders 5920. For example, the secondary battery 5100 may be lowered into the battery receptacle 4402 until a portion of the secondary battery 5100 contacts the recessed surface 4308 of the base 4010. When the secondary battery 5100 is positioned in the battery receptacle 4402, a first electrical terminal 5102 (e.g., electrical terminal 124) and a second electrical terminal 5104 (e.g., electrical terminal 125) of the secondary battery 5100 may extend through a corresponding battery opening 4312 of the base 4010, as shown in FIG. 59 for example. The first electrical terminal 5102 and the second electrical terminal 5104 of the secondary battery 5100 may also extend through one of the battery slots 3820 of the battery tray 3810 aligned with the battery opening 4312 of the compression fixture base 4010. As noted above, the secondary batteries 5100 are loaded into the compression fixture 3830 as part of a buffer system in this embodiment. Accordingly, a third terminal 5106 electrically connected to an auxiliary electrode of the buffer system (e.g., conductive tab 508-1) may also extend through the battery opening 4312 and battery slot 3820. The terminals of the secondary battery 5100 are therefore readily accessible and connectable to other components of the cell formation system 3800, for example, to perform one or more of the formation and/or pre-lithiation processes described herein.

When the secondary battery 5100 is positioned within the battery receptacle 4402, the plate spreaders 5920 may release or otherwise disengage from the moveable compression plate 4040, for example, by actuating the plate spreader actuators 6308 to move the moveable tabs 6306 away from the moveable compression plate 4040 and/or towards the fixed compression plate 4030 of the set 4050. Releasing the moveable compression plate 4040 allows the moveable compression plate 4040 to move towards and engage the secondary battery 5100 under the force of the springs 4408.

The secondary battery 5100 is then compressed between the moveable compression plate 4040 and the fixed compression plate 4030.

The battery clamp 5930 may release the secondary battery 5100, for example, by actuating the battery clamp 5930 to move the pairs 6002 of fingers 6004 away from one another. The battery clamp 5930 may release the secondary battery 5100 before, during (i.e., simultaneously with), or after the plate spreaders 5920 release or disengage the moveable compression plate 4040. In one example, the battery clamp 5930 releases the secondary battery 5100 after the moveable compression plate 4040 is released from the plate spreaders 5920 and engages the secondary battery 5100. In this example, the fingers 6004 of the battery clamp 5930 may be positioned within the slots 5518 of the fixed compression plate 4030 (FIG. 55) and/or the slots 5720 of the moveable compression plate 4040 (FIG. 57), for example, to prevent interference between the fingers 6004 and the fixed compression plate 4030 and the moveable compression plate 4040, and to allow the battery clamp 5930 to be removed from the battery receptacle 4402 after the secondary battery 5100 is positioned therein.

Once the secondary battery 5100 is released from the battery clamp 5930, the battery clamp 5930 may be raised or otherwise moved out of the battery receptacle 4402, for example, by actuation of the linear actuator 5940. The plate spreaders 5920 may also be raised or otherwise moved out of and/or away from the battery receptacle 4402 (e.g., via lift mechanism 6400) to allow the loading mechanism 3860 to move to the location where additional secondary batteries are stored. The above process may be repeated to load additional secondary batteries 5100 into the compression fixture 3830.

While the secondary batteries 5100 are held in the compression fixture 3830, each secondary battery 5100 is compressed between the fixed compression plate 4030 and the moveable compression plate 4040 of a compression plate set 4050. The amount of compression is based, at least in part, on the type and number of springs 4408 included in each compression plate set 4050. For example, the amount of compression may be increased or decreased by utilizing springs having a higher or lower spring constant and/or by utilizing a larger or smaller number of springs 4408. Moreover, the compressive force applied to the secondary battery 5100 may be selected based on one or more of the size of the secondary battery 5100, the geometry of the secondary battery 5100, the construction of the secondary battery 5100, and one or more processes (e.g., formation and/or pre-lithiation processes) to which the secondary battery 5100 is subjected while in the compression fixture 3830. In some embodiments, each compression plate set 4050 is configured (i.e., has a suitable number and type of springs 4408) to apply a compressive force across the surface of the secondary battery 5100 equal to a pressure in the range of 1 pound per square inch (PSI) to 10 PSI, in the range of 1 PSI to 8 PSI, in the range of 2 PSI to 10 PSI, in the range of 1 PSI to 6 PSI, in the range of 2 PSI to 8 PSI, in the range of 3 PSI to 10 PSI, in the range of 2 PSI to 6 PSI, in the range of 3 PSI to 8 PSI, in the range of 4 PSI to 10 PSI, or in the range of 3 PSI to 6 PSI.

Additionally, as noted above, the terminals of the secondary batteries 5100 may be connected to one or more components of cell formation system 3800 to perform one or more processes on the secondary batteries 5100 while the secondary batteries 5100 are held in the compression fixture 3830. In some embodiments, for example, the terminals of each secondary battery 5100 are connected to a pre-lithiation module (e.g., pre-lithiation module 2216 and/or pre-lithiation module 3104), and the secondary batteries are subjected to a pre-lithiation process while held in the compression fixture 3830.

The secondary batteries 5100 may be removed from the compression fixture 3830 in a similar manner in which they are loaded. For example, the loading mechanism 3860 may be positioned above the compression fixture 3830 with the fingers 6004 of the battery clamp 5930 vertically aligned with the battery receptacle 4402 of one of the compression plate sets 4050, and the moveable tab 6306 of each plate spreader 5920 vertically aligned with a space or gap between corresponding flanges (e.g., flanges 5514 and 5714) of the fixed compression plate 4030 and the moveable compression plate 4040 of the compression plate set 4050. The plate spreaders 5920 may then be lowered or otherwise moved (e.g., via lift mechanism 6400) such that the moveable tab 6306 of each plate spreader 5920 is positioned between corresponding flanges (e.g., flanges 5514 and 5714) of the fixed compression plate 4030 and the moveable compression plate 4040 of the compression plate set 4050. The actuator 6308 of each plate spreader 5920 may be actuated to cause the moveable tab 6306 to engage a respective flange 5714 of the moveable compression plate 4040, and move the moveable compression plate 4040 away from the fixed compression plate 4030 (e.g., to the second position) to increase a size or width of the battery receptacle 4402 and cause the moveable compression plate 4040 to disengage the secondary battery 5100.

The battery clamp 5930 may be lowered or otherwise moved (e.g., via linear actuator 5940) such that the secondary battery 5100 is positioned between the pairs 6002 of fingers 6004 of the battery clamp 5930. In some embodiments, the battery clamp 5930 is lowered by the linear actuator 5940 prior to the plate spreaders 5920 moving the moveable compression plate 4040 such that the secondary battery 5100 is held in place until the battery clamp 5930 clamps the secondary battery 5100. In such embodiments, the fingers 6004 of the battery clamp 5930 may be inserted into the slots 5518 of the fixed compression plate 4030 (FIG. 55) and/or the slots 5720 of the moveable compression plate 4040 (FIG. 57) when the battery clamp 5930 is lowered towards the compression fixture 3830 by the linear actuator 5940. When the secondary battery 5100 is positioned between the pairs 6002 of fingers 6004 of the battery clamp 5930, the battery clamp 5930 may be actuated to cause the pairs 6002 of fingers 6004 to clamp the secondary battery 5100 therebetween such that the secondary battery 5100 is secured by the battery clamp 5930. The plate spreaders 5920 may move the moveable compression plate 4040 away from the fixed compression plate 4030 and the secondary battery 5100, if not already moved. The battery clamp 5930 may then be raised with the secondary battery 5100 secured thereto to remove the secondary battery 5100 from the battery receptacle 4402. The plate spreaders 5920 may also be raised or otherwise moved out of and/or away from the battery receptacle 4402 (e.g., via lift mechanism 6400) to allow the loading mechanism 3860 to move to another location and transport the secondary battery 5100 thereto. The above process may be repeated to unload additional secondary batteries 5100 from the compression fixture 3830.

Figure 66:
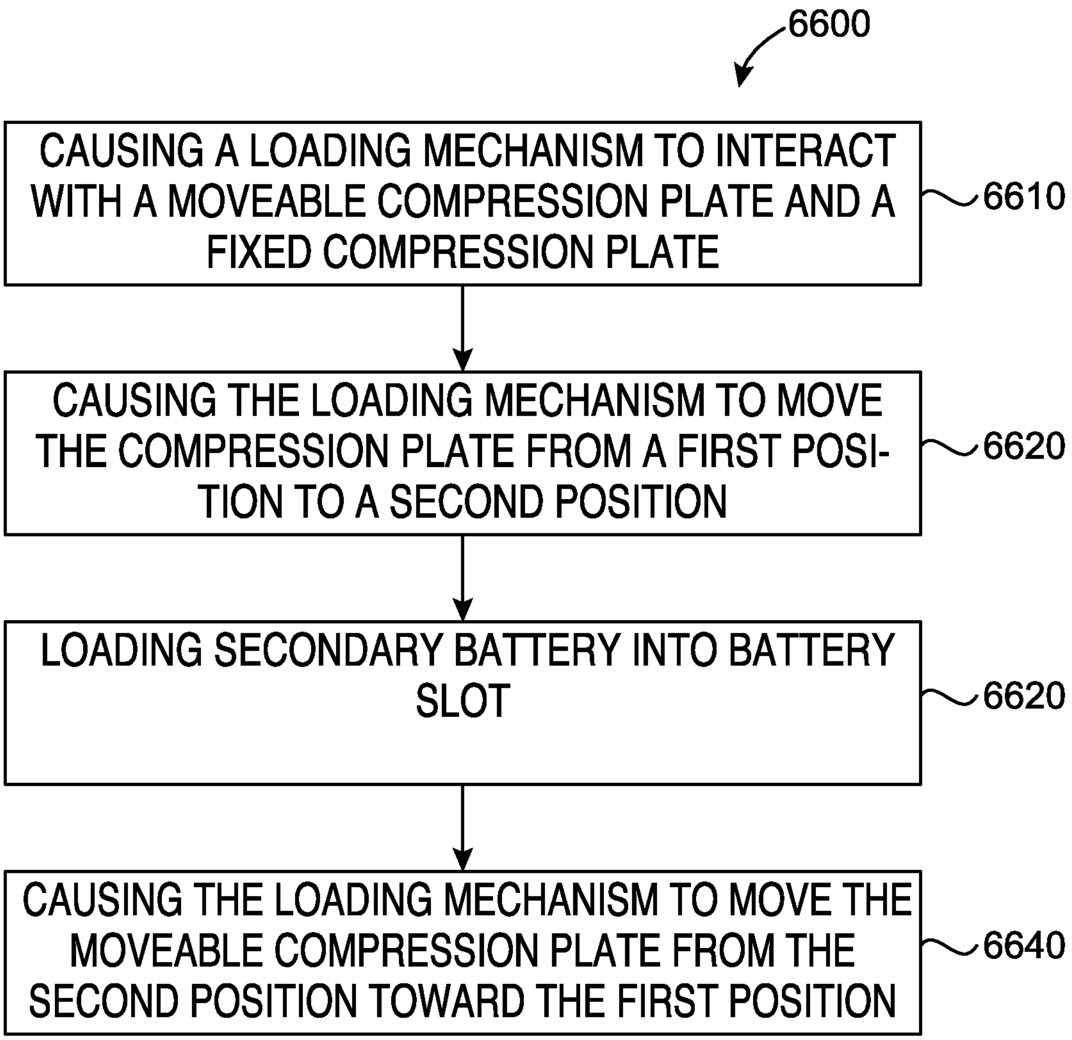
FIG. 66 is a flowchart of an example method for compressing a lithium containing secondary battery according to one suitable embodiment.

FIG. 66 is a flowchart of an example method 6600 for compressing a lithium containing secondary battery according to one suitable embodiment. The method 6600 may be performed by or within a cell formation system such as, for example, the cell formation system 3800 shown and described with reference to FIGS. 38-65.

Method 6600 begins when a loading mechanism (e.g., loading mechanism 3860) interacts 6610 with a moveable compression plate and a fixed compression plate of a compression fixture (e.g., compression fixture 3830). As explained above, the fixed compression plate and moveable compression plate define a battery receptacle having an associated width. The loading mechanism may be moveable along a length of the compression fixture when a secondary battery is loaded into and/or removed from the battery receptacle.

As part of this interaction, the loading mechanism may interface with one or more flanges of the moveable compression plate and/or the fixed compression plate. As a result, the moveable compression plate is moved 6620 from a first position to a second position. For example, the loading mechanism may insert a moveable tab into the battery receptacle and push and/or pull the moveable compression plate away from the fixed compression plate.

Once the moveable compression plate has been moved from the first position to the second position, a secondary battery is loaded 6630 (or unloaded) from the battery receptacle. The loading mechanism then causes the moveable compression plate to be moved 6640 from the second position toward the first position. As a result, a compressive force is applied to the secondary battery.

The following embodiments are provided to illustrate various aspects of the present disclosure. The following embodiments are not intended to be limiting and therefore, the present disclosure further supports other aspects and/or embodiments not specifically provided below.

Embodiment 1: A cell formation system for lithium containing secondary batteries, each lithium containing secondary battery comprising a population of unit cells, an electrode busbar, a counter-electrode busbar, a first terminal electrically connected to the electrode busbar, and a second terminal electrically connected to the counter-electrode busbar, wherein each unit cell of the population of unit cells comprises an electrode structure, a separator structure, and a counter-electrode structure. The cell formation system comprises a compression fixture and a loading mechanism. The compression fixture comprises a base and a plurality of compression plate sets coupled to the base, each compression plate set comprising a fixed compression plate, a moveable compression plate moveable relative to the fixed compression plate between a first position and a second position, and at least one spring operatively coupled to the moveable compression. The moveable compression plate is positioned farther from the fixed compression plate in the second position than in the first position, wherein the fixed compression plate and the moveable compression plate define a battery receptacle therebetween for receiving a lithium containing secondary battery. The at least one spring biases the moveable compression plate towards the fixed compression plate such that a compressive force is applied to the lithium containing secondary battery when positioned within the battery receptacle. The loading mechanism comprises at least one plate spreader operable to move the moveable compression plate away from the fixed compression plate to load and unload the lithium containing secondary battery within the battery receptacle.

Embodiment 2: The cell formation system of embodiment 1, wherein the base defines a plurality of battery openings, each battery opening aligned with the battery receptacle of a corresponding compression plate set, wherein the first terminal and the second terminal of the lithium containing secondary battery extend through one of the battery openings when the lithium containing secondary battery is positioned in the battery receptacle of the corresponding compression plate set.

Embodiment 3: The cell formation system of embodiment 2, wherein each lithium containing secondary battery further comprises an auxiliary electrode and a conductive tab electrically connected to the auxiliary electrode, wherein the conductive tab of the lithium containing secondary battery extends through one of the battery openings when the lithium containing secondary battery is positioned in the battery receptacle of the corresponding compression plate set.

Embodiment 4: The cell formation system of any previous embodiment, further comprising a battery tray, wherein the compression fixture is removably coupleable to the battery tray.

Embodiment 5: The cell formation system of embodiment 4, wherein the battery tray defines a plurality of battery slots, and wherein the first terminal and the second terminal of the lithium containing secondary battery extend through one of the battery slots when the lithium containing secondary battery is positioned in the battery receptacle of one of the compression plate sets, and the compression fixture is coupled to the battery tray.

Embodiment 6: The cell formation system of embodiment 5, wherein each lithium containing secondary battery further comprises an auxiliary electrode and a conductive tab electrically connected to the auxiliary electrode, wherein the conductive tab of the lithium containing secondary battery extends through the one of the battery slots when the lithium containing secondary battery is positioned in the battery receptacle of one of the compression plate sets, and the compression fixture is coupled to the battery tray.

Embodiment 7: The cell formation system of any previous embodiment, wherein the moveable compression plate of each compression plate set includes a first side facing the fixed compression plate and an opposing second side facing away from the fixed compression plate, wherein the moveable compression plate includes a compliant material disposed on the first side.

Embodiment 8: The cell formation system of any previous embodiment, wherein the fixed compression plate of each compression plate set includes a first side facing the moveable compression plate and an opposing second side facing away from the moveable compression plate, wherein the fixed compression plate includes a compliant material disposed on the first side.

Embodiment 9: The cell formation system of any previous embodiment, wherein each compression plate set further comprises at least one spacer positioned between the fixed compression plate and the moveable compression plate, wherein the at least one spacer maintains a minimum distance between the fixed compression plate and the moveable compression plate.

Embodiment 10: The cell formation system of embodiment 9, wherein the at least one plate spreader includes a moveable tab operable to engage the moveable compression plate to move the moveable compression plate from the first position to the second position, wherein a thickness of the moveable tab is less than a thickness of the spacer.

Embodiment 11: The cell formation system of any previous embodiment, wherein the at least one spring is positioned between the moveable compression plate of one compression plate set and the fixed compression plate of an adjacent compression plate set.

Embodiment 12: The cell formation system of any previous embodiment, further comprising at least one alignment rod, wherein each of the fixed compression plate and the moveable compression plate defines at least one through-hole, wherein the at least one alignment rod extends through the at least one through-hole of each fixed compression plate and each moveable compression plate.

Embodiment 13: The cell formation system of any previous embodiment, wherein the moveable compression plate of each compression plate set comprises at least one flange, and wherein the plate spreader is operable to engage the at least one flange to move the moveable compression plate from the first position to the second position.

Embodiment 14: The cell formation system of any previous embodiment, wherein the loading mechanism further comprises a battery clamp operable to clamp the lithium containing secondary battery and position the lithium containing secondary battery within the battery receptacle.

Embodiment 15: A lithium containing secondary battery formed using the cell formation system of any previous embodiment, the lithium containing secondary battery comprising a population of unit cells, an electrode busbar, a counter-electrode busbar, a first terminal electrically connected to the electrode busbar, and a second terminal electrically connected to the counter-electrode busbar, wherein each unit cell of the population of unit cells comprises an electrode structure, a separator structure, and a counter-electrode structure, the electrode structure of each member of the unit cell population comprises an electrode current collector and an electrode active material layer, and the counter-electrode structure of each member of the unit cell population comprises a counter-electrode current collector and a counter-electrode active material layer.

Embodiment 16: The lithium containing secondary battery of embodiment 15 further comprising an auxiliary electrode, an enclosure enclosing the population of unit cells, the electrode busbar, the counter-electrode busbar, and the auxiliary electrode, and a conductive tab electrically connected to the auxiliary electrode, wherein the first terminal, the second terminal, and the conductive tab extend from the enclosure.

Embodiment 17: A compression fixture for lithium containing secondary batteries, each lithium containing secondary battery comprising a population of unit cells, an electrode busbar, a counter-electrode busbar, a first terminal electrically connected to the electrode busbar, and a second terminal electrically connected to the counter-electrode busbar, wherein each unit cell of the population of unit cells comprises an electrode structure, a separator structure, and a counter-electrode structure, the compression fixture comprising a base and a plurality of compression plate sets coupled to the base, each compression plate set comprising a fixed compression plate, a moveable compression plate moveable relative to the fixed compression plate between a first position and a second position, wherein the moveable compression plate is positioned farther from the fixed compression plate in the second position than in the first position, wherein the fixed compression plate and the moveable compression plate define a battery receptacle therebetween for receiving a lithium containing secondary battery, and at least one spring operatively coupled to the moveable compression plate and biasing the moveable compression plate towards the fixed compression plate such that a compressive force is applied to the lithium containing secondary battery when positioned within the battery receptacle.

Embodiment 18: The compression fixture of embodiment 17, wherein the base defines a plurality of battery openings, each battery opening aligned with the battery receptacle of a corresponding compression plate set, wherein the first terminal and the second terminal of the lithium containing secondary battery extend through one of the battery openings when the lithium containing secondary battery is positioned in the battery receptacle of the corresponding compression plate set.

Embodiment 19: The compression fixture of embodiment 18, wherein each lithium containing secondary battery further comprises an auxiliary electrode and a conductive tab electrically connected to the auxiliary electrode, wherein the conductive tab of the lithium containing secondary battery extends through the one of the battery openings when the lithium containing secondary battery is positioned in the battery receptacle of the corresponding compression plate set.

Embodiment 20: The compression fixture of any previous embodiment, wherein each compression plate set further comprises at least one spacer positioned between the fixed compression plate and the moveable compression plate, wherein the at least one spacer maintains a minimum distance between the fixed compression plate and the moveable compression plate.

Embodiment 21: The compression fixture of any previous embodiment, wherein the at least one spring is positioned between the moveable compression plate of one compression plate set and the fixed compression plate of an adjacent compression plate set.

Embodiment 22: The compression fixture of any previous embodiment, further comprising at least one alignment rod, wherein each of the fixed compression plate and the moveable compression plate defines at least one through-hole, wherein the at least one alignment rod extends through the at least one through-hole of each fixed compression plate and each moveable compression plate.

Embodiment 23: The compression fixture of any previous embodiment, wherein the moveable compression plate of each compression plate set includes a first side facing the fixed compression plate and an opposing second side facing away from the fixed compression plate, wherein the moveable compression plate includes a compliant material disposed on the first side.

Embodiment 24: The compression fixture of any previous embodiment, wherein the fixed compression plate of each compression plate set includes a first side facing the moveable compression plate and an opposing second side facing away from the moveable compression plate, wherein the fixed compression plate includes a compliant material disposed on the first side.

Embodiment 25: A method for manufacturing lithium containing secondary batteries, each lithium containing secondary battery comprising a population of unit cells, an electrode busbar, a counter-electrode busbar, a first terminal electrically connected to the electrode busbar, and a second terminal electrically connected to the counter-electrode busbar, wherein each unit cell of the population of unit cells comprises an electrode structure, a separator structure, and a counter-electrode structure, the method comprising moving a moveable compression plate of a compression plate set from a first position to a second position, the compression plate set including a fixed compression plate, the moveable compression plate, and at least one spring that biases the moveable compression plate towards the fixed compression plate, the fixed compression plate and the moveable compression plate defining a battery receptacle therebetween, wherein the moveable compression plate is positioned farther from the fixed compression plate in the second position than in the first position, positioning a lithium containing secondary battery within the battery receptacle, and moving the moveable compression plate towards and into engagement with the lithium containing secondary battery such that the lithium containing secondary battery is compressed between the fixed compression plate and the moveable compression plate.

Embodiment 26: The method of embodiment 25, wherein the compression plate set is a coupled to a base of a compression fixture, and wherein positioning a lithium containing secondary battery within the battery receptacle includes positioning the first terminal and the second terminal of the lithium containing secondary battery through a battery opening defined in the base and aligned with the battery receptacle.

Embodiment 27: The method of embodiment 26, wherein each lithium containing secondary battery further comprises an auxiliary electrode and a conductive tab electrically connected to the auxiliary electrode, wherein positioning a lithium containing secondary battery within the battery receptacle further includes positioning the conductive tab of the lithium containing secondary battery through the battery opening.

Embodiment 28: The method of any previous embodiment, further comprising performing a pre-lithiation process on the lithium containing secondary battery while the lithium containing secondary battery is compressed between the moveable compression plate and the fixed compression plate.

Embodiment 29: The method of embodiment 28, further comprising removing the lithium containing secondary battery from the battery receptacle following the pre-lithiation process.

Embodiment 30: The method of any previous embodiment, wherein moving a moveable compression plate of a compression plate set from a first position to a second position comprises engaging a flange of the moveable compression plate with a plate spreader of a loading mechanism, and moving the moveable compression plate from the first position to the second position with the plate spreader.

Embodiment 31: A secondary battery assembly formed using any of the previous embodiments of the cell formation system, the compression fixture and/or the method of manufacturing lithium containing secondary batteries.

Embodiment 32. The secondary battery assembly of Embodiment 31, wherein an electrode assembly of the battery assembly comprises a rectangular prismatic shape.

Embodiment 33. The secondary battery assembly of any prior Embodiment, wherein the electrode assembly is enclosed within a volume defined by a constraint.

Embodiment 34. The secondary battery assembly of any prior embodiment, wherein the electrode assembly comprises an anodically active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 35. The secondary battery assembly of any prior embodiment, wherein the electrode assembly comprises an anodically active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Embodiment 36. The secondary battery assembly of any prior embodiment, wherein the electrode assembly comprises an anodically active material selected from the group consisting of alloys and intermetallic compounds of Si, Ge, Sn, Pb, Sb, Bi, Zn, Al, Ti, Ni, Co, or Cd with other elements.

Embodiment 37. The secondary battery assembly of any prior embodiment, wherein the electrode assembly comprises an anodically active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Embodiment 38. The secondary battery assembly of any prior embodiment, wherein the electrode assembly comprises an anodically active material selected from the group consisting of oxides, carbides, nitrides, sulfides, phosphides, selenides, and tellurides of Si.

Embodiment 39. The secondary battery assembly of any prior embodiment, wherein the electrode assembly comprises an anodically active material selected from the group consisting of silicon and the oxides and carbides of silicon.

Embodiment 40. The secondary battery assembly of any prior embodiment, wherein the electrode assembly comprises an anodically active material comprising lithium metal.

Embodiment 41. The secondary battery assembly of any prior embodiment, wherein the electrode assembly comprises an anodically active material selected from the group consisting of graphite and carbon.

Embodiment 42. The secondary battery assembly of any prior embodiment, wherein within the enclosure the secondary battery further comprises a non-aqueous, organic electrolyte.

Embodiment 43. The secondary battery assembly of any prior embodiment, wherein within the enclosure the secondary battery further comprises a non-aqueous electrolyte comprising a mixture of a lithium salt and an organic solvent.

Embodiment 44. The secondary battery assembly of any prior embodiment, wherein within the enclosure the secondary battery further comprises a polymer electrolyte.

Embodiment 45. The secondary battery assembly of any prior embodiment, wherein within the enclosure the secondary battery further comprises a solid electrolyte.

Embodiment 46. The secondary battery assembly of any prior embodiment, wherein within the enclosure the secondary battery further comprises a solid electrolyte selected from the group consisting of sulfide-based electrolytes.

Embodiment 47. The secondary battery assembly of any prior embodiment, wherein within the enclosure the secondary battery further comprises a solid electrolyte selected from the group consisting of lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

Embodiment 48. The secondary battery assembly of any prior embodiment, wherein within the enclosure the secondary battery further comprises a polymer-based electrolyte.

Embodiment 49. The secondary battery assembly of any prior embodiment, wherein within the enclosure the secondary battery further comprises a polymer electrolyte selected from the group consisting of PEO-based polymer electrolyte, polymer-ceramic composite electrolyte (solid), and other polymer-ceramic composite electrolytes.

Embodiment 50. The secondary battery assembly of any prior embodiment, wherein within the enclosure the secondary battery further comprises a solid electrolyte selected from the group consisting of oxide-based electrolytes.

Embodiment 51. The secondary battery assembly of any prior embodiment, wherein within the enclosure the secondary battery further comprises a solid electrolyte selected from the group consisting of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

Embodiment 52. The secondary battery assembly of any prior embodiment, wherein one of electrode active material and counter-electrode material of the electrode assembly is a cathodically active material selected from the group consisting of intercalation chemistry positive electrodes and conversion chemistry positive electrodes.

Embodiment 53. The secondary battery assembly of any prior embodiment, wherein one of electrode active material and counter-electrode material of the electrode assembly is a cathodically active material comprising an intercalation chemistry positive electrode material.

Embodiment 54. The secondary battery assembly of any prior embodiment, wherein one of electrode active material and counter-electrode material of the electrode assembly is a cathodically active material comprising a conversion chemistry positive electrode active material.

Embodiment 55. The secondary battery assembly of any prior embodiment, wherein one of electrode active material and counter-electrode material of the electrode assembly is a cathodically active material selected from the group consisting of S (or $Li_2S$ in the lithiated state), LiF, Fe, Cu, Ni, $FeF_2$, $FeO_dF_{3.2d}$, $FeF_3$, $CoF_3$, $CoF_2$, $CuF_2$, $NiF_2$, where $0 \leq d \leq 0.5$.

Embodiment 56: The secondary battery assembly of any prior embodiment, comprising a population of unit cells, an electrode busbar, a counter-electrode busbar, a first terminal electrically connected to the electrode busbar, and a second terminal electrically connected to the counter-electrode busbar, wherein each unit cell of the population of unit cells comprises an electrode structure, a separator structure, and a counter-electrode structure.

Embodiment 57: The secondary battery assembly of embodiment 56, wherein the electrode structure is one of a positive electrode and a negative electrode, the counter-electrode structure is the other one of the positive electrode and the negative electrode, the positive electrode has a positive electrode coulombic capacity, and the negative electrode has a negative electrode coulombic capacity exceeding the positive electrode coulombic capacity.

Embodiment 58: The secondary battery assembly of embodiment 57, wherein a ratio of the negative electrode coulombic capacity to the positive electrode coulombic capacity is at least 1.2:1.

Embodiment 59: The secondary battery assembly of embodiment 57, wherein a ratio of the negative electrode coulombic capacity to the positive electrode coulombic capacity is at least 1.3:1.

Embodiment 60: The secondary battery assembly of embodiment 57, wherein a ratio of the negative electrode coulombic capacity to the positive electrode coulombic capacity is at least 1.5:1.

Embodiment 61: The secondary battery assembly of embodiment 57, wherein a ratio of the negative electrode coulombic capacity to the positive electrode coulombic capacity is at least 2:1.

Embodiment 62: The secondary battery assembly of embodiment 57, wherein a ratio of the negative electrode coulombic capacity to the positive electrode coulombic capacity is at least 3:1.

Embodiment 63: The secondary battery assembly of embodiment 57, wherein a ratio of the negative electrode coulombic capacity to the positive electrode coulombic capacity is at least 4:1.

Embodiment 64: The secondary battery assembly of embodiment 57, wherein a ratio of the negative electrode coulombic capacity to the positive electrode coulombic capacity is at least 5:1.

Embodiment 65: The secondary battery assembly of any prior embodiment, comprising a lithium containing secondary battery and an auxiliary electrode.

Embodiment 66: The secondary battery assembly of embodiment 65, wherein the auxiliary electrode includes a first separator layer including an ionically permeable material, a conductive layer including an electrically conductive material, the conductive layer having a first surface contacting the first separator layer and a second surface opposing the first surface, a population of carrier ion supply layers disposed on the second surface of the conductive layer, each carrier ion supply layer including a material that supplies lithium ions for electrode active material layers of the lithium containing secondary battery, and a second separator layer including an ionically permeable material and in contact with the carrier ion supply layers.

Embodiment 67: The secondary battery assembly of embodiment 66, wherein the second surface of the conductive layer includes a first region disposed at a first end of the conductive layer, a second region disposed at a second end of the conductive layer that opposes the first end, and a third region disposed between the first region and the second region, wherein one of the carrier ion supply layers is disposed within the first region and another one of carrier ion supply layer is disposed within the second region.

Embodiment 68: The secondary battery assembly of embodiment 67, wherein the second separator layer is in contact with the third region of the second surface of the conductive layer.

Embodiment 69: The secondary battery assembly of embodiment 67 or 68, wherein the first region, the second region, and the third region are disposed across a length of the conductive layer.

Embodiment 70: The secondary battery assembly of any one of embodiments 66-69, wherein the first separator layer and the second separator layer are mechanically bonded together around at least a portion of a perimeter of the first separator layer and the second separator layer.

Embodiment 71: The secondary battery assembly of any one of embodiments 66-69, wherein the first separator layer and the second separator layer are formed from a continuous separator material, the first separator layer includes a first portion of the continuous separator material, the second separator layer includes a second portion of the continuous separator material, and the second portion is folded over the first portion to contact surfaces of the carrier ion supply layers.

Embodiment 72: The secondary battery assembly of embodiment 71, wherein the continuous separator material has a thickness in a range of about 0.01 millimeter to about 1 millimeter.

Embodiment 73: The secondary battery assembly of embodiment 72, wherein the thickness of the continuous separator material is about 0.025 millimeter.

Embodiment 74: The secondary battery assembly of any one of embodiments 66-73, wherein the first separator layer and the second separator layer have a thickness in a range of values of about 0.01 millimeter to about 1 millimeter.

Embodiment 75: The secondary battery assembly of any one of embodiments 66-74, wherein a thickness of the second separator layer is about 0.025 millimeter.

Embodiment 76: The secondary battery assembly of any one of embodiments 66-75, wherein the conductive layer includes one of copper and aluminum, or alloys of copper and aluminum.

Embodiment 77: The secondary battery assembly of any one of embodiments 66-76, wherein the conductive layer includes copper.

Embodiment 78: The secondary battery assembly of any one of embodiments 66-77, wherein the conductive layer has a thickness in a range of values of about 0.01 millimeter to about 1 millimeter.

Embodiment 79: The secondary battery assembly of any one of embodiments 66-78, wherein the conductive layer has a thickness of about 0.1 millimeter.

Embodiment 80: The secondary battery assembly of any one of embodiments 66-79, wherein the carrier ion supply layers have a thickness in a range of values of about 0.05 millimeter to about 1 millimeter.

Embodiment 81: The secondary battery assembly of any one of embodiments 66-80, wherein the carrier ion supply layers have a thickness of about 0.15 millimeter.

Embodiment 82: The secondary battery assembly of any one of embodiments 66-81, wherein the carrier ion supply layers provide a source of lithium ions.

Embodiment 83: The secondary battery assembly of any one of embodiments 66-82, wherein the carrier ion supply layers are cold welded to the second surface of the conductive layer.

Embodiment 84: The secondary battery assembly of any one of embodiments 66-83, wherein the auxiliary electrode includes a conductive tab including an electrically conductive material and coupled to the second surface of the conductive layer.

Embodiment 85: The secondary battery assembly of embodiment 84, wherein the conductive tab includes a first end that is coupled to the conductive layer and a second end distal to the first end that projects away from the conductive layer.

Embodiment 86: The secondary battery assembly of embodiment 84 or 85, wherein the conductive tab includes one of nickel, copper, and aluminum, or alloys of copper, nickel, and aluminum.

Embodiment 87: The secondary battery assembly of embodiment 84 or 85, wherein the conductive tab includes nickel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for formation of a battery, the system comprising:

an auxiliary electrode configured to operatively couple with the battery to allow flow of carrier ions from the auxiliary electrode to an electrode assembly of the battery for forming the battery, the carrier ions participating in electrolytic processes in the battery, the coupling between the auxiliary electrode and the battery being at least in part by coupling the auxiliary electrode with at least one face of the electrode assembly; and an electrical connector configured to couple the auxiliary electrode with the electrode assembly, and (i) a battery slot configured to receive the battery, (ii) a formation base configured to removably attach to the battery and to the electrical connector, (iii) a formation cluster configured to communicate with a central controller, the formation cluster comprising the electrical connector, the formation cluster being configured to control the flow of the carrier ions based at least in part on a control signal received from the central controller, or (iv) any combination of (i), (ii), and (iii).

2. The system of claim 1, wherein the auxiliary electrode is configured for removal from coupling with the electrode assembly.

3. The system of claim 1, wherein the system is configured to operatively couple with a compression fixture for the flow of the carrier ions from the auxiliary electrode to the electrode assembly of the battery, the compression fixture being external to the battery.

4. The system of claim 1, wherein the auxiliary electrode is configured to couple with at least one surface of the electrode assembly.

5. The system of claim 4, wherein the at least one surface is a major surface of the electrode assembly.

6. The system of claim 1, wherein the auxiliary electrode is configured to simultaneously couple with opposing surfaces of the electrode assembly.

7. The system of claim 1, wherein coupling of the auxiliary electrode with the electrode assembly is at least in part by being operatively coupled with a constraint coupled with the electrode assembly, the constraint configured to facilitate flow of an electrolyte therethrough to allow the flow of the carrier ions.

8. The system of claim 7, wherein the constraint comprises perforations configured to facilitate flow of the electrolyte therethrough to allow the flow of the carrier ions.

9. The system of claim 1, wherein the electrode assembly comprises silicon, silicon composites, silicon blends, silicon oxide, porous silicon, silicon alloys, or a mixture thereof.

10. The system of claim 1, wherein the electrode assembly comprises unit cells, and the auxiliary electrode is configured to couple with at least one side of the electrode assembly.

11. The system of claim 1, wherein the battery comprises an electrolyte configured to at least carry the carrier ions from the auxiliary electrode to the electrode assembly, the electrolyte being a liquid electrolyte, formation of the battery comprising forming a solid electrolyte interphase (SEI) in the electrode assembly at least in part by the carrier ions.

12. The system of claim 1, wherein the electrode assembly comprises an electrode and a counter-electrode, each of the electrode and/or of the counter-electrode having a length a width, and a height, the height, the length, and the width being along axes of a Cartesian coordinate system, the length being from about 5 millimeters (mm) to about 500 mm, the width being from about 0.01 mm to about 2.5 mm, the height being from about 0.05 mm to about 25 mm, the electrode assembly comprising from 1 unit cell to 200 or more members of the unit cell, the unit cell comprising the electrode and the counter-electrode.

13. The system of claim 1, wherein the electrode assembly comprises an electrode separated by a separator from a counter-electrode, each of the electrode and/or of the counter-electrode having a length, a width and a height, the height, the length, and the width being along axes of a Cartesian coordinate system, a ratio of the length to each of the width and the height is at least 5:1, a ratio of the height to the width is at least 0.4:1, the separator having a thickness of at least about 4 micrometers to about 50 micrometers, the electrode assembly comprising from 1 unit cell to 200 or more members of the unit cell comprising the electrode separated by the separator from the counter-electrode.

14. The system of claim 1, wherein the electrode assembly comprises an anode separated from a cathode, the anode having a loading from about 0.1 milligrams per centimeter squared ($mg/cm^2$) to about 5 $mg/cm^2$.

15. A method for generation of a battery, the method comprising: (a) manufacturing the system of claim 1, (b) using the system for buffering the battery, and/or (c) controlling the system during formation of the battery, the formation comprising forming a solid electrolyte interphase (SEI) in the electrode assembly.

16. An apparatus for formation of a battery, the apparatus comprising at least one controller operatively coupled with the system of claim 1, the at least one controller being configured to control the battery, the at least one controller being coupled with a power source.

17. The system of claim 1, wherein the battery slot is configured to receive the battery.

18. The system of claim 1, wherein the formation base is configured to removably attach to the battery and to the electrical connector.

19. The system of claim 1, wherein the formation cluster is configured to communicate with the central controller, the formation cluster comprising the electrical connector, and the formation cluster being configured to control the flow of the carrier ions based at least in part on the control signal received from the central controller.

20. An apparatus for battery generation, the apparatus comprising at least one controller operatively coupled with a battery for receiving a flow of carrier ions, the battery comprising:

an enclosure sealing an auxiliary electrode and an electrode assembly of the battery, the sealing being from an external environment to the enclosure, the enclosure allowing an electrical coupling between the auxiliary electrode and the electrode assembly, the electrical coupling being in the external environment, the auxiliary electrode being configured to operatively couple with the electrode assembly to allow the flow of the carrier ions from the auxiliary electrode to the electrode assembly for forming the battery, the carrier ions participating in electrolytic processes in the battery, and the battery being configured to connect to a system to provide the carrier ions to the battery, the system comprising:

(i) a battery slot configured to receive the enclosure, (ii) a formation base configured to removably attach to the enclosure and an electrical connector configured to electrically connect the auxiliary electrode and the battery, (iii) a formation cluster configured to communicate with a central controller, the formation cluster comprising the electrical connector, the formation cluster being configured to control the flow of the carrier ions based at least in part on a control signal received from the central controller, or (iv) any combination of (i), (ii), and (iii).

21. A system for flowing carrier ions into a battery, the system comprising:

a compression fixture comprising (I) a base; and (II) a compression plate set comprising: (a) a first compression plate, (b) a second compression plate movable relative to the first compression plate to at least in part define a receptacle therebetween, the receptacle being for receiving the battery operatively coupled with an auxiliary electrode to allow the flowing of the carrier ions from the auxiliary electrode to an electrode assembly of the battery, and (c) at least one mechanism operatively coupled with the second compression plate, the at least one mechanism being configured for biasing the second compression plate towards the first compression plate such that a compressive force is applied when the battery and the auxiliary electrode are positioned in the receptacle, the system being configured to allow electrical connection between the auxiliary electrode and the electrode assembly for the flowing of the carrier ions into the battery, and (i) a battery slot configured to receive the battery, (ii) the base being configured to removably attach with the battery and with an electrical connector allowing the electrical connection between the auxiliary electrode and the electrode assembly, (iii) a formation cluster configured to communicate with a central controller, the formation cluster comprising the electrical connector, the formation cluster being configured to control the flowing of the carrier ions based at least in part on a control signal received from the central controller, or (iv) any combination of (i), (ii), (iii).

* * * * *